United States Patent [19]
Shen et al.

[11] Patent Number: 5,966,530
[45] Date of Patent: *Oct. 12, 1999

[54] STRUCTURE AND METHOD FOR INSTRUCTION BOUNDARY MACHINE STATE RESTORATION

[75] Inventors: Gene W. Shen, Mountain View; John Szeto, Oakland; Niteen A. Patkar, Sunnyvale, all of Calif.; Michael C. Shebanow, Plano, Tex.

[73] Assignee: Fujitsu, Ltd., Japan

[*] Notice: This patent is subject to a terminal disclaimer.

[21] Appl. No.: 08/872,982

[22] Filed: Jun. 11, 1997

Related U.S. Application Data

[62] Division of application No. 08/487,801, Jun. 7, 1995, Pat. No. 5,751,985, which is a continuation of application No. 08/398,299, Mar. 3, 1995, abandoned, which is a continuation of application No. 08/390,885, Feb. 14, 1995, abandoned.

[51] Int. Cl.⁶ .................................................. G06F 11/00
[52] U.S. Cl. ...................................... 395/591; 395/183.14
[58] Field of Search ............................... 395/591, 183.14

[56] References Cited

U.S. PATENT DOCUMENTS

| | | | |
|---|---|---|---|
| 4,703,481 | 10/1987 | Fremont | 395/182.15 |
| 4,847,755 | 7/1989 | Morrison et al. | 395/379 |
| 4,893,233 | 1/1990 | Denman et al. | 395/591 |
| 4,903,264 | 2/1990 | Talgam et al. | 395/183.01 |
| 4,912,707 | 3/1990 | Kogge et al. | 395/182.15 |
| 5,003,458 | 3/1991 | Yamaguchi et al. | 395/733 |
| 5,003,462 | 3/1991 | Blaner et al. | 711/207 |
| 5,021,945 | 6/1991 | Morrison et al. | 395/392 |
| 5,075,844 | 12/1991 | Jardine et al. | 395/394 |
| 5,093,908 | 3/1992 | Beacom et al. | 395/376 |
| 5,193,206 | 3/1993 | Mills | 395/800.41 |
| 5,235,700 | 8/1993 | Alaiwan et al. | 395/182.11 |
| 5,261,071 | 11/1993 | Lyon | 711/140 |
| 5,271,013 | 12/1993 | Gleeson | 395/182.08 |

(List continued on next page.)

OTHER PUBLICATIONS

Hwu, Wen–Mei W., et al.; "Checkpoint Repair for High–Performance Out–of–Order Execution Machines", *IEEE Transactions on Computers*, vol. C–36, No. 12 (Dec. 1987), pp. 1496–1514.

*Primary Examiner*—William M. Treat
*Assistant Examiner*—Kenneth R. Coulter
*Attorney, Agent, or Firm*—Flehr Hohbach Test Albritton & Herbert LLP

[57] ABSTRACT

A high-performance processor is disclosed with structure and methods for: (1) aggressively scheduling long latency instructions including load/store instructions while maintaining precise state; (2) maintaining and restoring state at any instruction boundary; (3) tracking instruction status; (4) checkpointing instructions; (5) creating, maintaining, and using a time-out checkpoint; (6) tracking floating-point exceptions; (7) creating, maintaining, and using a watchpoint for plural, simultaneous, unresolved-branch evaluation; and (9) increasing processor throughput while maintaining precise state. In one embodiment of the invention, a method of restoring machine state in a processor at any instruction boundary is disclosed. For any instruction which may modify control registers, the processor is either synchronized prior to execution or an instruction checkpoint is stored to preserve state; and for any instruction that creates a program counter discontinuity an instruction checkpoint is stored. Instruction execution status is monitored to detect a fault condition and if a fault occurs, the instruction identifier is saved according to predetermined rules and used as an endpoint to backup the program counter. If the faulting instruction is a checkpointed instruction, then the state information is restored from the checkpoint prior to reexecuting the faulting instruction, but if one of the instructions for which state was stored is sequentially between the faulting instruction and the last issued instruction, then (i) backing-up said processor to the closest checkpoint after the faulting instruction, (ii) back stepping the processor to restore state, and (iii) decrementing the program counter to the faulting instruction.

10 Claims, 60 Drawing Sheets

U.S. PATENT DOCUMENTS

| | | | |
|---|---|---|---|
| 5,293,499 | 3/1994 | Jensen | 395/571 |
| 5,301,309 | 4/1994 | Sugano | 395/182.1 |
| 5,313,634 | 5/1994 | Eickemeyer | 395/587 |
| 5,313,647 | 5/1994 | Kaufman et al. | 395/672 |
| 5,355,457 | 10/1994 | Shebanow et al. | 395/394 |
| 5,442,757 | 8/1995 | McFarland et al. | 395/394 |
| 5,497,499 | 3/1996 | Garg et al. | 395/393 |
| 5,590,295 | 12/1996 | Deosaran et al. | 395/393 |
| 5,649,136 | 7/1997 | Shen et al. | 395/591 |

Checkpoint State in Conventional Checkpointing Schemes

States that may be modified (mod) by Instruction A:

| mod | – | – | – | – | – | – | – |
|-----|---|---|---|---|---|---|---|
|     |   | mod |   |   |   |   |   |

States that may be modified (mod) by Instruction B:

| mod | – | – | – | – | – | – | – |
|-----|---|---|---|---|---|---|---|
|     |   |   |   |   |   |   |   |

States that may be modified (mod) by Instruction C:

| – | mod | – | – | mod | mod | – | – |
|---|-----|---|---|-----|-----|---|---|
|   |     |   |   |     |     | mod |   |

States that may be modified (mod) by Instruction D:

| – | – | – | – | – | – | – | – |
|---|---|---|---|---|---|---|---|
|   |   |   | mod |   |   |   |   |

Checkpointed States comprise all states that may be modified by any one of the instructions in the instruction set:

| state1 | state2 | state3 | state4 | state5 | state6 | state7 | state8 | state9 | state10 |
|--------|--------|--------|--------|--------|--------|--------|--------|--------|---------|

Conventional Checkpoint register stores all state that aray be modified by any one of the executable instructions.

FIG. 3

Renaming Example

- Now let's see what happens when we execute the add:
  - add L41, L42, L47   ! assume SN = 13

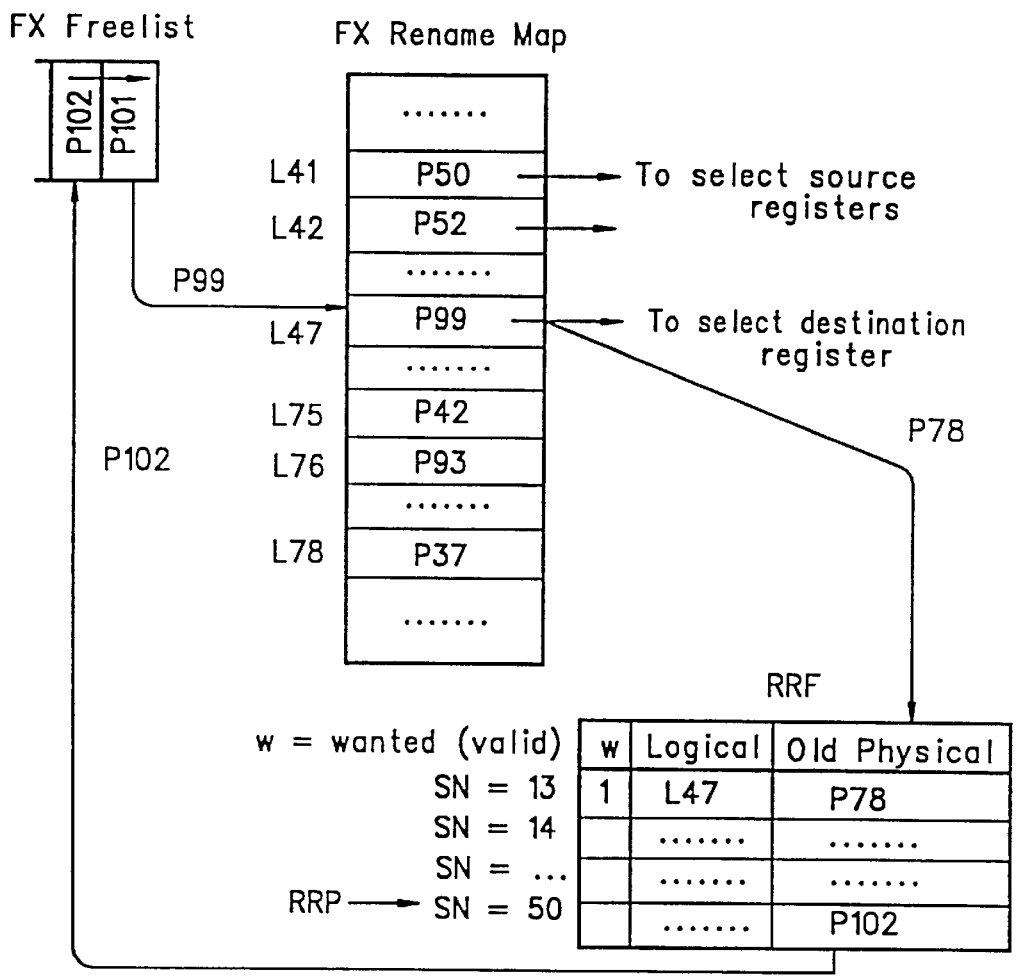

- L41 and L42 are mapped to P50 and P52 and are used to fetch the sources.
- Register P99 from the free list was used to rename destination L47.
  ⟹ P101 then moved to the front of the Freelist.
- The old value for L47 (P78) was moved to the RRF entry indexed by the current SN (13).
  ⟹ The logical register that P78 previously mapped is also stored in RRF and the wanted (w) bit was set to say the entry is valid.
- RRP = 50 so P102 is not needed any more and can move to the Freelist.

FIG. 19

FIG. 27 ABSTRACT INTERFACE BETWEEN WATCHPOINT AND OTHER UNITS

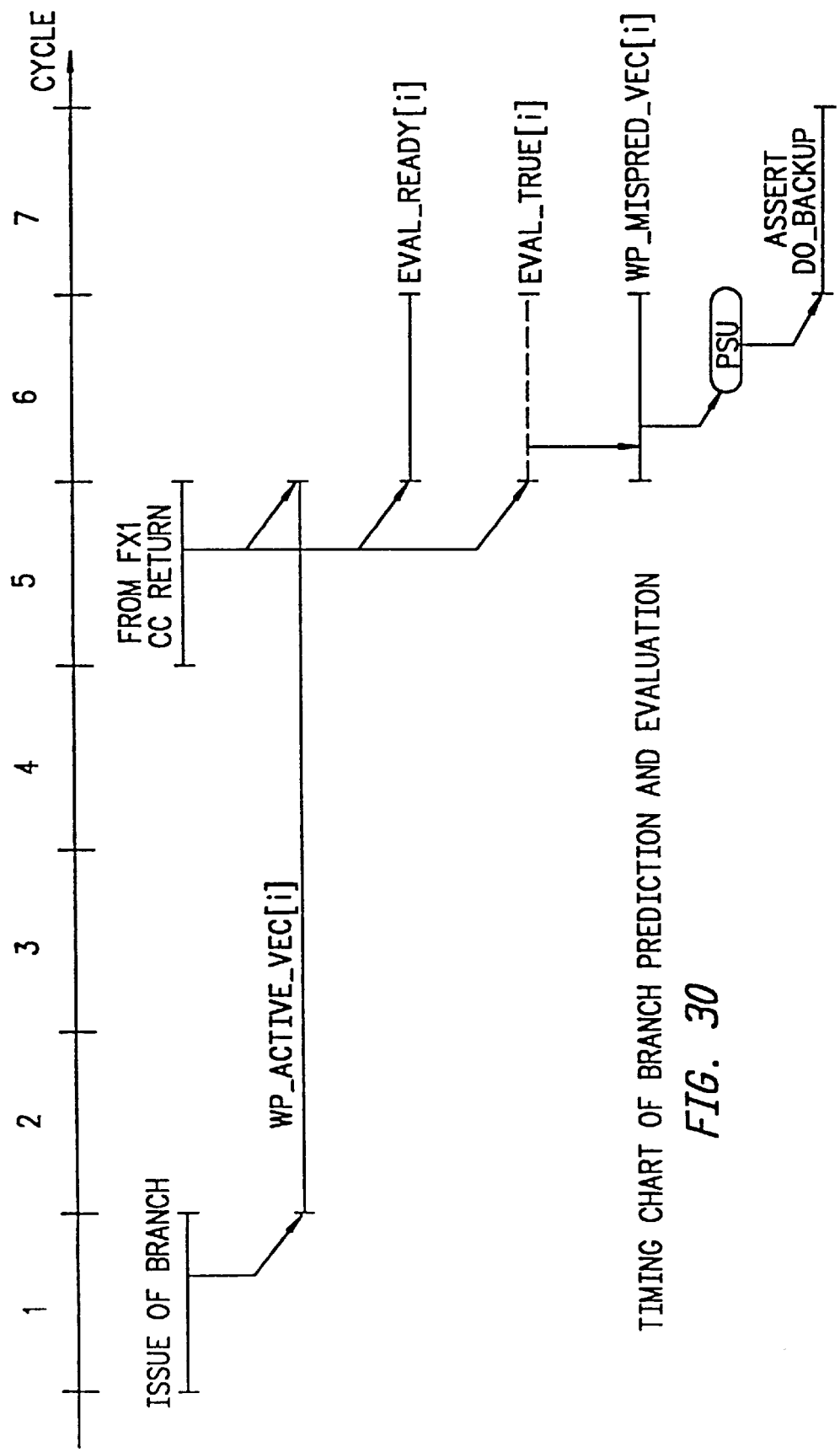
FIG. 30 TIMING CHART OF BRANCH PREDICTION AND EVALUATION

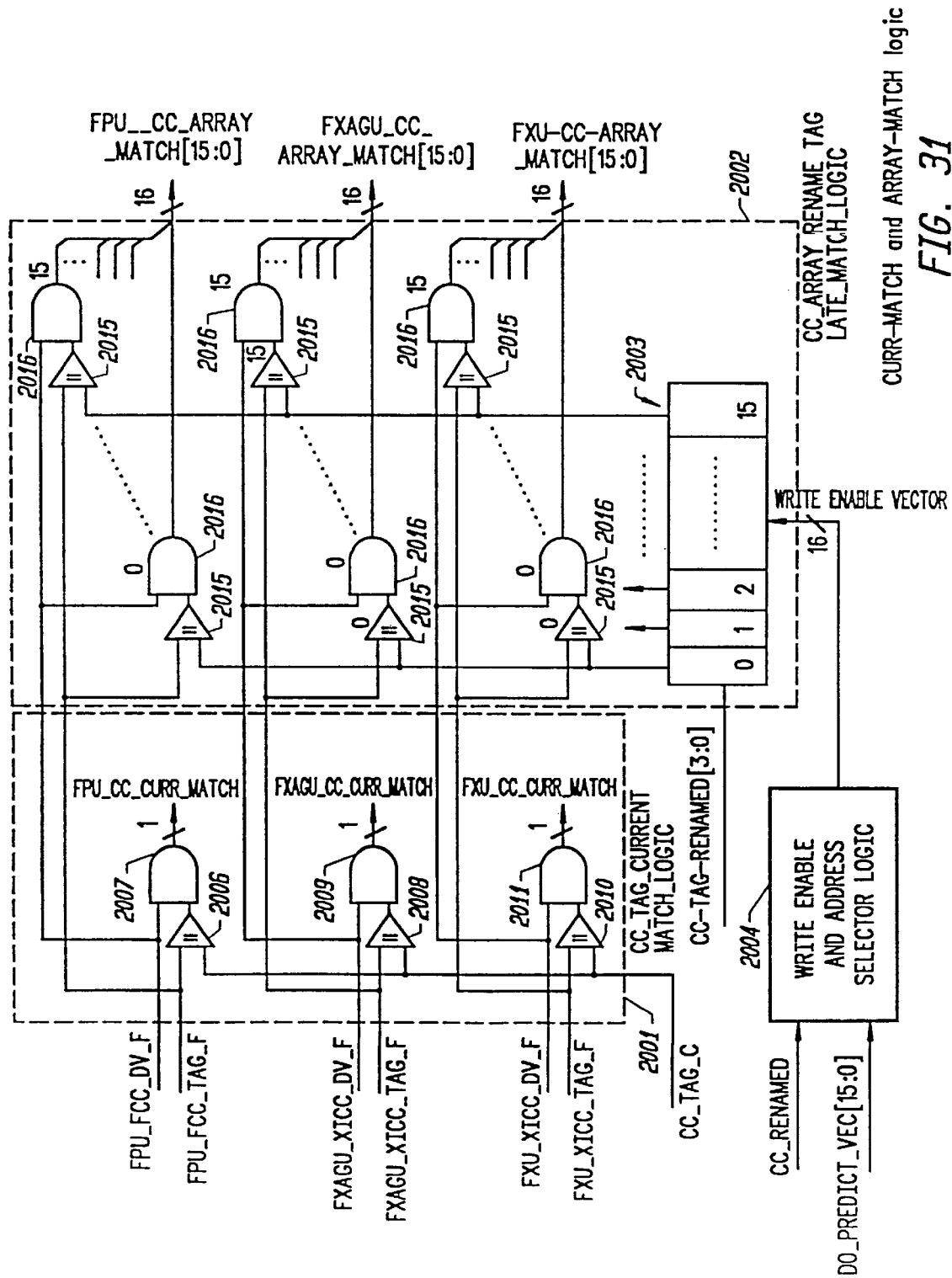

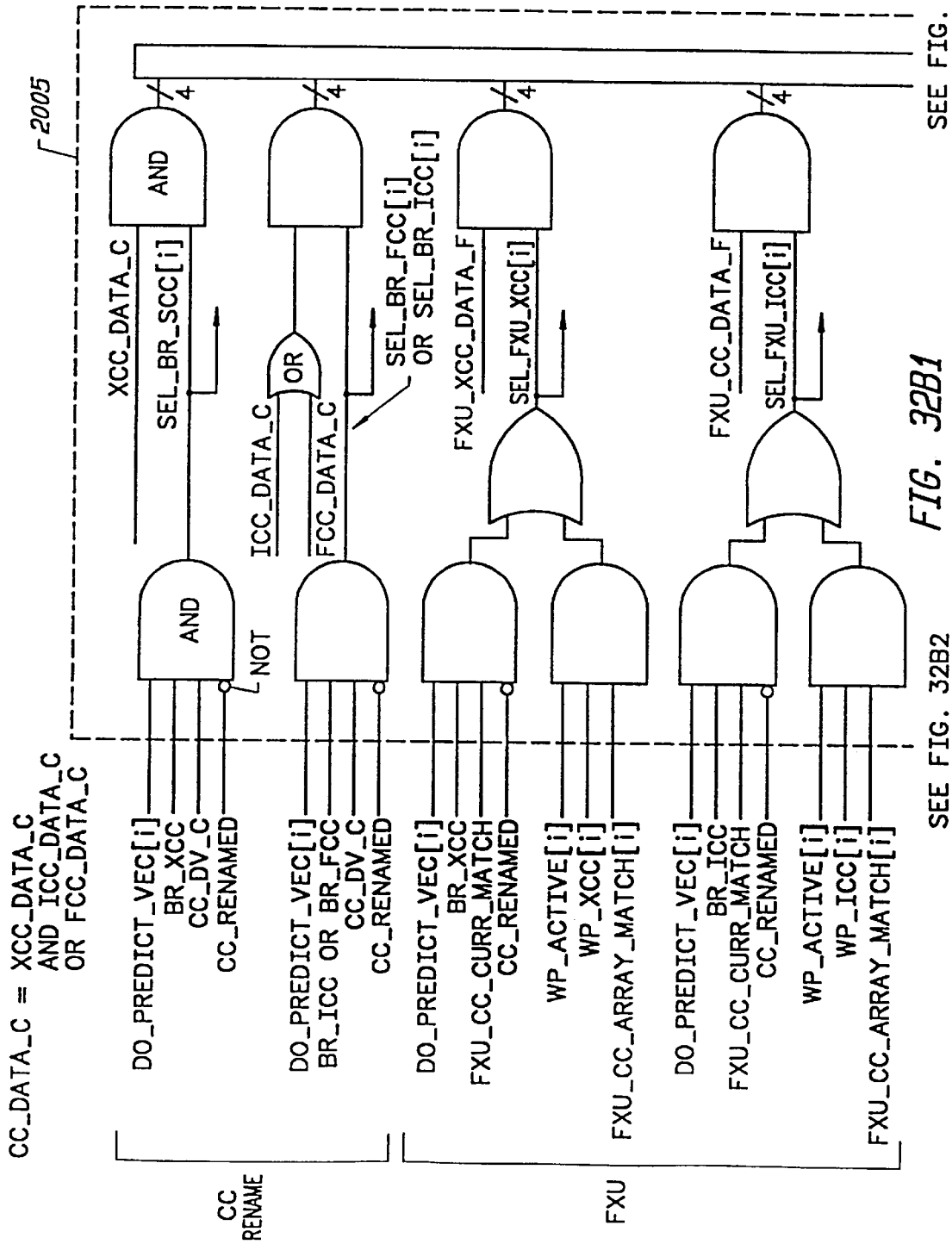

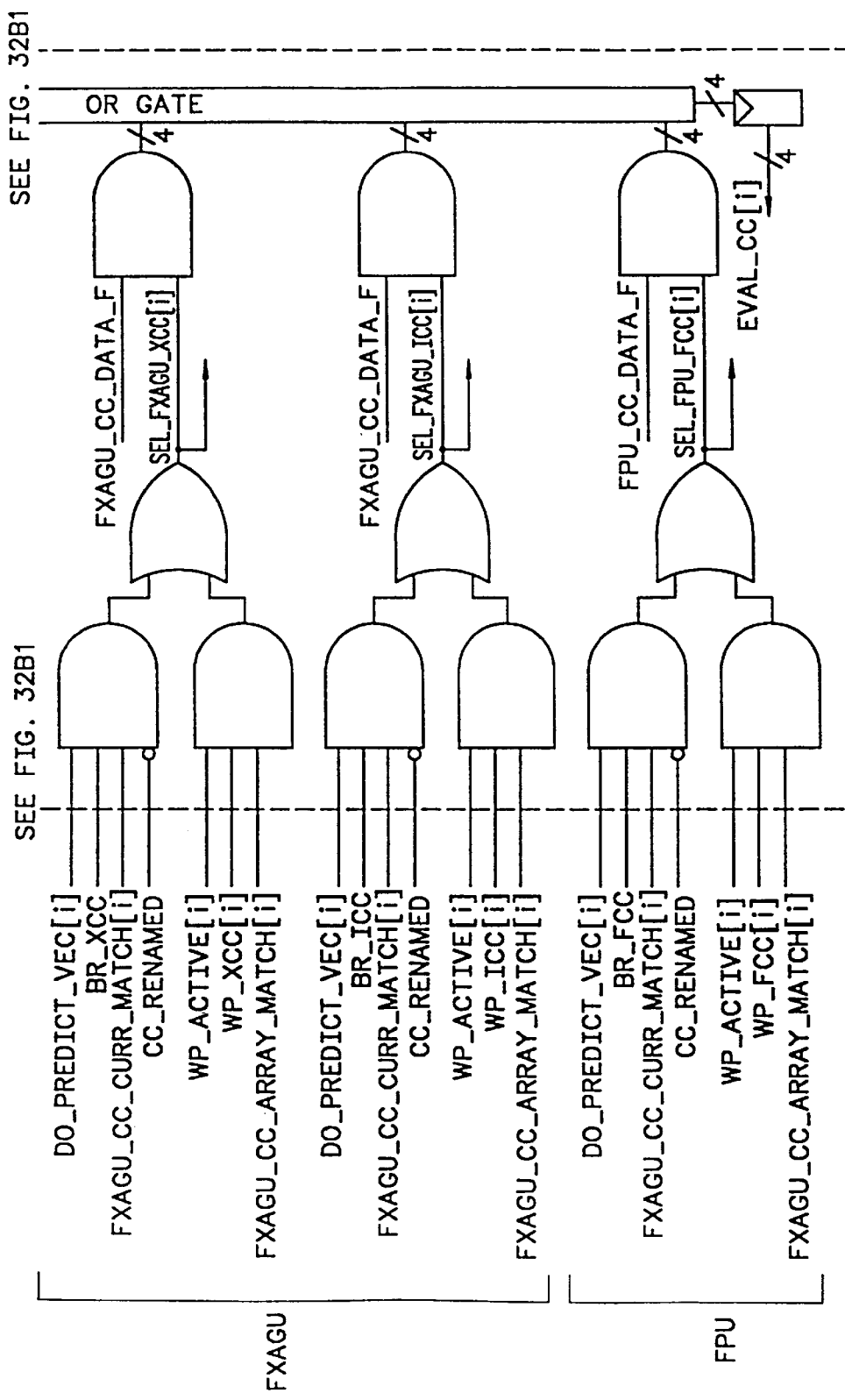
FIG. 32B2
CC SELECT LOGIC OF FIG 32A SHOWING INDIVIDUAL SIGNAL LINES INTO LOGIC DEVICES.

EVAL-TRUE LOGIC

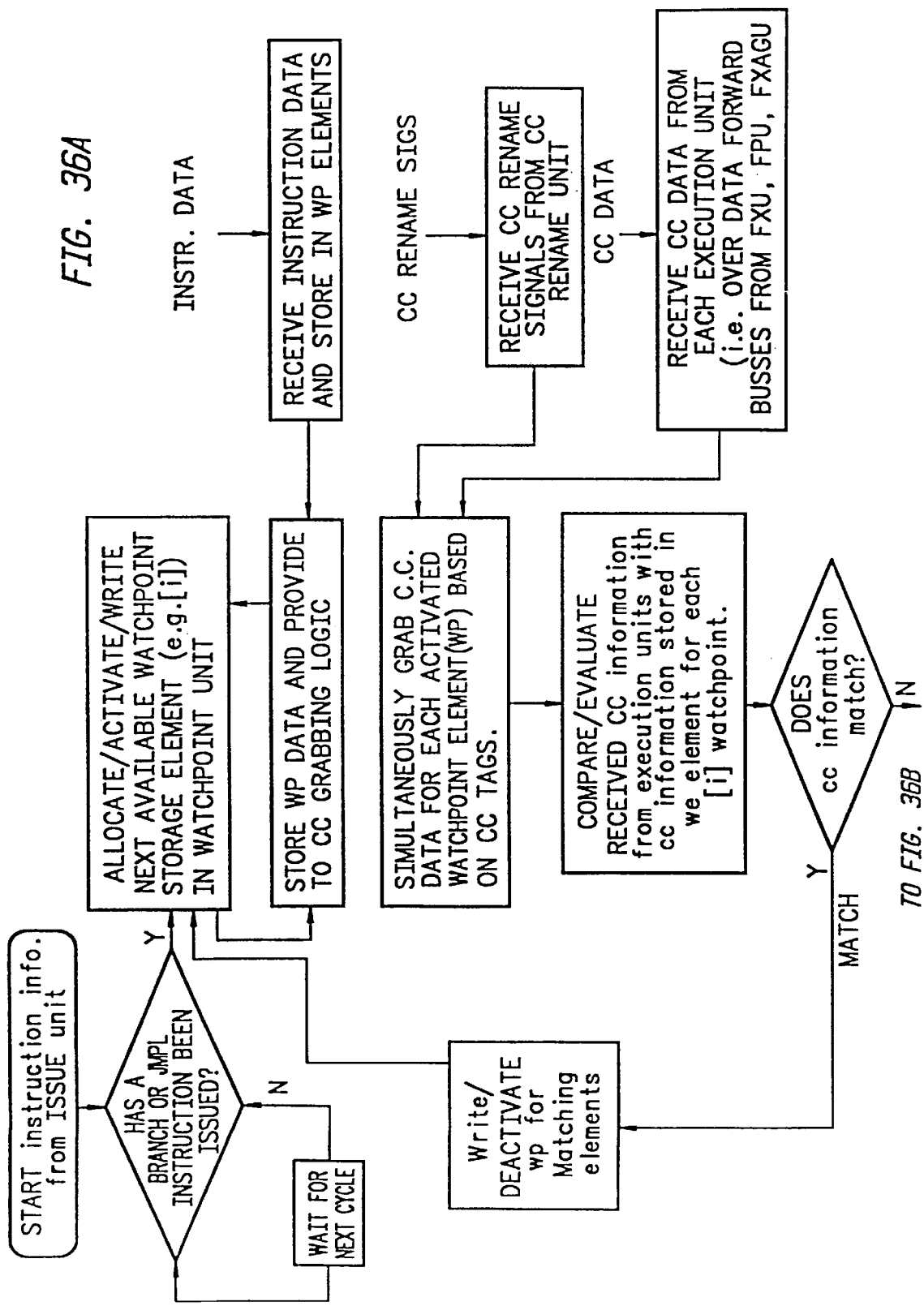

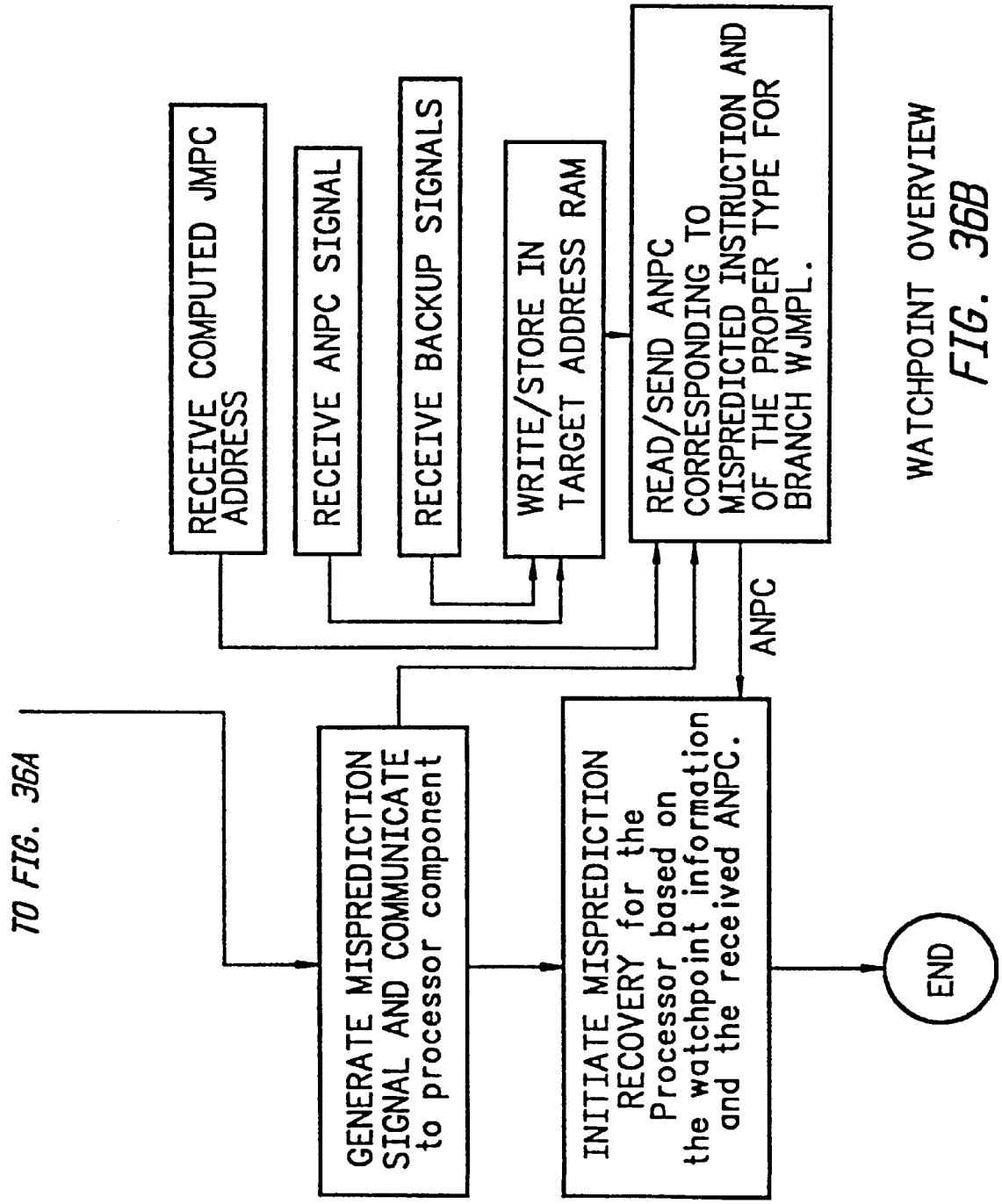

EXAMPLE OF BACKUP FOLLOWING BY BACKSTEP, ASSUMING A MAXIMUM BACKSTEP AMOUNT OF 4 INSTRUCTIONS PER CYCLE

FIG. 45

FIG. 50  WP OUTPUT LOGIC
WP_ACTIVE_VEC AND WP_MISPRED_VEC LOGIC

STRUCTURE AND METHOD FOR INSTRUCTION BOUNDARY MACHINE STATE RESTORATION

RELATED APPLICATIONS

This is a division of application Ser. No. 08/487,801 filed Jun. 7, 1995 now U.S. Pat. No. 5,751,985 which is a continuation of Ser. No. 08/398,299, filed Mar. 3, 1995, now abandoned, which is a continuation of Ser. No. 08/390,885, filed Feb. 14, 1995, now abandoned.

U.S. patent application Ser. No. 08/388,602 for an INSTRUCTION FLOW CONTROL CIRCUIT FOR SUPERSCALER MICROPROCESSOR by inventor Takeshi Kitahara filed Feb. 14, 1995, now U.S. Pat. No. 5,689,673 issued Nov. 18, 1997; U.S. patent application Ser. No. 08/388,389 for an ADDRESSING METHOD FOR EXECUTING LOAD INSTRUCTIONS OUT OF ORDER WITH RESPECT TO STORE INSTRUCTIONS by inventors Michael Simone and Michael Shebanow filed Feb. 14, 1995, now abandoned; U.S. patent application Ser. No. 08/388,606 for a METHOD AND APPARATUS FOR EFFICIENTLY WRITING RESULTS TO RENAMED REGISTERS by inventors DeForest Tovey, Michael Shebanow, John Gmuender filed Feb. 14, 1995, now abandoned; and U.S. patent application Ser. No. 388,364 for a METHOD AND APPARATUS FOR COORDINATING THE USE OF PHYSICAL REGISTERS IN A MICROPROCESSOR by inventors DeForest Tovey, Michael Shebanow, John Gmuender filed Feb. 14, 1995, now abandoned, are each hereby incorporated by reference in their entirety.

U.S. patent application Ser. No. 08/390,885 entitled PROCESSOR STRUCTURE AND METHOD FOR TRACKING INSTRUCTION STATUS TO MAINTAIN PRECISE STATE filed Feb. 14, 1995 by inventors Gene W. Shen, John Szeto, Niteen A. Patkar and Michael C. Shebanow, now abandoned; U.S. patent application Ser. No. 08/398,299 entitled PROCESSOR STRUCTURE AND METHOD FOR TRACKING INSTRUCTION STATUS TO MAINTAIN PRECISE STATE filed Mar. 3, 1995 by inventors Gene W. Shen, John Szeto, Niteen A. Patkar and Michael C. Shebanow, now abandoned; U.S. patent application Ser. No. 08/397,810 entitled PARALLEL ACCESS MICRO-TLB TO SPEED UP ADDRESS TRANSLATION filed Mar. 3, 1995 by inventors Chih-Wei David Chang, Kioumars Dawallu, Joel F. Boney, Ming-Ying Li, and Jen-Hong Charles Chen; U.S. patent application Ser. No. 08/397,809 entitled LOOKASIDE BUFFER FOR ADDRESS TRANSLATION IN A COMPUTER SYSTEM filed Mar. 3, 1995, by inventors Leon Kuo-Liang Peng, Yolin Lih, and Chih-Wei David Chang, now U.S. Pat. No. 5,680,566 issued Oct. 21, 1997; U.S. patent application Ser. No. 08/397,893 entitled RECLAMATION OF PROCESSOR RESOURCES IN A DATA PROCESSOR filed Mar. 3, 1995 by Michael C. Shebanow, Gene W. Shen, Ravi Swami, and Niteen Patkar; U.S. patent application Ser. No. 08/397,891 entitled METHOD AND APPARATUS FOR SELECTING INSTRUCTIONS FROM ONES READY TO EXECUTE filed Mar. 3, 1995 by Michael C. Shebanow, John Gmuender, Michael A. Simone, John R. F. S. Szeto, Takumi Maruyama, and DeForest W. Tovey; U.S. patent application Ser. No. 08/397,911 entitled HARDWARE SUPPORT FOR FAST SOFTWARE EMULATION OF UNIMPLEMENTED INSTRUCTIONS filed Mar. 3, 1995 by Shalesh Thusoo, Farnad Sajjadian, Jaspal Kohli, and Niteen Patkar, now U.S. Pat. No. 5,632,028 issued May 20, 1997; U.S. patent application Ser. No. 08/398,284 entitled METHOD AND APPARATUS FOR ACCELERATING CONTROL TRANSFER RETURNS filed on Mar. 3, 1995 by Akiro Katsuno, Sunil Savkar, and Michael C. Shebanow, now abandoned; U.S. patent application Ser. No. 08/398,066 entitled METHODS FOR UPDATING FETCH PROGRAM COUNTER filed Mar. 3, 1995 by Akira Katsuno, Niteen A. Patkar, Sunil Savkar, and Michael C. Shebanow, now abandoned; U.S. patent application Ser. No. 08/398,151 entitled METHOD AND APPARATUS FOR RAPID EXECUTION OF CONTROL TRANSFER INSTRUCTIONS filed Mar. 3, 1995 by Sunil Savkar; U.S. patent application Ser. No. 08/397,910 entitled METHOD AND APPARATUS FOR PRIORITIZING AND HANDLING ERRORS IN A COMPUTER SYSTEM filed Mar. 3, 1995 by Chih-Wei David Chang, Joel Fredrick Boney, and Jaspal Kohil; U.S. patent application Ser. No. 08/397,800 entitled METHOD AND APPARATUS FOR GENERATING A ZERO BIT STATUS FLAG IN A MICROPROCESSOR filed Mar. 3, 1995 by Michael Simone, now U.S. Pat. No. 5,638,312 issued Jun. 10, 1997; and U.S. patent application Ser. No. 08/397,912 entitled ECC PROTECTED MEMORY ORGANIZATION WITH PIPELINED READ-MODIFY-WRITE ACCESS filed on Mar. 3, 1995 by Chien Chen and Yizhi Lu, now U.S. Pat. No. 5,687,353 issued Nov. 11, 1997, are each hereby incorporated by reference in their entirety.

U.S. application Ser. No. 08/457,049 entitled METHOD AND APPARATUS FOR ROTATING ACTIVE INSTRUCTIONS IN A PARALLEL DATA PROCESSOR by inventors Sunil Savkar, Michael C. Shebanow, Gene W. Shen, and Farnad Sajjadian filed Jun. 1, 1995; U.S. patent application Ser. No. 08/456,746 entitled PROGRAMMABLE INSTRUCTION TRAP SYSTEM AND METHOD by inventors Sunil Savkar, Michael C. Shebanow, Gene W. Shen, and Farnad Sajjadian filed Jun. 1, 1995, are each hereby incorporated by reference in their entirety.

U.S. patent application Ser. No. 08/487,801 entitled PROCESSOR STRUCTURE AND METHOD FOR TRACKING INSTRUCTION STATUS TO MAINTAIN PRECISE STATE filed Jun. 7, 1995 by inventors Gene W. Shen, John Szeto, Niteen A. Patkar, and Michael C. Shebanow, now U.S. Pat. No. 5,751,985 issued May 12, 1998; U.S. patent application Ser. No. 08/478,025 entitled PROCESSOR STRUCTURE AND METHOD FOR AGGRESSIVELY SCHEDULING LONG LATENCY INSTRUCTIONS INCLUDING LOAD/STORE INSTRUCTIONS WHILE MAINTAINING PRECISE STATE filed Jun. 7, 1995 by inventors Gene W. Shen, John Szeto, Niteen A. Patkar, Michael C. Shebanow, and Michael A. Simone, now U.S. Pat. No. 5,651,124 issued Jul. 22, 1997; U.S. patent application Ser. No. 08/483,958 entitled PROCESSOR STRUCTURE AND METHOD FOR MAINTAINING AND RESTORING PRECISE STATE AT ANY INSTRUCTION BOUNDARY filed Jun. 7, 1995 by inventors Gene W. Shen, John Szeto, Niteen A. Patkar, and Michael C. Shebanow, now U.S. Pat. No. 5,649,136 issued Jul. 15, 1997; U.S. patent application Ser. No. 08/476,419 entitled PROCESSOR STRUCTURE AND METHOD FOR CHECKPOINTING INSTRUCTIONS TO MAINTAIN PRECISE STATE filed Jun. 7, 1995 by inventors Gene W. Shen, John Szeto, Niteen A. Patkar, and Michael C. Shebanow, now U.S. Pat. No. 5,659,721 issued Aug. 19, 1997; U.S. patent application Ser. No. 08/473,223 entitled PROCESSOR STRUCTURE AND METHOD FOR A TIME-OUT CHECKPOINT filed Jun. 7, 1995 by inventors Gene W. Shen, John Szeto, Niteen A. Patkar, and Michael C. Shebanow, now U.S. Pat. No. 5,644,742 issued Jul. 1, 1997; U.S. patent application Ser. No. 08/484,795 entitled PROCESSOR STRUCTURE AND METHOD FOR TRACKING FLOATING-POINT EXCEPTIONS filed Jun. 7, 1995 by inventors Gene W. Shen, John Szeto, and Michael C. Shebanow, now U.S. Pat. No. 5,673, 426 issued Sep. 30, 1997; U.S. patent application Ser. No. 08/472,394 entitled PROCESSOR STRUCTURE AND METHOD FOR RENAMABLE TRAP-STACK filed Jun. 7, 1995 by inventors Hideki Osone and Michael C. Shebanow, now U.S. Pat. No. 5,673,408 issued Sep. 30, 1997; and U.S. patent application Ser. No. 08/482,075 entitled PROCESSOR STRUCTURE AND METHOD FOR WATCHPOINT FOR PLURAL SIMULTANEOUS UNRESOLVED BRANCH EVALUATION filed Jun. 7, 1995 by inventors Gene W. Shen, Michael C. Shebanow, Hideki Osone, and Takumi Maruyama, now U.S. Pat. No. 5,655,115 issued Aug. 5, 1997, are each hereby incorporated by reference in their entirety.

TECHNICAL FIELD

The field of the subject invention concerns apparatus, systems, and methods for increasing processor performance while maintaining precise state in a speculative out-of-order execution processor.

BACKGROUND OF THE INVENTION

With processors, control flow instructions (such as branch instructions), latency due to memory transactions, and instructions requiring multi-cycle operations often prevent the processor from sustaining peak instruction execution bandwidth because "bubbles" are introduced into the pipeline. Performance can be improved by implementing speculative out-of-order instruction execution to enhance performance. Conventionally, when an intermediate result from an instruction is not available for a subsequent instruction, the processor ceases execution, or "stalls" until that intermediate result is available.

Two techniques, speculative execution and out-of-order execution, help to maintain high execution bandwidth in modern processors. Speculative execution is a known technique in which, when a branch is encountered without the information from an earlier process step to select the appropriate branch, a prediction is made and instruction dispatch and execution proceeds based on that prediction. If the prediction later proves to be incorrect, the mispredicted instruction sequence must be undone using branch mispredict recovery. Speculative execution allows the processor to continue issuing and executing instructions. Known prediction schemes minimize the frequency of mispredicted execution in order to improve performance. However, maintaining precise state in a speculative machine is complicated and incurs undesirable overhead. Out-of-order execution is a technique that hides memory and multi-cycle instruction latency. In processors implementing out-of-order execution, instructions are dynamically reordered and executed in a different order than the sequential program order to reveal available instruction level parallelism.

A "precise exception" model has been shown to be in important feature for simplifying software resolution of exception conditions, but maintenance of precise exceptions is complicated in machines implementing speculative out-of-order execution. Machine state is generally processor specific and architectural state includes all control/status registers, data registers, address registers and all external memory state. For example, SPARC-V9 control/status registers are identified on pages 29–30 of the SPARC-V9 Architecture Manual. It is what the software and software programmer sees. Machine state is a super-set of architectural state that is processor specific and includes everything else about the state of the machine. A faulting instruction is an instruction which generates an exception. An exception is any situation or condition that tells the processor to stop and investigate the situation that caused the exception before proceeding. An exception need not be an error condition and includes interrupts for example. Execution traps may result from exceptions. In a processor implementing a precise exception model, a fault or exception does not modify architectural state. Architectural state has bee modified for all instructions prior to the faulting instruction, but architectural state has not been modified for instructions after the faulting instruction. When a precise exception model is not provided, the software must identify the faulting instruction and then calculate a restart point for either retrying the faulting instruction or bypassing the faulting instruction and executing the next instruction.

Precise state maintenance techniques for short-pipelined, single-issue machines are known. Generally, a short-pipelined machine has fewer than about four or five stages including an instruction fetch, issue, execute, and write-back state wherein state is modified. Single-issue implementations simplify recovery in the event of an exception or misprediction because the pipeline may be cleared without worrying about which instruction in a pipeline stage should be flushed. In these conventional techniques, any exception that may have occurred is detected prior to modifying architectural state. When an exception is detected, the pipeline is flushed of instructions and any writeback of data, status, or results to architectural state is intentionally blocked to prevent modification of architectural state.

In speculative out-of-order superscalar (multi-issue) implementations, maintaining precise state is much more difficult than for single-issue machine. In such speculative out-of-order machines, instructions which generate errors may execute speculatively and method and structure must be provided to undo any architectural state modification which occur after the location of the fault. Also, exceptions may generally be detected in a different order than program order. Therefore, an out-of-order processor must be able to unscramble the exceptions and determine which instructions should be allowed to complete (and modify architectural state) and which instructions should be undone.

FIG. 1 shows a conventional approach using a re-order buffer for maintaining precise state in a speculative processor. The reorder buffer is implemented by a first-in/first-out stack that effectively introduces a temporal delay between instruction execution completion (when the result is available) and the time when machine state is modified as the result of execution completion. Precise state is maintained by preventing writeback to memory of a mispredicted branch instruction, execution exception, or like condition. Precise state is maintained by preventing state modification while the instruction is still speculative rather than by restoring state to undo mispredicted speculative execution.

FIG. 2 shows a conventional approach for maintaining precise state in a speculative processor by storing state in a "checkpoint" prior to executing an instruction and later restoring state from the stored checkpoint information. In conventional checkpointing, every speculatively executed instruction that may result in modification of machine state is check pointed. Each processor has a set of state parameters, including for example, all control/status registers, data register values, and the like, that define the state of the machine. In order to restore a previous machine state, all of the state defining parameters must be stored so that they can be restored if and when the need arises. In conventional checkpointing techniques, every state defining parameter is typically stored for every instruction that may modify any one of the state defining parameters. For every checkpointed instruction, conventional checkpointing stores all state information that may be changed by any one of the checkpointed instructions, and not just the state that may be modified by that particular instruction about to be executed. For example, in a machine requiring 100 state parameters to define machine state, if execution of instruction "X" may modify only one control/status register, execution of that instruction will still require storing 100 state parameters, not just the one that may be modified by that instruction.

FIG. 3 shows the structure and content of an exemplary sequence of instructions and conventional checkpoints in diagrammatic fashion for purposes of illustration only and do not represent actual checkpoint data for any particular machine or CPU. Since conventional checkpoints are fixed size, this means that each checkpoint must be relatively large compared to the state actually modified by a particular instruction. Recovery using conventional checkpointing includes restoring state using a stored checkpoint closest to but prior to the faulting or mispredicted speculative instruction, backing up the program counter to just after the checkpointed instruction, and re-executing instructions from the checkpointed instruction forward.

Checkpointing, re-order buffers, history buffers, and the use of a future file have been described as ways to manage out-of-order execution and maintain precise state in some circumstances. Conventional Checkpointing which permits restoration of machine state at a checkpoint boundary, but not at an arbitrary instruction boundary, is described by Hwu and Patt (W. Hwu and Y. N. Patt, "Checkpoint Repair for High Performance Out-of-order Execution Machines", Proceedings of the 14th Annual Symposium on Computer Architecture, (June 1987), pp. 18–26.). Methods of implementing precise interruptions in pipelined RISC processors are described by Wang and Emmett ("Implementing Precise Interruptions in Pipelined RISC Processors", IEEE Micro, August 1993, pp. 36–43.). Methods of implementing precise interrupts in pipelined processors are also described by Smith and Pleszkun (J. E. Smith and A. R. Pleszkun, "Implementation of Precise Interrupts in Pipelined Processors.", Proceedings of the 12th Annual International Symposium on Computer Architecture, (June 1985), pp. 36–44.). An overview of conventional techniques for designing high-performance superscalar microprocessors is provided by Mike Johnson (M. Johnson [a.k.a. William Johnson], *Superscalar Microprocessor Design,* Prentice-Hall, Inc., Englewood Cliffs, N.J. 07632, 1991, ISBN 0-13-875634-1.). Each of these references are hereby incorporated by reference in their entirety.

Although at least some of these techniques improve performance, they are not entirety satisfactory because they either limit the degree of speculation or they allow only coarse machine state restoration not instruction level machine state restoration. Conventional re-order buffer techniques limit the degree of speculation because the re-order buffer length is linear with respect to the degree of speculation supported. That is, for each instruction that may have to be undone, the instruction execution result must be stored in the re-order buffer. For example, if the machine permits sixty-four outstanding and potentially speculative instructions, the re-order buffer must contain at least sixty-four locations for storing results. In conventional checkpointing, the number of checkpoints checkpointed are typically fewer than the number of outstanding instructions in the machine, but the amount of data stored in each checkpoint is very large (the entire state of the machine at the time). The checkpoint storage requirements place a burden on processor chip substrate area. Ideally, a scheme for maintaining precise state should be scalable, at a linear or lower order relationship (e.g. logarithmic) to larger numbers of concurrently outstanding speculative instructions. Reorder buffer entry storage areas must have sufficient width to store the data and these techniques also require associative lookup to all entries. This can be difficult for very large reorder buffers.

Furthermore, conventional methods of restoring precise state are incorporate in some environments. For example, where are instruction executed as the result of a speculative branch modifies the state of an external "dumb" device, where restoration of state typically involves restoring state at a checkpoint boundary prior to the point of the modification to the external device and then forward re-execution of non-faulting instructions including the instruction that modifies the external device. In such cases re-executing the faulting instruction alone will not undo the effect of the change in the state of the external device and the re-execution of the non-faulting instructions between the point where state is restored and the faulting instruction causes further problems.

Conventional checkpointing saves machine state at a limited number of different points in the instruction stream and restores the checkpointed architectural state in order to recover from branch mispredictions or execution errors. Conventional checkpointing does not checkpoint each instruction. Conventional checkpointing can restore machine state only at checkpoint boundaries, that is at the instruction for which a checkpoint was established. When a fault or execution error occurs, the checkpointed state is restored by known techniques, thereby in effect "undoing" all instructions subsequent to the checkpoint, and thus including the faulting instruction(s). Then the instructions are re-executed serially forward, for example in a single-issue mode, from the checkpointed instruction to reach the faulting instruction.

This conventional checkpointing technique allows speculative execution but is disadvantageous in many respects. For example, it does not provide robust exception recovery. On intermittant errors, conventional backup of the machine to the checkpoint prior to the exception creating instruction and then re-execution execution of the instructions following the checkpoint may not result in deterministic behavior and may compound machine state disruption by propagating erroneously altered state in the re-executed instructions. Conventional checkpointing and machine backup procedures do not attempt to minimize instruction re-execution. Furthermore, catastrophic machine errors such as hardware failures and machine time-outs may deadlock the processor if all of the instructions between the restored checkpointing instruction and the instruction causing the exception are re-executed.

Conventional "re-order buffers" manage speculative instructions in a re-order buffer which is a first-in-first-out (FIFO) memory structure of a predefined size. When an instruction completes execution, data value results from the execution are written into the re-order buffer and as they move through the buffer and emerge at the top, the data values are written from the re-order buffer into a register file. The size of the re-order buffer effectively defines the delay between completion of execution of the instruction and permanent modification of architectural state. Once the data values are written to the register they cannot be undone. "Associative lookup," a procedure by which entries in the re-order buffers are associated with entries in the register file, is discussed in M. Johnson, *Superstar Microprocessor Design* at page 49 et seg.

Re-order buffer schemes have at least three limitations. First, in conventional re-order buffer schemes, only the results of instruction execution are saved in the re-order buffer and the Program Counter (PC) values are not saved. Therefore, any branch mispredict recovery using re-order buffers requires the additional steps of PC reconstruction, instruction fetch, and instruction issue. As a result, conventional recovery from a branch mispredict using re-order buffers is delayed.

Second, re-order buffers generally only allow speculative execution of a limited mix of instructions. For example, traps detected during the instruction issue stage (issue type) may not be speculatively executed using re-order buffers because they generally involve control register updates. Re-order buffer techniques do not support speculative execution of an instruction involving control register updates. The inability to speculatively enter issue traps in certain instruction set architectures (e.g. "spill/fill" traps in the Sun Microsystems SPARC architecture) can impose significant performance limitations.

Third, re-order buffer size is generally a direct linear function of the number of outstanding instructions allowed in the processor. For example, in the processor that allows sixty-four outstanding instructions a re-order buffer having sixty-four entries would be required. Allocating the large number of buffer registers within the processor can be prohibitive, especially in dataflow processors where large active instruction windows, that is a relatively large number of concurrently outstanding instructions allow improved extraction of instruction level parallelism. Dataflow processors are processors where the order of instruction execution is determined by the operand or data availability, rather than based on incrementing the program counter as in conventional non-data flow processors.

Future files are a modification of the re-order buffer technique that avoids the associative lookup problem in the reorder buffer. Future Files are described in M. Johnson's *Superscalar Microprocessor Design* at pages 94–95. History buffers are a method and structure proposed for implementing precise interrupts in a pipelined scalar processor with out-of-order completion and is described in M. Johnson's *Superscalar Microprocessor Design* at pages 91–92.

"The SPARC Architecture Manual", Version 9, by D. Weaver and T. Germond, Englewood Cliffs (1994), which is hereby explicitly incorporated by reference in its entirety, describes a particular type of out-of-order speculative execution processor. The SPARC V9 architecture requires a Floating-Point State Register (FSR). The FSR contains 3 fields, the FSR_accrued_exception (FSR.aexc) field, and the FSR_current_exception (FSR.cexc) field, and the FSR_floating_$_{point}$_trap_type (FSR.ftt) field, which are updated when a floating point exception occurs and are used by a trap handling routine for handling a trap caused by the floating point exception. The updating of these fields is difficult in an out-of-order execution processor because instructions execute and complete in a different order than program order. Since these fields need to be updated or appear to be updated as if instructions are issued and executed in program order, an apparatus and corresponding method is required to track these exceptions and correctly update the FSR register.

For data processors which can execute instructions speculatively, branch direction (taken or not-taken), or branch address (target address or address next to the branch instruction) can be predicted before they are resolved. Later, if these predictions turn out to be wrong, the processor backs up to the previous state and re-starts executing instructions in the correct branch stream. However, most superscalar processors available in the market can evaluate only one branch per cycle to check whether or not branch predictions are correct. But, multiple predicted branches are often ready to evaluate in one cycle. Thus, branch evaluations which could otherwise be performed need to be delayed. Delaying branch evaluations affects the processor performance significantly.

Furthermore, in conventional speculative execution processors, when a trap occurs, the processor has to wait until all predicted branches have been resolved to make sure that the trap is real and not speculative. The easiest way for a processor to make sure that a trap is real is to synchronize the processor (i.e., execute and complete all instructions issued prior to the occurrence of the trap condition) before taking the trap. However, doing so for traps that occur frequently degrades the performance of the processor. This is especially true in the SPARC-V9 architecture where spill/fill issue traps and software traps (Tcc instructions) often occur. This problem needs to be resolved in order to increase processor performance.

SUMMARY OF THE INVENTION

The foregoing problems are solved by the method and structure of this invention which provides for tracking and maintaining precise state by assigning a unique identification tag to each instruction at the time of issue, associating the tag with a storage location in a first active instruction data structure, updating the data stored in the storage location in response to instruction activity status changes for each instruction, and maintaining a plurality of pointers to the storage locations that move in response to the instruction activity status. The status information includes an active-bit that is set at the time the instruction is issued and cleared when execution completes without error. Pointers are established that point to the last issued instruction (issued instruction pointer), the last instruction that has completed without error and for which all sequentially earlier instructions have completed without error (last committed instruction pointer), and the last instruction for which allocated processor resources have been reclaimed (reclaimed instruction pointer). These three pointers are moved forward toward the later issued instructions along the data structure based on comparisons of the active-bit for each location associated with one instruction in the data structure and predetermined rules. Exceptions or error conditions for any instruction prevent changing the active-bit so that movement of the pointers is controlled prevented under these conditions.

BRIEF DESCRIPTION OF THE DRAWINGS

FIG. 3 shows the structure and content of an exemplary sequence of instructions and conventional checkpoints in diagrammatic fashion for purposes of illustration only and do not represent actual checkpoint data for any particular machine.

FIG. 19 illustrates the inventive register renaming method.

FIG. 30 shows an exemplary timing chart associated with branch prediction and evaluation.

FIG. 31 shows structural detail associated with an embodiment of the Current Match Logic and Array Match Logic.

FIGS. 32A, 32B1, and 32B2 shows structural detail associated with an embodiment of the Condition Code Select Logic.

FIGS. 36A and 36B is a diagrammatic flow-chart of an embodiment of the inventive Watchpoint method for plural simultaneous unresolved branch evaluation.

FIG. 45 shows an exemplary Trap Stack Unit.

DESCRIPTION OF SPECIFIC EMBODIMENTS

Figure 1:
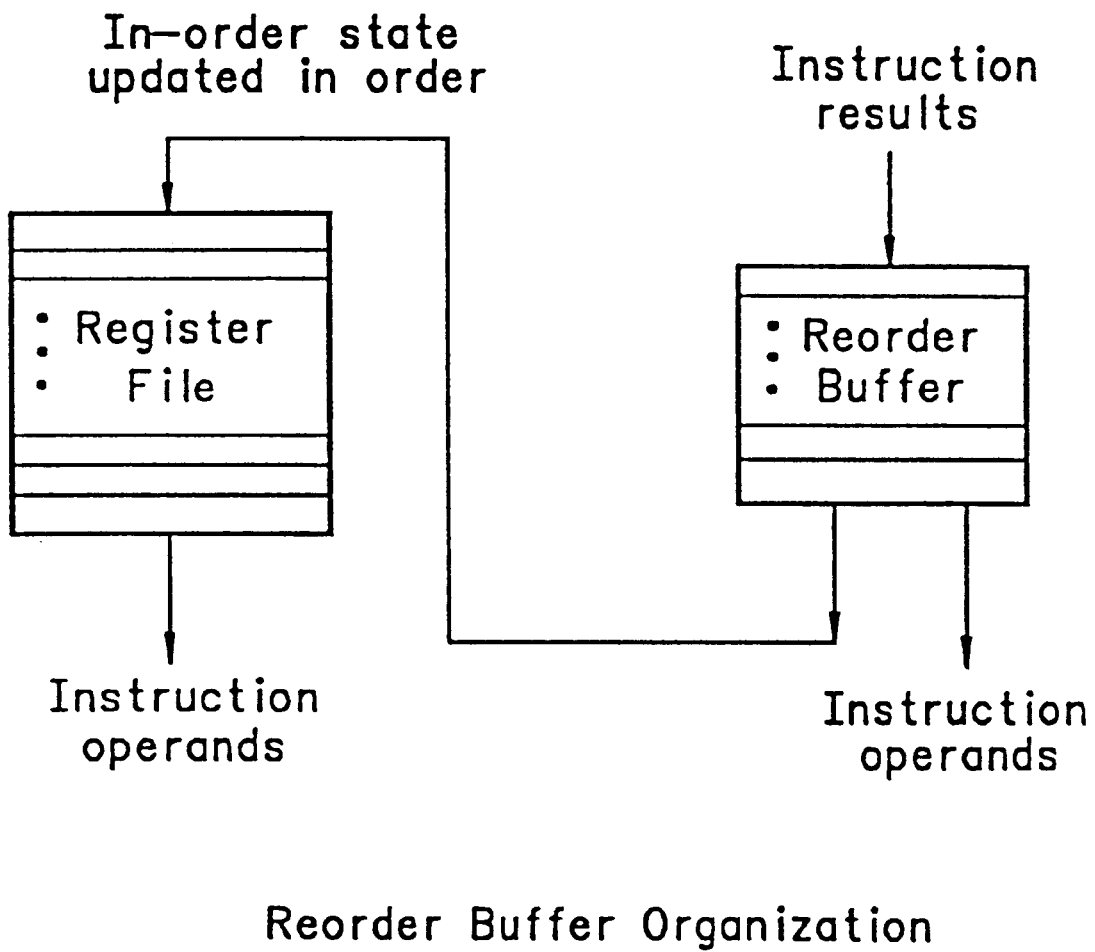
FIG. 1 shows a conventional approach using a re-order buffer for maintaining precise state in a speculative processor.
Figure 2:
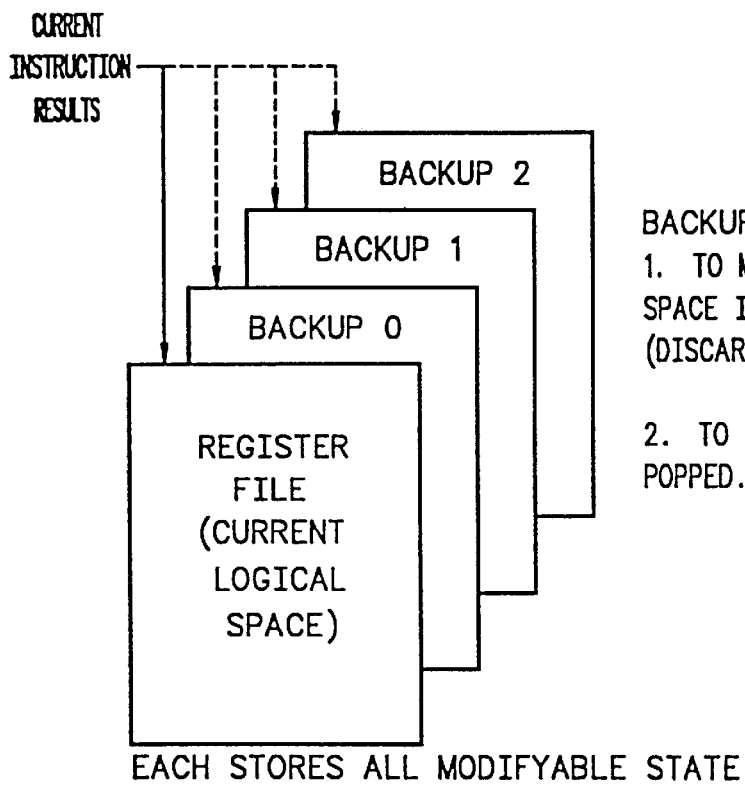
FIG. 2 shows a conventional approach for maintaining precise state in a speculative processor by storing state in a checkpoint prior to executing an instructions and later restoring state from the stored checkpoint information.
Figure 4:
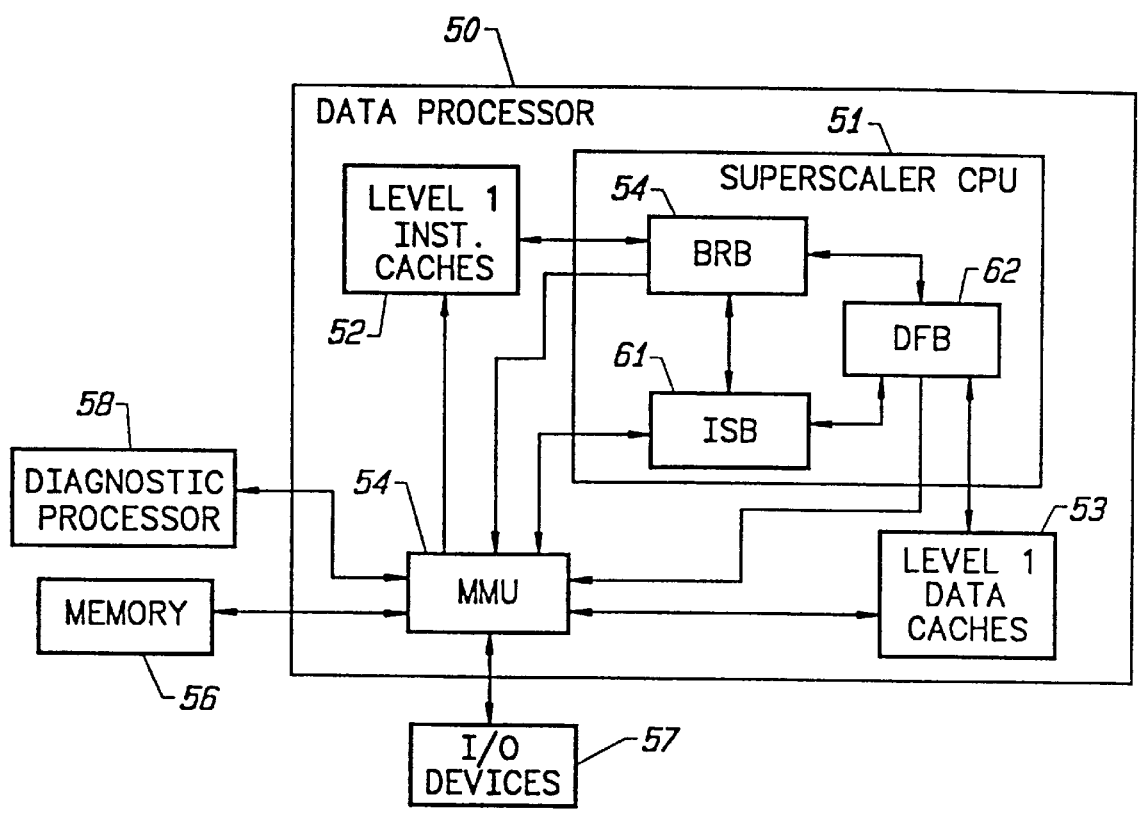
FIG. 4 is a top level functional block diagram of an embodiment of the inventive data processor including a central processing unit.

FIG. 4 is a top level functional block diagram of a data processor 50. The data processor includes a novel out-of-order speculative execution (superscalar) central processing unit (CPU) 51. The exemplary CPU is capable of executing the SPARC-V9 instruction set described in the SPARC-V9 Architecture Manual. "The SPARC Architecture Manual", Version 9, by D. Weaver and T. Germond, Englewood Cliffs (1994), which is hereby explicitly incorporated by reference. However, those skilled in the art will recognize that the novel design and methods described herein are not limited to the SPARC-V9 architecture.

Indeed, CPU 51 employs novel designs and methods for increasing throughout while maintaining precise machine state which are applicable to all data processors. Specifically, it employs (1) a novel design and method for tracking instructions to monitor and recover processor resources and state; (2) a novel design and method for aggressively scheduling long latency instructions such as load/store instructions; (3) a novel design and method for checkpointing machine state; and (4) a novel design and method for restoring machine state after detection of an exception or misprediction.

An outline of the Description of Specific Embodiments Section of this Specification if provided here for convenient reference. The topical headers in this Specification are provided for convenient reference only, and are not to be interpreted as limiting the applicability of the disclosure provided in that section to any particular aspect or embodiment of the invention.

I. CPU OPERATION OVERVIEW
II. TRACKING INSTRUCTIONS
A. Instruction Fetch
B. Instruction Issue
   1. Instruction Issue Overview
   2. Instruction Serial Number Allocation and Instruction Status Storage
      a. Instruction Issue-Commit-Reclaim Unit (ICRU)
      b. Instruction Issue Related Pointers and Pointer Maintenance During Issue Stage
   3. Register Renaming
   4. Dispatch to Reservation Stations
C. Instruction Execution and Completion
D. PSU Participation in the Instruction Execution Stage
E. Instruction Commitment
F. Instruction Retirement and Resource Recovery
   1. Update to RRF and Rename Maps at Instruction Commitment and Retirement
   2. Reading RRF at Instruction Retirement
   3. Precise State Maintenance Using Pointers
III. AGGRESSIVE LONG LATENCY (LOAD/STORE) INSTRUCTIONS SCHEDULING
A. Memory Instruction Status Information Storage
B. NMCSN and PBSN Pointers for Tracking and Scheduling Long-Latency Information
C. Advancing NMCSN
D. Load-Store Unit (LSU) within Data Flow Block
   1. Identifying In-Range Memory Referencing (long Latency) Instructions
   2. Enhancement to the Basic Structure and Method For Aggressive Long Latency (Load/Store) Instruction Scheduling
IV. CHECKPOINTING
A. Structure of Checkpoint Allocation Register
B. Checkpoint Allocation
C. Checkpoint Retirement
D. Checkpoint Maintenance On Machine Backup
E. Timeout Checkpoint Enhancement
F. Maintaining and Restoring Precise State at Any Instruction Boundary
G. Method of Syncing Machine for Predetermined Instructions to Reduce amount of Checkpointed Data
H. Method of Checkpointing Register Rename Map to reduce amount of Checkpointed Data
V. RECOVERY FROM MISPREDICTS AND EXCEPTIONS
A. Misprediction Detection with Watchpoint for Simultaneous Plural Unresolved Branch/Jump-and-Link Instruction Evaluation
   1. Activation of Watchpoint Elements
   2. Watchpoint Grabbing of CC Data Directly from Data Forward Busses
   3. Examples of Watchpoint Operation
   4. Evaluation of Branch Instructions
   5. Evaluation of JUMP-LINK (JMPL) Instructions
B. Exception Detection
   1. Detecting Issue Traps
   2. Detecting Execution Traps
C. Recovery by Backtracking the Processor to an Earlier State
   1. Processor Backup to a Checkpoint Boundary
   2. Mispredicted Instruction, RED Mode, and Execution Trap Initiated Backup
   3. Processor Backstep to Any Instruction Boundary
D. Priority Logic and State Machine Operation During Exception & Misprediction Recovery
E. Handling of Traps with Trap Stack

I. CPU OPERATION OVERVIEW

CPU 51 fetches instructions from a level one (L1) instruction cache 52 and stores data in and retrieves data from a level one (L1) data cache 53. The L1 instruction and data caches may be physically positioned on the same chip/substrate as the CPU 51 or may be assembled on a different chip/substrate.

The CPU also interacts with a memory management control unit (MMU) 54 to determine the overall status of the data processor 50. Specifically, the MMU retrieves instructions from the external memory 56, stores data in and retrieves data from the external memory 56, receives data from and outputs data to the external I/O devices 57, provides diagnostic information to and receives diagnostic information from the external diagnostic processor 58, the CPU 51, and the caches 52 and 53, performs data address translations, and stores and tracks memory status information.

Figure 5:
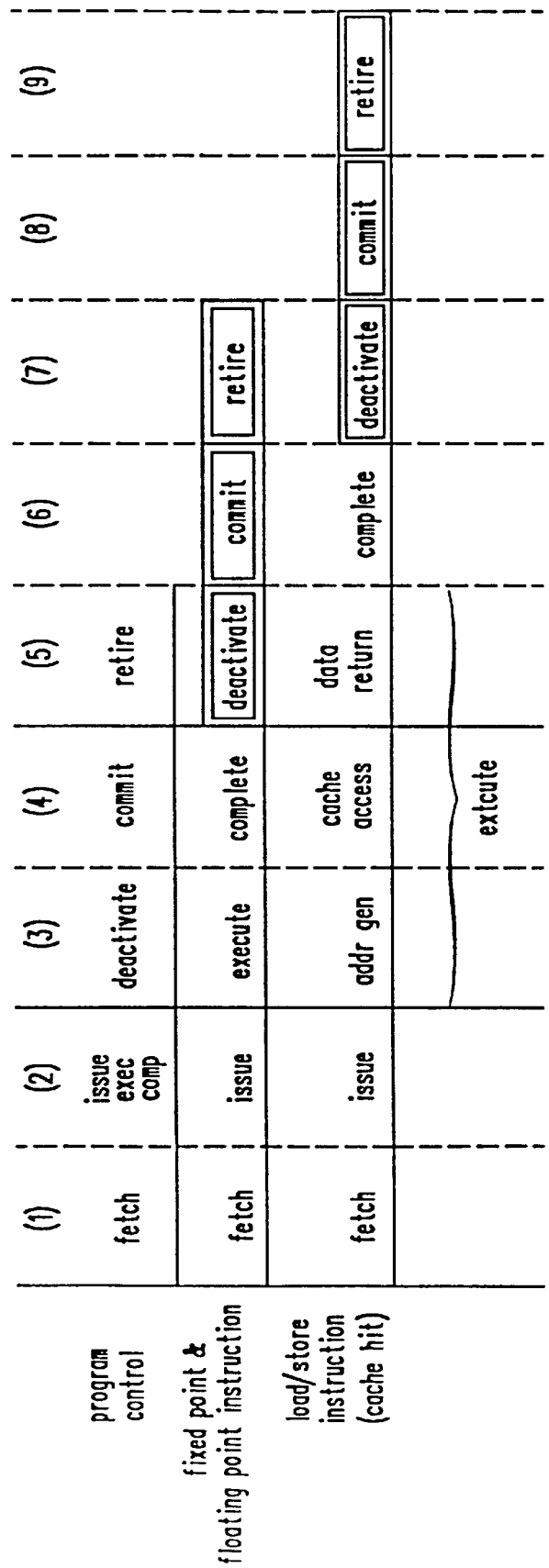
FIG. 5 shows the stages of an embodiment of the novel instruction pipeline of the CPU for some typical instruction types.

FIG. 5 shows the stages (and associated machine cycles) of the novel instruction pipeline of the CPU 51 for some typical instruction types, including predicted program control instructions, fixed and floating point instructions, and load/store instructions. To implement this pipeline, the CPU 51 includes a branch block (BRB) 59, an issue block (ISB) 61, and a data flow block (DFB) 62, as shown in FIG. 4.

Referring to FIGS. 4 and 5, the BRB 59 fetches instructions during the fetch stage and provides these instructions to the ISB 61. The BRB 59 makes target address predictions and branch taken or not taken predictions for various types of program control instructions. Thus, it is capable of speculatively fetching instructions during the fetch stage.

The ISB 61 issues the fetched instructions in predicted program counter (PC) order during the issue stage because the instructions may have been speculatively fetched. It also forms checkpoints of the machine state of the CPU 51 during the issue stage for instructions that fall at predefined intervals and for predefined types of issued instructions including program control instructions for which predictions were made by the BRB 59.

The BRB 59 executes and completes nop and predicted program control instructions in the same stage as which they are issued by the ISB 61. However, the DFB 62 executes and completes issued fixed point and floating point instructions as soon as the resources they require become available. Moreover, the DFB 62 aggressively schedules issued load/store instructions for execution when the resources they require are available and in such way when they are executed and completed they do not have to be undone in the case of an exception (e.g., issue trap, execution trap, or interrupt) or program control misprediction. Thus, although some fixed point, floating point, and load/store instructions may have an earlier issue stage than others, they will have later execute and complete stages since the resources they require may not have become available yet. Moreover, they may have been speculatively executed and completed since they may have been speculatively fetched by the BRB 59 based on an earlier program control prediction by the BRB 59. In other words, instructions issued to the DFB 62 may be executed and completed out of predicted PC order.

When an instruction completes without an error occurring (e.g., issue trap, execution tap, or mispredict), it is then deactivated by the ISB 61 in the deactivate stage. Since instructions may complete out of predicted PC order, they may also be deactivated out of predicted PC order.

Deactivated instructions are then committed by the ISB 61 in actual PC order during the commit stage. This is true because a deactivated instruction may not be committed unless all preceding issued instructions were committed. As a result, once an instruction is committed, it may not be undone in the case of an exception or misprediction. This means that the actual PC order up to this point is correct and that the instruction has been committed in the actual PC order. Moreover, when an instruction for which a checkpoint was formed is committed, then the preceding checkpoint can be retired.

When an instruction is committed, it is then retired by the ISB 61 in actual PC order in the retire stage. After an instruction is retired, the resources allocated to it are reclaimed and may be re-allocated to other instructions when they are issued.

The ISB 61 handles recovery from an exception or program control misprediction that occurs at some point during the pipeline. Thus, if a program control misprediction occurs, then the ISB 61 backs up the CPU 51 to the checkpoint formed when the faulting program control instruction was issued. Similarly, if an execution trap occurs, then the ISB 61 first backs up the CPU 51 to the earliest checkpoint formed after the faulting instruction was issued, if such a checkpoint has been formed, and/or backsteps the CPU 51 to the faulting instruction. In backing up to a checkpoint and/or backstepping, the CPU 51 is returned to the correct machine state that existed just prior to the issuance and execution of the faulting instruction.

If the ISB 61 has backed up to a faulting instruction that caused a program control misprediction, then the BRB 59 begins fetching instructions with the correct program counter value and the correct machine state. But, if the ISB 61 has backed up and/or backstepped to an instruction that caused an execution trap, it provides the BRB 59 with the target program counter value for the appropriate trap handling routine. The trap handling routine then handles the trap and returns the program counter value of the faulting instruction or the next program counter value to the BRB 59 for fetching the next instruction. The program counter of the faulting instruction is returned if the trap handling routine instructs the CPU 51 to fetch the faulting instruction and retry issuing and executing it. But, the next program counter value is returned if the trap handling routine instructs the CPU 51 to fetch the next instructions after the faulting instruction so as to skip issuing and executing the faulting instruction.

II. TRACKING INSTRUCTIONS

As was alluded to earlier, the CPU 51 employs a novel design and method for tracking instructions in the instruction pipeline of the CPU 51. In order to implement this design and method, the pipeline includes the fetch, issue, execute, complete, deactivate, commit, and retire stages shown in FIG. 5 and discussed briefly earlier.

A. Instruction Fetch

Figure 6:
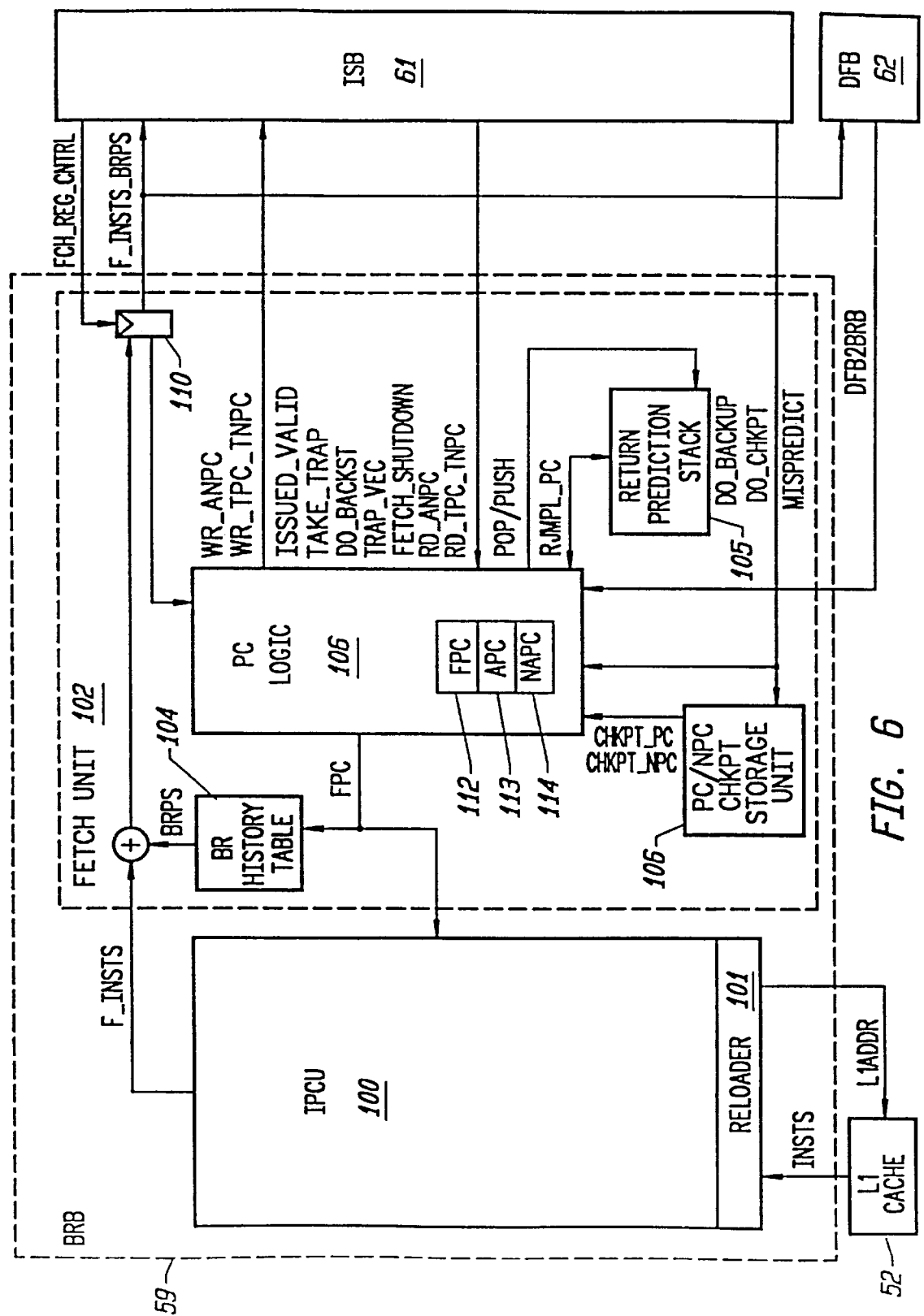
FIG. 6 shows an exemplary Branch Block (BRB) of the inventive CPU which includes an instruction prefetch and cache unit and a fetch unit.

Referring again to FIG. 4, the BRB 59 fetches instructions during the fetch stage and provides them to the ISB 61. As shown in FIG. 6, the BRB 59 includes an instruction prefetch and cache unit (IPCU) 100 and a fetch unit 102.

The IPCU 100 can retrieve four instructions (INSTs) from the level one (L1) instruction cache 52 at a time. The retrieved instructions are recoded by the instruction recoder 101 of the IPCU 100 to a format more suitable for use by the BRB 59, ISB 61, and DFB 62. In alternative embodiments, the IPCU 100 could be implemented to retrieve more or less than four instructions at a time.

The fetch unit 102 includes program counter (PC) logic 106 to compute a fetch program counter (FPC) value, an architectural program counter (APC) value, and a next architectural program counter (NAPC) value. The FPC, APC, and NAPC values computed each machine cycle are respectively stored in the FPC, APC, and NAPC registers 112–114 of the PC logic. The current FPC value in the FPC register points to the instructions being fetched in the current machine cycle while the current APC and NAPC values in the APC and NAPC registers 113 and 114 point to the first and next instructions which are available to be issued by the ISB in the current machine cycle and which were fetched in a previous machine cycle.

In response to the FPC value, four instructions (F_INSTs) at a time are fetched by the IPCU 100. In alternative embodiments, it could be implemented to fetch more or less than four instructions at a time.

For each FPC value, the branch history table 104 contains a branch prediction field (BRP) for each instruction fetched with the FPC value. Thus, each of the BRP fields corresponds to one of the instructions fetched with that FPC value. If any of the fetched instructions are conditional branch instructions, such as the SPARC-V9 BPcc, Bicc, BPr, FBfcc, and FBPfcc instructions, then their corresponding BRP fields identify whether the branch should be predicted taken or not taken in the subsequent issue, execute, and complete stage of the branch instruction. The branch history table 104 outputs the BRP fields for the fetched instructions in response to the FPC value. The BRP fields are then appended to the corresponding fetched instructions (F_INSTs) by the fetch unit 102 to provide composite instructions which are received by the fetch rotation register 110.

The fetch register has four latches for holding four instructions at a time. The latches define an issue window with four slots (0–3) containing, in predicted PC order, the next four instructions that can issued by the ISU 200. However, some of the instructions held by the fetch register during the previous machine may have not been issued by the ISU 200 because of issue constraints such as those described shortly. To make sure that fetched instructions will be issued in predicted PC order, the ISU 200 generates fetch register control (FCH_REG_CNTRL) signals which control the fetch register to place the instructions that weren't issued in the last machine cycle in the appropriate latches so that they are in predicted PC order in the issue window and can therefore be issued in predicted PC order by the ISU 200. Moreover, in response to the FCH_REG_CNTRL signals, the fetch register places in the remaining latches those of the just fetched instructions that come next in predicted PC order.

In alternative embodiments, the fetch register could be implemented to store more or less than four instructions at a time. Moreover, although the exemplary CPU 51 has been described with one fetch register located in the fetch unit 102, a fetch register of the type just described could be used at each block in the CPU that performs decoding. And, the fetch registers could be placed in these blocks so that initial decoding takes place during the fetch cycle prior to the decoded instructions being stored in the fetch registers with the remainder of the decoding taking in the issue stage.

B. Instruction Issue

1. Instruction Issue Overview

Figure 7:
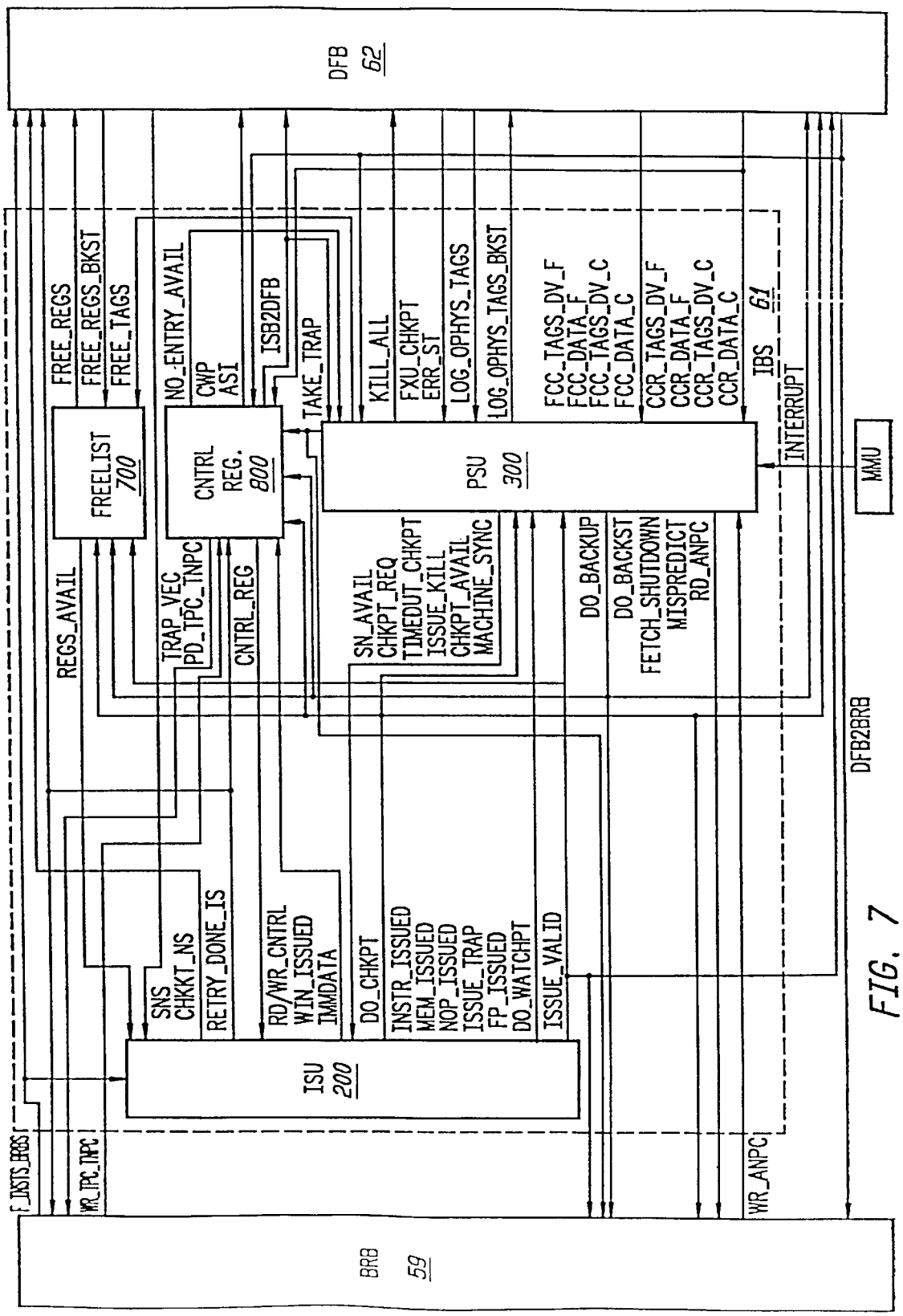
FIG. 7 shows an exemplary issue Block (ISB) including an issue Unit (ISU), a Precise State Unit (PSU), a Freelist Unit, and a Control Register File.

The ISB 61 is responsible for issuing fetched instructions during each issue stage. As shown in FIG. 7, the ISB 61 includes an issue unit (ISU) 200, a precise state unit (PSU) 300, a freelist unit 700, and a control register file 800. During each issue stage, the ISU 200 receives four instructions (F_INSTs_BRPs) at a time from the fetch register 110 of the BRB 59. In response, it decodes them to determine how many of them to issue based on various issue constraints, such as those described next.

Figure 8:
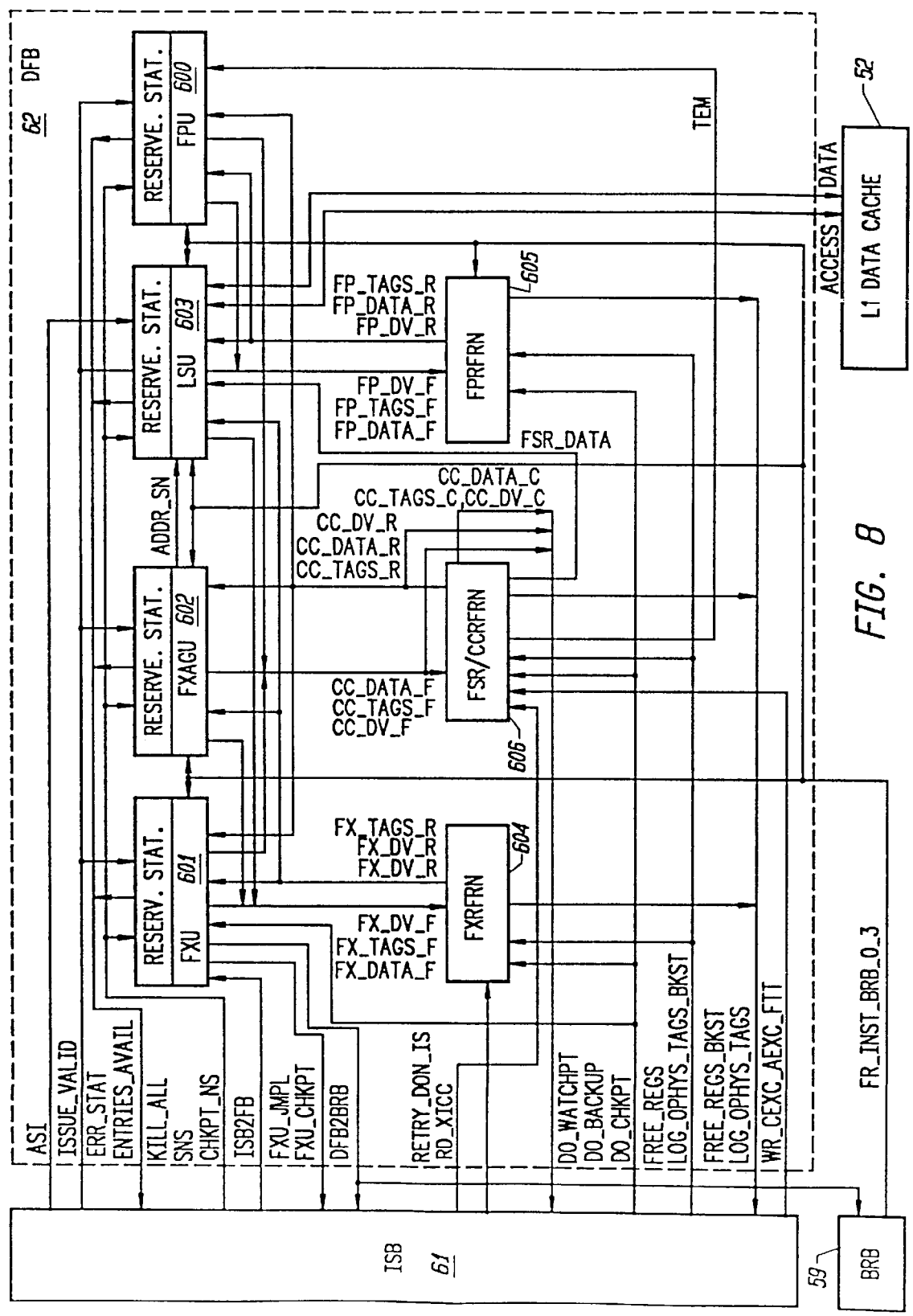
FIG. 8 shows exemplary signals received by the Issue Unit from the register renaming Freelist Unit and used to implement the inventive register renaming.

Since the fetch register 110 provides four instructions at a time to the ISU 200 during each issue stage, the ISU 200 can issue up to four instructions during each issue stage. But, it can only issue the four instructions in the issue window of each issue stage in predicted PC order. Therefore, if any other issue constraints require that one of the instructions in the current issue window cannot be issued, then only those of the instructions in the issue window slots prior to this instruction can be issued during the current issue stage. Since, in alternative embodiments, the fetch register 110 may be constructed to provide to the ISU 200 more or less than four instructions per issue stage, the ISU 200 may be constructed to issue up to more or less than four instructions per issue stage. Referring to FIG. 8, the FPU 600, FXU 601, FXAGU 602, and LSU 603 have reservation stations or queues for storing instruction data dispatched to them for issued instructions. However, during the issue stage, some of the reservation stations may not have enough storage elements or entries available to store dispatched instruction data. Thus, the FPU 600, FXU 601, FXAGU 602, and LSU 603 output ENTRIES_AVAIL signals that respectively indicate how many entries are available in the reservation stations of the FPU 600, FXU 601, FXAGU 602, and LSU 603 to receive dispatched instruction data. As a result, the ISU 200 issues floating point, fixed point, and load store instructions based on how many entries are available as indicated by the ENTRIES_AVAIL signals.

Moreover, in the exemplary CPU 51, the FXU 601 is the only execution unit in the DFB 62 that executes program control, multiply/divide, and control register read/write instructions that involve fixed point data computations. Thus, in this case, the ISU 200 issues these kinds of instructions for execution by the FXU 601. In alternative embodiments, the FXAGU 602 may also be configured to execute program control, multiply/divide, and control register read/write instructions that involve fixed point data. In this case, the ISU 200 would also issue these kinds of instructions for execution by the FXAGU 602. Moreover, each of the execution units 600–603 may comprise one ore more functional units, with each functional unit capable of executing or performing an issued instruction. Thus, the number of instructions that can be issued depends on the number of functional units within each execution unit.

Referring again to FIG. 7, the PSU 300 may also impose issue constraints on the issuing of instructions by the ISU 200. The PSU 300 can output an ISSUE_KILL signal that identifies which, if any, of the instructions received from the fetch register 110 should not be issued during the current issue stage. As will be explained in greater detail later, the ISSUE_KILL signal is asserted when the PSU 300 is backing up or backstepping to a faulting instruction after an exception has been detected or during the execution, completion, deactivation, and retirement of a syncing instruction which is described next.

For particular types of instructions, the ISU 200 makes certain that the CPU 51 is synced (synchronized) prior to issuing one of these syncing (synchronizing) instructions. The CPU 51 is synced for a particular instruction when all of the instructions preceding it have been issued, executed, completed, deactivated, and retired. Thus, when the ISU 200 determines that one of the instructions received from the fetch register 110 is a syncing instruction, it waits until it has issued the instructions that are in the issue window slots ahead of it and until it receives a MACHINE_SYNC signal from the PSU 300 indicating that the CPU 51 has been synced. When this occurs, the instruction is in the slot of the issue window for the instruction with the earliest PC value (i.e., slot 0) and the ISU 200 will only issue it. Although the exemplary CPU 51 implements the previously described method of syncing machine state for particular types, an alternative technique would allow issue of syncing instructions after commitment of the previous instruction since a committed instruction is guaranteed to be non-speculative.

The ISU 200 also detects issue traps, such as those described in the SPACR-V9 Architecture Manual, which effect issuing of instructions. The ISU 200 receives control register (CNTRL_REG) fields from the control register file 800 and decodes the instructions (F_INSTs_BRPs) received from the fetch register 110 to detect whether certain types of issue traps have occurred during an issue stage. In an embodiment based on the SPARC-V9 architecture, this is done in accordance with the SPARC-V Architecture Manual. Moreover, other types of issued traps do not require register control and are taken and detected based on the instruction opcode decoded by the ISU 200.

Only the issue trap caused by the instruction in the earliest issue window slot will be taken. Therefore, when one or more issue traps are detected, only the instructions in the issue window slots prior to the slot of the issue trap causing instruction in the earliest slot can be issued by the ISU 200. Moreover, for issue traps that occur often, the CPU 51 will be synced in the manner described earlier so that the issue trap is not taken speculatively. In alternative embodiment, the CPU 51 could be configured to allow the issue traps to only occur in slot 0 so as to reduce and simplify logic.

During each issue stage, the ISU 200 assigns (allocates) a serial number to each instruction that is issued and dispatches these serial numbers (SNs) to the DFB 62. As will be described in greater detail later, the PSU 300 keeps track of the issued instructions using the allocated serial numbers. Moreover, in the exemplary CPU 51, it can only keep track of a predetermined number of issued but not yet retired instructions at any one time. But, as issued instructions are retired, their serial numbers become available. Thus, the PSU 300 provides the ISU 200 with SN__AVAIL signals that include a signal to indicate how many serial numbers are available for the current issue stage and signals to contain these available serial numbers. If, during the current issue stage, the SN__AVAIL signals indicate that the number of serial numbers currently available are less than the number of instructions that can be issued, then only those instructions in the earliest slots for which serial numbers can be allocated are actually issued.

Also during the issue stage, the ISU 200 determines whether checkpoints of the machine state of the CPU 51 should be formed for any of the instructions. As will be described in greater detail later, checkpoints will be formed for certain types of instructions and at predetermined issue stage intervals. Thus, when the ISU 200 determines that any of the instructions it will issue require a checkpoint and/or the PSU 300 indicates with the TIMEOUT__CHKPT signal that a predetermined number of issue stages have occurred since the last tissue stage in which a checkpoint was formed, the ISU 200 generates a DO__CHKPT signal instructing the PSU 300, control register file 800, the BRB 59, and the DFB 62 to form checkpoints of the machine state of the CPU 51.

Furthermore, the ISU 200 assigns a checkpoint number to each of the instructions that is issued and dispatches these checkpoint numbers (CHKPT__Ns) to the DFB 62. In doing so, each instruction for which a checkpoint is to be formed is assigned a new checkpoint number while the instructions for which a checkpoint is not formed are assigned the checkpoint number of the previous checkpoint. The PSU 300 keeps track of the formed checkpoints using the assigned checkpoint numbers.

As with assigned serial numbers, the PSU 300 can only keep track of a predetermined number of formed but not yet retired checkpoints at any one time. However, since checkpoint numbers become available as checkpoints are retired, the PSU 300 provides the ISU 200 with CHKPT__AVAIL signals that include a signal that indicates how many checkpoint numbers are available for the current issue stage and signals that contain the available checkpoint numbers. Thus, when the CHKPT__AVAIL signals indicate that the number of new checkpoint numbers currently available are less than the number of instructions that require a new checkpoint to be formed, only those of the instructions in the earliest issue window slots for which new checkpoint numbers can be assigned are actually issued.

Furthermore, the CPU 51 may be configured to only form a predetermined number of checkpoints per issue stage. Thus, for example, if the CPU 51 can only form one checkpoint per issue stage and there are two instructions in an issue window that require a checkpoint to be formed, the ISU 200 will only issue the instruction which is in the earliest slot during the current issue stage and will issue the other instruction in another issue stage.

As will be discussed later, the CPU 51 employs register renaming to increase processor throughput. In order to properly implement register renaming, the ISU 200 receives REGS__AVAIL signals from the register renaming freelist unit (FREELIST). Referring to FIG. 8, these signals include signals that indicate how many of the physical fixed point registers of the fixed point register file and rename unit (FXRFRN) 604 are available for renaming, how many of the floating point registers of the floating point register file and rename unit (FPRFRN) 605 are available for renaming, how many of the physical integer and floating point condition code registers in the floating point status and condition code register file and rename unit (FSR/CCRFRN) 606 are available for renaming. Referring back to FIG. 7, if any of the instructions received from the fetch register 110 require register renaming, and physical registers are required for renaming but are not available as indicated by the REGS__AVAIL signals, then the ISU 200 cannot issue these instructions.

The foregoing issue constraints have been described with respect to the exemplary CPU 51 in order to demonstrate the concept of issue determination. Furthermore, implementations may exist which involve different and more or less issue constraints than those just described but do not depart from the basic concept of issue determination as described herein. Thus, those skilled in the art will recognize that issue constraints are implementation dependant and that the invention described herein is not to be limited by the issue constraints just described.

2. Instruction Serial Number Allocation and Instruction Status Storage

The exemplary CPU 51 assigns a unique identification tag that is associated with an instruction from the time the instruction is issued until the instruction completes execution and is ultimately retired. Sequential serial numbers are conveniently used as the instruction identification tags. The serial numbers are used during each stage and by virtually every block during exception-free processing and during CPU 51 recovery when exceptions or mispredictions occur. Instruction status information is stored in CPU 51 and continually updated in response to changes in status, such as execution completion signals, execution error signals, and branch instruction mispredict signals, and the like. The Precise State Unit (PSU) 300 within ISB 61 is responsible for allocating the instruction serial number tags and for tracking instruction status in response to signals received from other CPU 51 units, particularly form DFB 62.

Figure 9:
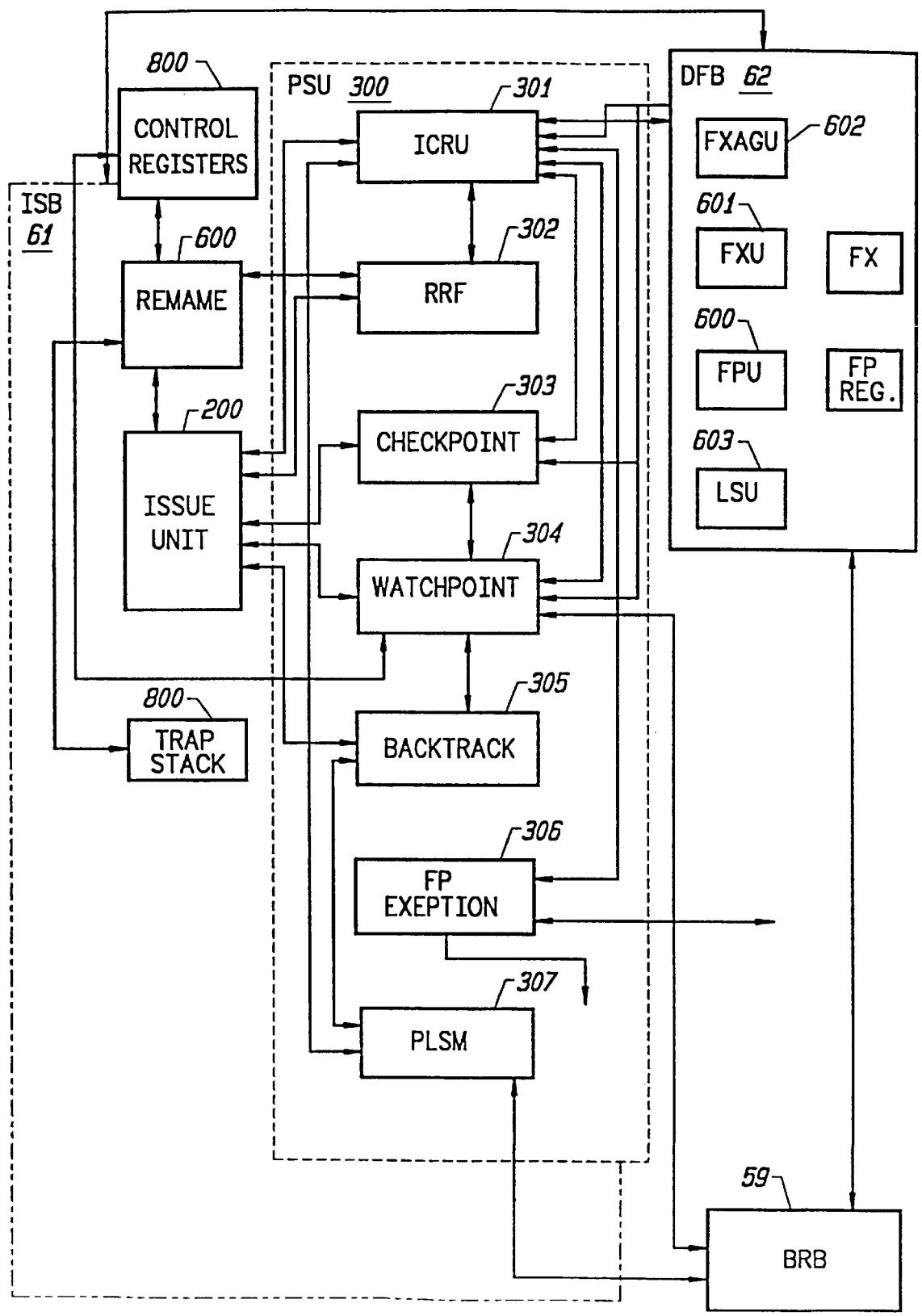
FIG. 9 shows an embodiment of the Precise State Unit (PSU).

In reference to FIG. 9, Precise State Unit (PSU) 300 is a functionally within ISB 61 and is responsible for (1) tracking the issue, execution, completion, and retirement status of instructions in CPU 51; (2) detecting and initiating branch mispredict recovery; (3) tracking the availability of certain machine resources including instruction serial numbers, checkpoints, and watchpoints; and (4) general exception handling and control. Several units within PSU 300, as shown in FIG. 9 and as described in greater detail hereinafter, are implemented to accomplish this functionality.

PSU 300 includes an Issue/Commit/Retire Unit (ICRU) 301 which maintains activity status information for all issued instructions until they are retired. ICRU 301 supplies ISU 200 with a signal (SN__AVAIL) that identifies up to four instruction serial numbers (SN's) for use by ISU 200 in the next instruction issue cycle. At the time ISU issues instructions, ISU 200 informs ICRU which of the up to four serial numbers provided (SN__AVAIL) to ISU in the previous cycle were validly issued by ISU in the form of the ISSUE_VALID signal that, as indicated earlier, identifies which serial number was allocated and which serial number was associated with each instruction. Recall that issue constraints may restrict ISU's ability to issue all of the instructions in the instruction window. ICRU 301 stores and maintains status information and address pointers to the status information to track instruction issue, execution, completion, deactivation, commitment, and retirement phase status for every instruction that was validly issued by ISU 200, independent of the type of instruction. ISU 200 also informs ICRU 301 with signal ISSUE_NOP which of the issued instructions are associated with nop and certain program control instructions, which allow deactivation in the same stage as which they are issued. ISSUE_NOP is not limited to the specific "nop" instruction which may be inserted into the instruction stream, such as for example, to introduce a pause or delay. When aggressive scheduling of long latency instructions such as load/store and other instructions referencing memory external to the CPU 51, ISU 200 also informs ICRU 301 in the form of an ISSUE_MEM signal that identifies which of the instructions in slot0–3 are long latency. (Aggressive scheduling of long latency instructions is separately described as an enhancement to the basic inventive structure and method.)

a. Issue/Commit/Reclaim Unit (ICRU)

Figure 10:
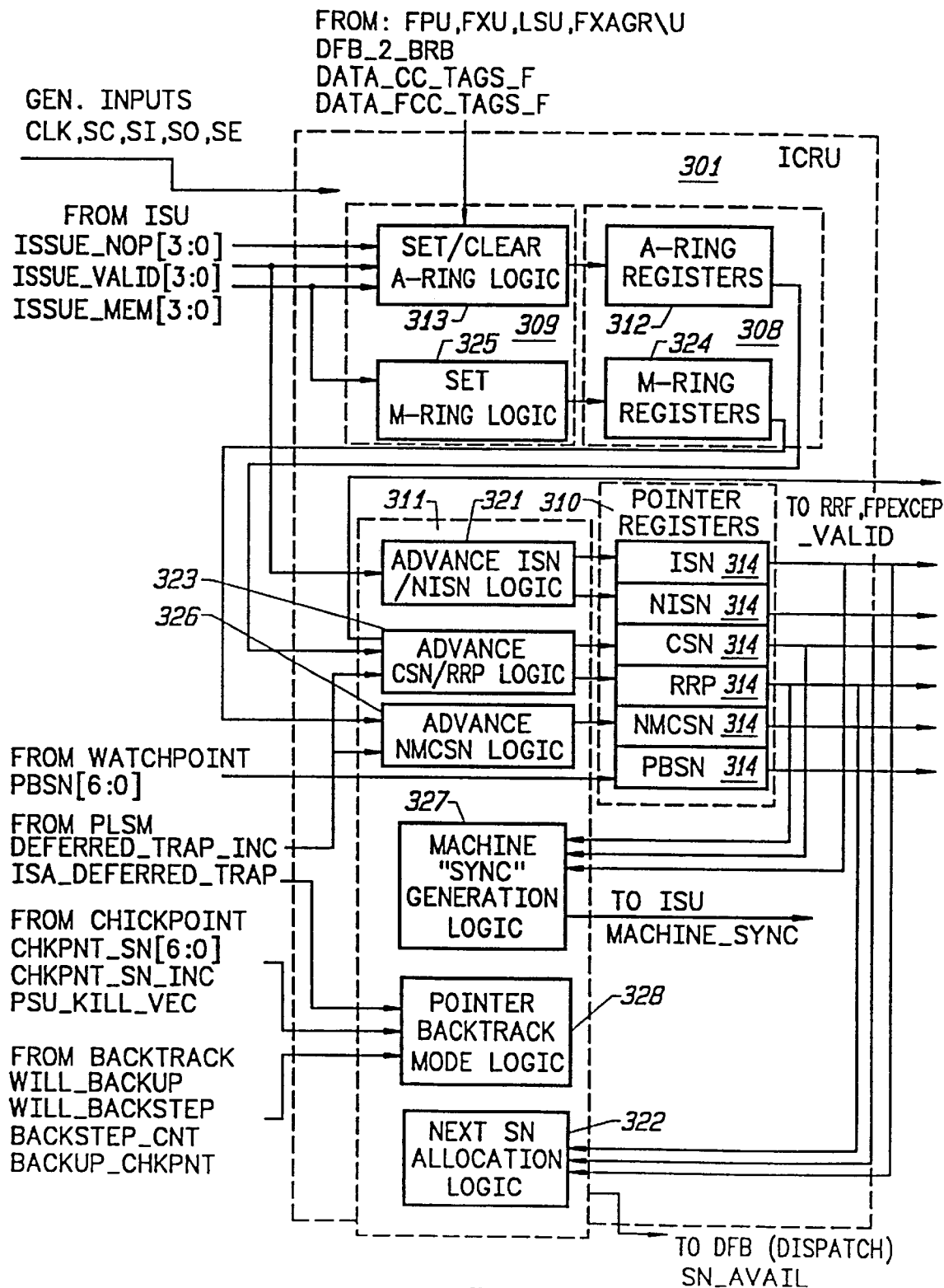
FIG. 10 shows a functional block diagram of components of an embodiment of the Issue/Commit/Reclaim Unit (ICRU) and input and output signals associated with its operation.

Issue/Commit/Reclaim Unit (ICRU) 301 is functionally within PSU 300 and assigns instruction tags, such as the n-bit sequential serial numbers, and maintains activity status information for all issued instructions by defining and maintaining a data storage area for the instruction status information in memory internal to CPU 51. FIG. 10 shows a functional block diagram of components of ICRU 301 and input and output signals associated with ICRU operation. ICRU 301 is functionally organized into four areas. Instruction Status Information Data Structure 308 is responsible for storing instruction status information and updating the status in response to signals Data Structure Control Logic 309 which itself is responsive to signals from other CPU 51 units, particularly DFB 62. Pointer Data Structure 310 includes data storage areas for separately storing a plurality of a serial numbers that serve as status pointers to various instruction stage milestones in the CPU 51, such as issued, completed, retired, and the like. These serial number pointers are described in greater detail hereinafter. Pointer Control Logic 311 is responsible for evaluating the status information stored in Data Structure 308 in conjunction with data received from other CPU 51 units in order to update the serial number pointer to reflect then current CPU 51 state. Pointer values are provided as global outputs from ICRU 301 and PSU 300 to other units in the CPU 51.

Instruction Status Information Data Structure 308 comprises Active Instruction Ring Registers (A-ring) 312 and may optionally comprise Memory Instruction Ring Registers (M-ring) 324. Memory Instruction Ring registers are described elsewhere in this specification in connection with Aggressive Load/Store instruction scheduling. Data Structure Control Logic 309 comprises A-Ring Set/Clear Logic 313 and may optionally comprise M-Ring Set/Clear Logic 325. Pointer Control Logic 311 comprises ISN/NISN initialization and Advance Logic 321, Next Instruction Serial Number Allocation Logic 322, and CSN/RRP Advance Logic 323, and may optionally comprise NMCSN Advance Logic 326, Machine Sync Generation Logic 327, and Backtrack Mode Pointer Adjustment Logic 328. Optional elements pertain to enhancements of the basic inventive structure and method and are described more fully hereinafter.

Operation of Issue/Commit/Reclaim Unit during instruction issue stage is not described in reference to FIG. 10. The serial numbers (SN_AVAIL) sent to ISU 200 for allocation to issued instructions are selected by serial number allocation logic in ICRU based on pointers values within Pointer Data Structure 310. When the CPU 51 is initialized (such as on power-up), pointers within Pointer Data Structure 310 may also be initialized so that ICRU initially allocates the first serial numbers to ISU 200 (e.g. SN's 0–3) for instructions in the issue window.

ISU 200 sends ISSUE_VALID signal to Data Structure Control Logic 309 to inform ICRU which of the serial numbers provided in the previous cycle (e.g. which of the four SNs) where validly issued by ISU 200 and for which instruction slot. Set/Clear A-Ring Control Logic 313 uses this information and the values of pointers within Pointer Register 310 to write instruction status information into A-Ring 312. In one embodiment of the CPU 51, ISSUE_VALID is a four-bit vector that informs ICRU which of the instruction serial numbers (SN_AVAIL) were actually used by ISU 200 by identifying instruction slot for which an instruction was actually issued. ICRU can then determine which SN's were used based on both SN_AVAIL and ISSUE_VALID.

Figure 11:
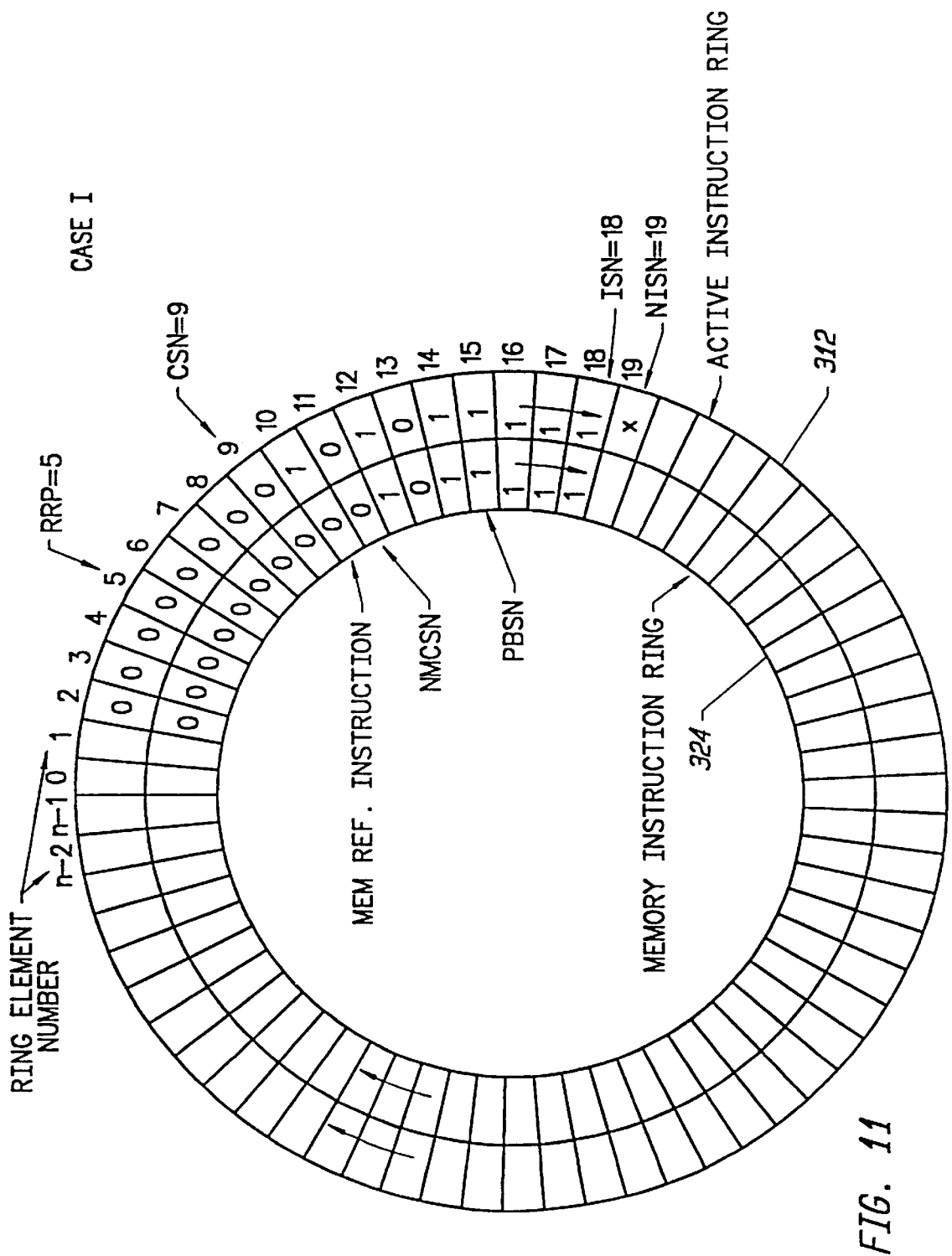
FIG. 11 shows diagrammatic illustrations of embodiments of the Active Instruction Data Structure and Memory Instruction Data Structure for storing instruction status information and various pointers associated with a first set of exemplary data stored in the data structure.

An embodiment of Active Instruction Ring 312 is now described with reference to a diagrammatic representation in FIG. 11. The data structure in FIG. 11 is exemplary and those workers having ordinary skill in the art, in light of the teaching of this patent, will understand that a variety of data structure may be used to implant this Active Instruction Status Register. FIG. 11 shows Active Instruction Ring (A-ring) 312 which is implemented as a 64-bit data structure. (Memory Instruction Ring (M-Ring) 324 is also shown in diagrammatic form and will be described elsewhere in this specification with respect to an enhancement for aggressively scheduling long latency instructions.) Each of the sixty-four addressable locations in A-Ring 312 corresponds to an instruction serial number in the CPU 51. The set ("1") or cleared ("0") state of each Active-bit (A-bit) indicates whether the instruction is active ("1") or inactive ("0") in the CPU. Basically, instruction is actuated where it is issued and deactivated where it completes execution without error and was not mispredicted. For some instructions that are issued and effectively complete execution in a single machine cycle, the A-bit is cleared at instruction issue. The number of addressable locations in A-ring 312 limits the number of instructions that may be concurrently outstanding in the CPU.

In the exemplary processor, A-ring 312 is implemented as a circular, ring, or wrap-around data structure where pointers are moved along the data structure using "modulo-A-ring register length" type arithmetic (here, modulo-64 type arithmetic). That is, as a pointer is incrementally moved from a first data storage location (addressable bit 0) through a series of intermediate storage locations (e.g. locations 15, 16, . . . ) to the last data storage location (addressable bit 63), it will then return to the first location (addressable bit 0). Those of ordinary skilled in the art will, in light of the teachings of the present invention, realize that although a circular data structure is advantageous, it is not essential to the invention and other data structures implementing the features of the invention may be used. Furthermore, although the exemplary A-ring has sixty-four single-bit addressable locations to maintain the required status information, multi-bit addressable locations may alternatively be provided for storing these and additional status indicators. For example, in one embodiment, a 64-bit register with arbitrary rotation is used, and in a second embodiment eight 8-bit registers are used to provide the sixty-four A-ring 312 A-bits. A simple decoding circuit enables writing (set and clear) of the bits as described hereinafter.

"Instruction Issue" by the ISU 200 results in the allocation of an instruction serial number to the instruction. The number of allocatable serial numbers is limited by the number of addressable locations (e.g. bit positions) in A-ring 312. Each addressable A-ring location therefore corresponds to a unique serial number. For example, for the exemplary 64-bit circular A-ring, as many as 64 instruction serial numbers may be concurrently assigned. More or fewer serial numbers may be assigned by providing more or fewer A-ring locations. If all serial numbers are assigned, further instruction issue must be stalled by ISU 200 until serial numbers and locations on the A-ring are freed in subsequent machine cycles. ISU 200 is informed that SN are or are not available by the SN-AVAIL signal. Each addressable location in A-ring 312 corresponds to one of the available serial numbers so that an entry in the A-ring is made for each newly issued instruction by advancement of an Issued Serial Number Pointer (ISN) 314 by one for each instruction issued. Since multiple instructions may be issued during a single machine cycle, more than one A-bit may be set during each cycle and therefore ISN may be advanced by more than one A-ring location each cycle.

"Instruction Dispatch" by ISU 200 is the activation and sending of an instruction (having an assigned serial number) for execution to DFB 62. All dispatched instructions are also issued instructions but not all issued instructions are dispatched. All "dispatched" instructions have the bit corresponding to the assigned serial number in A-RING 312 set equal to "1" to indicate the instruction is active in the machine (1=active, 0=inactive or deactivated). Instructions which are issued but not dispatched correspond to known branches or nop-type instructions and for which instructions, the A-bit is cleared (or not set) at issue. There known branches and nop-type instructions do not require an execution unit to execute, and may be issued, executed, and completed in a single stage.

b. Instruction Issue Related Pointers and Pointer Maintenance During Issue Stage FIG. 11 also shows several pointers (ISN, NISN, CSN, RRP, NMCSN, and PBSN) that are stored in pointer storage memory area 310 and point to locations on A-Ring 312 and M-Ring 324. Each pointer is element in a pointer storage unit 210 that stores one of the A-Rings location valves 0–64. Certain combinations of pointers may point to the same A-Ring or M-Ring location but other combinations may not. For example, NISN can never equal ISN, but at machine "sync" CSN=ISN=RRP. Issued Serial Number pointer (ISN) 314 and Next Issued Serial Number pointer (NISN) 315 maintain and track instruction issue status and generally limit advantage of other pointers. Committed Serial Number pointer (CSN) 316 tracks instruction commitment which follows instruction execution, completion, and deactivation for which no pointers are specifically provided. Retire and Reclaim Pointer (RRP) 317 tracks instruction retirement and controls resource reclaiming. Two additional pointers Earliest Predicted Branch Instruction pointer (PBSN) 318 and Non-Memory Committed Serial Number pointer (NMCSN) 319 are used to schedule and track execution of predicted branch instructions and long latency instructions such as load/store instructions. ICRU 301 provides current values for each of ISN, NISN, CSN, RRP, and NMCSN to a number of other units within the CPU 51. ICRU receives a value of PBSN 318 from Watchpoint Unit 308 within PSU 300 as described hereinafter. Each of these pointers are implemented as a six-bit vector in the exemplary CPU.

Issued Serial Number pointer (ISN) 314 always points to the serial number of the lase issued instruction. An instruction is considered to have been issued when one of the serial numbers supplied by ICRU has actually been allocated by ISU 200. ISN and NISN are incremented in response to ISSUE_VALID from ISU 200 which informs ICRU of the number of instructions actually issued during the cycle. As ISN and NISN are incremented, the pointers effectively advanced around A-ring 312. The maximum number of positions the ISN can advance every machine cycle is determined by the peak issue rate of the machine, but may be limited to a smaller predetermined maximum number of instructions per cycle by other software of hardware controls. For example, in the exemplary CPU advancement of ISN and NISN are limited to four instruction serial numbers (A-ring locations) per machine cycle. When the CPU is initialized ISN is initialized to 0 (zero) and when additional instructions issue ISN is advanced by the number of newly issued instructions.

Next issued Serial Number pointer (NISN) 315 always points to ISN+1 (modulo A-ring length), so that if ISN=63, the NISN=0. Where A-ring 312 contains sixty-four entries, NISN=ISN+1 (modulo 64). This is essentially the serial number of the next instruction to be issued (all instructions are issued in predicted PC order). While it is convenient to provide a separate pointer NISN, ISN alone could be used in some embodiments since NISN is always one greater than ISN. When the CPU is initialized NISN is initialized to 1 (one) and when additional instructions issue, NISN is advanced by the number of newly issued instructions. Initialization and advancement of ISN and NISN are performed by ISN/NISN Advance Logic Unit 321 in response to ISSUE_VALID from ISU 200.

ICRU 301 provides ISU 200 with four available instruction serial numbers that may be assigned to instructions as they are issued. Determination of the proper four instruction serial numbers is made in the Next Instruction Serial Number Allocation Logic 322 within Pointer Control Logic unit 311 based on the current values of ISN 314 and NISN 315. RRP 317 may limit allocation of SNS if the CU is full, that is if all SNs have been allocated and not reclaimed. ICRU 301 informs ISU 200 of the next series of (four) serial numbers that should be assigned to the issued instructions if the serial numbers are available by sending SN_AVAIL signals to ISU 200.

In one embodiment of CPU 51, SN_AVAIL composes four seven-bit signals (SN_SLOT_0, SN_SLOT_1, SN_SLOT_2, and SN_SLOT_3) that identify the serial numbers to be assigned to the up to four instructions in slots 0–3 of the issue window. Six bits supply the serial number while the seventh bit is a serial number validity bit. If the validity bit for that serial number is not set, the instruction serial number is still active in the CPU 51 and should not be used by ISU. The validity bit may not be set if all sixty-four instructions supported by the sixty-four bit A-ring 312 are active in the CPU 51. Since ISU 200 can only issue an instruction if a serial number is available, ISU may have to wait for previously issued instructions to commit and retire before issuing additional instructions. Instruction commitment and retirement is described hereinafter.

Figure 12:
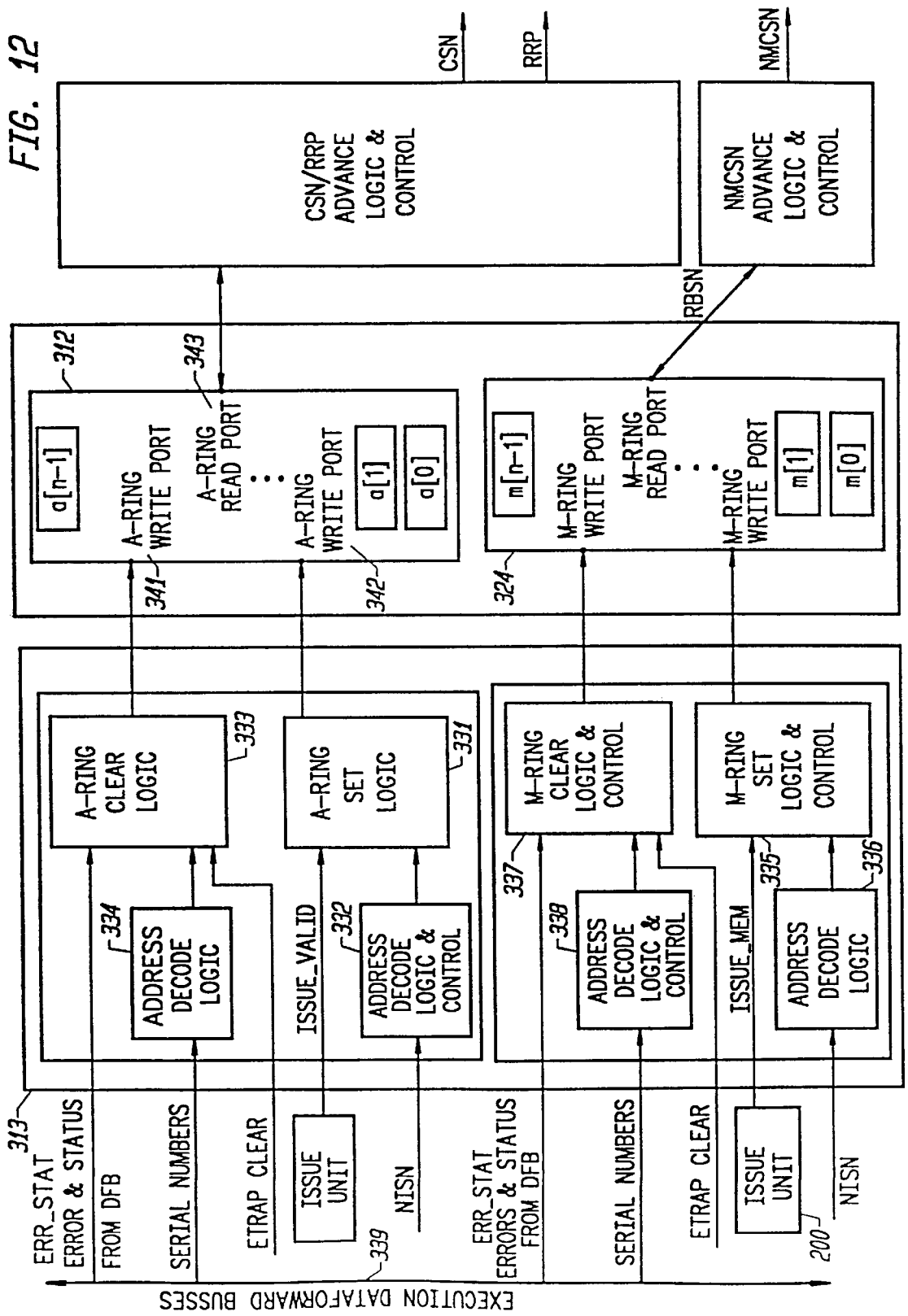
FIG. 12 shows an exemplary Status Control Logic Unit including some structural components of A-Ring Bit Set/Clear Logic.

FIG. 12 shows Status Control Logic Unit 309 in greater detail including the structure of A-Ring Bit Set/Clear Logic (ASCL) 313. ASCL 313 comprises Set Logic 331 and Clear Logic 333, as well as an Address Decode Logic Units 332, 334 associated with the Set and Clear Logic Units 331, 333, respectively. Set Logic Unit 331 receives ISSUE_VALID signal from ISU 200, and the decoded NISN pointer address from Address Decode Logic Unit 332. A-ring Set Logic Unit 331 then sets A-bits corresponding to the number of instructions actually issued by ISU to "1" via A-ring write port 342. A-bits are cleared when instructions are deactivated and/or CPU reset. The number of write ports 342 is selected to support the maker of instructions that will be activated (or deactivated) each cycle. Other structures shown in FIG. 12 relating to M-RING 324 are discussed hereinafter in conjunction with aggressive scheduling of long latency instructions and with instruction commitment and retirement.

In one embodiment, ISSUE_VALID is a four-bit vector received from ISU 200 where assertion (bit set "1" or high signal level as seated) at position bit-i indicates instruction in the i-th instruction issue window slot has been issued. ICRU 301 knows which serial numbers are associated with which slot by virtue of the SN_SLOT_i signals described previously. Since instructions are issued in sequential program order, there are only five possible states for ISSUE_VALID in a four instruction issue CPU ("0000", "0001", "0011", "0111", and "1111"). ICRU also receives a "noptype" instruction signal (ISSUE_NOP) from ISU which informs ICRU that the instruction is a nop-type instruction as described. In one embodiment of the CPU 51, ISSUE_NOP is a four-bit signal where assertion at position bit-i indicates i-th instruction in the slot is a "no-op"-class instruction. In implementing aggressive Local/Store instruction scheduling, ISSUE_MEM is a four-bit signal where assertion at position bit-i indicates i-th instruction in the slot is a memory referencing instruction.

Generally, a no-op instruction is either a control transfer instructions such as a branch, or a write ASR, write FPRS, or write PIL. The instructions "write ASI", "write FPRS" and "write PIL" are executed in the corresponding Control Register Unit 800 and not in DFB 62 and are therefore are treated as NOP-type instructions. Consequently, their corresponding ISSUE_NOP is set to '1' leading to the A-bit be set to '0'. Tcc instructions are not issued when CC is not known. Tcc instructions are issued as a NOP instruction if CC is known and false. Tcc instructions are issued with ISSUE_NOP=0 in other cases. Theses instructions do not require a DFB 62 execution unit to execute and generally complete in the same machine cycle as issued. When the corresponding instruction is of the "nop"-class such as a "branch" (br) instruction, ISSUE_NOP is set to "1". When ISSUE_NOP is set to "1", the corresponding A-bit is set to '0', i.e. the instruction is instantly deactivated and committable. (Instruction commitment and modification of A-bits at commitment are described hereinafter.)

The sixty-four activity bits in the A-ring indicate the activeness of the instructions coexisting in the CPU. The A-bits do not need to be initialized because they will be set and cleared every cycle before they are used. The A-bits are set according to the ISSUE_VALID, ISSUE_NOP, and NISN.

Because the branch instructions have the A-bit cleared at issue, additional steps are taken to prevent CSN 316 (see description hereinafter) from advancing past a speculatively executed branch instruction. In the exemplary embodiment, a branch condition code is stored in Watchpoint Unit 304 at the time the branch instruction is issued. Watchpoint Unit 304 monitors instruction execution and when the speculatively issued branch instruction completes, Watchpoint compares the execution result with the branch condition code required to validate the speculative issue. Condition code comparison provides a determination as to whether the speculative execution was correctly predicted. If the speculative execution was incorrect, CPU 51 recovery methods (such as backup and/or backstep) are initiated to undo the execution thereby preventing CSN from advancing past the mispredicted branch in spite of the cleared A-bit, which would otherwise preclude recovery. Special attention must be taken to initiate machine recovery fast enough to prevent instruction commitment of the incorrectly issued instruction sequence. Prior to evaluation, the pending instruction itself prevents commitment of the mispredicted instruction sequence. Watchpoints and CPU 51 recovery are described in greater detail elsewhere in this specification.

Figure 13:
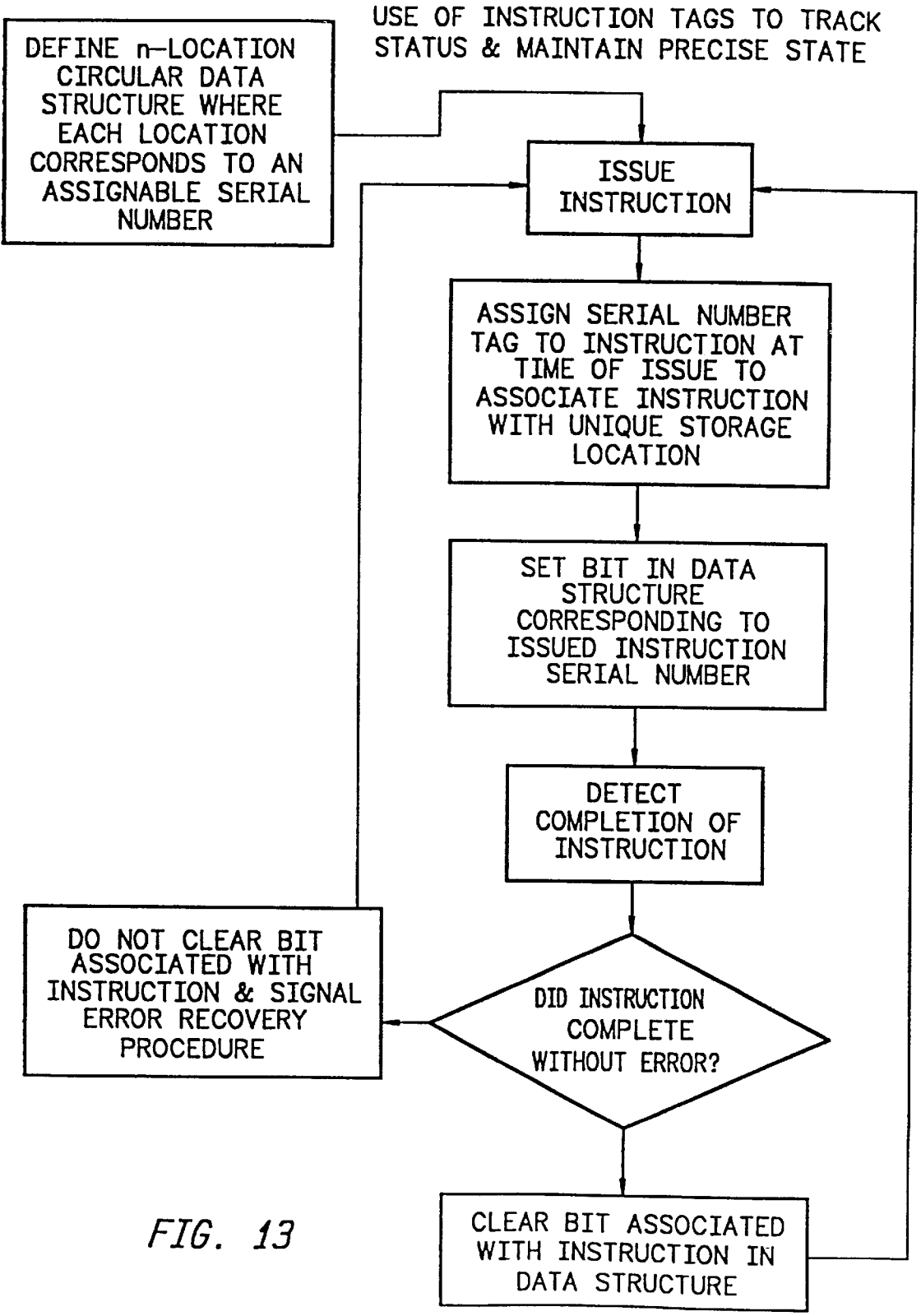
FIG. 13 is a flow-chart of an embodiment of the inventive method of using instruction tags to track status and maintain precise state.
Figure 14:
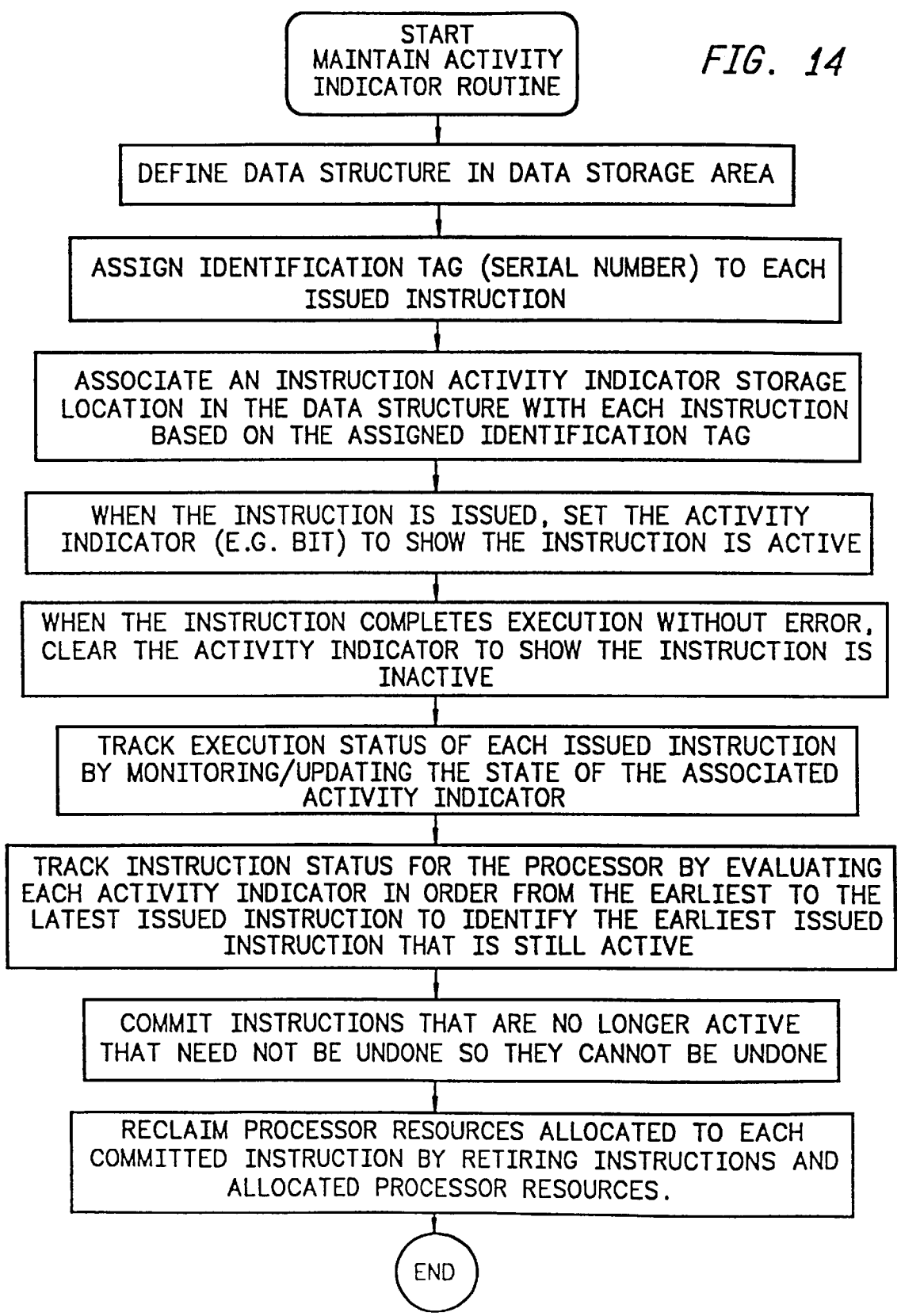
FIG. 14 is a diagrammatic flow-chart of an embodiment of the inventive method for tracking instruction status to maintain precise state.
Figure 15A:
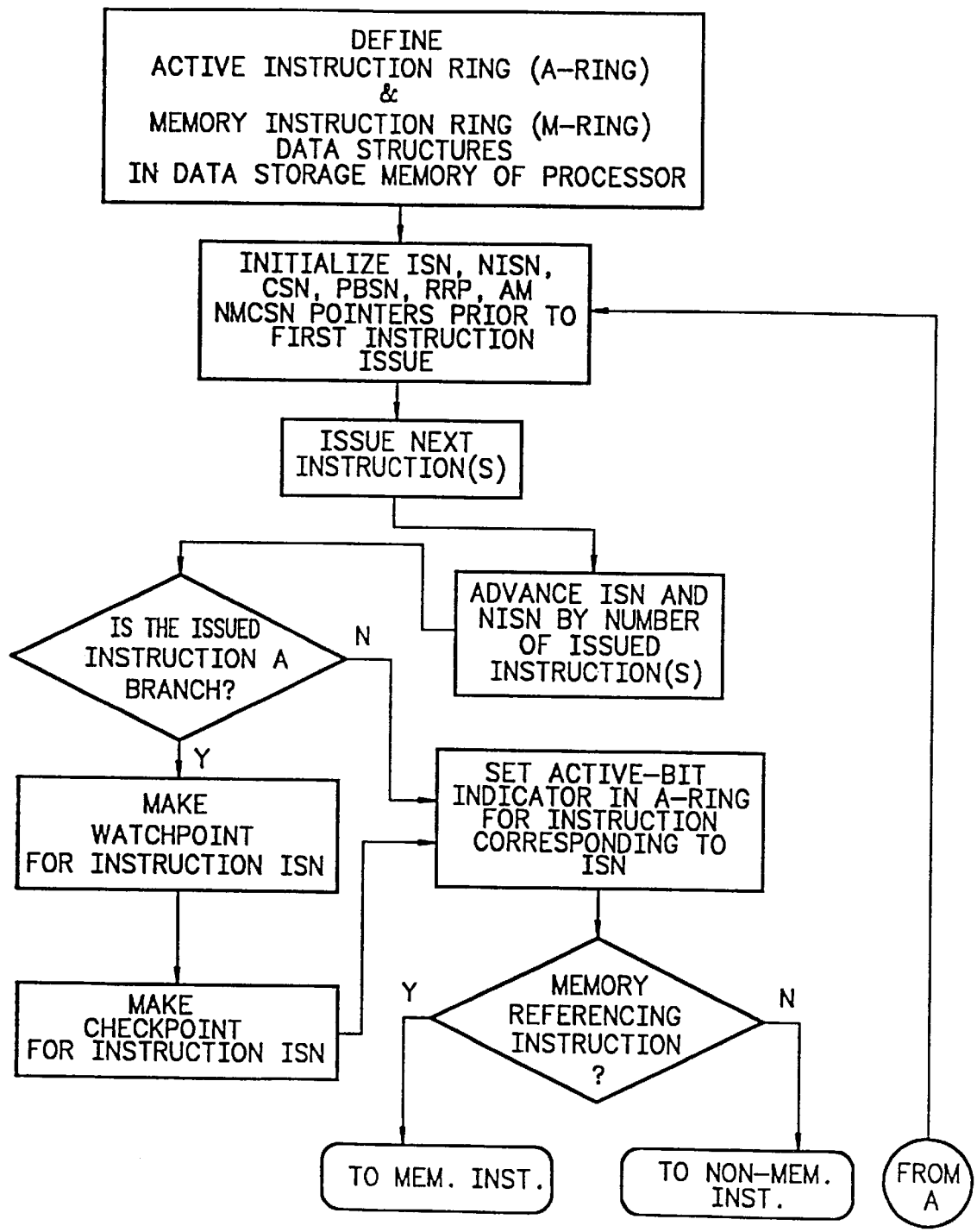
FIGS. 15A and 15B is a flow-chart diagram of the method for writing status information in the Active Instruction Ring and Memory Instruction Ring according to an embodiment of the inventive method for tracking instruction status to maintain precise state.
Figure 15B:
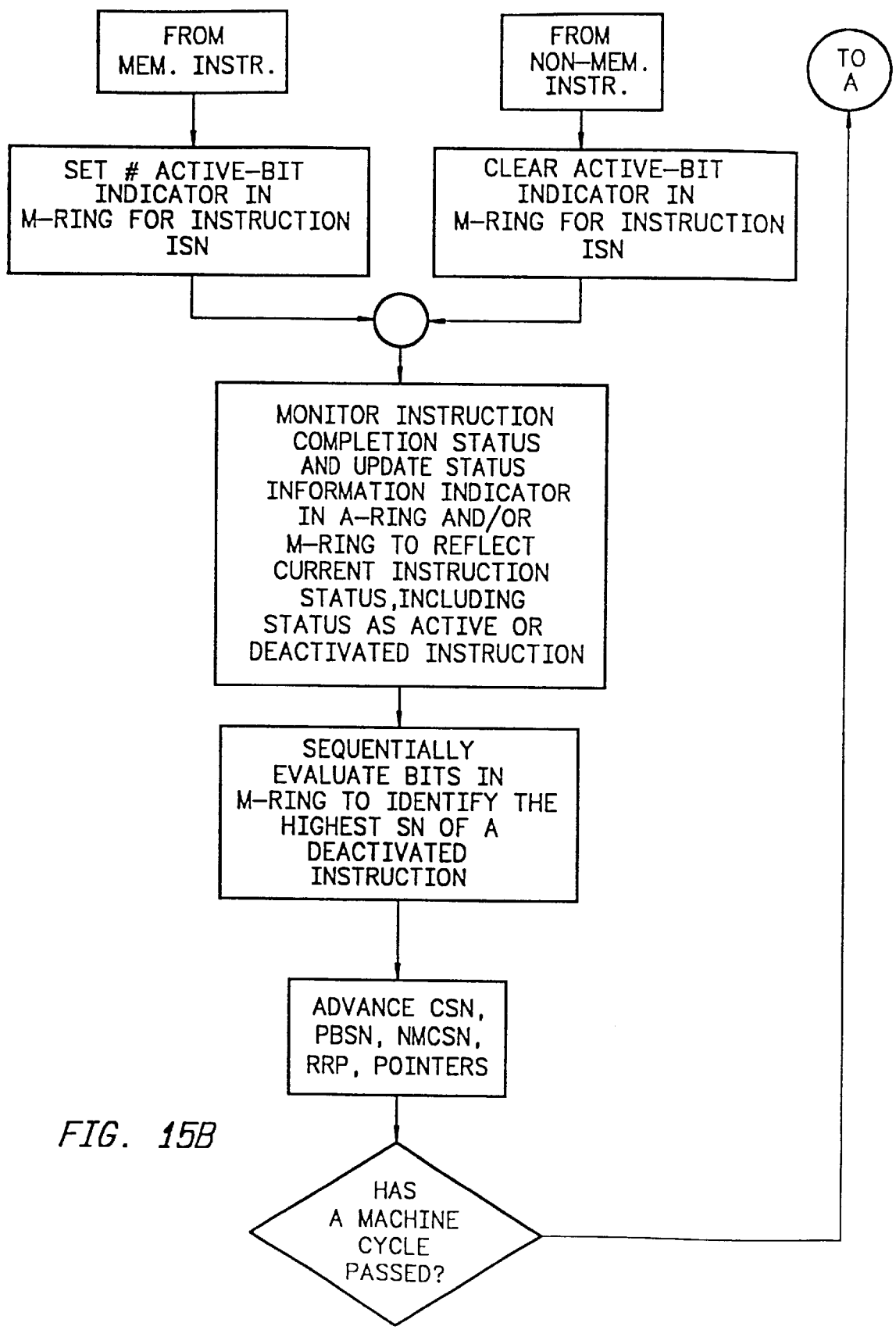

Aspects of an embodiment of the inventive method, including the use of instruction tags to track instruction status and maintain precise state are illustrated in the flowcharts of FIGS. 13–15. FIG. 13 is a diagrammatic flow-chart of an embodiment of the method of using instruction tags to track status and maintain precise state. FIG. 14 is a diagrammatic flow-chart of an embodiment of the inventive method for tracking instruction status to maintain precise state. FIG. 15 is a flow-chart diagram of the method for writing and maintaining status information in the Active Instruction Ring and Memory Instruction Ring according to an embodiment of the present invention.

3. Register Renaming

To remove some register dependencies so that more instructions can be issued per machine cycle by the ISU 200, the CPU 51 performs register renaming during the issue stage. This may be done in a similar manner to that described in U.S. Pat. No. 5,355,457 issued on Oct. 11, 1994 to Shebanow et al. and/or that described in the copending U.S. patent application Ser. No. 08/388,364 entitled "METHOD AND APPARATUS FOR COORDINATING THE USE OF PHYSICAL REGISTERS IN A MICROPROCESSOR" referenced earlier and/or that described in M. Johnson's text *Superscalar Microprocessor Design* at pages 48–55.

Referring to FIG. 8, to implement register renaming, the DFB 62 includes the FXRFRN 604, FPRFRN 605, and CCRFRN 610 of the FSR/CCRFRN 606. As mentioned briefly earlier, the FXRFRN 604 contains physical fixed point registers for storing fixed point data, the FPRFRN 605 contains physical floating point registers for storing floating point data, the CCRFRN 610 contains physical integer (fixed point) and floating point condition code registers (XICC and FCCs) for storing integer and floating point condition code data. The FXRFRN 604, FPRFRN 605, and CCRFRN 610 may each be configured as shown in FIG. 16.

Figure 16:
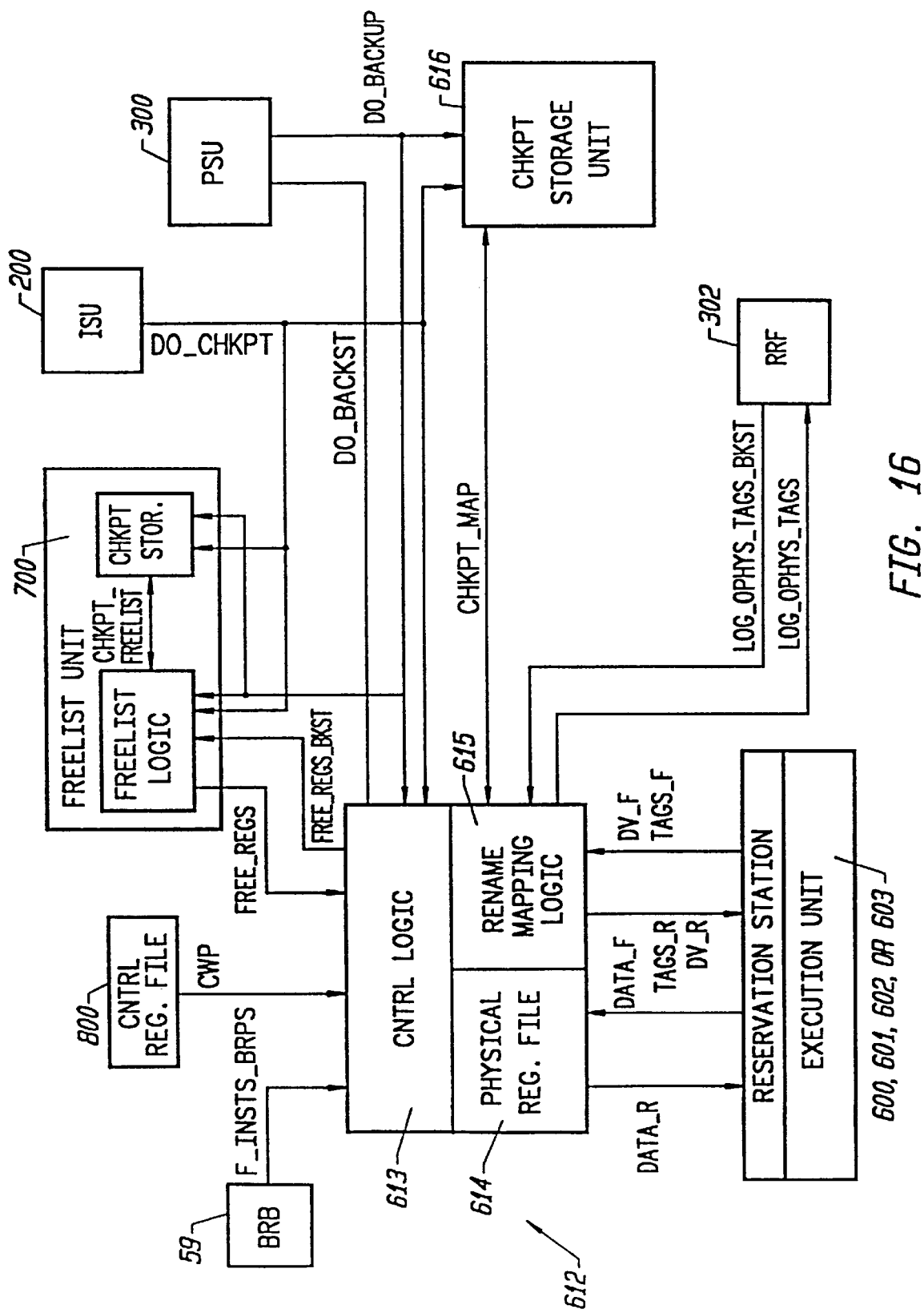
FIG. 16 shows an embodiment of the Register File and Rename Unit (RFRN) including a physical register file that includes physical registers.

As shown in FIG. 16, the register file and rename unit (RFRN) 612 includes a physical register file 614 that includes physical registers. The RFRN also includes rename mapping logic 613 that maps logical and/or architected registers specified by an instruction to physical registers in the physical register file 614. For example, with SPARC-V9 instructions, the rename mapping logic of the FXRFRN 604 could perform a mapping of 32 architected to 80 logical to 128 physical fixed point registers, the 32 architectural or logical single and double precision floating point registers are mapped into 2 sets of 64 single precision (32-bit) renamed floating point registers (odd and even), the five architected or logical Condition Code Registers (xicc, fcc0, fcc1, fcc2, and fcc3) map to 32 renamed Condition Code Registers. The architectural to logical mapping is due to the fact that SPARC-V9 fixed point instructions specify architected registers that map to logical registers in accordance with the current window pointer (CWP) stored in the CWP register of the control register file 800 shown in FIG. 17.

The control logic 613 of the RFRN receives instructions (F_INSTs_BRPs) from the fetch register of the BRB 59 during each issue stage. In response, the control logic 613 decodes the instructions and determines which of the instructions requires physical registers as sources and/or destinations from the register file 614 of this particular RFRN.

The rename mapping logic 615 first maps each logical or architected source register specified by the instructions to the currently mapped physical register in the register file and provides the corresponding physical register tags to the reservation stations of the appropriate execution units (FPU 600, FXU 601, FXAGU 602, or LSU 603) in the TAGS_R signals. For each physical register tag, the rename mapping logic has a data-valid (DV) bit that identifies whether the data in the mapped physical source register is available yet as a source. The DV bits are provided by the rename mapping logic 615 to the reservation stations of the appropriate execution units in the DV_R signal. Moreover, if the data is available as indicated by the DV bits, then it is provided by the mapped physical source registers in the DATA_R signals.

For each RFRN (i.e., FXRFRN 604, FPRFRN 605, and CCRFRN 610), the FREELIST unit 700 contains a list of all of the free physical registers of the register file 614 of the RFRN. Free or available registers are those that are not being currently used by instructions that have not been retired. These available physical registers are identified by the FREE_REGS signals from the FREELIST unit 700 each cycle.

Thus, after the logical or architected source registers have been mapped, the rename mapping logic 615 then maps each logical or architected destination register specified by the instructions to an available or free physical register identified by the FREE_REGS signals and sets the corresponding DV bit to indicate that the data in that register is not yet available. The rename mapping logic 615 then provides the physical register tags for the newly mapped physical destination registers and the corresponding DV bits to the reservation stations of the appropriate execution units in the TAGS_R and DV_R signals.

Moreover, the rename logic 615 provides the old logical or architected to physical register mapping to the Reclaim Format Unit (RRF) 302 of the PSU 300. It does so by sending the logical or architected register tags and the physical register tags for the previously mapped physical destination registers to the RRF 302 in the LOG_OPHYS_TAGS signals. The LOG_OPHYS_TAGS signals from each RFRN 612 include a field to indicate that these signals come from that particular RFRN.

Figure 18:
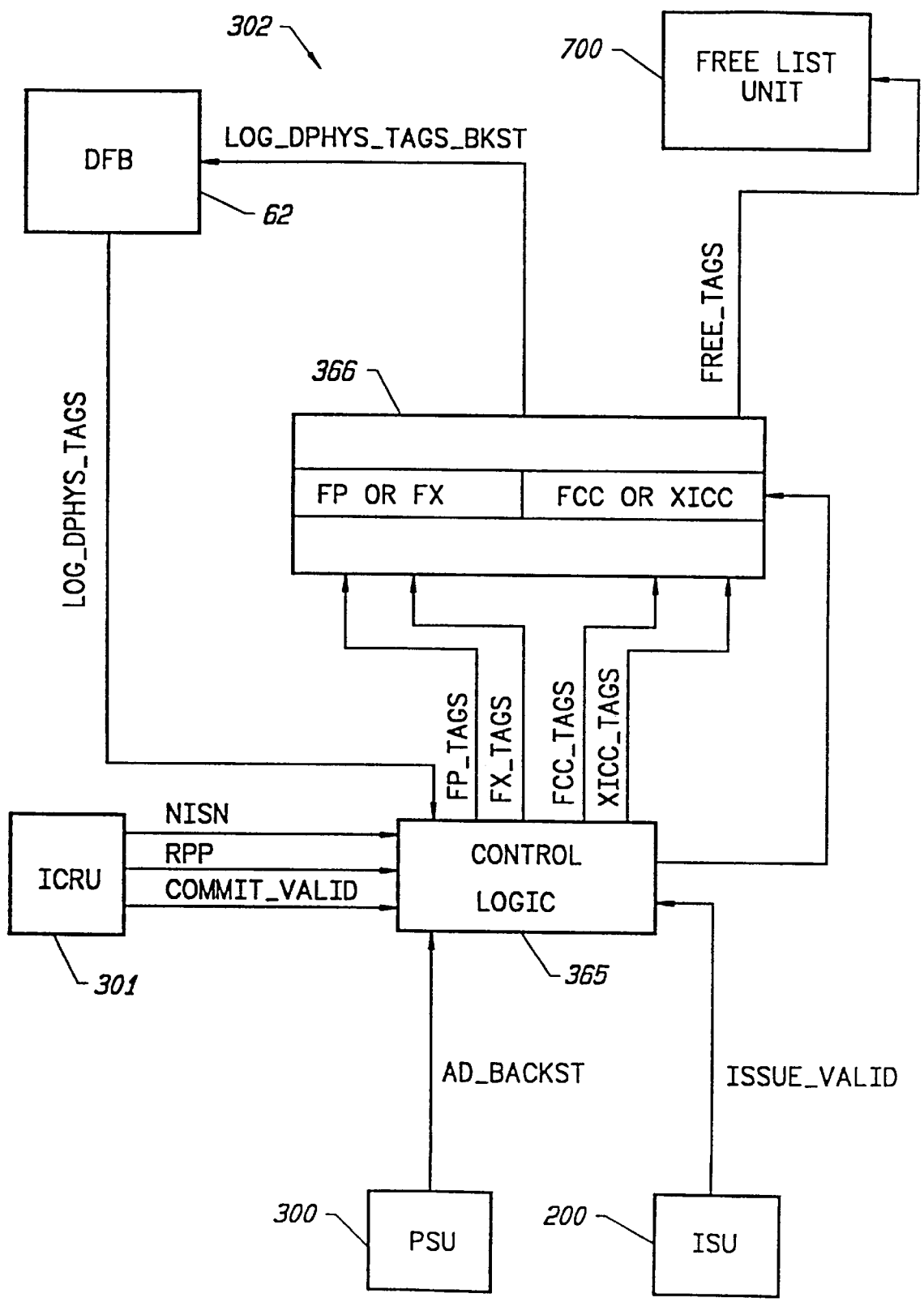
FIG. 18 shows an embodiment of the Resource Reclaim File (RRF).

The RRF 302 is shown in greater detail in FIG. 18. The RRF includes a data storage structure 366. In the exemplary CPU 51, in which up to 64 issued but not yet retired instructions may be assigned serial numbers, the data storage structure 366 includes 64 addressable storage elements or entries. Each storage element corresponds to one of the instruction serial numbers. Moreover, each storage element of the data storage structure 366 includes an FP or FX logical to old physical map field and an FCC or XICC logical to old physical map field. Various structures may be used for implementing RRF 302. One exemplary RRF is implemented as a sixty-four register×29-bit four-bank interleaved RAM, wherein the fields are packed or bundled during the write to RRF cycle and unpacked or unbundled upon readout during backstepping.

The control logic 365 of the RRF receives the LOG_OPHYS_TAGS signals from the DFB 62 and determines which contain floating point register tags from the FXRFRN 604, fixed point register tags from the FPRFRN 605, and XICC and FCC tags from the CCRFRN 610. The control logic 365 also receives the NISN pointer from the ICRU 301 of the PSU 300 and the ISSUE_VALID signal from the ISU 200. In response to the NISN pointer and the ISSUED_VALID signal, the control logic 365 determines the serial numbers of the issued instructions for which the LOG_OPHYS_TAGS signals are being received.

In the exemplary CPU 51, instructions can only modify floating point and FCC registers simultaneously or fixed point and XICC registers simultaneously, but not fixed point, floating point, XICC, and FCC registers simultaneously. Thus for each instruction for which fixed point or floating point logical and old physical register tags have been received in the LOG_OPHYS_TAGS signals, the control logic 365 writes these tags (FP_TAGS or FX_TAGS) into the FP or FX logical to physical map field of the storage element which corresponds to the serial number of the issued instruction. Similarly, for each instruction for which FCC or XICC logical and old physical register tags have been received, the control logic 365 writes the FCC or XICC logical to old physical tags into the FCC logical to physical map field of the storage element corresponding to the serial number of the issued instruction. Thus, in the case where an instruction requires both floating point and FCC registers or both fixed point and XICC registers as destinations, the logical and old physical register tags contained by the LOG_OPHYS_TAGS signals for this instruction are written to the same storage element. However, those skilled in the art will appreciate that the RRF 302 could be constructed to store the logical to old physical mappings for an instruction that modifies fixed point, floating point, XICC, and FCC registers simultaneously.

Thus, the RRF 302 serves as a sequential historical ledger from which earlier logical to physical mappings or relationships can be reconstructed if necessary. For example, if it becomes necessary to undo an instruction corresponding to SN="X", the logical and old physical register tags are identified in RRF using SN="X" as an index. Then, these tags are provided to the appropriate RFRN to restore the logical to physical register mapping that existed just prior to execution of instruction SN="X" and the newly mapped physical register is returned to the Freelist. This effectively reverses the register renaming and restores register state to the state that existed just prior to execution of the instruction. When it is necessary to undo several instructions, the same procedure is applied on a reversed step by step basis beginning with ISN and decrementing back to SN="X." This process is described in greater detail later.

FIG. 19 provides an example of register renaming for an add instruction with logical source registers L41 and L42 and destination register L47. In accordance with the foregoing, the logical source registers L41 and L42 are mapped by the rename mapping logic 615 to the physical registers P50 and P52. Then, the logical destination register L47 is re-mapped to the free physical register P99 provided by the FREELIST unit 700 and the logical register tag for the logical register L47 and the physical register tag for the previously mapped (old) physical register P78 is provided to the RRF for mapping with the serial number (SN=13) assigned to the add instruction. As is evident from this example, each "physical" register tag appears in one and only one of: (1) Freelist 700; (2) rename mapping logic of FXRFRN 604, FPRFRN 605, or CCRFRN 610; and (3) RRF 302.

4. Dispatch to Reservation Stations

Furthermore, referring to FIG. 8, during the issue stage, the reservation stations of the FPU 600, FXU 601, FXAGU 602, and LSU 603 receive the F_INSTs_BRPs instructions from the BRB 59. In response, each of the reservation stations extracts the opcodes and immediate data from these instructions.

The reservation stations of each of the FPU 600, FXU 601, FXAGU 602, and LSU 603 also receives during the issue stage the serial numbers and the checkpoint numbers that were assigned to the instructions that were issued. These are provided by the SNs and CHKPT_Ns signals received from the ISB 62

In order to execute mathematical and read/write instructions that involve floating point data, the reservation station of the FPU 600 may receive during the issue stage available data, data valid bits, and FP and CC physical register tags (FP_DATA_R, FP_DV_R, FP_TAGS_R, CC_DATA_R, CC_DV_R, CC_TAGS_R) from the FPRFRN 605 and the CCRFRN 610 in the FSR 607. Similarly, the FXU 601 may receive during the issue stage data from the control register file 800 over the ISB2DFB bus and available data, data valid bits, and FX and CC physical register tags (FX_DATA_R, FX-DV_R, FX_TAGS_R, CC_DATA_R, CC_DV_R, CC_TAGS_R) from the FXRFRN 604 and CCRFRN 610 to execute mathematical, program control, and read/write instructions that involve fixed point data. To execute address generation operations for load/store instructions and fixed point non-multiply/divide mathematical instructions, the FXAGU 602 may receive data and FX and CC physical register tags (FX_DATA_R, FX_DV_R, FX_TAGS_R, CC_DATA_R, CC_DV_R, CC_TAGS_R) from the FXRFRN 604 and/or CCRFRN 610. However, as was indicated earlier, the FXAGU 602 could be configured similar to the FXU 601 to execute program control, multiply/divide, and control register read/write instructions in which case it would receive the appropriate available data and physical register tags from the FXRFRN 604 and CCRFRN 610. Moreover, the LSU 603 may receive during the issue stage available data and FP and FX physical register tags (FX_DATA_R, FX_DV_R, FX_TAGS_R, FP_DATA_R, FP-DV_R, and FP_TAGS_R) from the FPRFRN 605 and/or FXRFRN 604 and the contents of the FSR register of the FSR/CCRFRN 606 to execute load/store instructions.

Then, for each issued instruction for which an entry in a reservation station is available as identified by the ENTRIES_AVAIL signal, that reservation station places in the identified entry the extracted opcode, serial number, checkpoint number, physical destination and/or source register tags, and available data for that instruction. Furthermore, for each physical source register tag for which data is already available as identified by the received data valid bits, the reservation station sets another data valid bit in the reservation station to indicate that the data associated with the register tag is available. Also, if the instruction involves immediate data, then the data valid bit is also set since the data is immediately available and stored in the reservation station entry.

C. Instruction Execution and Completion

Referring again to FIG. 6, during the issue stage, the PC logic 106 receives fetched instructions (F_INSTs_BRPs) from the fetch register 110 and decodes them. It also receives the ISSUE_VALID signal from the ISU 200 to determine which of the instructions it is decoding where actually issued. For certain program control instructions which can be issued, predictively executed and completed in one machine cycle, the PC logic predicts the program flow and computes the FPC, APC, and NAPC values based on the prediction. For all other instructions, the PC logic computes the FPC value for the next machine cycle based on the FPC value for the current machine cycle and on how many instructions were issued during the current machine cycle as indicated by the ISSUE_VALID signal. For these instructions as well, it computes the APC and NAPC values based on the APC for the previous machine cycle and on how many instructions the ISSUED_VALID signal indicates were issued during the current machine cycle.

For example, if any of the instructions that are issued are conditional branch instructions, such as the SPARC-V9 BPcc, Bicc, BPr, FBfcc, and FBPfcc instructions, then the PC logic 106 decodes the corresponding BRP fields for these instructions in order to determine whether to predict to take or not take the branch. If the branch is predicted taken, then the PC logic 106 extracts the displacement value from the instruction and uses it to compute the new FPC, APC, and NAPC values for the next machine cycle. If the branch is not taken, then the FPC, APC, and NAPC values are computed normally for no change in program flow.

But, if any of the instructions that are issued are return type jump and link instructions, such as the SPARC-V9 JMPL[rd=0] instructions, then the PC logic 106 outputs a POP signal to pop off the return prediction stack 105 a predicted JMPL target PC (P_JMPL_PC) value which is used by the PC logic 106 to form the new FPC, APC, and NAPC values. Since JMPL[rd=0] instructions are used to return from subroutines, PC logic 106 outputs a PUSH signal to push onto the return prediction stack 105 a P_JMPL_PC anytime it determines that a CALL or call type jump and link, such as the SPARC-V9 JMPL[rd=15] instruction was issued. The P_JMPL_PC pushed onto the return prediction stack 105 is the APC value for the instruction incremented by 8. Furthermore, since a P_JMPL_PC is pushed onto the return prediction stack 105 anytime that a CALL or JMPL[rd=15] instruction is issued, the PC logic 106 must also make sure that a P_JMPL_PC is popped off the return prediction stack 105 anytime a RETURN instruction is issued.

Additionally, the issued instructions may include unconditional branch always instructions, such as the SPARC-V9 BPA, BA, FBA, and FBPA instructions. In this case, the PC logic 106 extracts the displacement values from these instructions and uses them to compute the new FPC, APC and NAPC values.

Since the PC logic 106 does not need to wait for additional data from the DFB 62 for conditional branch, branch always, and JMPL[rd=0] instructions, these types of instructions can be issued, executed, and completed in the same stage. Furthermore, since issued conditional branches will be predicted taken or not taken and because predicted target FPC values will be computed for JMPL[rd=0] instructions, subsequently fetched instructions will be speculatively fetched and therefore speculatively executed.

Furthermore, the issued instructions may include other kinds of program control instructions such CALL and RETURN instructions and JMPL instructions other than JMPL[rd=0] instructions, such as the call type JMPL[rd=15] instruction. In this case, the PC logic 106 waits for the DFB 62 to compute an FPC value and provide it on the DFB2BRB bus during the execute stage. Referring to FIG. 8, since the FPC value is fixed point data, the FXU 601 computes the FPC value. Then during the complete stage, the PC logic 106 takes this value and forms the new FPC, APC, and NAPC values.

Figure 17:
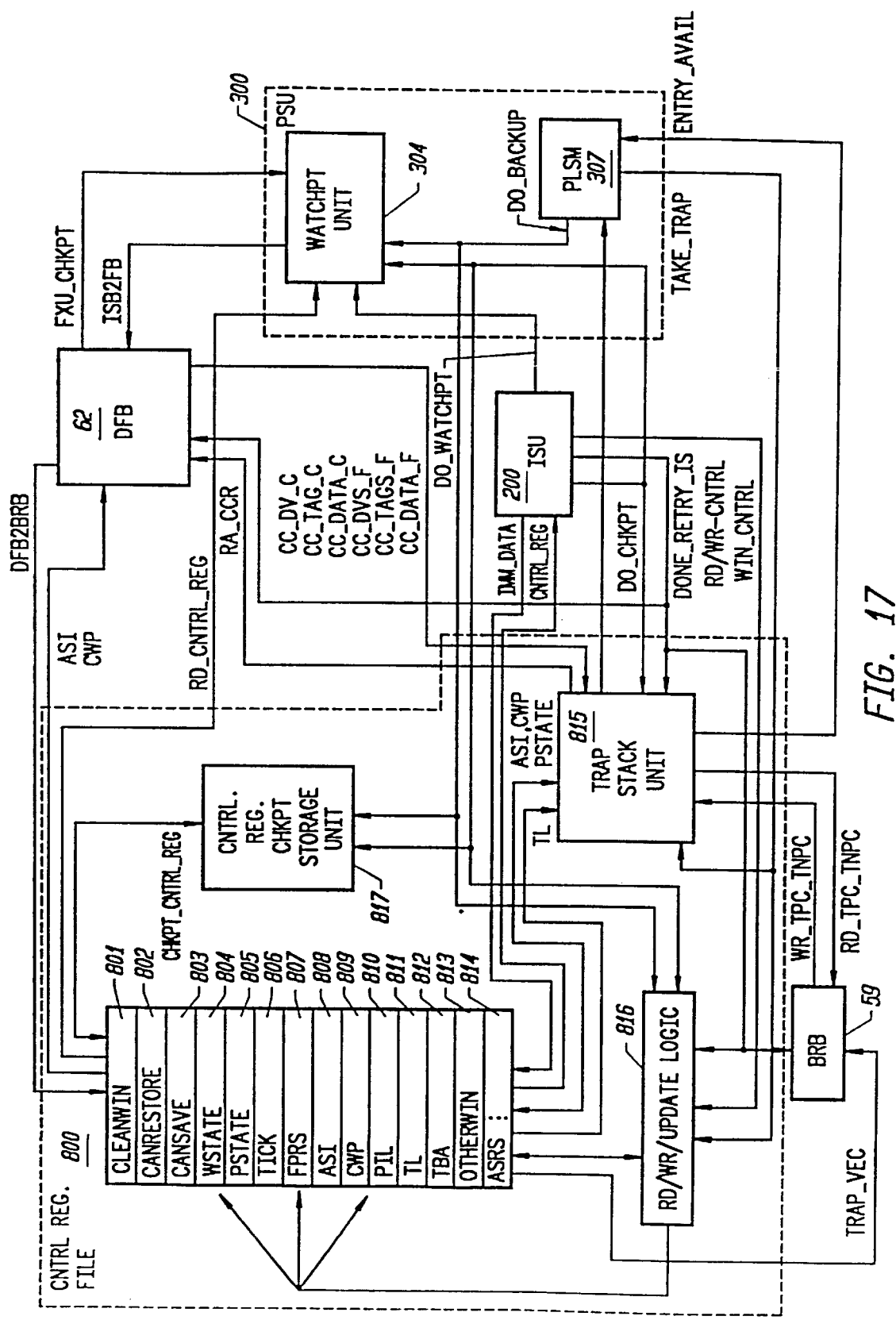
FIG. 17 shows an embodiment of the Control Register file associated with register renaming.

As will be discussed later in greater detail, when any of the issued instructions are return from trap handling routine instructions, such as the SPARC-V9 DONE or RETRY instructions, then the PC logic 106 receives the trap PC (TPC) value or trap NPC (TNPC) value from the RD_TPC_TNPC signals provided by the control register file 800 shown in FIG. 7. Referring to FIG. 17, the trap stack 815 of the control register file 800 provides these signals when the ISU 200 outputs RETRY_DONE_IS signal indicating that a RETRY or DONE instruction was issued. The PC logic 106 then uses the TPC or TNPC value received from the trap stack 814 to form the new FPC, APC, and NAPC values.

For other issued instructions, the PC logic 106 increments the preceding PC and NPC values during the issue stage to generate the new PC and NPC values for the next fetch stage.

Referring to FIG. 8, an instruction issued during the issue stage can be executed by the FPU 600, FXU 601, FXAGU 602, and LSU 603, only when all of the data it requires is placed in the corresponding reservation station entry. Since the data for instructions issued later than others becomes available sooner, these instructions may be executed and completed ahead of the earlier issued instructions.

As indicated earlier, the reservation station knows that the source data of a physical source register is not available when the data valid bit for the physical register indicates so. Thus, the reservation stations receive and monitor the appropriate available data, data valid bits, and physical register tags (FX_DATA_F, FX_DV_F, FX_TAGS_F, FP_DATA_F, FP_DV_F, FP_TAGS_F, CC_DATA_F, CC_DV_F, CC_TAGS_F) forwarded from the FXRFRN 604, FPRFRN 605, and CCRFRN 610 to determine when the data is available. The reservation station grabs the forwarded data intended for a particular register when the corresponding forwarded physical register tag matches the physical register tag stored in the entry of the reservation station.

When all data dependencies have been met for an instruction (i.e., when all the needed data has become available), the execution unit then executes the instruction using the instruction data stored in the entry of the reservation station for that particular instruction. The types of instructions executed by the execution units 600–603 have been described earlier in regard to storing entries in the reservation stations.

The executed instructions are then completed when the data they generate is stored in the physical register identified by the physical destination register tag stored in the reservation station in the entry for the instruction. During completion, the execution units 600–603 also send error and completion status information to the PSU 300 with the ERR_STAT signals.

Moreover, referring to FIG. 7, the ISU 200 decodes the instructions it receives from the fetch register 100 to determine if any of the issued instructions are read/write instructions of the control registers 801–814 shown in FIG. 17. The control registers 801–814 are used in the overall control of the CPU 51 and may include privileged, non-privileged, and ancillary state registers of the type described in the SPARC-V9 Architecture Manual.

For issued read instructions of the control registers, such as the SPARC-V9 RDPR and RDASR instructions, the ISU 200 outputs RD/WR_CNTRL signals that identify one of the registers 801–814 and indicate that it is to be read. In response, the control logic 816 of the control register file 800 outputs to the Watchpoint unit 304 the contents (RD_CNTRL_REG) of the control register identified by the RD/WR_CNTRL signals.

Since as will be discussed later, the CPU 51 makes checkpoints and corresponding watchpoints for read instructions of the control registers 801–814, the ISU 200 generates a DO_WATCHPT signal and DO_CHKPT signals. The DO_CHKPT signals indicate that a checkpoint should be made and contain the checkpoint number for this checkpoint. The DO_WATCHPT signal indicates that a watchpoint should be formed by the watchpoint unit 304 at the checkpoint number provided by the DO_CHKPT signals. The watchpoint unit 304 has 16 addressable storage elements with each corresponding to one of the 16 checkpoint numbers. Thus, in response to DO_WATCHPT and DO_CHKPT signals, it stores the contents of the control register that was read in the storage element corresponding to the checkpoint number provided in the DO_CHKPT signals.

The read control register instruction is also provided to the reservation station of the FXU 600 for further execution. Thus, the checkpoint number of the instruction is stored in the reservation station entry for the instruction. Then, when the FXU 601 executes the read control register instruction, it outputs the checkpoint number of the instruction to the watchpoint unit 304. In response, the watchpoint unit outputs the control register data that was read in earlier to the FXU 600 which then provides it and a corresponding physical destination register tag to the FXRFRN 604 for storage in a fixed point register. Thus, the CPU 51 does not have to be synced to perform a control register read.

To perform writes to the control registers (such as the SPARC-V9 WRPR and WRASR), the FXU 601 executes the instruction data stored for the instruction in the reservation station and outputs the data on the DFB2BRB bus. As shown in FIG. 17, the data is then provided to the control register file 800. Since the ISU 200 has generated a RD/WR CNTRL signal that indicates that a control register write has been issued and to what register the write is to occur, the RD/WR/UPDATE logic 816 then writes the data into the appropriate control register.

As indicated previously, the exemplary CPU 51 employs register windows for the fixed point registers. Register window operation is described in detail in the SPARC-V9 Architecture Manual. Thus, the ISU 200 also determines when a register window control instruction has been issued. In doing so, it generates WIN_CNTRL signals that indicate that a window control instruction has been issued and identify the specific kind of register window operation to be performed. These signals are provided to the control register file 800, as shown in FIG. 17. In response, the RD/WR/UPDATE logic 816 then performs the updating register window operations indicated by the WIN_CNTRL signals.

D. PSU Participation in the Instruction Execution Stage

Once instructions have been dispatched to the appropriate execution unit within DFB 62, ICRU 301 waits for instruction completion and monitors error and status information for each instruction serial number to arrive over the Execution Data Forward Busses between DFB 62 and PSU 300. PSU participation in the Execution Stage is limited to receiving execution status information. When instructions complete execution without error and have not mispredicted, the instruction is deactivated; however, if an execution exception occurred or the speculative execution was mispredicted then the instruction is not deactivated or CPU 51 initiates recovery procedures. A-Ring status information is updated to reflect correct or incorrect speculative execution and exception or exception-free execution. When an instruction was correctly predicted and executions without exception, ICRU 301 clears the A-ring bit associated with the serial number to deactivate the instruction.

In the exemplary CPU 51, DFB 62 includes Floating-Point Functional Unit (FPU) 600, Fixed-Point Functional Unit (FXU) 601, Fixed-Point/Address Generation Functional Unit (FXAGU) 602, and Load/Store Functional Unit (LSU) 603, as well as FPRFRN 605, FXRFRN 604, CCR-FRN 606, and FSR 607. In the exemplary CPU, each DFB functional unit can process as many as two instructions per machine cycle so that instruction execution completion is limited (by hardware constraints) to a maximum of eight instructions per machine cycle. In one embodiment of the CPU, FPU 600 can process two instructions at a time but can only output one instruction result, therefore in that embodiment, instruction completion is limited to seven instructions; however, there is no reason why two outputs cannot be implemented. FIG. 8 shows a functional block diagram of the major functional units within DFB 62 and major signals passed between DFB 62 and ISB 61.

When a dispatched instruction has completed execution in DFB 62, and instruction identification error and other status information (ERR_STAT) are broadcast back to PSU 300 including to ICRU 301 (and other units) on the execution data forward busses. Data and status are received for each instruction issued, but may be received out of order. Execution status information signals for each instruction may include for example whether an error occurred during execution, error type, condition codes for evaluating if speculative execution was correctly predicted, serial number, instruction checkpoint (the checkpoint that the machine will backup to if it faults and requires a backup), and whether the instruction involved a read or write to a control register.

The broadcast instruction serial number is used to index into A-ring 312 by Address Decode Logic 334 in FIG. 12. The number of A-Ring write ports 341, 342 (and read ports 343 for CSN/RRP Advance Logic 323) on the A-ring are preferably selected to correspond with the peak execution bandwidth of the processor. If a particular instruction causes an error, A-Ring Clear Logic 333 writes a "0" to the A-bit corresponding to the particular instruction serial number and the instruction is thereafter considered deactivated. However, if an instruction completes with error, the corresponding active-bit in the A-Ring is not cleared, the instruction is still considered active, and other processor recovery steps are taken to recover from the exception or error condition. The CSN eventually will catch up with ISN which points to the location one slot ahead of the erroring instruction. CSN cannot pass he SN of the erroring instruction because its A-bit is still set. Then when the execution trap is taken, the A-bit of the erroring instruction will be overwritten with a "1" to permit CSN and RRP to advance.

The Taken Trap (TT) field which identifies the trap type is popped off the TrapStack and decoded to determine whether the trap is an execution trap (etrap). The etrap is then handled by issuing a "DONE" or "RETRY". If the etrap can be successfully handled, a ETRAP_CLEAR signal is asserted by the trap-handler to clear the A-bit. Similar logic is provided to Clear M-bits in M-RING 324.

The data and status signals provide the serial number of the instruction in each execution issue slot and are also used by PSU 300 to determine exception handling priority in instances where multiple instructions fault to determine which exception is temporarily earlier. (Prioritization of exceptions is discussed further relative to Priority Logic and State Machine PLSM 307.) In the exemplary processor, the serial number arrives one cycle earlier than error and status information, thereby permitting serial number decode by Address Decode Logic Unit 334 in advance of arrival of any error information so that the bit can be cleared (when no error is present) or nor cleared (when an error is present) without incurring further delay in the address decode logic. When an error or other exception is detected, appropriate steps are taken to handle the error or exception as described hereinafter in this patent.

E. Instruction Commitment

The structure and method described heretofore provide structure and method for tracking the issue and execution status of as many instructions as addressable locations in A-ring 312, sixty-four instructions in the exemplary embodiment. However absent structure and method to recover the CPU resources, resources allocated by the CPU 51 to the instructions, including the serial numbers and associated A-bits for example, would remain allocated to the instructions even though the instructions had been completed and deactivated. By adding additional pointers associated with the A-ring data structure and moving the pointers in response to changes in status of relevant instructions within the CPU 51, particularly deactivation, instructions may be committed and resources may be retired and reclaimed for subsequent use by other instructions. In this way resources are continuously available for newly issued instructions.

Committed Serial Number pointer (CSN) 316 points to the last committed instruction. A "committed instruction" is defined to be an instruction that has completed execution without error so that it has progressed from issue through execution and is older than any speculatively issued predicted central transfer (branch) instruction that may need to be undone and may not be undone. A committed instruction need never be undone. By definition, all instructions prior to the Committed Instruction Serial Number (CSN) pointer 316 have completed execution without error and never need to be undone. The amount that CSN advances every machine cycle sets the maximum instruction commitment rate of the machine. Instructions that have completed and have been deactivated are not deemed to be committed until CSN has advanced to or beyond serial numbers for those instructions in A-ring 312.

As described previously for ISN 314, the maximum number of positions that CSN 316 can advance every machine cycle may be limited to a smaller maximum number of instructions per cycle by software, hardware or other controls. For example, in one the embodiment of the inventions that limits advancement of ISN to four instructions per machine cycle, CSN is limited to eight per cycle by hardware imposed limitations. CSN in addition can be equal to ISN but can never advance beyond ISN around the A-Ring. (Because of the A-Ring structure, CSN may be strictly numerically less than, equal to, or greater than ISN.) When the CPU is initialized, CSN is initialized to 0 (zero), and then advanced according to changes in instruction status and predetermined CSN advancement rules described hereinafter.

As active-bits are cleared in the Active Instruction Ring, CSN is advanced according to predetermined rules to "commit" instructions which have completed execution. In general, the CSN pointer may lag behind instructions that have already completed execution (i.e. are deactivated). CSN/RRP Advance Logic Unit 323 is responsible for advancing the position of the CSN and RRP pointers. Each machine cycle, CSN/RRP Logic unit 323 attempts to advance CSN past completed de-activated instructions (activity bit="0" in the A-ring) without passing ISN. Except when deferred trap occurs, CSN advances only based on the set or cleared condition of A-bits in A-ring 312 and predetermined rules implemented (e.g. software, firmware, and/or hardware) within logic unit 323, CSN/RRP only needs to query the status of the A-ring itself and remain mindful of ISN to determine the proper serial number address for CSN. When a deferred trap is taken and successfully handled, PLSM 307 sends a DEFERRED_TRAP signal to CSN/RRP advance logic control unit 323 which causes CSN to be advanced by one SN location, allowing CSN and later RRP to advance past the instruction that caused the exception. In one embodiment of the invention, the advancement of CSN is limited by a predetermined maximum instruction commitment rate (eight instructions per machine cycle) that is selected based on the desire to limit the hardware required to implement movement of the CSN pointer.

In principle, the CSN can advance up to and be equal with ISN. When ISN=CSN, the CPU is empty, that is, all issued instructions are committed. In practice, it may be advantageous to restrict the maximum advancement of the CSN [to eight instructions per machine cycle (for the four instruction issue machine) because] so that the logic can be simplified and the hardware required reduced. For example, four-issue per cycle CPU, the CSN advancement is limited to eight SNs per cycle. The rules governing the advancement of CSN may be summarized as follows: (1) Advance CSN up to, inclusive, ISN; (2) Advance CSN no more than eight instruction serial numbers in one cycle; (3) Advance up to, exclusive, the first "1" in the A-ring which corresponds to an active instruction that cannot be committed yet. More rigorously, CSN is generally advanced (see modification for certain exceptions below) according to the following relationship: CSN=min(CSN+4, ISN, slot_A), where A(CSN+1), . . . , A(slot_A) are all "0" and A(slot_A+1)=1. In this expression "min" is the minimum function, "slot_A" refers to an A-bit location in A-Ring 312, and A(slot_A) is the bit-state of that A-bit location (e.g. "1" or "0"). The rules for advancing CSN are modified when a deferred trap is deleted and taken such as an unfinished floating point operation exception or a data breakpoint exception are detected. Unfinished floating point exceptions and data breakpoint exceptions are identified by the execution status signals (ERR_STAT from DFB 62. When these exceptions occur and the trap is handled CSN is advanced by 1 (one), that is CSN←CSN+1, so that it advances past the instruction that caused the exception. PSU 300 is particularly concerned about unfinished floating-point operations and data breakpoints, both of which may require special handling of the pointers, since if A-bits are not cleared for handled traps the CPU would fill up and stall.

By limiting CSN advancement to the "maximum(8, ISN, the next A-bit=1)" simple hardware circuitry may be implemented to move CSN to the proper position. For example, A-ring 312 can be implemented as eight 8-bit registers. At the A-ring read port 343 of these eight 8-bit registers, the registers of the surrounding CSN are read out, and the content of these read-out registers is brought into two separate 8-bit buses. Concatenating these buses into a single 16-bit bus then shifting the bus by from 0-bits to 8-bits forms an 8-bit window of interest (maximum CSN advancement of 8) for advancing the old CSN. A "finding the first 1" circuit will yield the amount that CSN will advance.

ICRU 301 also informs Checkpoint Unit 303 of the new Committed Serial Number (CSN) 316 by sending a committed serial number signal (CSN) signal and issued Send Number (ISN) to Checkpoint Unit 303 so that it can free up any allocated checkpoints have a serial number less than CSN. Relative to locations on the circular A-Ring rather than strict mathematical order (i.e. SN≦⊙CSN relative to locations on the circular A-Ring). Checkpoints are described in greater detail elsewhere in this specification. In one embodiment of the CPU 51, CSN, as well as the other pointers described herein is a six-bit vector that encodes the instruction serial number corresponding to the addressable A-Ring bit location.

F. Instruction Retirement & Resource Recovery

CPU allocatable resources are recovered by provider. An additional pointer is provided to track and control instruction retirement and resource reclaiming for resources that are freed when instructions are retired. Resource Reclaim Pointer (RRP) 317 points to the last retired instruction and trails CSN. A "retired instruction" is an instruction that has completed execution, been deactivated, and committed by the CPU 51 and has had all associated machine resources reclaimed for subsequent use during subsequent instruction issue. Reclaimed machine resources include renamed and/or remapped logical, architectural, and physical registers allocated to the instruction, instruction serial numbers (SN), checkpoints, and watchpoints which are freed at instruction retirement and thereby made available for reallocation during subsequent instruction issue. The amount that RRP advances every machine cycle sets the maximum instruction retirement rate of the machine. When the CPU is initialized RRP is initialized to 0 (zero) and advanced according to changes in instruction status and predetermined RRP advancement rules described hereinafter. Allocation and deallocation of checkpoints and watchpoints, are described in detail hereinafter.

As instructions are committed, Resource Reclaim Pointer (RRP) 317 is advanced behind CSN 316 to retire instructions so that machine resources can be freed up and reclaimed for reuse. Each machine cycle, RRP 317 attempts to advanced past committed instructions based on the A-ring A-bit state and predetermined RRP advancement rules without passing CSN. RRP cannot pass CSN because machine resources allocated to non-committed instructions, even if deactivated, cannot be freed until it is certain that the instruction need not be undone. Instruction completion (deactivation) alone is not sufficient for instruction commitment or retirement because the deactivated instruction may still be speculative. Only committed instructions can be retired. RRP 317 points to the next instruction who's register resources can be reclaimed. RRP 317 advances based only on the set or cleared condition of bits in A-ring 312, CSN 316, and predetermined rules which may be implemented within CSN/RRP Advancement Logic 328.

As was the case for ISN and CSN, the maximum number of positions RRP can advance every machine cycle may be limited to a smaller maximum number of instructions per cycle by other software, hardware, or other controls. In one embodiment of the invention, the advancement of RRP is limited by a predetermined maximum instruction retirement rate that is selected based on the desire to limit the hardware required to implement movement of the RRP pointer. For example, in the exemplary four issue per cycle CPU embodiment, RRP advancement and therefore recovery of resources is limited to a maximum of four instructions per machine cycle. This is equal to the maximum instruction issue rate of the exemplary machine so it does not limit CPU 51 performance. RRP should not be restricted to advance more slowly than the normal issue rate. More rigorously, RRP is advanced according to the relationship: "RRP←min (RRP+4, CSN)." In principle limiting resource recovery in this manner is not essential, and RRP may be advanced up to CSN. The limitations in the exemplary CPU 51 were imposed because of hardware design tradeoffs. The hardware required to advance CSN for a predetermined number of instructions is greater than that required to advance RRP for the same number of instructions. Therefore, to minimize hardware to a desired level, RRP is advanced more slowly than CSN with little or no detrimental effect on performance.

1. Updates to RRF and Register Rename Maps at Instruction Commitment and Retirement Referring to FIG. 18, resource recovery frees up instruction serial numbers so they can be used again and, as a result, also frees some registers so that they can be put back into the freelists within Freelist Unit 700. When instructions are committed, they are identified by the COMMIT_VALID signal generated by the ICRU 301. In response to the COMMIT_VALID signal, the entries in the storage unit 366 of RRF 302 that correspond to the committed instructions are freed by the control logic 365 for reuse.

2. Reading RRF at Instruction Retirement

RRF is read when an instruction is retired (See ICRU 301 description) and at machine Backup (See Backtrack description). When an instruction is retired, as indicated by the RRP pointer, the control logic 365 controls the storage unit 366 to output to the Freelist Unit 700, in the form of the FREE_TAG signal, the physical register tags corresponding to the retired instruction. The Freelist Unit then places the physical register tags in its list of free physical register tags.

3. Precise State Maintenance using Pointers

A-Ring 312 and its associated logic provides accurate machine cycle current information on the status of each instructions that has been issued. Pointers ISN and CSN track status of issued and active instructions. Only when CSN advances to a particular instruction can the CPU 51 be certain that the instruction can be committed and free resources associated with executing the instruction, thereby preserving precise state. ISN moves around the A-ring setting A-bits (A=1) for issued instructions as it passes entries. CSN follows ISN looking for completed instructions (A=0) to commit. NMCSN follows ISN looking for completed (deactivated) memory instructions (M=0). RRP follows CSN around A-ring 312 and reclaims resources of committed instructions. When aggressive load/store instructions scheduling is discussed, that description will describe how NMCSN follows ISN looking for completed (deactivated) memory instructions (M=0).

CSN doesn't advance into an instruction that has an A-bit set. (NMCSN advances past memory referencing instructions because the M-bit is cleared at issue for memory referencing instructions.) Other rules for moving the pointers that permit precise state to be maintained are: (1) CSN can't advance past ISN (ISN≥CSN), (2) CSN can't advance past NMCSN (NMCSN≥CSN), (3) CSN can't advance past PBSN (PBSN≥CSN), (4) NMCSN can't advance into ISN (ISN≥NMCSN), (5) PBSN can't advance into ISN (ISN≥PBSN), (6) RRP can't advance past CSN (CSN≥RRP), (7) NISN is always ISN+1 (addition is modulo ring length), and (8) ISN can't catch up to RRP or CSN (indicating a full machine condition). Other rules that may optionally be implemented in a preferred implementation of the method are (9) CSN and NMCSN can advance by at most eight in one clock cycle, and (10) RRP can advance by at most four in one machine clock cycle. The symbol "≥" indicates that the greater than or equal to relationship is determined with respect to the wrap around A-ring structure rather than strict mathematical equality or inequality.

Figure 20:
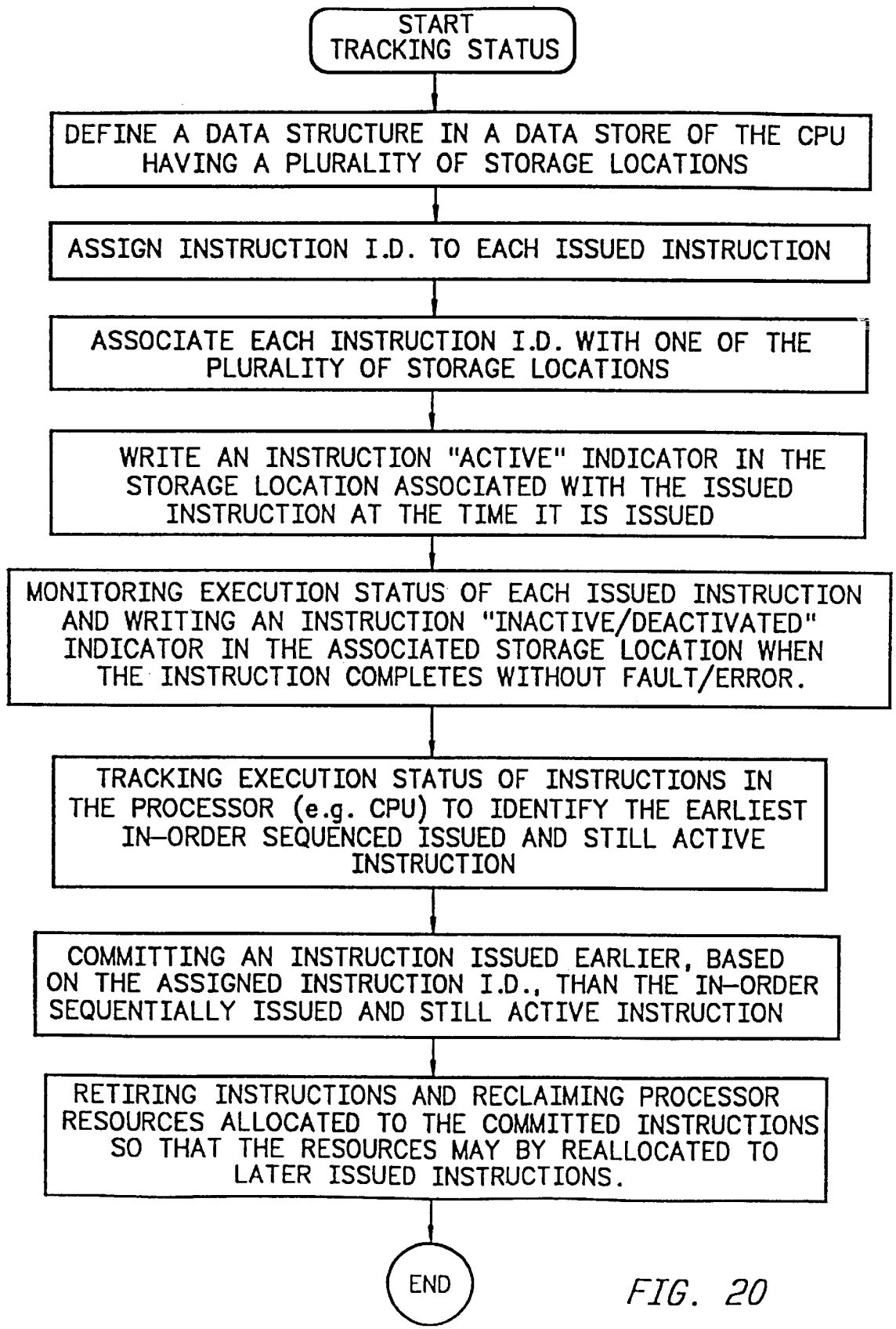
FIG. 20 is a diagrammatic flow-chart of an embodiment of the inventive method for maintaining precise state including instruction issue, deactivation, commit, and retirement.

Several observations may be made relative to the ISN, CSN, and RRP pointers: First, instructions having serial numbers between CSN and ISN correspond to outstanding active instructions in the machine. These instructions are speculative and may need to be undone. Second, instructions between CSN and RRP correspond to unretired instructions which have been committed and are simply awaiting retirement by RRP. These committed instructions will never be undone. Third, CSN can never pass ISN since it is not possible to commit the result of an instruction that has not issued. Fourth, machine "sync" is reached by definition when CSN=ISN=RRP so that all issued (ISN) instructions in the machine have been committed (CSN) and retired (RRP). Fifth, ISN can never pas RRP in the conceptually circular A-ring and the serial numbers between RRP and ISN are available for instruction issue. When ISN=RRP−1 (modulo A-ring length), all instruction serial numbers have been allocated and the machine must stall (wait) until RRP can advance to reclaim machine resources for reuse before another instruction is issued. Of course the CPU 51 continues to execute, deactivate, complete, and commit instructions that had been issued prior to the stall. Finally, the relative relationship among the three pointers is RRP≤⊙CSN≤⊙ISN, where the "≤⊙" operator indicates an ordering within the circular A-RING (modulo A-ring length) and does not imply a strict mathematical relationship. FIG. 20 is a diagrammatic flow-chart of an embodiment of the inventive method for maintaining precise state including instruction issue, deactivation, commit, and retirement.

III. AGGRESSIVE LONG LATENCY (LOAD/STORE) INSTRUCTION SCHEDULING

The description of the inventive method of using various pointers to track and schedule instruction commitment and retirement pertain to all instruction types and provides many advantages in modern speculative out-of-order processors. Further benefits are attainable by recognizing that many modern processors have been designed as "load-store" architectures in which only load instructions and store instructions reference external memory, while all other instructions or operations reference registers within the processor.

Actually, load and store instructions belong to a more general class of instructions that are referred to here long latency instructions that require several machine cycles to complete, and include external memory referencing instructions of which load instructions and store instructions are two types. Instructions that reference internal registers generally require fewer or perhaps only a single machine cycle to complete. Long latency instructions also include "atomic" instructions which are instructions designed to execute in multiple-machine cycles without interruption.

Latency is the elapsed time between issuing an instruction and execution completion of that instruction. An instruction set for a load-store architecture is desirable because it decouples long latency memory references (such load-store references to memory) from short latency logical or arithmetic operations (such as add, multiply, divide, logical compare, and the like) that reference internal CPU 51 registers. Additionally, most modern CPU 51 of the designed with load-store type architectures have many general purpose registers which can support the increased register requirements that arise from this type of instruction set.

Both load instructions and store instructions modify architectural state. In an out-of order execution processor, it is important to be able to schedule load and store instructions effectively in order to maintain a high load/store bandwidth without compromising precise state. An enhancement to the basic structure and method for tracking instruction status is provided that aggressively schedules long latency instructions while maintaining precise state. Structures and methods within the ICRU 301 of PSU 300 cooperate with structures and method within the DFB 62 particularly the Load/Store Unit (LSU) 603 as will be described to provide the enhanced capabilities.

A. Memory Instruction Status Information Storage

Figure 21:
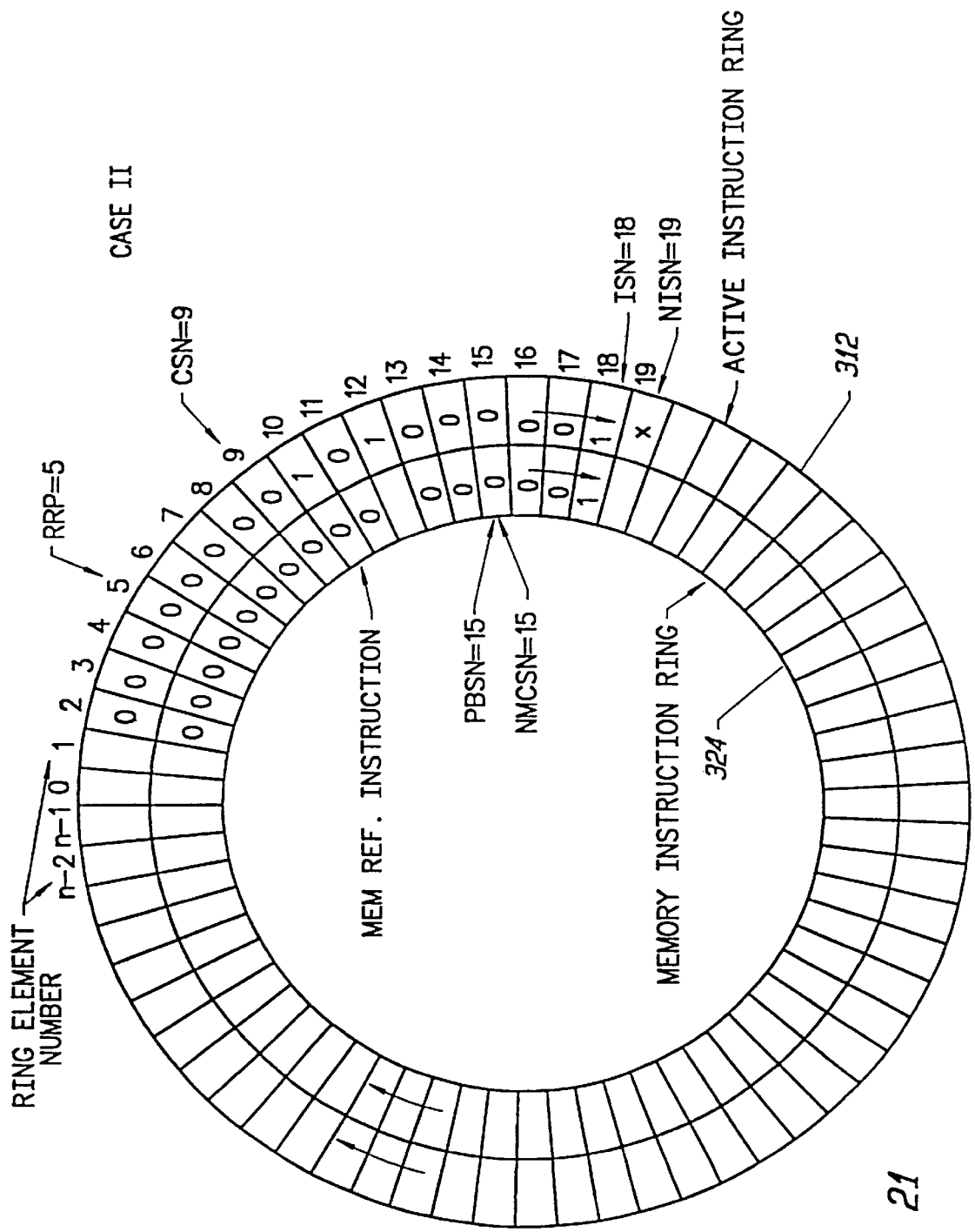
FIG. 21 shows diagrammatic illustrations of embodiments of the Active Instruction Data Structure and Memory Instruction Data Structure for storing instruction status information and various pointers associated with a second set of exemplary data stored in the data structures.

The inventive structure and method provides additional signals that distinguish long latency instructions, storage regions for storing long latency instruction status information, and pointers for tracking the instruction status. FIG. 21 shows a conceptual diagram of Memory Instruction Ring (M-ring) 324 for storing long latency instructions status information, typically memory referencing instructions (e.g. Load/Store instructions), in relationship with Active Instruction Ring 311 already described. M-ring 324 has generally the same structure and overall characteristics as A-ring 311 but the Memory status bits are set according to a different set of rules than the A-Ring status bits. In particular, M-ring 324 implements different rules concerning which instructions or instruction types are treated as active (bit set to "1") or inactive (bit cleared to "0") at issue.

As shown in FIG. 10, when ISU 200 issues an instruction, it provides an instruction type signal ISSUE_MEM which distinguishes between a memory referencing instruction and non-memory referencing instructions, along with the ISSUE_NOP and ISSUE_VALID already described. ISSUE_MEM could also be generated so that it signals any particular class of long latency instructions that would benefit from being aggressively scheduled, including load instructions, store instructions, atomic instruction sequences, and other instructions referencing memory.

In one embodiment of the CPU 51, ISSUE_MEM is a four-bit vector (each bit corresponding to one of the issuable instructions in the instruction issue window) where assertion ("1") at bit i indicates that i-th instruction is memory-related. ISSUE_MEM is used by M-Ring Set Logic 335 within ICRU 301 to set bits in M-Ring 324 at issue as shown in FIG. 12. Address decoding logic 338, 336 are provided within A-Ring 312. ISSUE_MEM indicates whether or not the issued instructions are related to memory operations. If ISSUE_MEM from ISU 200 is asserted at bit i, and ISSUE_VALID corresponding to the same instruction slot is asserted, then that particular M-bit is not set in the Memory Instruction Ring (M-Ring) 324. Not setting M-bit when the instruction is memory related permits the memory related instruction to be effectively "deactivated" at the time it is issued so that a Non-Memory Committed Instruction Serial Number (NMCSN) pointer (described hereinafter) advances over the cleared M-bits and is prevented from advancing by non-memory referencing instructions in the manner that CSN advances over cleared A-Ring bits. An M-bit must be written as either a "0" or "1" for every instance when ISSUE_VALID is "1", that is for every issued instruction whether memory related or not. Not setting the M-bit for a memory operation facilitates "ignoring" memory related operations for the purpose of advancing NMCSN.

M-bits are cleared by M-Ring Clear Logic 337 when an instruction completes without error just as they are cleared for A-ring 312. Memory referencing instructions having their M-bit cleared at issue remain cleared after instruction deactivation. M-Ring bits are cleared for execution traps in the same manner as for A-Ring 312. M-ring 324 status information is used to track and aggressively schedule memory referencing instructions. The overall status of memory referencing instructions, including issued, committed, retired status are still maintained by A-ring 311 and its associated pointers.

In light of the described similarities between the A-ring and the M-ring, those skilled in the art will realize that the function of the A-ring and M-ring could be implemented within a single data structure, such as a single circular ring wherein each addressable location of the ring comprises a plurality of bits. In such a plurality-bit ring, both instruction activity (active or inactive) and instruction type (memory, non-memory, branch, nop, and the like) could be encoded in the plurality of bits. Furthermore, other coding schemes could be provided to store the same information as presently provided in separate A-ring and M-ring data structures. Those of ordinary skill in the art, in light of the present description, will also appreciate how the ring set and clear logic, how CSN/RRP logic for a multi-bit circular ring would be modified to support the multi-bit format, and to accommodate NMCSN and that different logic states or symbols may be implemented other than a "1" for set and a "0" for clear to differentiate between active and inactive and between a memory instruction and a non-memory instruction.

B. NMCSN and PBSN Pointers for Tracking and Scheduling Long-Latency Information So far, the structure and method for setting M-bits in M-ring 324 has been described. In the structure and method of the present invention a Predicted Branch Instruction Serial Number (PBSN) 318 pointer and a Non-Memory Committed Serial Number (NMCSN) pointer 319 are provided and used in conjunction with M-ring 324 to enable the CPU 51 to effectively and aggressively schedule long latency instructions, particularly load/store instructions referencing external memory. Both NMCSN and PBSN are stored in Pointer Register 313 within ICRU 301 as described.

NMCSN 319 points to the last "committed" instruction (as defined previously), but since M-bits for memory referencing instructions are cleared at the time of instruction issue, all memory access instructions are effectively ignored in M-ring 324 for the purposes of advancing NMCSN, therefore NMCSN advances more rapidly. Note that only advancement of pointer CSN 316 actually commits instructions. NMCSN is used only by Load/Store Unit 603 as will be described hereinafter. An instruction can be committed if it has completed without error and all prior instructions have been completed without error. NMCSN can advance past memory referencing instructions even if the memory referencing instructions are still active. This method may also be used to aggressively schedule other long latency instruction types that do not reference memory. When the CPU is initialized, NMCSN is initialized to 0 (zero).

PBSN 318 is the serial number of the earliest (oldest) unresolved predicted branch instruction. In the present exemplary embodiment, PBSN is determined by Watchpoint Unit 304. (Watchpoint Unit 304 is described in greater detail elsewhere in this specification.) An unresolved branch instruction is an instruction (and instruction sequence spawned from that instruction) that has been speculatively issued, begun executing, and possibly even completed execution before it is known for certain that the instruction should have been issued and executed. In other words, the conditions that would make execution of the instruction appropriate have not yet arisen in the processing flow at the time the instruction is issued. In the present inventive structure and method, whenever there are no active unresolved predicted branch instructions PBSN is made equal to ISN. PBSN is used in NMCSN advancement logic as a barrier to NMCSN advancement. NMCSN can never advance beyond the SN address of pointer PBSN or ISN, and in situations where there are no memory instructions, pointer NMCSN is equal to CSN. When the CPU is initialized PBSN is initialized to 0 (zero).

C. Advancing NMCSN

NMCSN 319 is the memory-related operations counterpart of the CSN 316. In correspondence of A-ring for advancing CSN, there is an M-ring for advancing the NMCSN. The M-ring consists of 64 bits of M bits in a wrap-around manner. That is for the exemplary 64 bit M-ring, the bit following M-bit #63 is M-bit #0. An M-bit=0 means that the corresponding instruction is a long-latency instruction such as a memory-related instruction, for example, a load/store instruction.

In an exemplary CPU, the rule to advance the NMCSN pointer is similar to that of CSN as shown below. (1) Advance NMCSN up to, inclusive, ISN; (2) Advance NMCSN no more than eight instruction serial numbers in one cycle; (3) Advance up to, exclusive, the first "1" in the M-ring.

The rule for advancing NMCSN is modified when an "unfinished floating point operation" exception occurs in the floating-point unit (FPU) or a "data breakpoint exception" is detected from the load/store execution unit (LSU). In these two instances NMCSN is advanced by one serial number just as for CSN previously described. That is CSN←CSN+1, and NMCSN←NMCSN+1 under these conditions. PSU 300 is particularly concerned about unfinished floating-point operations and data breakpoint operation which require special pointer handling.

The implementation of the M-ring can be similar to that of A-ring. In fact, in the exemplary CPU, since NMCSN can only be advanced to the maximum (8, ISN, the next M-bit= 1) simple hardware circuitry may be implemented to move NMCSN to the proper position as for CSN. (The expression "maximum (x, y, z)" means select the maximum value from among the values of parameters or expressions x, y, and z.) M-ring 324 can be implemented as eight 8-bit registers. At the M-ring read port 346 of these eight 8-bit registers, the registers of the surrounding NMCSN are read out and the content of these registers when read is brought into two separate 8-bit buses. Concatenating these buses into a 16-bit bus then shifting the bus by from 0-bits to 8-bits forms an 8-bit window of interest for advancing the old NMCSN. A "finding the first 1" circuit will yield the amount that NMCSN shall advance.

Correct maintenance of NMCSN and PBSN permits simple determination of the load/store or other memory referencing instructions that can be selected for execution without compromising precise state. Load/store instructions which can be selected for execution without compromising precise state are considered to be "in-range" for execution. Recall that precise state is maintained when (1) an instruction which generates an exception does not modify architectural state, (2) all instructions prior to the faulting instruction have completed modifications to architectural state, and (3) all instructions after the faulting instruction have not modified architectural state. LSU 603 also receives NMCSN 319 from ICPU 301 and PBSN 318 from Watchpoint Unit 304 to use in scheduling the long latency instructions.

D. Load-Store Unit (LSU) within Data Flow Block

While implementation of several of the invention features of the invention pertain to general execution units, aggressive scheduling of Long Latency instructions benefits when particular structures are present to support the Long Latency in state schedule. For example, structures for aggressively scheduling load/store and other memory referencing instructions are provided. Those having ordinary skill in the art will, in light of the disclosure, appreciate how such testers could be implemented in other execution units not dedicated to local store operations.

The LSU supports both Relaxed Memory Model (RMO) and Total Store Ordering (TSO) modes that are defined in the SPARC-V9 Architecture Manual. The LSU is responsible for scheduling of both fixed and floating point Load/ Store instructions. The LSU can make up to two requests each cycle to the Cache. Instruction ordering required to maintain precise state is managed by a set of protocol signals between the processor and the cache chips. The LSU contains a 12-entry reservation station. In RMO mode, load instructions are allowed to speculatively bypass store instructions. There is a three stage pipeline between the LSU and the Data Caches that supports split transactions. In the first stage, an instruction's address, opcode, and serial number are sent to the Data Caches. Also sent are some control bits used for speculative execution. In the second stage, a store instruction's data is sent from the LSU to the Data Caches. Also in the second stage, the Data Caches send back to the LSU the serial number and valid bit of the instruction that is going to complete in the next cycle. In the third stage, the Data Caches return the status and load data. On a cache miss, the Data Cache will return the data during an unused pipeline slot or it will assert a signal which opens up a pipeline slot for the data.

Figure 22:
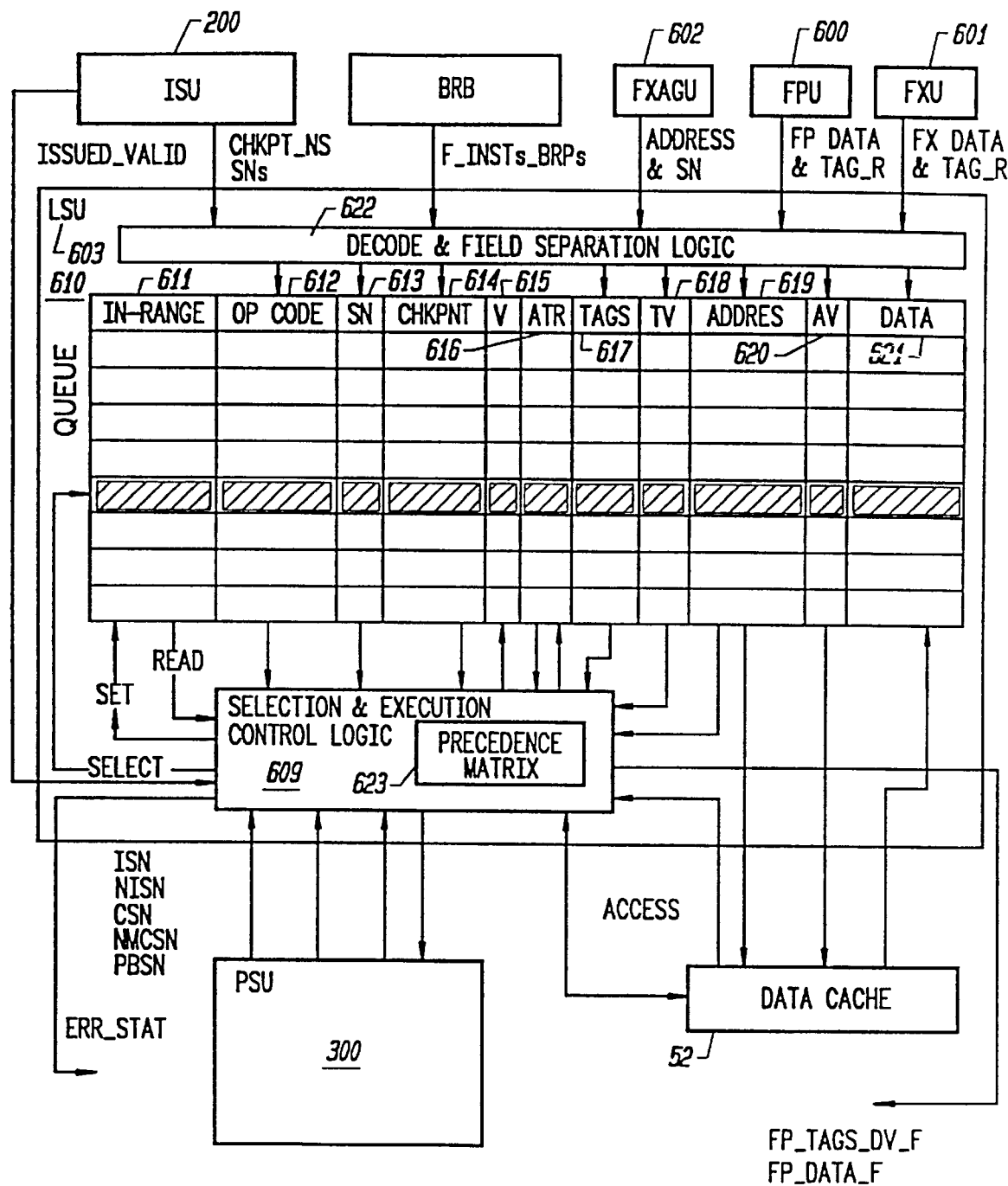
FIG. 22 shows a functional block diagram of Load/Store Unit (LSU) within the Data Forward Block of the CPU.

FIG. 22 shows a functional block diagram of Load/Store Unit (LSU) 603 which comprises Selection & Execution Control Logic Unit 609, and Instruction/Data Queue (IDQ) 610 for storing a variety of instruction and data related information, and Decode & Field Separation Logic (SSFSL) 620 for decoding signals from ISU 200, FPU 600, FXU 601, and FXAGU 602. More particularly, IDQ 610 comprises In-Range Bit field 611, Op-code filed 612, Instruction Serial Number (SN) filed 613, Checkpoint Number 614, Validity Bit filed 615, Attribute (ATR) field 616, Register Tag (TAGS) field 617, Tag Valid Field (TV) 618, Address field 619, Address Valid (AV) field 620, and Cache Data Field 621. Data cache 52 sends and receives addresses and data with IDQ 610.

When the LSU 603 receives an instruction, the decode and field separation logic 622 decodes it and determines whether the address will be contained in the immediate data field of the instruction, or whether the FXAGU 602 will have to compute the address. If the decode logic 622 determines that the address has to be computed by the FXAGU 602, then it clears the address valid bit. But, if it decides that the address is contained within the instruction, meaning that its immediate data within the instruction, then it sets the address valid bit to indicate that the address data is ready and available for the instruction, and that the instruction can be executed. Tags coming from the FPU and the FXU are handled in the same manner, so that the tag signals indicate whether the data is valid or not. The issued valid signal when the instruction gets stored in the reservation station or queue 610, the valid signal is cleared (not asserted) until the issued valid signal indicates that it was actually issued.

When the LSU 603 executes the instruction, it sends the data to the data cache 52 directly. When it is retrieving data from data cache 52, the data in our implementation is shown going into the selection and execution control logic which then sends out a signal containing the tag sends and the data valid bit indicating that the data is valid and it also sends out the data as we show it, so there are combined signals that come out. These are the FP_TAGS_DV_F signal, and the FP_DATA_F signals in FIG. 22.

The Selection Execution Control Logic 609 also gets access information and gives access information to the data cache 52. Some of that information will be trap information, the type of traps that are associated with memory operation, and outputs error signals (ERR_STAT) for use by PSU 300 in error detection.

Selection & Execution Control Logic Unit (SECLU) 609 is responsible for selecting instructions for execution in LSU. It deals with ordering constraints of loads, stores, atomic operations, and the like. For example, a younger load to address "X" cannot pass an older store to address "X". This type of load is marked as "strong" in the Attributes Array like a store. It initiates stores "in-order" and a store cannot be initiated until all previous loads and stores have completed. Finally, a store's serial number must be in-range. SECLU 609 contains logic that masks only the instructions that are valid, eligible (i.e. not currently being processed by the cache), have all of there dependencies met, and are a "weak" operation (e.g. a load) or are "in-range" and not constrained by a previous cache miss. The masked instructions are then processed by Precedence Matrix 623 which selects the oldest instructions from the set of instructions that meet the mask logic criteria.

SECLU 609 is also responsible for controlling a memory access. It sends commands to the caches and receives cache status information on completion of the access. It also puts the proper destination register tags on "load" data from the cache and keeps track of the attributes of an access in Attribute Array 616. These attributes include in-range, weak/strong (generally stores and atomics are "strong" and loads are "weak"), speculative access, and eligible to send to cache.

SSFSL 620 receives Instruction Packets from ISU 200 which include instruction op-code, instruction serial number, instruction checkpoint, and register tags, and decodes the information, selects the correct slot in IDQ 610 to store the information, and separates the information into the proper field. Each serial number entry and data associated with the SN is stored into an empty slot in the queue.

SECLU also receives pointer values (ISN, NISN, CSN, PBSN, and NMCSN) from PSU 300, CSN, PBSN, and NMCSN are particularly relevant to determining if the instruction serial number is in-range. SECLU 609 includes the logic that determines if an access is "in-range," that is if the serial number is greater than CSN and less than or equal to NMCSN as described. In-range information is forwarded to Attributes Array 616 and stored in in-range file 611 within SECLU. SECLU also contains logic to match an entry stored in the IDQ with data returning status and/or data from the cache for a given access. All valid entries within IDQ are monitored to see if they are in-range during that cycle and the attributes array is updated as required. Once a queue entry is in-range, it remains in-range until the queue entry is reused.

Checkpoint Field 614 contains the checkpoint number that corresponds to the access in a queue slice. New checkpoint number(s) can arrive from ISB 61 each cycle. Valid Bit Queue 615 holds a validity bit that is set if a memory access instruction is actually issued. This information comes from the ISB 61 during the instruction issue cycle. The bits can be reset if accesses are killed by the ISB. Address field 618 holds the addresses for all cache accesses. The serial number arrives in the IDQ address match logic before the address arrives in the Address Queue from the DFB 62 Address Generation Unit (FXAGU) 602. Attributes may be set in the Attributes Array 616 in response to the content of the control registers. For example, if the Program Order bit is set, then the "strong" bit will be set in the attributes section.

1. Identifying In-Range Memory Referencing (Long Latency) Instructions

Figure 23:
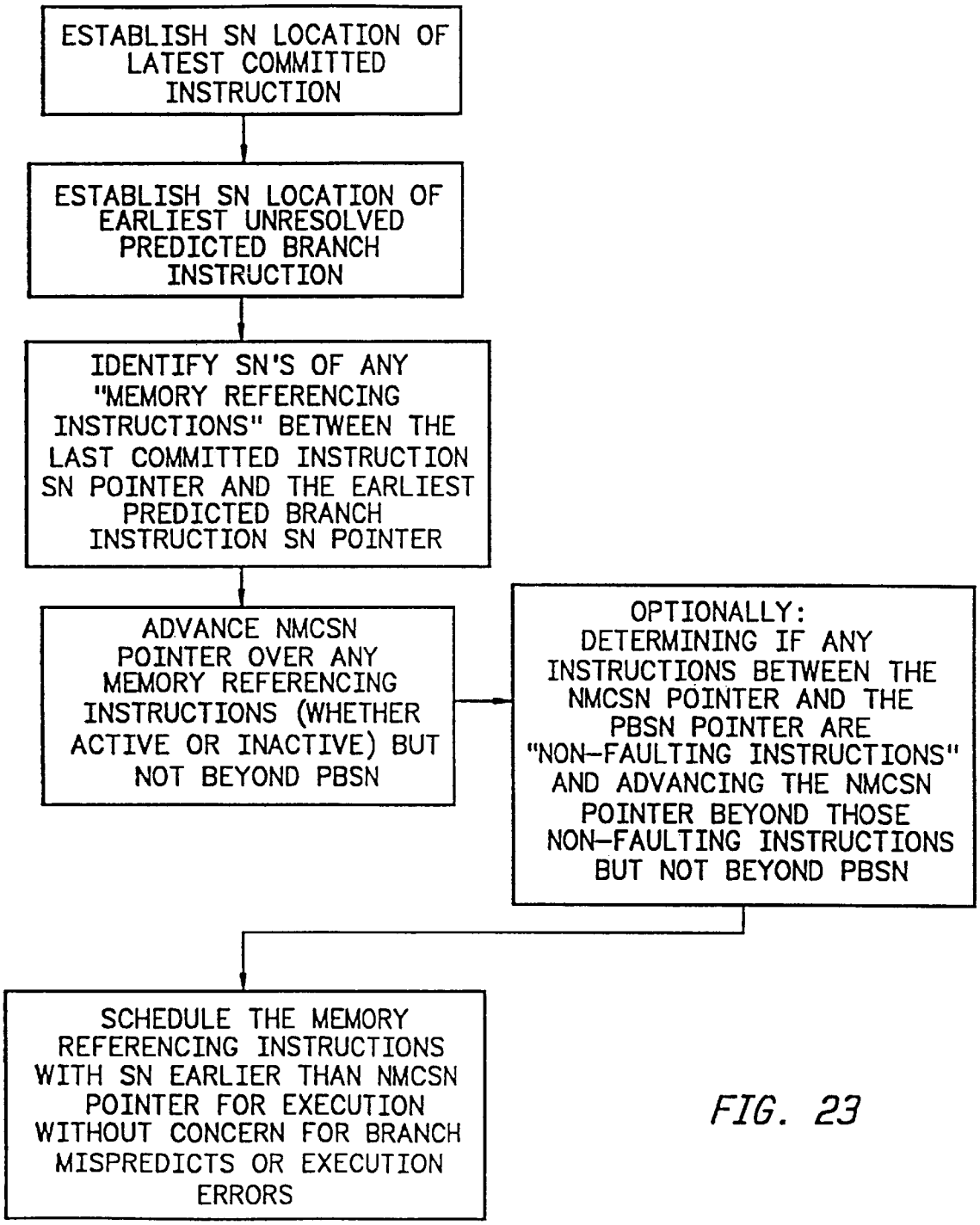
FIG. 23 is a flow-chart of an embodiment of the inventive method for aggressively scheduling long latency instructions including load/store instructions while maintaining precise state.

As described, SECLU 609 contains logic that determines whether an instruction is "in-range" in response to CSN and NMCSN from ICRU 301 and PBSN form Watchpoint Unit 304. The logic identifies instructions in a first-window having serial numbers between CSN and PBSN (CSN≦ • first-window≦PBSN) can be executed without concern for branch mispredicts, where the symbol "≦" indicates relative order in the Memory Instruction Ring rather than strict mathematical order. Instructions in a second, and possibly smaller "in-range" window having serial numbers between CSN and NMCSN (CSN≦in-range≦NMCSN≦PBSN) can be scheduled for execution without concern for branch mispredicts or execution exceptions. It is the memory referencing instructions that are "in-range" that can be identified to LSU 200 within DFB 62 for aggressive execution scheduling. FIG. 23 is a diagrammatic flow-chart of an embodiment of the inventive method for aggressively scheduling long latency instructions including load/store instructions wile maintaining precise state.

2. Enhancement to the Basic Structure and Method for Aggressive Long Latency (Load/Store) Instruction Scheduling In an enhancement to the basic method of the invention, rules can be implemented so that NMCSN ignores predetermined instructions known to be "non-faulting" instructions for purposes of advancement of the NMCSN pointer and improve performance by permitting an even more aggressive scheduling of load/store and other instructions that reference memory.

IV. CHECKPOINTING

A Checkpoint is a "snapshot" of the machine state at known instant of time. Checkpoints provide method and structure for quickly restoring an earlier machine state to undo a speculative instruction sequence in the event of a mispredicted branch or execution. In an exemplary processor according to the present invention, checkpoints are made during the instruction issue cycle. In the present inventive method, the restoration of machine state based on restoration of a checkpoint is defined as a machine "backup."

In the present invention, checkpoints are created for several classes of instructions: (1) predicted program control transfer instructions such as branches and (2) instructions that may have the side-effect of modifying control register values.

Control transfer instructions (such as branches) are predicted and may result in program counter (PC) discontinuities. In the CPU 51 implementing the inventive structure and method, the processor makes a checkpoint for each predicted program control instruction in order to provide a quick machine backup if that program control instruction (branch or return type jump and link) is mispredicted. If the APC and NAPC values were not saved in these circumstances, it would be difficult to reconstruct the correct FPC, APC, and NAPC values without re-issue and re-execution of the program control instruction that was mispredicted. Since a checkpoint is created for each such program control instruction, the maximum number of checkpoints allowed in the machine limits the number of program control instructions which may be predicted and remain unresolved concurrently. The predicted program control instructions may be those such as the SPARC-V9 BPr, FBcc, FBPcc, Bcc, BPcc, and JMPL[rd=0] instructions described earlier.

Other types of instructions that result in program flow changes may also be checkpointe. These may include SPARC-V9 instructions such as CALL, JMPL, TCC, RETURN, DONE, and RETRY.

Checkpoints are also created for instructions that modify machine state including instructions which may have the side-effect of modifying control register values. Checkpointing certain control registers, allows the control registers to be modified speculatively. These include writes to the control registers in the control register file 800, such as the SPARC-V9 WRPR and WRASR instructions, and include register window control instructions, such as the SPARC-V9 SAVED, RESTORED, and FLUSHW instructions. However, not all control registers are checkpointed in order to reduce the amount of checkpointed state, without loosing performance.

Moreover, in the exemplary CPU 51, reads of control registers in the control register file 800 require checkpoints since, as described earlier, their data is stored in the watchpoint unit 304 so that it can then be made available to the FXU 601 for execution at a later time. These may be instructions such as the SPARC-V9 RDPR and RDASR instructions.

Furthermore, instructions which often result in an issue trap may require a checkpoint. These include window control instructions such as the SPARC-V9 SAVE and RESTORE instructions and unimplemented instructions, which for example, may be the SPARC-V9 LDD/LDDA and STD/STDA instructions.

Traps may also be entered speculatively and when so issued are checkpointed. Thus, checkpoints may be made for the issued instruction prior to an instruction that causes an execution trap (etrap) or issue trap in the manner described later. Moreover, checkpoints are made prior to the first instruction in a trap handling routine so that return can be made if the trap was taken speculatively.

For instructions which have side-effects which cannot be controlled speculatively, or instructions which so rarely cause exceptions and require large amounts of checkpoint information, a decision may be made not to checkpoint the instruction for reasons of efficiency, but instead to force a "syncing" of the machine prior to issue. That is, prior to issuing an instruction that has side-effects which cannot be controlled speculatively, the CPU must be at machine sync, meaning that all pending instructions have committed and been retired (ISN=CSN=RRP).

An important performance/design trade-off is made in the choice of which instructions are to be designated as machine syncing instructions and which instructions are to be checkpointed. The performance degradation for syncing is weighed against the additional logic complexity and processor area that would be associated with handling such instructions speculatively, including the chip area required for storing the checkpointed machine state.

Many different types of instructions modify data values in registers. Conventional checkpointing methods checkpoint register data values in order to restore register state. By comparison, in a machine implementing the method of the present invention, the CPU 51 is able to restore earlier register state without checkpointing actual register data values by instead checkpointing the register rename maps. Checkpointing the "register rename map" rather than the "register data values" is advantageous because it drastically reduces the amount of checkpointed state information stored in the CPU 51.

In the exemplary machine, supporting 64 concurrent instruction up to sixteen Checkpoints are available at any given time. In the exemplary embodiment, ISU 200 is limited (by hardware considerations) to allocating at most one checkpoint per issue cycle; however, in general, one or any plurality of checkpoints may be allocated in a cycle. Predetermined rules have also been implemented in the exemplary CPU 51, to restrict the types and combinations of instructions that may be issued during the same machine cycle. For example, in the exemplary CPU, only one control transfer instruction may be issued during a single machine cycle, so that only a single checkpoint is needed to save state for that cycle. This checkpoint limitation means that in some cases (depending on what type instructions are waiting in the issue window) the maximum number of instructions (e.g. 4) cannot be issued during the cycle. More or fewer checkpoint can be provided, the number being selected based on such factors as the number instructions requiring checkpointing that will be outstanding concurrently in the machine.

In the exemplary embodiment, Active Instruction Ring 312 supports as may sixty-four instructions concurrently. As described hereinafter, the inventive structure and method provides for certain instruction types to be checkpointed, and optionally provides for checkpointing arbitrary instruction types at predetermined instruction cycle time-out intervals in response to a TIMEOUT_CHKPNT signal from ISU 200. Therefore, the number of checkpoints supported need be no greater than the number of instructions supported by Active Instruction Ring 312 and the number may generally be fewer. In the exemplary CPU 51, sixteen checkpoints are allocatable and each of these checkpoints is a machine resource that is recovered after the instruction causing the checkpoint is retired.

In the exemplary CPU 51, checkpoint data (the machine state) is saved locally throughout the CPU 51 in checkpoint storage units in response to the DO_CHKPT signals to cut down on chip routing and to improve performance. However, those skilled in the art will recognize that the checkpointed data could be stored off chip.

Each of the checkpoint storage units has 16 addressable storage elements or entries. Each storage entry corresponds to one of the 16 checkpoint numbers described later. Thus, referring to FIG. 6, the contents of the APC and NAPC registers 113 and 114 (CHKPT_PC and CHKPT_NPC) are stored in the PC checkpoint storage unit 107 by the PC logic 106 in response to the DO_CHKPT signal. Similarly, the control register contents (CHKPT_CNTRL_REG) are stored in the control register checkpoint storage unit 817 by the control logic 816, as shown in FIG. 17. Moreover, as shown in FIG. 16, data representing the rename maps (CHKPT_MAP) of each of the FXRFRN 604, the CCRFRN 610, and the FPRFRN 605 are stored in a checkpoint storage unit 616 and data representing the freelist (CHKPT_FREELIST) of the freelist logic 701 are stored in the freelist checkpoint storage unit 702. And, as will be described later, certain contents of the trap stack unit 815 are also checkpointed.

The ISU 200 is responsible for determining when a checkpoint is to be formed. I does so by decoding the fetched instructions it receives from the BRB 59 to determine if any are of the type just described that need to be checkpointed. And, as explained later, it also determines when to form a checkpoint when the PSU 300 indicates with the TIMEOUT_CHKPT signal that a checkpoint should be made after the occurrence of a predetermined umber of machine cycles. As a result, the ISU 200 generates DO_CHKPT signals which indicate that a checkpoint is to be formed and specify the checkpoint number (explained in greater detail later) for the checkpoint.

Figure 24:
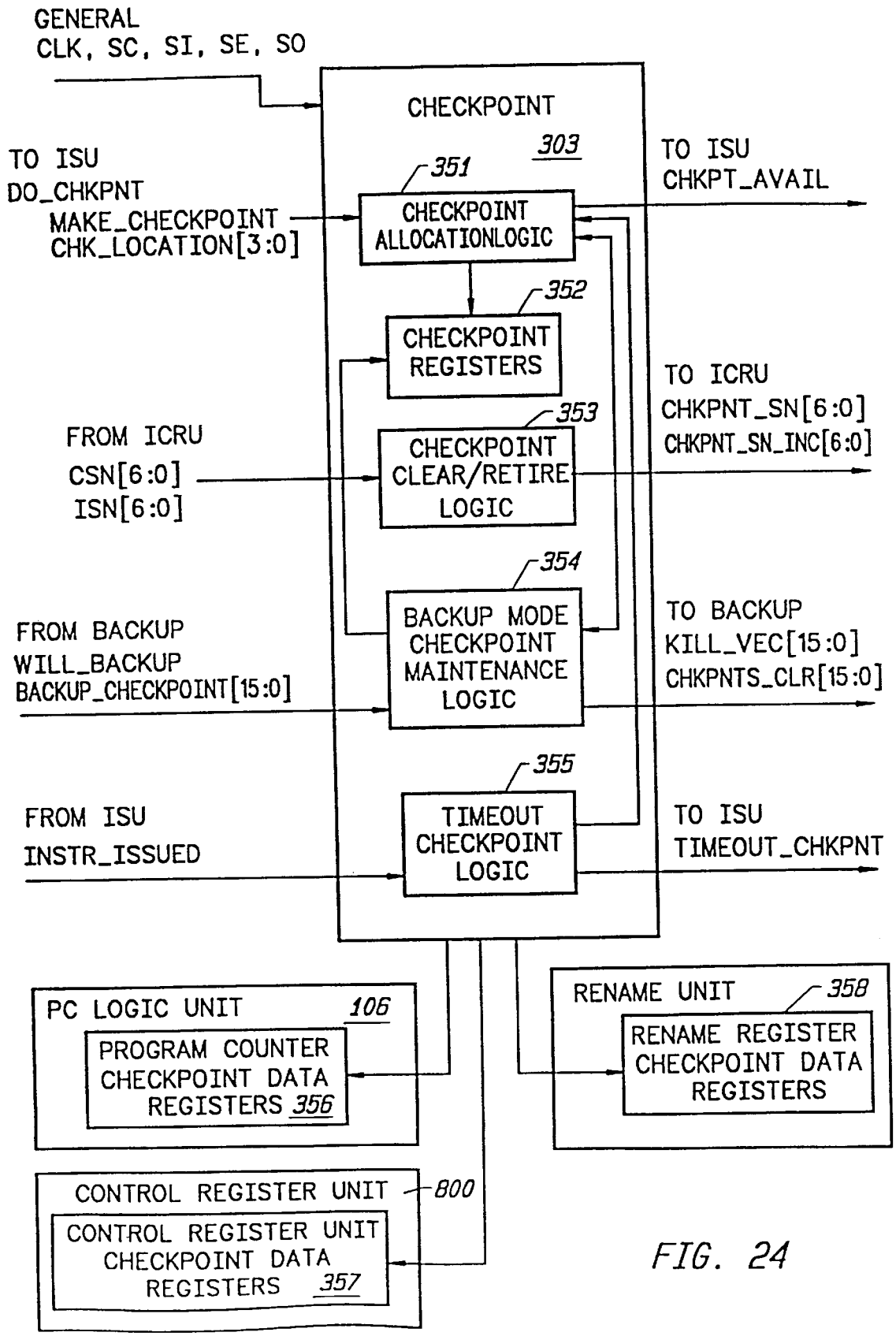
FIG. 24 is a functional block diagram of Checkpoint Unit.

FIG. 24 is a functional block diagram of Checkpoint Unit 303 within PSU 300. Assertion by ISU 200 of DO_CHKPNT signals instructs Checkpoint (CKPT) 303 to make checkpoint(s) for one or more instructions, and which of the instructions issued in instruction slot(s)0–3 required the checkpoint. Since no checkpoints can be allocated unless at least one free checkpoint register is available, CKPT 303 must send a CHKPT_AVAIL signal to ISU 200. CHKPT_AVAIL which informs ISU that at least one checkpoint is available for allocation, and informs ISU of the checkpoint number so that the checkpoint number can be associated with each instruction and incorporated into the checkpoint number (CHKPTs) formed by ISU 200 and forwarded to DFB 62. These signals would precede the DO_CHKPNT signal issue by ISU 200. If no checkpoints are available for allocation, instruction issue by ISU stalls until checkpoint resources become available. In simplified terms, stored checkpoints are only used if it is necessary to recover from execution exceptions or mispredictions, otherwise they are deallocated and the storage space freed for reuse. (Allocation and deallocation of machine resources, including checkpoints, is described in detail hereinafter.) In an enhancement to the basic inventive structure and method, described hereinafter, timeout checkpoints are also formed independent of the decoded instruction type when a predetermined number of machine cycles or alternating a predetermined number of instructions have issued, have expired without checkpoint formation.

Checkpoint Unit 303 keeps track of the checkpoints, allocates checkpoints when ISU 200 instructs it to, and frees checkpoints when they are no longer needed. If the Committed Serial Number is greater than the Serial Number (CSN>SN) of checkpoint i+1, then checkpoint i can be retired because in accordance with the inventive method and structure that permits restoring machine state at any instruction boundary, it is never necessary to backtrack the machine to an instruction sequentially earlier than a committed instruction. PSU 300 also instructs the rest of the system when it allocates or frees a checkpoint so those system components can reuse their local data storage areas used for the retired checkpoint. Checkpoint Unit 303 also tells ISU 200 how many checkpoints are free for allocation. The use of Checkpoints are described in greater detail with respect to the Backup—and Backstep—Units hereinafter.

Checkpoint 303 has five main functions: First, it controls the allocation of checkpoints, as requested by ISU 200 through the maintenance of a list of checkpoint data register structures (CHKPNT_REG_i) within Checkpoint Register Unit 352 in response to DO_CHKPNT signals from ISU 200. DO_CHKPNT specifies that one or more checkpoints are to be formed and their respective checkpoint number location(s) (e.g. 0–15) when control transfer instructions are issued. In an enhancement to the inventive structure and method, TIMEOUT_CHKPT is generated by Checkpoint 303 and sent to the ISU 200 to form a checkpoint at predetermined timings relatively independent of instruction type as described hereinafter in an enhancement to the basic checkpointing method. This Timeout checkpoint is provided to establish and limit the maximum number of cycles it would take to undo the effects of instructions for which no checkpoints were formed. (Time-out checkpoint formation may be delayed or canceled when a checkpointable instruction type is to be issued in the same instruction window.)

Second, checkpoint retires (clears) checkpoint(s) based on CSN advancement past a given checkpoint (n) and the temporally next checkpoint (n+1). The mechanism used to determine CSN has passed a specific checkpoint number is a comparison of CSN with the serial number stored in the checkpoint register. The serial number stored in the checkpoint register is the serial number of the instruction after the instruction that made the checkpoint. In response to ISN and CSN from ICRU 301. For example, checkpoint n can be retired only if CSN has advanced past checkpoints n and n+1.

Third, Checkpoint 303 indicates to ISU 200 what is the next checkpoint that should be allocated through the signal CHKPT_AVAIL sent to ISU 200, including whether checkpoints are available for allocation by ISU and the checkpoint location number(s). Fourth, Checkpoint 303 stores instruction serial numbers (SN) corresponding to an allocated checkpoint, and provides both SN and SN+1 associated with a checkpoint when requested by other units particularly to ICRU 301. Fifth, it participates in executing machine Backups by generating an instruction kill vector (KILL_VEC) which indicates to Backup Unit 402 within Backtrack Unit 305 which of the outstanding valid checkpoints to kill, and by indicating to ICRU 301 by signals CHKPNT_SN and CHKPNT_SN_INC which checkpoints can be retired in conjunction with the machine backup. (Machine Backup is described in greater detail hereinafter.)

A. Structure of Checkpoint Allocation Register

Checkpoint Allocation Register 352 structure is shown diagrammatically in Table 1. The first six bits are status bits. Bit-V denotes the validity (allocation) of the checkpoint. Bit-CP (checkpoint passed) indicates whether CSN has passed the SN of this checkpoint, Q denotes one of the 5 states to keep track of CSN advancement, and GT (greater than) indicates whether CSN is greater than the serial number of the checkpoint at allocation. Bit-GT is used to determine when CSN has passed this checkpoint. On boot-up, bits V and CP should be set to zero except at Checkpoint location 0 where Bit-V is set to "1" and Bit CP is set to "0" for proper functionality. The NSN field indicates the next serial number following the checkpointed serial number. In this implementation, a checkpoint number is not saved, rather setting the V-bit in the checkpoint data structure for location "i" indicates that checkpoint "i" has been allocated. The possible states for the checkpoint register (CHKPNT_REG_i) are described in Table 2.

In the exemplary CPU, Bit-Q is reset to either '000' or '001' during checkpoint allocation. Bit-Q changes state based on CSN advancement around A-ring 312. Table 3 show Q-bit states and transition.

TABLE 1

Structure of Exemplary Checkpoint Allocation Registers (CHKPNT_REG_i).

| i | 1-bit | 1-bit | 3-bit | 1-bit | 6-bit |
|---|---|---|---|---|---|
| 0 | V | CP | Q | GT | NSN |
| 1 | V | CP | Q | GT | NSN |
| . | . | . | . | . | ... |
| . | . | . | . | . | |
| . | . | . | . | . | |
| 14 | V | CP | Q | GT | NSN |
| 15 | V | CP | Q | GT | NSN |

TABLE 2

Possible States for Exemplary Checkpoint Register (CHKPNT_REG_i).

| V | CP | GT | Description |
|---|---|---|---|
| 0 | X | X | Checkpoint has not been allocated. CP and GT are not valid. CP is always set to zero if the checkpoint is not active. |
| 1 | 0 | 0 | Checkpoint has been allocated. CSN is less than this checkpoint serial number at allocation, and CSN has not yet advanced past the checkpoint. |
| 1 | 0 | 1 | Checkpoint has been allocated. CSN is greater than the checkpoint serial number at allocation, and CSN has not yet advanced past the checkpoint. |
| 1 | 1 | X | Checkpoint has been allocated. CSN has passed the checkpoint. GT is not valid (don't care). If the next checkpoint is also in "11X" state, then this checkpoint can be retired. |

TABLE 3

Exemplary Q-bit States and Transitions

| Q-State | State Description |
|---|---|
| 000 | Initial state of a currently formed checkpoint if 0 < CSN < 32 during checkpoint allocation. |
| 001 | Initial state of a currently formed checkpoint for 31 < CSN < 64 during checkpoint allocation. |
| 010 | State of a checkpoint where CSN has advanced across the 63/0 boundary once since allocation. |
| 011 | State of a checkpoint where CSN has advanced across the 63/0 boundary twice since allocation. |
| 1XX | State of a checkpoint where CSN has advanced across the 63/0 boundary twice, and CSN is currently less than 32. X indicates don't care. |

B. Checkpoint Allocation

On allocation of a checkpoint for an instruction SN, Checkpoint Allocation Logic Unit 351 sends a signal to Checkpoint Register and Control Unit 352 which sets the V-bit to "1" in CHKPNT_REG_i to "1" to indicate that checkpoint "i" is valid and has not been retired and sets the CP-bit to zero. The checkpoint which is to be allocated is determined in CAL 351 by the CHKPT_AVAIL signal sent to ISU 200 which tells ISU the next checkpoint number(s) available for allocation (CHKPNT_SN) and by DO_CHKPNT from ISU which includes a make checkpoint enable signal and identifies the instruction serial number for which the checkpoint is made (CHK_LOCATION). Bit-Q is written to indicate the location of CSN at the time the checkpoint is allocated as shown in Table 3 below. This information is used to detect CSN transition from around the ring (e.g. from location 63 back to location 0). The checkpoint which is allocated is determined by a signal DO_CHKPNT which identifies the checkpoint serial number and serves as an enable signal. In addition, the serial number corresponding to the checkpoint is calculated by checkpoint Allocation Logic Unit 351 but only the serial number incremented by one (NSN=SN+1) is stored in the register. Serial number NSN is used in two different conditions. First, NSN becomes an incremented checkpoint serial number signal (CHKPNT_SN_INC) on data bus to ICRU 301. Second, NSN is used to determine whether faulting instructions lie in the instruction slot following the checkpoint. Saving NSN (SN+1) rather than SN in the register saves logic and speeds up generation of signals that identify the serial number after the checkpoint. Alternatively, SN itself could be stored in the register and logic provided to generate the incremented serial number signal.

The following checkpoint allocation procedure is exemplary. If the make checkpoint signal is asserted (DO_CHKPNT), then the V-Bit field is set to "1" (CHKPNT_REG_i[V_field]=1and the CP_bit filed is cleared (CHKPNT_REG_i[CP_field]=0. Then the instruction serial number for which the checkpoint has been created is derived from the encoded four-bit checkpoint location vector and stored in the checkpoint serial number field (CHKPNT_REG_i[SN_field]). For example, in an embodiment of the CPU 51 '0000' designates checkpoint location NISN; '0001' designates NISN+1; '0011' designates NISN+2; '0111' designates NISN+3; and '1111' designates NISN+4.

C. Checkpoint Retirement

Checkpoints are cleared or retired in the Checkpoint Clear/Retirement Logic Unit 353. Checkpoint 303 will only require as many checkpoints per cycle as are requested by ISU 200. A checkpoint is retired by clearing the V-bit field in Registers 352 in response to CSN passing the current checkpoint (n) and the next checkpoint (n+1). Checkpoint Allocation Logic Unit 353 maintains a pointer called OLDEST_ACTIVE_CHECKPOINT which is used to point to the checkpoint which will be retired in Checkpoint register 352. The checkpoint retirement procedure is as follows. A signal called "CSN_PASSED" is generated in Retire Logic 353 by computing the difference between the serial number stored in the checkpoint (CKPSN) and the committed serial number (CSN) pointer (e.g. CKPSN-CSN). CSN is maintained in ICRU 301 and sent to Checkpoint Unit 303 each cycle. Checkpoints can only be retired when CSN advances past a given checkpoint (n) and the temporally next checkpoint (n+1), or if there is a machine backup past the checkpoint serial number.

In one embodiment of the inventive structure and method, CSN advancement past the checkpoints is determined by providing logic that simultaneously compares CSN with all checkpoint serial numbers. In making the comparison, the wrap around character of A-ring 312 is considered (modulo-ring length) so that simple greater than tests are may be insufficient to determine whether CSN has passed a checkpoint serial number is some cases.

D. Checkpoint Maintenance On Machine Backup

In response to receiving WILL_BACKUP and BACKUP_CHECKPOINT signals from Backtrack 305 that tell Checkpoint Unit 303 to prepares a KILL_VEC signal for the beginning of the next machine cycle. KILL_VEC kills instructions that have not been committed. The instructions to be killed are derived from the BACKUP_CHECKPOINT signal which specifies the instruction serial number of the instruction at the checkpoint, and ISN which indicates the last committed instruction. All those instructions between CSN and the backup checkpoint will be killed.

In one embodiment of the CPU 51, BACKUP_CHECKPOINT is a signal generated by the Backup Unit 402 within Backtrack 305 and tells the CPU 51 which checkpoint to backup to in order to restore state. An instruction kill vector signal (KILL_VEC) is also generated by Backtrack to indicate which of the instructions between ISN and the backup checkpoint are to be killed. For example, the instruction kill vector may be a multi-hot signal with the hot bits identifying the instructions to be killed. Other signal forms may alternatively be used.

Checkpoint 303 provides checkpoint register information (CHKPNT_SN) that identifies the checkpoint serial number to ICRU 301 so that it can adjust ISN during a backup. Checkpoint Unit 303 also provides the serial number is used by ICRU 301 to adjust ISN when an unfinished floating-point exception or a data breakpoint exception are detected (CHKPNT_SN_INC).

E. Timeout Checkpoint Enhancement

In conventional checkpointing techniques, checkpoint is made based on decoded attributes of an instruction. Checkpoints are made only for certain instruction attributes so that the number of instructions between successive checkpoints (within a checkpoint boundary) is unbounded. When a instruction execution exception occurs, the CPU 51 may have to expend many machine cycles to restore CPU 51 state prior to the faulting instruction. As a consequence, the time the CPU 51 spends re-executing or undoing instructions before reaching the faulting instruction becomes a function of the instruction window size and the number of instructions within the checkpoint boundary. Instruction window size in this context means the maximum number of instruction allowed to be outstanding in the CPU 51 at any time. (In the exemplary CPU 51, up to sixty-four instructions may be outstanding in the machine at any time.)

In this enhancement to the inventive structure and method, a checkpoint is made, not based (only) on decoded instruction attributes, but rather (in addition) due to a timeout condition in the CPU 51. The timeout condition is based on the number of instruction issue cycles that have passed without forming a checkpoint. For example, no checkpoint has been formed because recently issued instructions have not been of the type that are conventionally checkpointed. Timeout checkpointing limits the maximum number of instructions within a checkpoint boundary. As long as the instruction window size is greater than the maximum number of instructions within a checkpoint boundary, the processor can restore checkpointed state faster than conventional instruction decode based checkpoint techniques in the event of an exception. Furthermore, the inventive checkpointing enhancement eliminates the CPU 51 state restoration dependency on instruction window size.

Timeout Checkpoint may be used in a structure and method implementing conventional checkpoints, or the inventive rename map checkpointing. Furthermore, timeout checkpoints may be used with conventional processor backup techniques as well as with the inventive backup and backstepping structure and method.

Timeout Counter 355 receives INSTR_ISSUED signal from ISU 200 that indicates that at least one instruction was issued during that machine cycle and counts the number of instructions issue. When the number of instruction issue cycles that have passed without forming a checkpoint (either a checkpoint based on instruction decode or an earlier timeout checkpoint) exceeds a predetermined count, it sends TIMEOUT_CHKPNT signal to ISU that a timeout condition has occurred, and that a checkpoint should be formed. The ISU 200 then generates a DO_CHKPT signal from ISU if and only if a checkpoint is actually formed. The maximum number of instructions allowed within a checkpoint boundary is determined by the maximum instruction issue rate (maximum number of instructions issued per machine cycle) and the timeout value of the counter.

Variations on the timeout checkpoint may be advantageous. For example, of one of the instructions due to be issued in the same cycle as the timeout checkpoint is due, the instruction decode based checkpoint may be preferentially made and serve to reset the timeout counter. Furthermore, if all checkpoints are allocated at the time a timeout checkpoint becomes due, the timeout checkpoint may be delayed according to predetermined rules (e.g. delay one cycle) rather than stalling the machine as might be required to maintain precise state for an instruction decode type checkpoint.

F. Maintaining and Restoring Precise State at Any Instruction Boundary

The method of the present invention permits maintenance of precise state at any <u>instruction</u> boundary and also minimizes the amount of information required to restore state at the instruction boundary. As used in here, an "instruction boundary" corresponds to the point in the sequential set of instructions just before (or just after) an instruction is issued. Each and every instruction creates an instruction boundary.

Conventional instruction checkpoints permit maintenance of precise state at <u>checkpoint</u> boundaries (i.e. only at checkpointed instructions) in the processor but conventional checkpointing has not been used at every instruction, and even if so used would hinder rather than improve CPU 51 performance because for a machine issuing multiple instructions per machine cycle, an equal multiple of checkpoints would be required for each cycle. In the present invention various instruction issue rules are implemented so that only one instruction ever need be checkpointed each cycle, and the backstep method and structure provides the finer instruction level restoration. Instruction checkpoints are used to preserve and later restore architectural (machine) state, such as state which may be incorrectly modified by a speculative instruction sequence.

Conventional checkpointing that maintains precise state at checkpoint boundaries is known; however, conventional checkpointing when used as the only method of capturing and later restoring machine state does not permit maintenance of precise state at the more closely spaced instruction boundaries during speculative out-of-order execution.

G. Method of Syncing Machine for Predetermined Instructions to Reduce Amount of Checkpointed Data Checkpoints are a fixed size independent of the instruction type or operands for which they are created. For example, in a machine (CPU) having instructions that may alter 200 state values, every checkpoint created must store those 100 state values even if the instruction itself will at most modify eight values. In an embodiment of the invention, novel structure and method are implemented to reduce the amount of checkpointed data in all checkpoints by taking into account the amount of state modified by each particular instruction and the statistical frequency which the each particular instruction occurs in typical processing.

Using this design technique, an optimum checkpoint size may be determined and implemented in the machine. First, the state modifiable by each instruction is determined. Second, the statistical frequency at which each particular instruction occurs for some representative nominal processing task is determined. The state storage requirements for each instruction are examined. The design goal is to identify those instructions that are rarely issued and require relatively larger amounts of checkpoint storage than more frequently occurring instructions. Any linear or non-linear optimization technique may be used to determine which instructions to checkpoint, and non-mathematical rules based on some maximum checkpoint storage may also be used to achieve a reduction in checkpointed state. A simplified example is described below:

| States that may be modified by any instruction in the instruction Set | | | | | | | | | |
|---|---|---|---|---|---|---|---|---|---|
| state1 | state2 | state3 | state4 | state5 | state6 | state7 | state8 | state9 | state10 |
| States that may be modified (mod) by instruction A: | | | | | | | | | |
| mod | — | — | mod | — | — | — | — | — | — |
| States that may be modified (mod) by Instruction B: | | | | | | | | | |
| mod | — | — | — | — | — | — | — | — | — |
| States that may be modified (mod) by Instruction C: | | | | | | | | | |
| — | mod | mod | — | mod | mod | mod | — | mod | mod |
| States that may be modified (mod) by Instruction D: | | | | | | | | | |
| — | — | — | — | — | — | — | mod | — | — |

If each of instructions A, B, C, and D are checkpointed then every checkpoint must store all of states 1–10. However, if Instruction C is rarely executed so that the CPU 51 slowdown necessitated by syncing the machine during execution of that instruction occurs only rarely, then not checkpointing Instruction C reduces the checkpointed state from ten states to three states: state 1, state 4, and state 8.

Syncing the machine involves delaying issuance of any instruction that requires machine sync until pending instructions have committed and been retired and then executing instructions requiring sync sequentially and in-order. When the machine is run in sync mode, instruction checkpointing is not required to maintain precise state because exception conditions are identified before writeback to state is made.

H. Method of Checkpointing Register Rename Map to reduce amount of Checkpointed Data Furthermore, conventional checkpoints contain large amounts of information because the entire state of the machine at the time the checkpoint was generated is stored so that machine state can be restored to recover from a mispredicted branch, fault, execution error, or other anomaly in processing. No attempt is made in conventional checkpointing methods to modify only the state that changes.

For example, if conventional checkpointing methods were applied to each instruction in the CPU 51 that permitted sixty-four concurrently issued instructions, then up to sixty-four checkpoints would have to be maintained, one for each of the instructions, and as many as four checkpoints would have to be created per machine cycle in a four-issue machine. Although the particular type and amount of state stored in a conventional checkpoint will depend on the CPU 51 architecture and the instruction set, each conventional checkpoint contains state information for every state that may be modified by any instruction. That is, a conventional checkpoint contains state information for every modifiable state independent of whether the instruction can modify that state or not. In conventional checkpointing methods, all of the machine status required to restore machine state are rewritten for each checkpoint, not just the status that changes from checkpoint to checkpoint.

In the inventive method, registers are renamed and the Rename Maps are stored in a register rename map. Register renaming is described elsewhere herein. Register renaming is a method of mapping architectural registers to greater number of physical registers that serves to effectively increase the number of architectural registers available for processing. In the inventive method, the amount of storage required for a new checkpointing method is reduced by checkpointing the renamed registers rather than the data values themselves. As described, certain predetermined instructions that would require large amounts of checkpointed state to maintain precise state cause the machine to sync so that all previously issued instructions have executed, committed, and had their resources retired (ISN=CSN= RRP). If the synced type instruction faults is mispredicted, then state will not be modified and either the fault can be handled or an alternative instruction path can be pursued before the instruction execution results are permitted to modify state.

Figure 26:
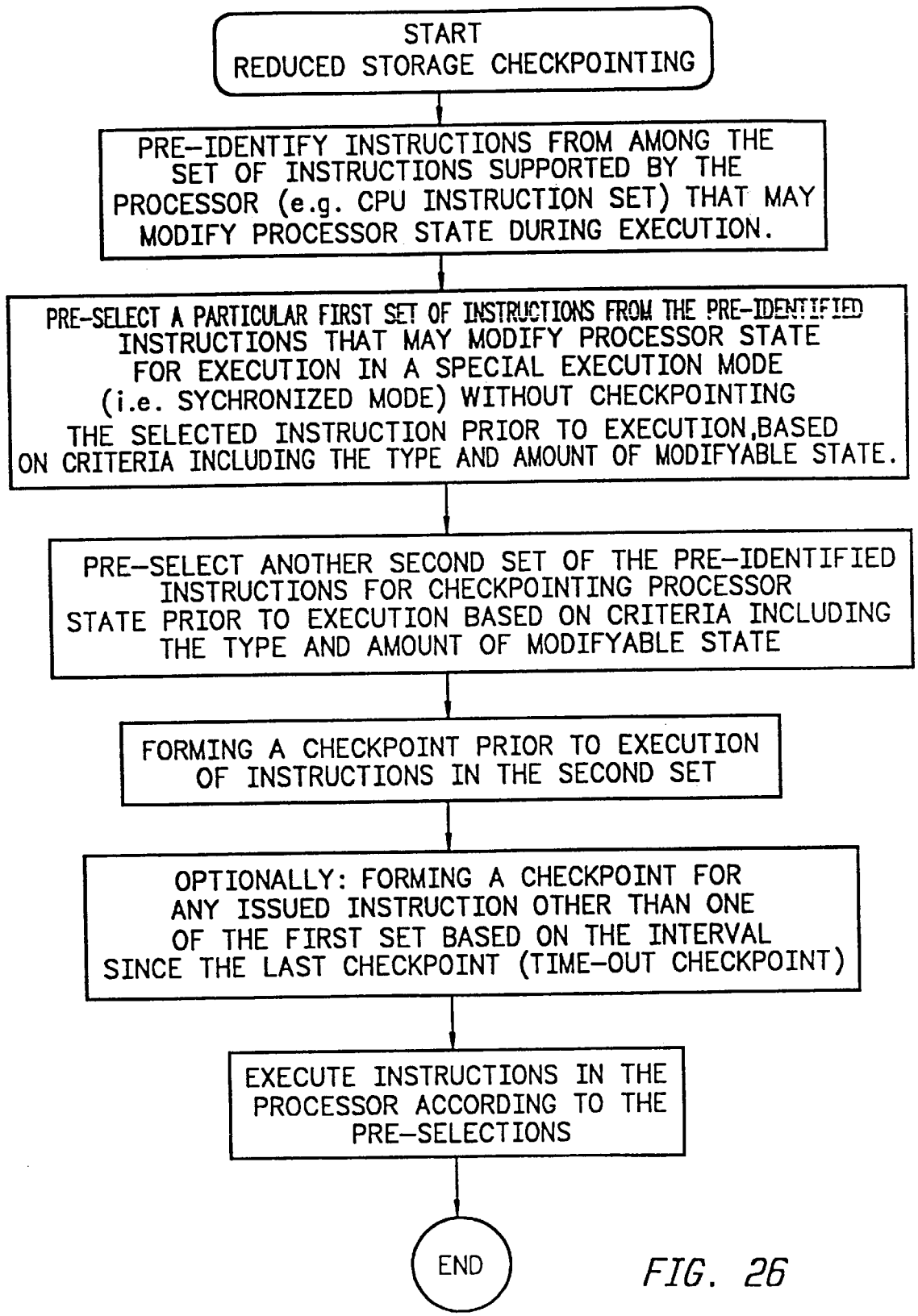
FIG. 26 is a diagrammatic flow-chart of an embodiment of the inventive method for checkpointing including an optional checkpointing enhancement for forming a time-out checkpoint.

All state modified by non-sync requiring instructions which may modify control registers are checkpointed so that machine state may be quickly restored. All state modified by the instructions is checkpointed and stored locally within the CPU 51 as described. Furthermore, state for execution of instructions which do not modify control registers may be restored by backstepping the CPU 51 as described elsewhere in this specification. FIG. 26 is a diagrammatic flow-chart of an embodiment of the inventive method for checkpointing including an optional checkpointing enhancement applicable to other checkpointing methods for forming a time-out checkpoint.

RECOVERY FROM MISPREDICTS AND EXCEPTIONS

As was alluded to earlier, at times, program control mispredictions and exceptions may occur in the instruction pipeline of FIG. 5. These errors must then be detected and an handle so as to return the CPU 51 to the state it was in just prior to the instruction that caused the misprediction or exception.

A. Misprediction Detection with Watchpoint for Simultaneous Plural Unresolved Branch/Jump-and-Link Instruction Evaluation For the processors which can execute instructions speculatively, branch direction (taken or not-taken), or branch address (target address or address next to the branch instruction) can be predicted before they are resolved. Later, if these predictions turn out to be wrong, the CPU 51 backs up to the previous state, and then begins executing instructions in the correct branch stream. In conventional processors, plural branches are often ready to evaluate in one cycle; however, these conventional processors evaluate only a single branch prediction per cycle. Not-selected branch evaluations which are ready for evaluation must therefore be delayed. Delaying branch evaluations detracts from CPU 51 performance and evaluating branches as early as possible can significantly improve performance.

The inventive Watchpoint structure and method provides several advantages over conventional techniques. First, it can monitor or watch a plurality of predicted branch or jump-and-link (JMPL) addresses for which predicted branch or jump-and-link instructions are waiting by simultaneously monitoring or watching data forward buses from a plurality of execution units. Third, it can generate a plurality of misprediction signals of branch or jump-and-link instructions simultaneously. Fourth, it can store alternate branch address or predicted jump-and-link address in a single shared storage area. Fifth, it sends the correct branch address or jump-and-link address for instruction fetch when misprediction is detected by Watchpoint.

Figure 27:
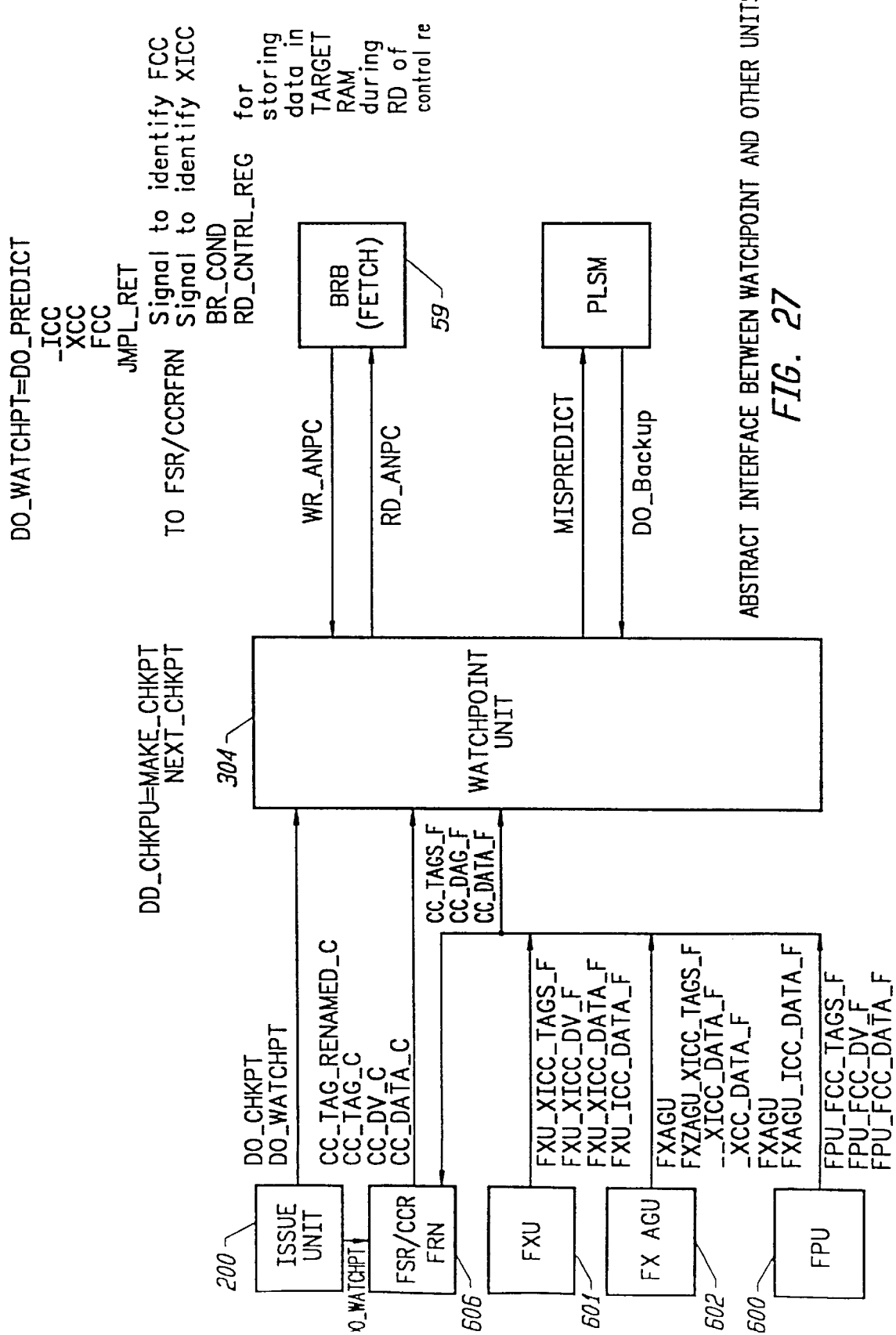
FIG. 27 shows a functional block diagram of the major functional blocks within an embodiment of the Watchpoint Unit.

Referring to FIG. 27, Watchpoint (WPT) 304 is responsible for monitoring the execution and prediction status of each issued checkpointed control transfer instruction. Therefore, WPT 304 receives a DO__CHKPNT signal along with a DO__WTCHPT signal that includes condition code information for branch, annulling branch, and jump-link instructions including condition information for Br Xcc, condition Br Icc, condition Br Fcc, JMPL rt(l) (rd=0), and read/write to control registers (except CCR and FSR registers). Condition code information is later used by WPT 304 in determining whether an instruction sequence was properly predicated or needs to be undone. WPT 304 is discussed in greater detail elsewhere in this specification.

Watchpoint Unit 304 is responsible for monitoring or watching execution completion signals arriving over the data forward busses from DFB 62 and informing other CPU 51 units when predetermined events are detected, such as branch mispredictions for example. Watchpoint Registers 491 within Watchpoint Unit 304 are multipurpose. They check branch predictions, JMPL predictions, and supply a correct branch/JMPL address to BRB 59 for refetching instructions after a backup when the original prediction was incorrect. They are called "Watchpoint" registers because they sit on data forward distribution buses and monitor results from the several execution units (FXU, FPU, LSU, and FXAGU). There are sixteen watchpoint registers, one for each checkpoint.

An exemplary Watchpoint Unit 304 is described with respect to a CPU having an integer execution unit (FXU) and integer and address generation execution unit (FXAGU) and a floating-point execution unit (FPU). Those workers having ordinary skill in the art, in light of this description, will realize that more, fewer, or different execution units may be implemented. In particular, to match the execution units of the exemplary CPU 51, an additional FXU and FXAGU would be provided.

FIG. 27 shows a functional block diagram of the major functional blocks within Watchpoint Unit 304. Fetch Unit (FETCH) within BRB 59 fetches instructions and feeds them to ISSUE 200, and also predicts branches and JMPL's based on a decode of the instruction. Issue 200 sends DO__CHKPNT signals to Watchpoint 304 and to FSR/CCRFRN 606 and DO__WTCHPT signals to Watchpoint 304. FSR/CCRFRN is responsible for condition code renaming (CC-renaming). DO__CHKPNT includes a MAKE__CHKPNT signal that initiates checkpoint formation and a NEXT__CHKPNT signal that identifies the checkpoint number to be formed. The DO__WTCHPT signal informs Watchpoint 304 that a branch or JMPL instruction has been issued and identifies the branch type, the condition field in the issued instruction, the Condition Code (CC) tag, and the Alternate Next Program counter address/predicted jump and link instruction address (ANPC/predicted JMPL address) of the issued instruction. FETCH also sends branch/JMPL addresses to Watchpoint 304 in the form of the WR-ANPC signal within the DO__WTCHPT signal. When a branch or JMPL or other control transfer instructions (branch/JMPL) is issued, ISU 200 sends a branch/JMPL instruction issued signal (DO__WTCHPT) signal for each predicted branch or JMPL issued which includes the signal JMPL. WP__ANPC is written into the Target-RAM and indicates the target FPC computed by PC logic 106. The ANPC is determined during instruction decode of predicted branch and JMPL instructions. For a JMPL instruction, the WP__ANPC sent to Watchpoint within the DO__WTCHPT signal is the predicted target FPC. For a predicted branch instruction, the WP__ANPC sent to Watchpoint within the DO__WTCHPT signal is the alternative FPC, that is the FPC for the alternative branch direction. The RD__ANPC output from the ANPC Output Logic within Watchpoint is used during a Backup to compute FPC, APC, and NAPC when a misprediction occurs. The Condition Code (CC) portion of Rename 600 (referred to as FSR/CCRFRN 606) manages CC register renaming and sends CC-renaming signals to Watchpoint 304 after instruction issue. The CC-renaming signals include CC__TAG__RENAMED__C,CC__TAG__C, CC__DV__C, and CC__DATA__C as defined below.

Each of the execution units (FXU 601, FXAGU 602, and FPU 600) sends condition code tag (CC__TAGS__F), condition code data valid (CC__DV__F), and condition code data (CC__DATA__F) over the data forward busses to both Watchpoint 304 and to FSR/CCRFRN 606. Tag, data valid, and XCC and ICC data signals from FXU include FXU__XICC__TAGS__F, FXU__XICC__DV__F, FXU__XCC__DATA__F, and FXU__ICC__DATA__F. Signals from FXAGU include FXAGU__XICC__TAGS__F, FXAGU__XICC__DV__F, FXAGU__XCC__DATA__F, and FXAGU__ICC__DATA__F. Signals from FPU include FPU__FCC__TAGS__F, FPU__FCC__DV__F, and FPU__FCC__DATA__F. Examples of XCC, ICC, and FCC condition codes and formats are described in the SPARC-V9, for example.

Figure 28:
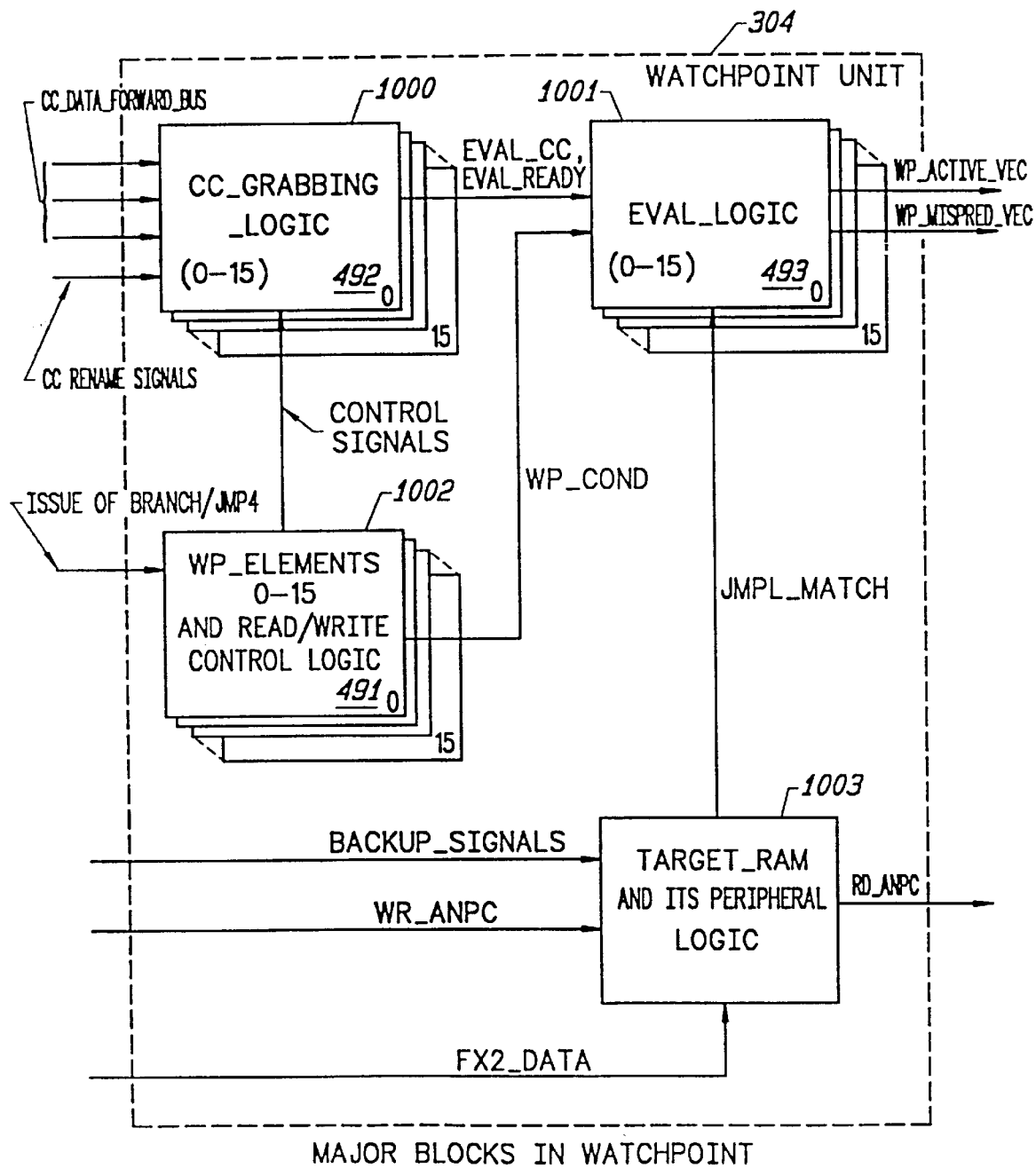
FIG. 28 shows an embodiment of the Watchpoint Unit showing particular embodiments of the Condition Code grabbing Logic, Evaluation logic, Watchpoint Elements Storage and Control Unit, and Target RAM.

In reference to FIG. 28, Watchpoint 304 includes CC-Grabbing logic 1000 which grabs condition codes directly off of the CC data forward busses from the execution units (FXU, FPU, and FXAGU) or from renamed CC signals arriving from FSR/CCRFRN 606, Watchpoint storage elements 1002 and associated read/write control logic are responsible for storing watchpoint information including predicted condition code data arriving from BRB 59 whenever branch or JMPL instructions are decoded, and Evaluation Logic (Eval-Logic) 1001 which is responsible for performing comparisons of the computed or actual condition codes arriving from the execution units (directly or via the rename unit) and comparing tem with the predicted condition codes stored in the individual Watchpoint storage elements 1002. Target-RAM and its associated control and comparison logic 1003 participate in recovering from a branch or JMPL misprediction as described in greater detail below. CC-Grabbing logic 1000, Eval-Logic 1001, and WP-Elements 1002 comprise sixteen separate structures, one for each of the sixteen Watchpoints that may be allocated in the exemplary CPU 51. Only a single Target-RAM 1003 data storage structure is provided.

Several data elements are stored for each of the sixteen Watchpoints. Data stored for each watchpoint includes a watchpoint valid bit (WP_VALID[i]=1) that is set upon watchpoint activation, a instruction type data to distinguish branch instructions from JMPL instructions (WP_JMPL [i]=1 indicates that a JMPL requires the watchpoint, WP_JMPL[i]=0 indicates the watchpoint is formed for a predicated branch), condition field in the instruction (WP_COND[i]), and storage for WP_XCC, WP_ICC, and WP_FCC. In one exemplary embodiment, these data elements are stored in latches. CC-tags are stored in CC_TAG_ARRAY, and "ANPC" (Alternate Next Program Counter address)/predicted JMPL (jump and link instruction) addresses are stored in the Target-RAM. Valid is written by watchpoint logic, branch type, COND, CC-tag, and ANPC/JMPL address are derived from DO_WTCHPT signals received from ISU 200. In response to DO_WTCHPT, a watchpoint storage element 491 is activated for each branch/JMPL instruction and Field Selection and Write Logic decodes DO_WTCHPT signals and writes the branch type, COND field, CC tag, and the ANPC/predicted JMPL address into Watchpoint.

Watchpoint entries can be activated by setting the Valid-bit to "1", unless all checkpoint elements have already been allocated at that cycle, in which case issue of the instruction requiring a watchpoint (and checkpoint) is delayed. Multiple watchpoint elements can be active (valid) at the same time, and all watchpoint entries which are valid (VALID field set) can be evaluated and generate misprediction signals simultaneously in each cycle. Watchpoint 304 can store either one of ANPC for branch instructions, or predicted target address for JMPL instructions in the same storage location in order to reduce chip area allocated to data storage. How the allocated multipurpose watchpoint register is actually used depends on the content of the DO_WTCHPT signals from ISU 200, that is whether the watchpoint entries are formed for a predicted branch or for a predicated JMPL instruction. Watchpoint registers self-deallocate as branch and jump predictions evaluate.

A Watchpoint element is allocated by Watchpoint Unit 304 whenever an instruction may result in a mispredict such as may occur for a conditional branch instruction. Every Watchpoint element has a corresponding checkpoint element but the converse is not always true. A Checkpoint may not have a corresponding active watchpoint entry because a watchpoint element is allocated whenever an instruction may result in a mispredict, for example, in the case of a conditional branch. Since checkpoints may be allocated for other than instructions that may result in a mispredict (such as "SAVE" instruction, or when a periodic "timeout" checkpoint is formed for other than a branch instruction) not all checkpoints have watchpoints. Watchpoints are stored in one of a plurality of Watchpoint Elements 432 within Watchpoint Unit 304. A Checkpoint Register is provided to store Checkpoint information; however, the actual checkpointed machine state is stored locally throughout the CPU 51 as described. Table 4 shows an example of the type of information stored by serial number in Checkpoints and the corresponding Watchpoints, if any, for a set of exemplary instructions.

Condition Code Grabbing Logic Unit 492 is responsible for detecting and capturing Condition Codes (CC) as they appear on the data forward busses from execution units within DFB 62 and routing them to Evaluation Logic Unit 493 where the captured condition codes are compared with the condition code predicted at the time the instruction was issued and now stored in Watchpoint element 491. If the captured condition code matches the predicted condition code, then the instruction was correctly predicted and need not be undone. However, if the condition code captured by the grabbing unit does not match the predicted condition codes, then the instruction has been mispredicted and must be undone.

TABLE 4

Simplified Exemplary
Watchpoint and Checkpoint Storage

| No. | CHECKPOINTS | WATCHPOINTS |
|---|---|---|
| 0 | SN=33, BRZ, Machine State | BRZ, CC Register waiting for, CC Register Tags |
| 1 | SN=41, ADD, Machine State | - no watchpoint needed |
| 2 | SN=44, JMPL, Machine State | JMPL, Register Tags (result of jmpl addr. calc.) |
| 3 | SN=47, SAVE, Machine State | - no watchpoint needed |
| 4 | - free checkpoint | - free watchpoint |
| ... | ... | ... |
| ... | ... | ... |
| 14 | SN=28, FBGE, Machine State | FBGE, FCC we're waiting for, Register Tags |
| 15 | - free checkpoint | - free watchpoint |

Capturing and comparing condition codes from the execution units is complicated by several factors, including: out-of-order instruction sequence execution, instruction execution queuing within each execution unit, the variable number of machine cycles needed for execution of different instruction types, and variability related to the need to wait for execution resources or data for instructions even for the same instruction types. These factors, and others, result in a general uncertainty as to when instruction results and status (including error and condition code information) will actually appear on the data forward busses. Therefore, the invention includes structure and method for capturing condition code data that may appear on the busses during the same machine cycle as the instruction was issued, or during any later cycle. It also provides structure and method for capturing condition codes for renamed registers. Register renaming, including renaming condition code registers, is provided in the exemplary CPU 51 in order to eliminate registers dependencies. Therefore, Watchpoint Unit 304 receives CC data and tags directly from the data forward busses, and later from FSR/CCRFRN 606, after CC registers in CCRFRN have been updated.

In FIG. 27, two Fixed-Point Execution units (FXU and FXAGU) and one Floating Point Execution Unit (FPU) within DFB 62 are shown, but more or fewer execution units can be implemented and they may be of any type. Each execution unit is connected by a CC-data-forward bus 430 to CCRFRN 606 and Watchpoint 304. The CC-data-forward bus 430 carries the result of CC-data which is just calculated by the unit execution unit (FXU, FXAGU, and FPU). The CC-data is used to update CCRFRN. Watchpoint 304 also monitors or watches the CC-data-forward-busses and "grabs" CC-data directly from the busses rather than waiting to get it from CCRFRN in a later cycle. Grabbing the CC-data directly from the buses in this manner makes branch evaluations faster.

When branch mispredictions are detected by Watchpoint 304, it sends misprediction signals WP_MISPRED_VEC to PLSM 307 within PSU 300. PSU 300 tracks and controls the main states of the CPU 51 as described. When PSU gets misprediction signals WP_MISPRED_VEC from Watchpoint, PLSM 307 within PSU 300 selects the earliest one among the mispredictions and execution exceptions and initiates backtrack procedures as described elsewhere in this specification.

Figure 25A:
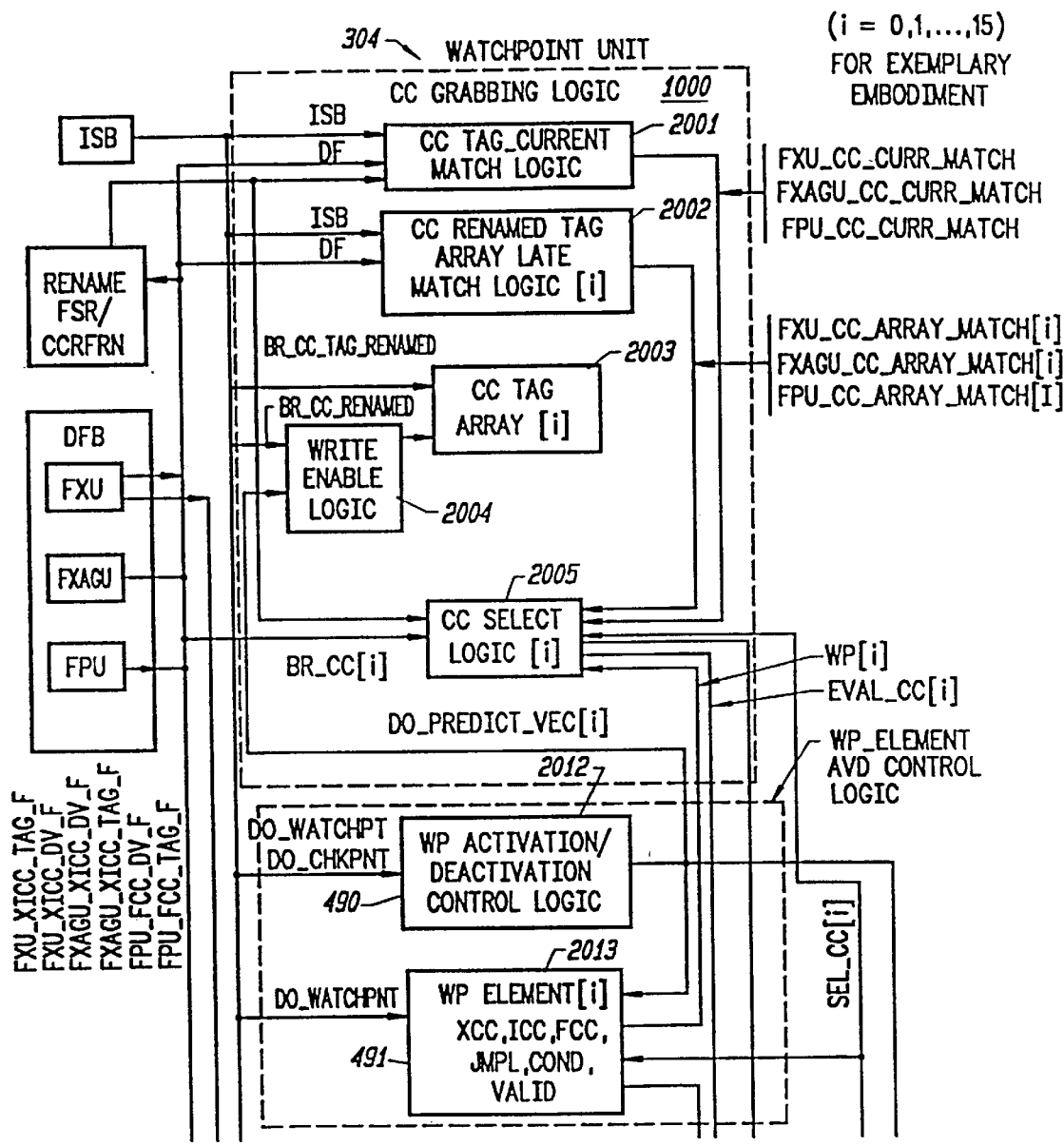
FIGS. 25A and 25B is a functional Block diagram of Watchpoint Unit.
Figure 25B:
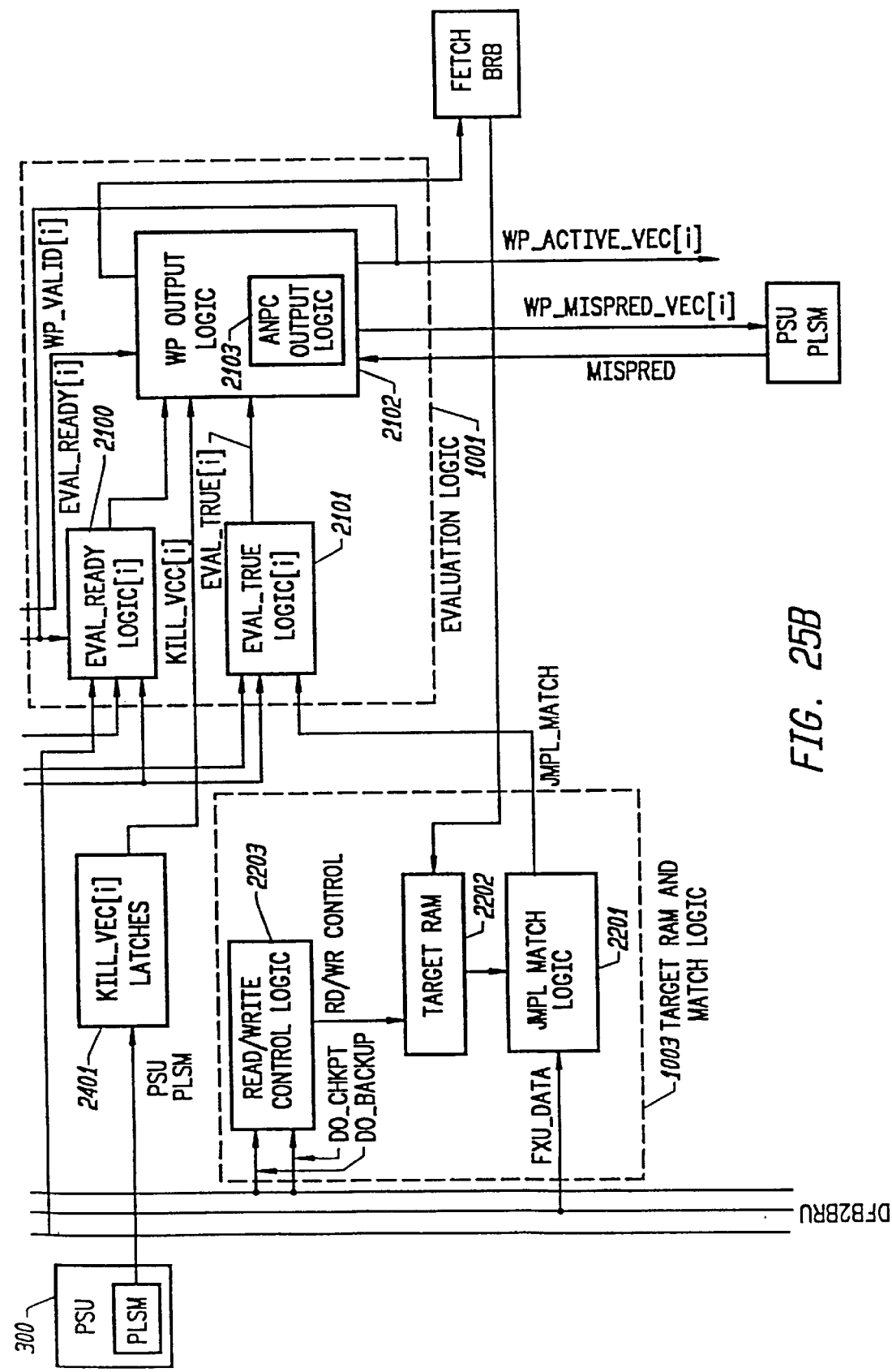

FIG. 25 shows a more detailed functional block diagram of Watchpoint 304 and interfaces to ISB, FSR/CCRFRN, Execution Units (FXU, FXAGU, and FPU) within the DFB, BRB, and to PLSM within PSU 300. Each of these major functional blocks are described in greater detail below.

1. Activation of Watchpoint Elements

Watchpoint Element and Control Logic Unit (WP-Element) 1002 includes WP Activation/Deactivation Control Logic 2012 and a set of sixteen Watchpoint Elements 2013 where each of the sixteen elements stores information pertaining to XCC, ICC, FCC, COND, JMPL/branch, and a validity indicator. When a branch/JMPL is issued and predicted, DO_WTCHPT signal is asserted by ISU 200 that includes condition code information for predicted branch, annulling branch, and jump-link instructions. "Predict a branch" means "predict a direction of branch (taken or not-taken)". "Predict a JMPL" means "predict a JMPL target address" because JMPL always changes program flow (always taken). When issuing branch/JMPL instructions, the exemplary CPU 51 makes a checkpoint identified by a checkpoint number. Once made, a checkpoint remains active until the CPU 51 completes all instruction executions for instructions lying between the checkpoint location and the next checkpoint location. The processor can have multiple active checkpoints at a time. Checkpoint information is not limited to issued branch/JMPL instructions, but may be formed in other cases, such as when taking a trap, for example.

Figure 50:
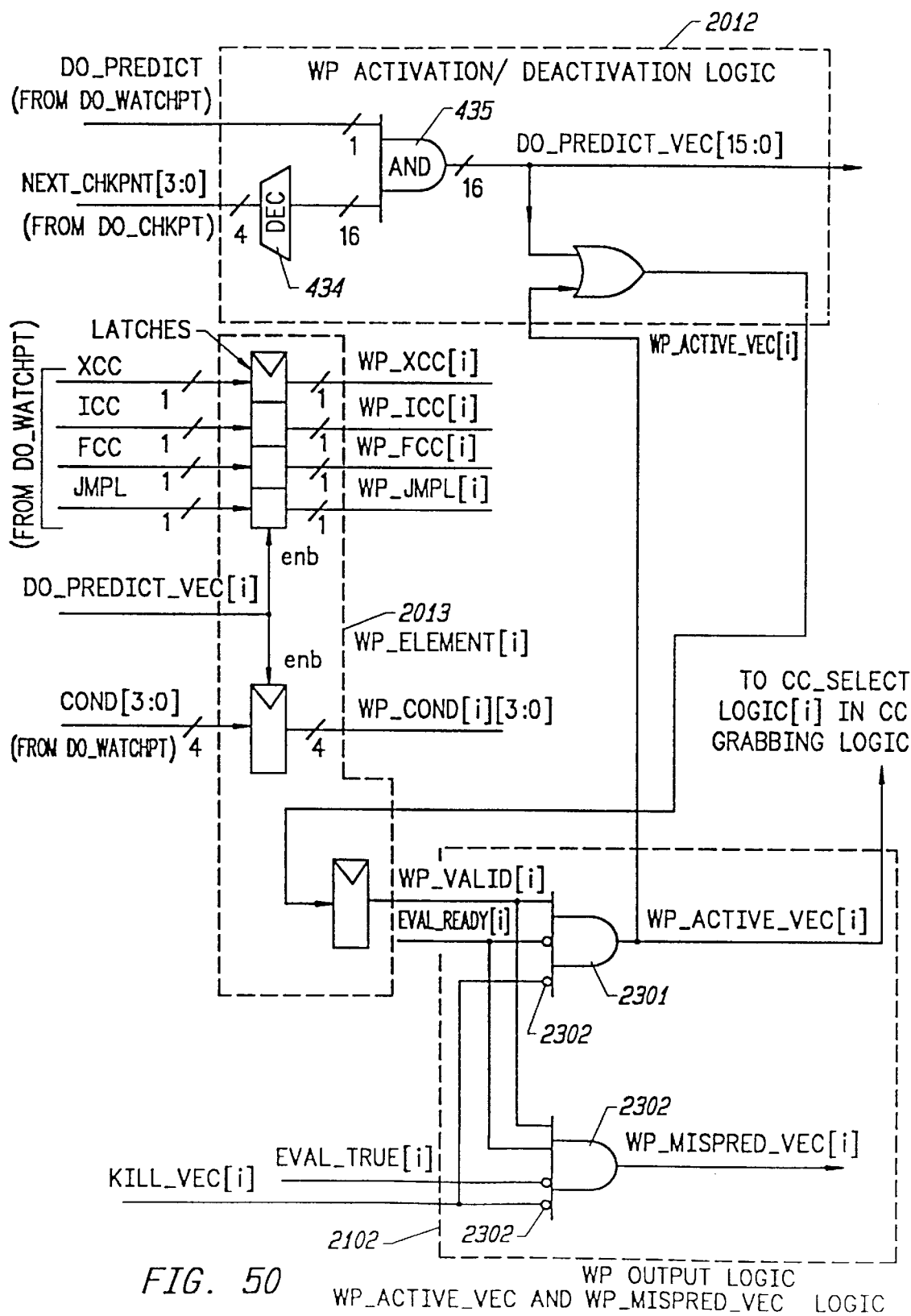
FIG. 50 shows Watchpoint WP_ACTIVE_VEC and WP_MISPRED Logic.

Each Watchpoint element 2010 corresponds to a checkpoint entry. The exemplary CPU 51 has sixteen checkpoint entries and therefore Watchpoint 304 has sixteen Watchpoint elements. Watchpoint Activation/Deactivation logic (WADL) 2012 is responsible for activating a watchpoint element in response to DO_CHKPNT and DO_WTCHPNT signals from ISU 200. DO_CHKPNT includes a MAKE_CHKPNT signal that initiates checkpoint formation and a NEXT_CHKPNT signal that identifies the checkpoint number to be formed. WADL 2012 is also responsible for deactivating a watchpoint element when the predicted branch/JMPL instruction is resolved. When ISU 200 issues a branch instruction ISU 200 asserts a MAKE_CHKPNT signal that indicates that a checkpoint should be formed, and a checkpoint number is assigned by PSU 300 and designated by NEXT_CHKPNT. As shown in FIG. 50, in order to activate one Watchpoint element, NEXT_CHKPNT is decoded by Decoder 434 and ANDed in an AND gate 435 with a DO_PREDICT signals derived from DO_WTCHPT from ISU 200. The output is called DO_PREDICT_VEC[i]. The signal DO_PREDICT_VEC[i] sets WP_VALID[i], where "[i]" indicates one of the sixteen watchpoint numbers. FIG. 50 also shows additional structural detail for a particular embodiment of the Watchpoint Unit associated with WP_ACTIVE_VEC and WP_MISPRED_VEC Logic, including a portion of the Watchpoint Output Logic 2102.

ISU 200 sends several signals to Watchpoint when a branch/JMPL instruction is issued. These signals identify the instruction as a branch that depends on XCC, as a branch that depends on ICC, as a branch that depends on FCC, as a jump-link instruction (JMPL), and the condition code filed of the branch (COND). These signals are received by Watchpoint 304 and stored in the watchpoint element designated by NEXT_CHKPNT as a component signal of DO_CHKPNT. When Watchpoint element "i" is assigned by the Watchpoint Activation Control Logic (WACL) 2012, these signals are kept in WP_XCC[i], WP_ICC[i], WP_FCC[i], WP_JMPL[i], and WP_COND[i] registers respectively. Each Watchpoint element retains these register values until the Watchpoint element is deactivated and the re-activated by another branch/JMPL instruction.

The exemplary CPU 51 can make more than one checkpoint each cycle and can issue more than one branch/JMPL instruction per cycle. Therefore, more than one Watchpoint element can be activated. For example, if a CPU 51 can make two checkpoints and issue two branches in the same cycle, two sets of DO_WTCHPT, XCC, ICC, FCC, JMPL, COND, DO_CHKPNT signals or their equivalent information content are needed.

Condition Code Formats and field definitions and JMPL (jump-and-link) instruction format and definitions are provided in SPARC V9 Architecture manual, already of record in this specification. Floating Point Condition codes having a two-bit format including bit-0 and bit-1. Integer Condition Codes are provided for XCC in bits 7-4 (N, Z, V, C respectively) and ICC as bits 3-0 (N, Z, V, C respectively). When a branch is issued and predicted "taken", COND value is same as the condition field data of the branch instruction. When a branch is issued and predicted "not-taken", a bit-3 of the COND field data is inverted, the rest of bits are unchanged, then, these become COND value.

Figure 29:
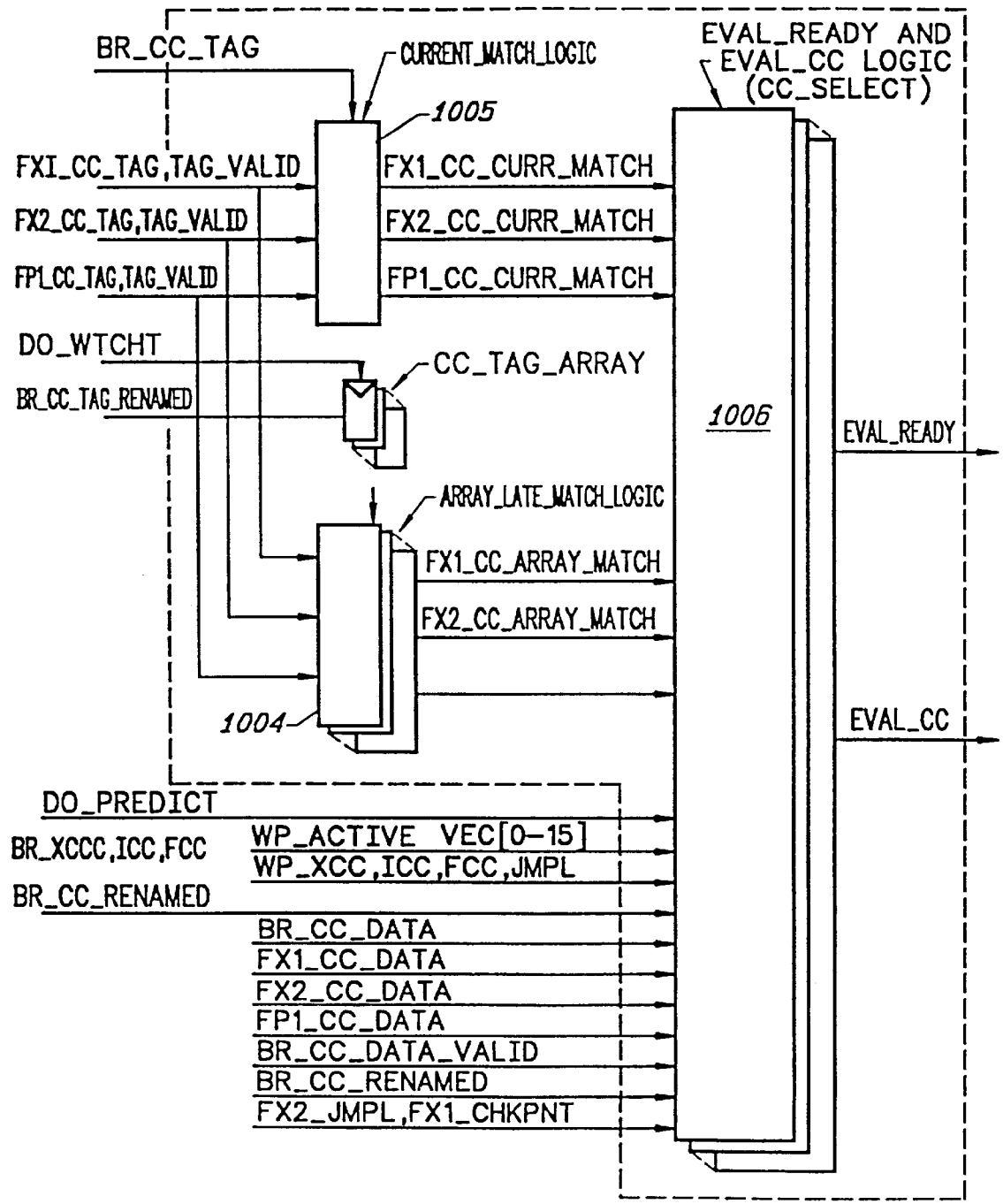
FIG. 29 shows a schematic portion of an embodiment of Watchpoint, including Current Matching Logic, Array Matching Logic, and Condition Code Select Logic which includes Evaluation Ready and Evaluate Condition Code Logic.

FIG. 28 shows a more detailed representation of the internal structure of Watchpoint 304 showing CC-grabbing Logic 1000, Eval-logic 1001, WP-elements Storage and Control Unit 1002, and target ram 1003. FIG. 29 shows a different schematic portion of Watchpoint 304, including current match logic 1005, array late matching logic 1004, and CC-select logic 1006 which includes Evaluation Ready (EVAL_READY) and Evaluate Condition Code (EVAL_CC) logic.

FIG. 30 shows a timing chart of branch prediction and evaluation. Watchpoint has a plurality of Watchpoint elements which each can hold a predicted branch/JMPL information and evaluate the correctness of the prediction. At cycle 1, a branch is issued. At cycle 2, one of the plurality of Watchpoint elements (assume element "i") is activated. Then WP_ACTIVE[i] is asserted. At cycle 5, FXU unit is returning the CC-data which the branch depends on and the Watchpoint element is waiting for. At cycle 5, the Watchpoint element i grabs the CC-data. At cycle 6, WP_ACTIVE_VEC[i] is de-asserted because the watchpoint element has grabbed the CC-data, and EVAL_READY[i] is asserted. EVAL_READY[i] enables CC-evaluation. If the prediction is correct, EVAL_TRUE[i] is asserted. If not, EVAL_TRUE[i] is not asserted. In this example, the timing diagram assumes that the prediction is not correct. Then WP_MISPRED_VEC is asserted and sent to PLSM within PSU 300. PLSM takes priority among WP_MISPRED_VEC[i] signals from all Watchpoint elements (sixteen elements in the exemplary embodiment) and execution trap signals from execution units, and takes determines the earliest event. At cycle 7, PSU 300 asserts DO_BACKUP signals which cause the CPU 51 to back up to a previous state. The DO_BACKUP signal includes a MAKE_BACKUP control signal that informs the CPU to perform the backup and a BACKUP_CHKPNT signal that identifies the Checkpoint number to which the backup will be made. FIG. 29 shows additional structural detail for a particular embodiment of the Watchpoint Unit associated with one of the plurality of watchpoint elements.

2. Watchpoint Grabbing of CC Data directly from Data Forward Busses

CC-Grabbing Logic 1000 includes CCTag Current Match Logic 2001 which receives condition code data valid and condition code tags from the data forward busses and attempts to match them with condition code tags received from ISB during the current machine cycle. Exemplary logic circuitry is shown for an embodiment of CC Tag Current Match Logic in FIG. 31.

FSR/CCRFRN 606 sends the following signals to Watchpoint: CC_RENAMED, CC_TAG_C, CC_TAG_RENAMED_C, CC_DV_C, and CC_DATA. CC_RENAMED is asserted when CC is modified by instructions issued in the current machine cycle. CC_TAG_C identifies the renamed-CC-physical tag except that CC modifications occurring in the current machine cycle are excluded. CC_TAG_RENAMED_C also means renamed-CC-physical-tag but the CC modifications occurring in the current cycle are included. CC_DV_C is asserted when CC_DATA has CC data which is modified by the previous cycle but excludes the CC modifications done in the current cycle. Therefore if CC_DV_C=1, all CC modifications done by the previous cycle are reflected in CC_DATA. Furthermore, if CC_DV_C=0, then the CC_DATA value is not up to date, and FSR/CCRFRN is waiting for the completions of instructions which were issued by the previous cycle before it grabs up-to-date CC data. The signals sent to Watchpoint by FSR/CCRFRN 606 are described in Table 6.

TABLE 6

FSR/CCRFRN 606 sends the following signals to Watchpoint:

| Signal | Description |
|---|---|
| CC_RENAMED | Asserted when CC is modified by instructions issued in the current machine cycle. Used by Condition Code Select logic. |
| CC_TAG_C | Identifies the renamed-CC-physical tag, but excludes CC modifications occurring in the current machine cycle. Used for current match. |
| CC_TAG_RENAMED_C | Identifies renamed-CC-physical-tag but includes the CC modifications occurring in the current cycle. Written into array and used for array match. |
| CC_DV_C | Asserted when CC_DATA has CC data which is modified by the previous cycle, but excludes the CC modifications done in the current cycle. Used by Condition Code Select logic. |
| CC_DATA | If CC_DV_C=1, all CC modifications done by the previous cycle are reflected in CC_DATA[7:0]. If CC_DV_C=0, then the CC_DATA value is not up to date, and FSR/CCRFRN is waiting for the completions of instructions which were issued by the previous cycle before it grabs up-to-date CC data. Used by Condition Code Select logic. |

In FIG. 31, comparison circuits 2006, 2008, and 2010 each receive CC_TAG_C signals which identifies the renamed-CC-physical tag, but excludes CC modifications occurring in the current machine cycle. Each of the comparison circuits also receives condition code tags directly from the data forward busses; FPU_FCC_TAG_F from the FPU, FXU_XICC_TAG_F from the FXU, and FXAGU_XICC_TAG_F from the FXAGU, where both the FXAGU_XICC_TAG_F and the FXU_XICC_TAG_F include both XCC and ICC parts of the integer condition code. The outputs of the comparisons are sent to AND gates 2007, 2009, and 2011 and ANDed with a data valid signal (FPU_FCC_DV_F, FXU_XICC_DV_F, or FXAGU_XICC_DV_F) which serves as a control signal. If the data valid signal is asserted then a match determined by the comparison circuits is valid and the CC current match signal (FPU_CURR_MATCH, FXU_CURR_MATCH, or FXAGU_CURR_MATCH) are asserted.

As shown in FIG. 31, CC renamed Tag Array Matching Logic 2022 includes a set of sixteen sets of comparison circuits 2015 and logic circuits to perform the AND logic function 2016 for each of the execution units (FPU, FXU, FXAGU). Whereas the Current Match Logic 2001 compares the signals from the data forward busses with CC_TAG_C, the Array Match Logic Unit 2002 simultaneously compares each of the signals from the data forward busses with CC_TAG_RENAMED_C which identifies renamed-CC-physical-tag but includes the CC modifications occurring in the current cycle. CC_TAG_RENAMED_C is written into one of sixteen CC tag array 2003 storage elements under control of a write enable signal generated by ANDing CC_RENAMED which is asserted when CC is modified by instructions issued in the current machine cycle with DO_PREDICT_VEC. Each cycle every store value of CC_TAG_RENAMED_C is compared with FPU_FCC_TAG_F from the FPU, FXU_XICC_TAG_F from the FXU, and FXAGU_XICC_TAG_F from the FXAGU to identify any matches, that is sixteen comparisons are made for each of the FPU, FXU, and FXAGU each cycle. The outputs of comparison circuits 2016 are ANDed with data valid signals (FPU_FCC_DV_F, FXU_XICC_DV_F, or FXAGU_XICC_DV_F) which serves as control signals. If the data valid signal is asserted then a match determined by the comparison circuits is valid and the CC array match signal (FPU_ARRAY_MATCH[i], FXU_ARRAY_MATCH[i], and FXAGU_ARRAY_MATCH[i] are asserted. Therefore, the CC-Grabbing Logic is able to simultaneously monitor plural unresolved branch evaluations.

FIG. 31 shows CC grabbing logic. CC_TAG_ARRAY comprises sixteen registers, each register corresponds to one of the sixteen checkpoints and has the same numbers of latches as CC_TAG_C bit number (here we assume 4 bit latches). When issuing and predicting a branch, CC_TAG_RENAMED_C is written into the location of CC_TAG_ARRAY designated by DO_PREDICT_VEC[i] derived from DO_WTCHPT. CC_RENAMED serves as a write enable signal in Write Enable and Address Selector Logic 2004, such as a AND logic gate.

The processor is assumed for purposes of this description to have two fixed-point execution units: FXU and FXAGU, and one floating-point execution unit FPU. In the exemplary embodiment, it is assumed that only FXU processes JMPL instructions. Each unit has CC-data-forward bus. FXU CC-data-forward bus comprises FXU_CC_TAG_VALID, FXU_CC_TAG, and FXU_CC_DATA. When FXU is finishing its execution which modified CC, FXU_CC_TAG_VALID is asserted, FXU_CC_TAG has its renamed CC physical tag, and FXU_CC_DATA has the result data of CC. The same thing applies to FXAGU and FPU. Condition Code (CC) data in FSR/CCRFRN unit is updated using these CC data forward buses in the next cycle. Watchpoint also grabs CC data from the data forward buses if Watchpoint elements are waiting for the CC data. CC_TAG_C is compared with FXU_CC_TAG, its match signal is ANDed with FXU_CC_TAG_VALID, and the output signal is called FXU_CC_CURR_MATCH. And also the contents or registers in CC_TAG_ARRAY are compared with FXU_CC_TAG, their match signals are ANDed with FXU_CC_TAG_VALID, and the output signals are called FXU_CC_ARRAY_MATCH[i]. For FXAGU and FPU, there are the same match functions as FXU. Operation of the Grabbing Logic is now described with reference to three instruction issue sequence examples. The exemplary CPU 51 can issue up to four instructions per cycle.

Figure 32A:
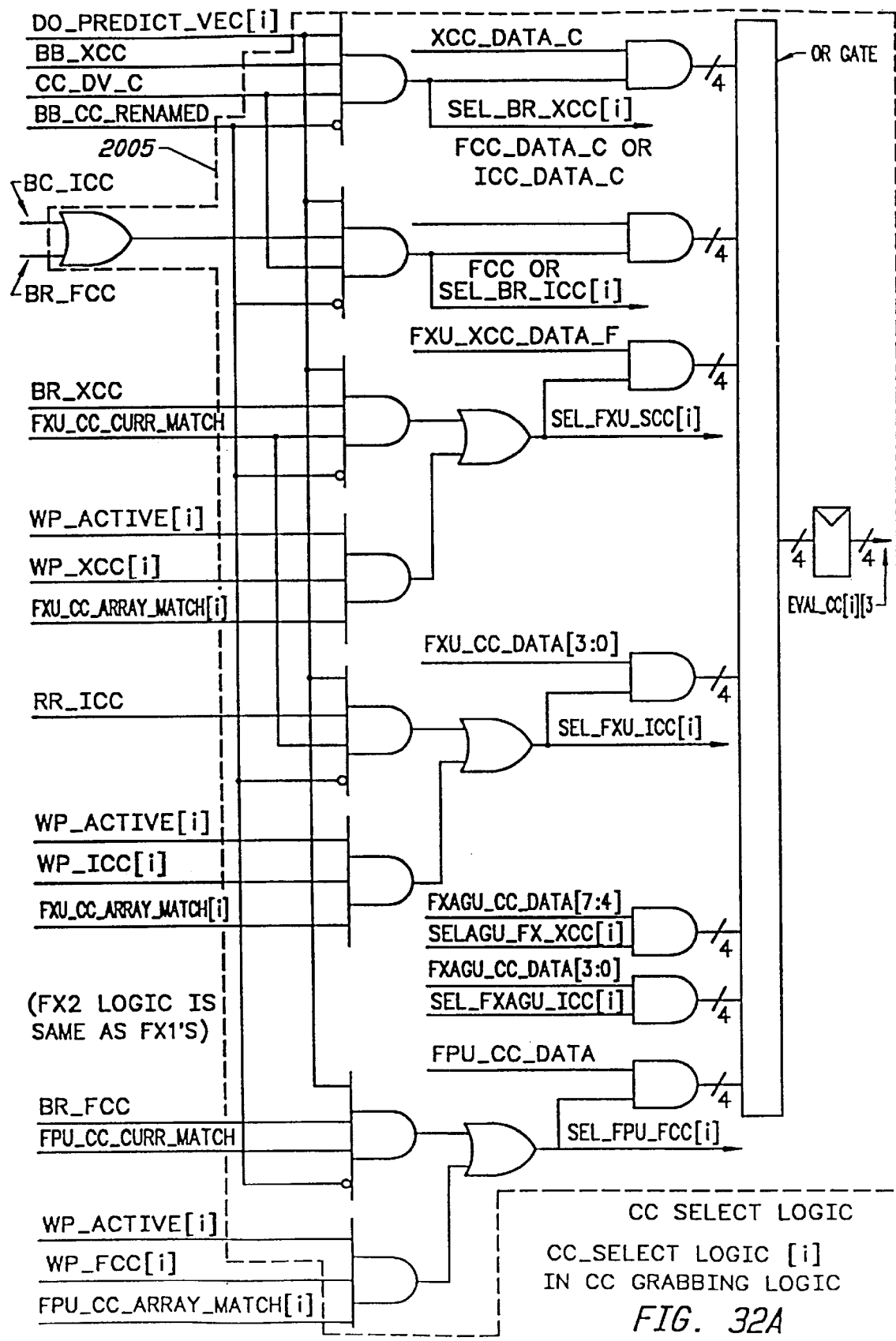

CC Grabbing Logic 1000 also includes CC Select Logic 2005 (sixteen layers, one for each watchpoint) which are responsible for generating signals based on the condition code on which the branch in that watchpoint element depends and that when asserted selects the CC data signal (for example, CC_DATA[7:4]) and also latches that data signal for evaluation in the next cycle. Exemplary logic circuitry for an embodiment of Condition Code Select Logic 2005 is provided in FIG. 32. The operation of this CC Select Logic 2005 is described with respect to three examples below.

Figure 33:
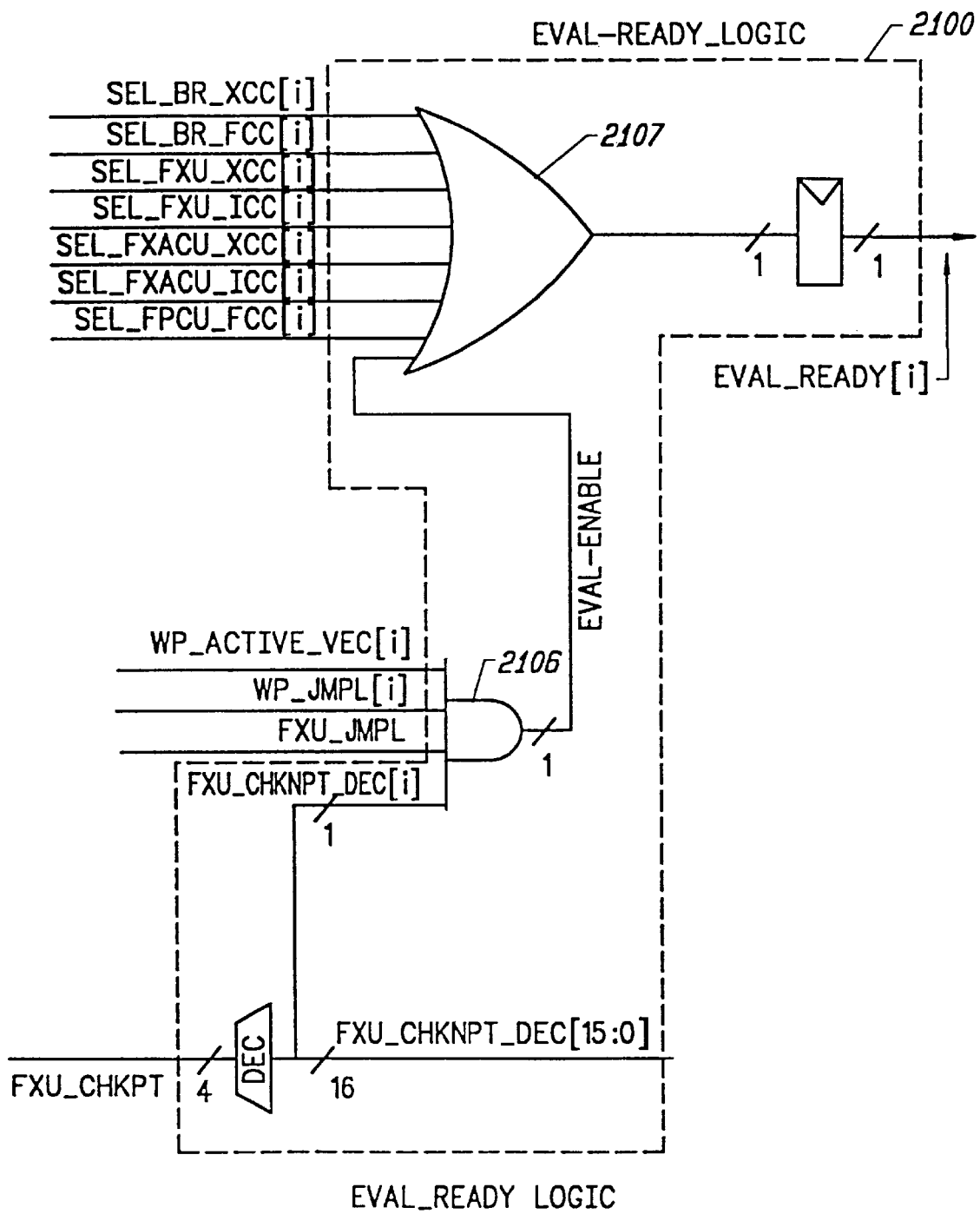
FIG. 33 shows structural detail associated with an embodiment of the Evaluation Ready Logic.

Evaluation Logic 1001 includes Evaluation Ready Logic (EVAL_READY) 2100, Evaluation True Logic (EVAL_TRUE) 2101, and Watchpoint Output Logic (WP Output Logic) 2102 as shown in FIG. 25. FIG. 33 shows additional structural detail associated with EVAL_READY Logic 2100 which receives a set of select signals (e.g. SEL_BR_XCC[i]) from CC Select Logic 2005 and an enable signal (EVAL_ENABLE) from the output of AND logic gate 2106. EVAL_ENABLE is asserted based on WP_ACTIVE_VEC[i], WP_JMPL, FXAGU_JMPL, and FXAGU_CHKPT. EVAL_READY Logic 2100 outputs an EVAL_READY[i] signal for the i-th watchpoint indicating that evaluation is ready.

Figure 34:
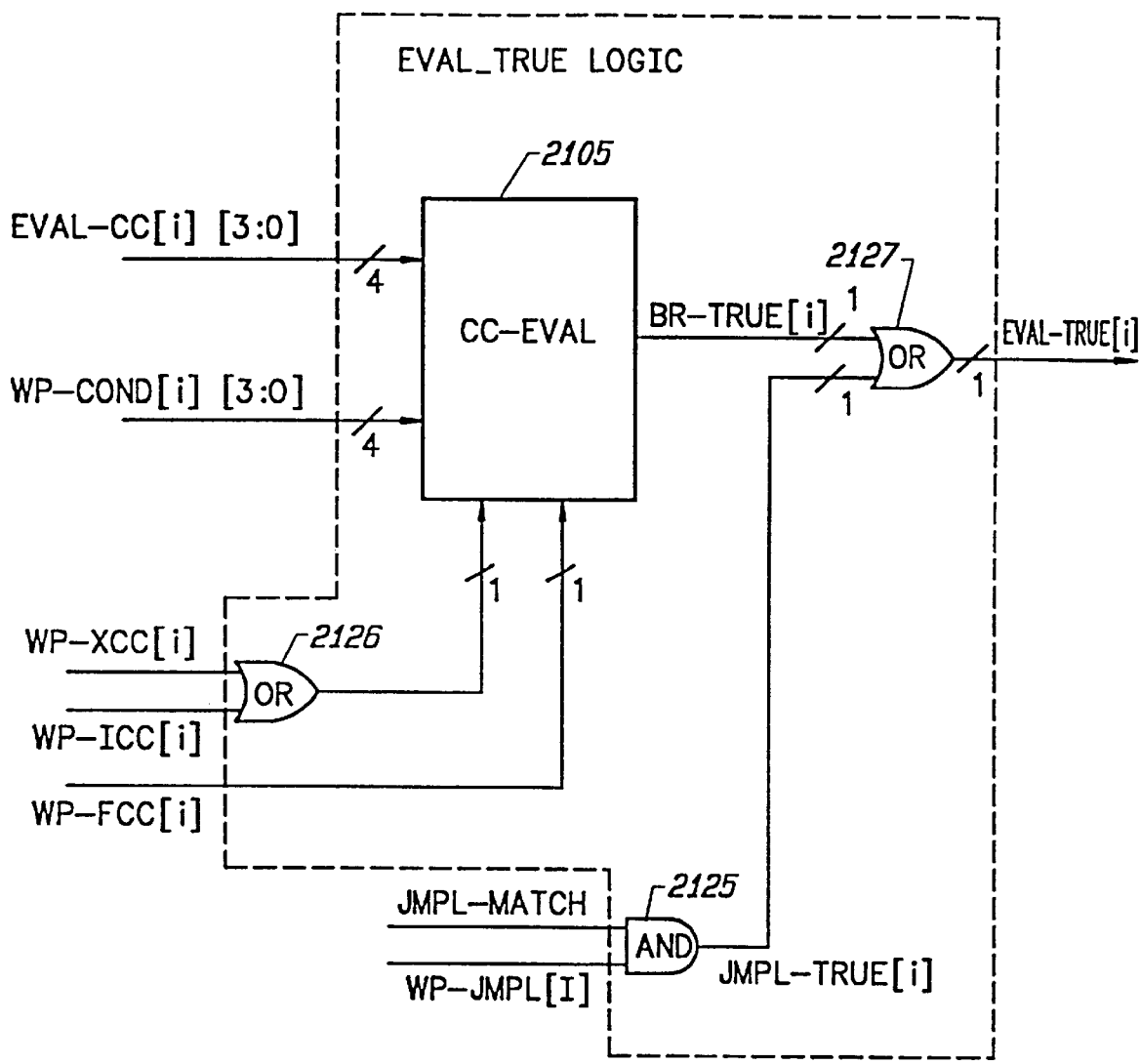
FIG. 34 shows structural detail associated with an embodiment of the Evaluation True Logic.

FIG. 34 shows additional structural detail associated with the EVAL_TRUE Logic 2101 which includes CC_EVAL logic 2105. EVAL_TRUE logic is responsible for determining if the branch instruction or if the JMPL instruction was properly predicted. CC_EVAL 2105 receives EVAL_CC[i] from CC Select Logic 2005 and WP_COND[i], WP_XCC[i], WP_ICC[i], and WP_FCC[i] and received from ISB and stored in the Watchpoint Element 2013 and evaluates the two signals based on a comparison using rules described in the SPARC-V9 manual. If they match, a branch true signal (BR-TRUE[i]) is generated for that i-th watchpoint. EVAL_TRUE Logic 2101 also compares the JMPL_MATCH output by JMPL Match Logic 2201 (See FIG. 35) with WP_JMPL[i] received from ISB and stored in the Watchpoint Element 2013. If JMPL_MATCH matches WP_JMPL[i] then the JMPL was properly predicted and a JMPL_TRUE[i] is asserted. The BR_TRUE[i] and JMPL_TRUE[i] are ORed to form the EVAL_TRUE[i] signal. A watchpoint is formed for a single instruction only and therefore only one of BR_TRUE[i] or JMPL_TRUE[i] will be asserted.

WP Output Logic 2102 is shown in FIG. 50. The EVAL_READY[i], EVAL_TRUE[i], WP_VALID[i] and KILL_VEC[i] from PSU 300 are input to WP Output Logic which outputs WP_ACTIVE_VEC[i] and WP_MISPRED_VEC[i] signals.

Figure 35:
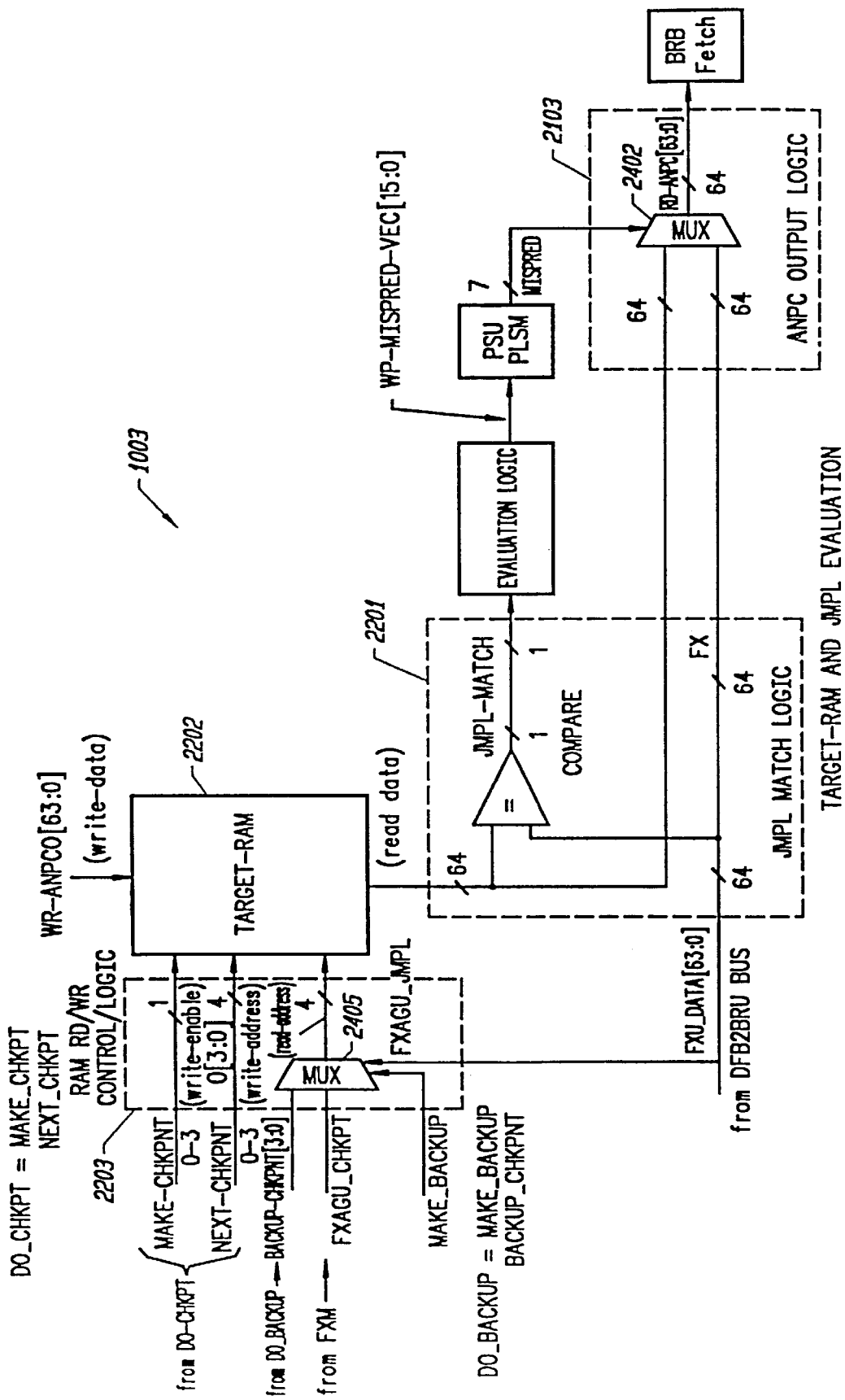
FIG. 35 shows structural detail associated with an embodiment of the TARGET-RAM and Jump-Link Instruction Evaluation Logic.

FIG. 35 shows additional structural detail associated with TARGET-RAM and JMPL Evaluation Logic. The JMPL Evaluation logic evaluated JMPL instructions of the return type where rd=0. ANPC Output Logic 2103 selects the RD_ANPC to send to the BRB Fetch Unit based on whether mispredict (MISPRED) is asserted by PSU PLSM based on the prioritization schemes described hereinwith and the comparison of the stored WP_ANPC, the value of FXU_DATA which is the correct computed value.

3. Examples of Watchpoint Operation a. Watchpoint Unit Operation-Example 1

Table 7, is a list of instructions for Example 1, executed in cycles X, X+1, and X+2. In cycle X, four instructions are issued and one of them (addcc) modified CC. Then renamed-CC-physical tag #7 is assigned. In cycle X+1, again four instructions are issued, and none of them modify CC, and addcc is executed and returns the CC data in cycle X+1. In cycle X+2, the CC-data modified by addcc is in FSR/CCRFRN. In cycle X+2, four instructions are issued, none of them modify CC before branch, and then a branch instruction (br,xcc) is issued. In this case, in cycle X+2, CC_RENAMED=0 because there are no instructions issued which modify CC in the current cycle. Furthermore, CC_TAG_C=CC_TAG_RENAMED_C=7 because the latest CC tag is #7 and it is assigned in cycle X. And finally, CC_DV_C=1 because the latest CC data is in FSR/CCRFRN.

When issuing a branch, CC_DATA on which the branch depends on in FSR/CCRFRN is valid. Therefore CC_DV_C is asserted at the same cycle of issuing the branch. Suppose the branch depends on XCC. Then SEL_BY_XCC[i] is asserted (See FIG. 32) and the signal selects CC_DATA[7:4] and the data is latched in EVAL_CC[i] in the next cycle. (Signals CC_DATA[7:4] is either XCC_DATA_C and ICC_DATA_C, or FCC_DATA_C.) And EVAL_READY[i] is asserted in the next cycle (See FIG. 33). The CC evaluation becomes ready.

b. Watchpoint Unit Operation - Example 2

Table 8, is a list of instructions for Example 2, executed in cycles X and X+1. In cycle X, four instructions are issued and one of them (addcc) modified CC. Then renamed-CC-physical tag #7 is assigned. In cycle X+1, again four instructions are issued, and none of them modify CC before branch and one of them is a branch instruction. In this case, in cycle X+1, CC_RENAMED=0 because there are no instructions issued which modify CC in the current cycle. And CC_TAG_C=CC_TAG_RENAMED_C=7 because the latest CC tag is #7 and it is assigned in the previous cycle. But CC_DV_C=0 because the latest CC data which is modified by addcc is not written into CC-Register in the FSR/CCRFRN.

When issuing a branch (at cycle X+1), CC_DATA on which the branch depends on in FSR/CCRFRN is not valid (CC_DV_C=0) because the instruction "addcc" which is issued at cycle X modified CC and the result data is not written into CC-Register in FSR/CCRFRN. We suppose "addcc" is being executed at cycle x+1 by FXU executing unit and FXU is returning CC data on its data-forward-bus at cycle X+1. Then FXU_CC_CURR_MATCH (See FIG. 31) is asserted at cycle X+1. SEL_FXU_XCC[i] (See FIG. 32) is asserted, and the signal selects FXU_CC_DATA and the data is latched in EVAL_CC[i] at cycle X+2. And EVAL_READY[i] is asserted at the cycle X+2 (See FIG. 33). Then CC evaluation becomes ready.

Note that not CC_TAG_RENAMED_C, but CC_TAG_C is used for FXU_CC_CURR_MATCH comparison. If any instructions which modify CC are issued at the same cycle when a branch is issued, CC_TAG_C is not the latest CC-physical tag. But CC_RENAMED is asserted and the signal inhibits FXU_CC_CURR_MATCH (See FIG. 32). That means FXU_CC_CURR_MATCH can be used when there are no instructions which modify CC at the same cycle when a branch is issued. Using CC_TAG_C[3:0] for FXU_CC_TAG_CURR_MATCH helps reduce the path delay because CC_TAG_C is a faster signal than CC_TAG_RENAMED_C.

c. Watchpoint Unit Operation - Example 3

Table 9, is a list of instructions for Example 3, executed in cycles X and X+1. In cycle X, four instructions are issued and one of the (addcc) modifies CC. Then renamed-CC-physical tag #7 is assigned. In cycle X+1, again four instructions are issued, and one of them (subcc) modifies CC before branch, and one of them is a branch instruction. The renamed-CC-physical tag #8 is assigned to the instruction, subcc. In this case, in cycle X+1, CC_RENAMED=1 because there is an instruction issued which modifies CC in the current cycle. CC_TAG_C=7 because the latest CC tag by the previous cycle is #7, and CC_TAG_RENAMED_C=8 because an instruction which modifies CC is issued in the current cycle, and the renamed-CC-physical tag #8 is assigned. And also, CC_DV_C=0 because the latest CC data which is modified by subcc is not written into CC-Register in FSR/CCRFRN.

When issuing a branch (at cycle X+1), CC_DATA on which the branch depends on in FSR/CCRFRN is not valid (CC_DV_C=0) because the instruction "addcc" which is issued at cycle X modifies CC and the result data is not written into CC-Register in FSR/CCRFRN. Moreover the instruction "subcc" is issued at cycle X+1, then CC_RENAMED is asserted. We suppose "subcc" is being executed at cycle X+2 by FXU executing unit and FXU is returning CC data on its data-forward-bus at cycle X+2. Then FXU_CC_ARRAY_MATCH[i] (See FIG. 31) is asserted at cycle X+2. SEL_FXU_XCC[i] (See FIG. 32) is asserted, and the signal selects FXU_CC_DATA[7:4] and the data is latched in EVAL_CC[i] at cycle X+3. And EVAL_READY[i] is asserted at the cycle X+3 (See FIG. 33). The CC evaluation becomes ready. There are 16 Watchpoint elements in this example, and each element can grab CC parallel for each branch evaluation at any cycle.

TABLE 7

Instructions and Signals from FSR/CCRFRN for Example 1.

| CYCLE | INSTRUC-TION | | FSR/CCRFRN SIGNALS |
|---|---|---|---|
| X | move | | |
| | mul | | |
| | addcc | <-#7 | |
| | div | | |
| X+1 | move | | |
| | move | | |
| | move | (#7 executed) | |
| | move | | |
| X+2 | mul | | CC_RENAMED=0 |
| | move | | CC_TAG_C=7 |
| | move | | CC_TAG_RENAMED_C=7 |
| | br, xcc | | CC_DV_C=1 |

TABLE 8

Instructions and Signals from FSR/CCRFRN for Example 2.

| CYCLE | INSTRUC-TION | | FSR/CCRFRN SIGNALS |
|---|---|---|---|
| X | move | | |
| | mul | | |
| | addcc | <-#7 | |
| | div | | |
| X+1 | mul | (#7 executed) | CC_RENAMED=0 |
| | move | | CC_TAG_C=7 |
| | move | | CC_TAG_RENAMED_C=7 |
| | br, xcc | | CC_DV_C=0 |

TABLE 9

Instructions and Signals from FSR/CCRFRN for Example 3.

| CYCLE | INSTRUCTION | | FSR/CCRFRN SIGNALS |
|---|---|---|---|
| X | move | | |
| | mul | | |
| | addcc | <-#7 | |
| | div | | |
| X+1 | mul | | CC_RENAMED=1 |
| | move | | CC_TAG_C=7 |
| | subcc | <-#8 | CC_TAG_RENAMED_C=8 |
| | br, xcc | | CC_DV_C=0 |

4. Evaluation of Branch Instructions

One cycle after a branch is issued, WP_VALID[i] is asserted. If WP_VALID[i]=1 and EVAL_READY[i]=0 and KILL_VEC[i]=0, WP_ACTIVE_VEC[i] is asserted (See FIG. 29). "WP_ACTIVE[i]=1" means a branch which uses checkpoint i is already issued and is not resolved yet. If the value becomes 0, that means the branch is resolved (completed). WP_ACTIVE_VEC is sent to ICRU 301 and used for deciding which branch/JMPL instructions are completed.

When a branch evaluation becomes ready, EVAL_READY[i] is asserted and EVAL_CC[i] is the grabbed CC value. Then EVAL_CC[i] and WP_COND[i] are fed into CC_EVAL logic within EVAL_TRUE LOGIC 2101 (See FIG. 34), and the branch is evaluated. If the prediction made when issuing the branch is correct, BR_TRUE[i] is asserted. If not, it's not asserted. When evaluating a branch, WP_XCC[i], WP_ICC[i], WP_FCC[i] signals are also used to know branch type. BR_TRUE[i] is OR-ed with JMPL_TRUE[i] (to be explained later) and EVAL_TRUE[i] is generated. When WP_VALID[i]=1 and EVAL_READY[i]=1 and EVAL_TRUE[i]=0 and KILL_VEC[i]=0, WP_MISPRED_VEC[i] is asserted (See FIG. 29). "WP_MISPRED_VEC[i]=1" means the branch prediction made before is wrong. PSU receives this signal and execution error signals and chooses the earliest misprediction or execution error condition and then assert BACKUP signal to back up to the previous state.

PSU asserts KILL_VEC[i] signal when a backup occurs and the checkpoints taken after the backup point need to be killed. When KILL_VEC[i] is asserted, the corresponding Watchpoint element is also killed. "Killed" means WP_ACTIVE_VEC[i] and WP_MISPRED_VEC[i] are suppressed. WP_ACTIVE_VEC and WP_MISPRED_VEC can be multi-hot so that the WP_MISPRED_VEC [0–16] can be encoded in the same vector. That means that up to 16 Watchpoint elements (in this example) can be active at a time, and can detect mispredictions at a time.

When issuing and prediction a branch, FETCH sends branch-target address or next address of branch via WR_ANPC to Watchpoint. If the prediction is "taken", WR_ANPC is next address of the branch (not-taken address). If the prediction is "not-taken", WR_ANPC is branch-target address (taken address). If it turns out that the prediction was wrong, Watchpoint sends back the address via RD_ANPC to FETCH to re-fetch instructions from the correct branch path. WR_ANPC value is stored into TARGET-RAM (See FIG. 35). TARGET-RAM has 16 entries and each entry corresponds to each checkpoint and can store one WR_ANPC address. The write enable signal and write address of this RAM are MAKE_CHKPNT and NEXT CHKPNT. MAKE_CHKPNT is asserted when making a checkpoint. When BACKUP signal is asserted, BACKUP_CHKPNT is used for read address of TARGET_RAM. BACKUP_CHKPNT designates the checkpoint which the CPU 51 backs up to. And the read data of TARGET-RAM is sent to FETCH via RD_ANPC.

5. Evaluation of JUMP-LINK (JMPL) Instructions

When issuing and predicting a JMPL instructions, FETCH sends predicted JMPL target address via WR_ANPC to Watchpoint. Watchpoint keeps the address, and evaluates the correctness by comparing the address and the calculated correct address by execution unit. If it turns out that the prediction was wrong, Watchpoint sends the calculated correct address via RD_ANPC to FETCH to re-fetch instructions from the correct address. The predicted JMPL target address is stored into TARGET-RAM in the same way as branch case.

We suppose only FXAGU execution unit calculates JMPL target address. When FXAGU finishes execution of JMPL instruction, FXAGU_JMPL is asserted, FXAGU_CHKPNT designates the checkpoint number of JMPL, and FXAGU_DATA contains the calculated correct JMPL target address. Then the predicted JMPL address in TARGET-RAM indexed by FXAGU_CHKPNT is read and the read data gets compared with FXAGU_DATA. The compare result gets latched and the latched signal is JMPL_MATCH (FIG. 35). JMPL_MATCH is asserted if the predicted address and the calculated address are the same. Then JMPL_MATCH is ANDed with WP_JMPL[i] and the output becomes EVAL_TRUE[i] (FIG. 34). One cycle after FXAGU_JMPL is asserted, EVAL_READY[i] is also asserted (FIG. 33).

WP_ACTIVE_VEC[i] and WP_MISPRED_VEC[i] are generated for JMPL in the same manner as for branch instructions. One cycle after WP_MISPRED_VEC[i] is asserted, PSU 300 sends BACKUP as many as two signals to Watchpoint 304: BACKUP_CHKPNT and MISPRED (but only when the backup is due to JMPL misprediction). If MISPRED is asserted, Watchpoint sends two-time latched FXAGU_DATA signals which contains the correct JMPL address to FETCH (See FIG. 35). TARGET-RAM is used for two purposes: one is for storing alternate address of branch, and another is for storing predicted JMPL target address. The two usages are exclusive, so only one TARGET-RAM is enough for the implementation.

The inventive structure and method provide (1) Structure and method for initiate watching of plural predicted branch or jump-and-link instruction simultaneously; (2) Structure and method for grabbing plural Condition-Code data or calculated jump-and-link addresses for which predicted branch or jump-and-link instructions are waiting by watching data forward buses from execution units simultaneously; (3) Structure and method for being able to generate plural misprediction signals of branch or jump-and-link instructions simultaneously, either alone or in combination with (2); (4) Structure and method for storing alternate branch address or predicted jump-and-link address in one storage shared with the two above cases, wither alone or in combination with (2); (5) Structure and method for sending the correct branch address or jump-and-link address for instruction fetch when misprediction happens, wither alone or in combination with (4); and (6) Structure and method for speeding up critical paths, by: tag compares for grabbing CC data are split into two parts: one is cc tag in previous cycle compared to the data forward bus tag; another is currently renamed cc tag in the current issue window compared to data forward bus tag. (Alone or in combination with (2)) For the latter case, the latched signal of renamed cc tag can be used for the compare so, it's not timing-critical. FIG. 36 is a diagrammatic flow-chart of an embodiment of the inventive Watchpoint method for plural simultaneous unresolved branch evaluation.

B. Exception Detection

Exceptions may occur during issue or execution. Thus, exceptions include issue traps and execution traps. The detection of Issue Traps and Execution Traps are described below.

1. Detecting Issue Traps

The ISU 200 also detects issue traps which effect issuing of instructions. These issue traps may be syncing or non-synching issue traps. Those skilled in the art will recognize, the type of issue traps that are made syncing and non-syncing can be selected based on various criteria and subject to designer choice.

For example, non-syncing issue traps are typically those that occur often and for which syncing of the CPU 51 in the manner described earlier would reduce processor speed. Thus, these kinds of issue traps are not synced and entered into speculatively. These issue traps may include issue traps such as the fill_normal, fill_other, spill_normal, spill_other, clean_window, trap_instruction (a trap always immediate(TA %g0+simm7) instruction), unimplemented_idd, unimplemented_std, and illegal_instruction described in the SPARC-V9 Architecture Manual.

The non-syncing issue traps are typically of the type that do not occur often and for which syncing the CPU 51 would not significantly effect processor speed. These may include issue traps such as the SPARC-V9 instruction_access_error, instruction_access_exception, privileged_opcode, privileged_action, fp_exception_other, fp_disabled, emulation_trap, and trap_instruction (a conditional trap (Tcc) instruction) issue traps.

In order to detect whether certain types of these issue traps occurred during the issue stage, the ISU 200 receives control register (CNTRL_REG) fields from the control register file 800. As shown in FIG. 17, the control register file 800 contains the SPARC-V9 privileged registers including the clean windows (CLEANWIN) register 801, the restorable windows (CANRESTORE) register 802, the savable windows (CANSAVE) register 803, the windows state (WSTATE) register 804, and the processor state (PSTATE) register 805. It also contains SPARC-V9 non-privileged registers including the TICK register 806 and the floating point register status (FPRS) register 807. The CNTRL_

REG fields include the CLEANWIN, CANRESTORE, CANSAVE, WSTATE_NORMAL, WSTATE_OTHER, PSTATE_PEF, PSTATE_PRIV, TICK_NPT, and FPRS_FEF fields described in the SPARC-V9 Architecture Manual and provided by the CLEANWIN, CANRESTORE, CANSAVE, WSTATE, TICK, and FPRS registers 801–807.

Turning back to FIG. 7, the ISU 200 decodes the FR_INSTs_BRPs instructions and utilizes the CNTRL_REG fields in accordance with the SPARC-V Architecture Manual to determine whether any of the SPARC-V9 issue traps occurred. Only the issue trap caused by the instruction in the earliest issue window slot will be taken. Therefore, when one or more issue traps are detected, only those of the instructions in the issue window slots prior to the slot of the issue trap causing instruction which is in the earliest slot can be issued by the ISU 200. The issue trap causing instruction and those of the FR_INST_BRP_0–3 instructions after the slot of the issue trap causing instruction will not be issued, except that a TA or Tcc instruction that caused the (trap_instruction) issue trap will be issued.

When an issue trap occurs, the ISU 200 outputs ISSUE_TRAP signals to the PSU 300 that indicate that a trap has occurred and identify which of the issue traps described earlier has occurred. When a non-syncing issue trap is detected by the ISU 200, the ISSUE_TRAP signals will be output by the ISU 200 as soon as the issue trap is detected. However, when a syncing issue trap is detected by the ISU 200, then the ISSUE_TRAP signals will not be output by the ISU 200 until the issue trap causing instruction is in slot 0 and the CPU 51 is synced in the manner previously described. In the case of a Tcc instruction which causes a non-syncing issue trap, the Tcc instruction can only be issued once the CPU 51 is synced.

2. Detecting Execution Traps

Referring to FIG. 8, during execution of issued instructions, errors may occur which are detected by the FPU 600, FXU 601, and LSU 603. As indicated earlier, FPU 600, FXU 601, and LSU 603 output ERR_STAT signals to the PSU 200 of the ISB 61 that indicate if an error occurred during execution of an instruction. Execution errors from the LSU and FXU can be easily handled by the PSU 300. But, floating point exceptions require special handling as will be described next.

Referring to FIG. 8, as was discussed earlier, the FPU 600 executes floating point instructions out of predicted and/or actual PC order based on resource availability. During execution of floating point instructions, the FPU 600 may detect execution traps (i.e., errors). But, since the FPU 600 may execute instructions out of predicted and/or actual PC order, the execution traps they cause may also be out of predicted and/or actual PC order. In order to properly handle and detect floating point execution traps as if they had occurred in actual PC order, the PSU 300 includes a floating point exception (FPEXCEP) ring or unit 306, as shown in FIG. 37.

Figure 37:
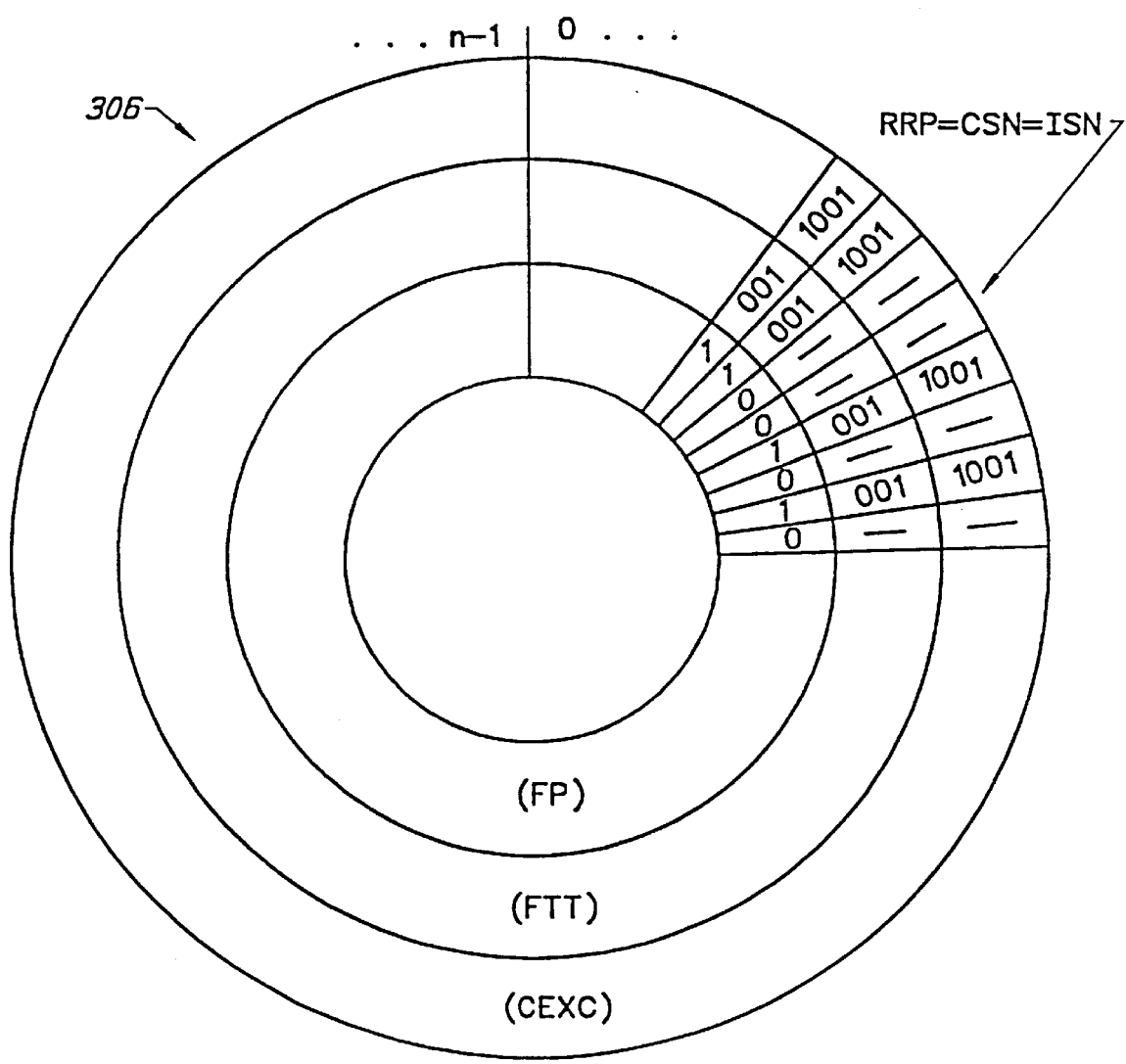
FIG. 37 is schematic representation of an embodiment of the Floating-Point Exception (FPEXCEP) Data Structure.
Figure 38:
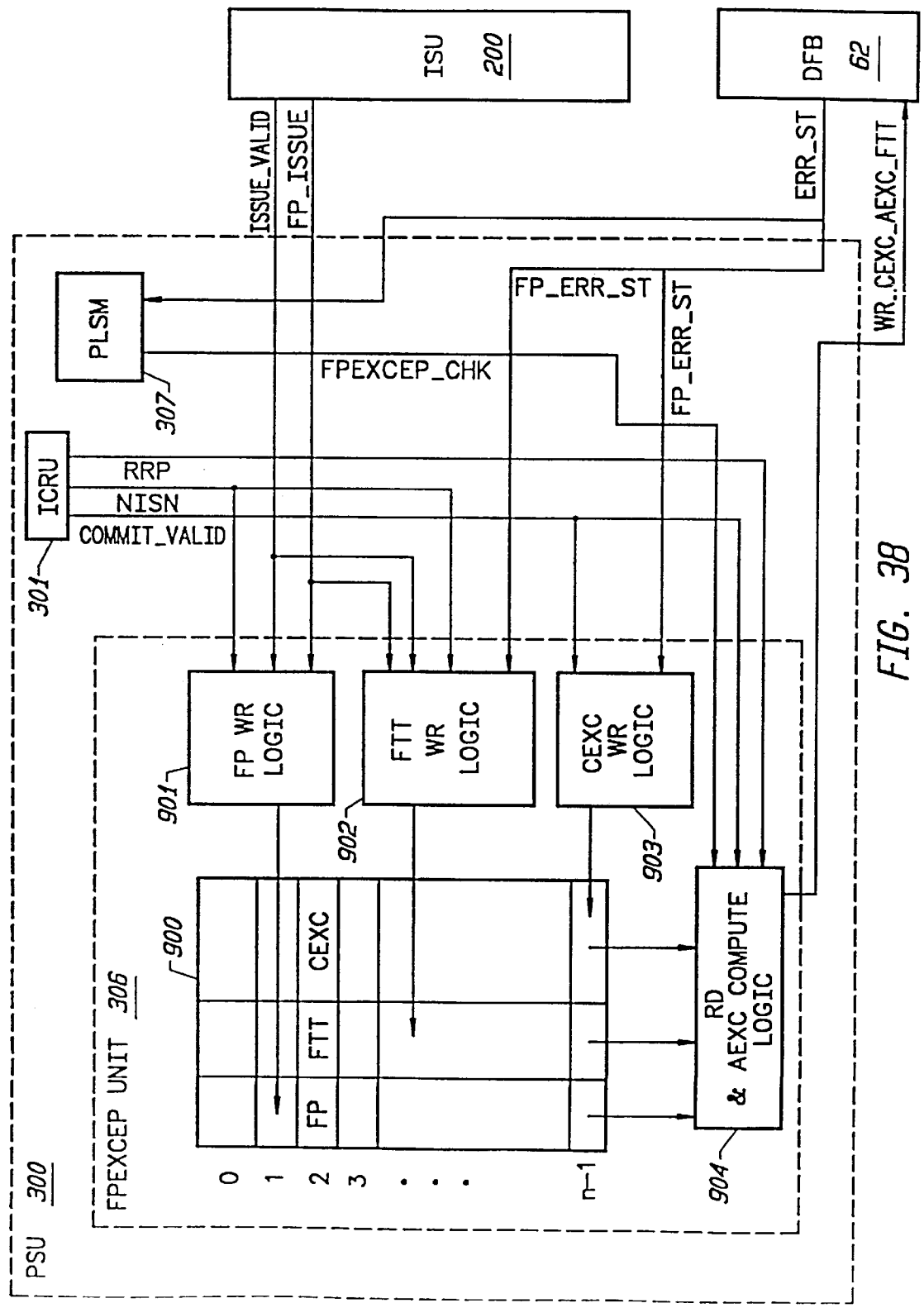
FIG. 38 show signal interfaces to the exemplary Floating-Point Exception Ring data structure.

As shown in FIG. 38, the FPEXCEP ring 306 includes a data storage structure 900 with 64 storage elements or entries. Each storage entry corresponds to one of the 64 instruction serial numbers and has an instruction identifying (FP) field, a floating point trap type (FTT) field, and a current floating point exception type (CEXC) field. As shown in FIG. 37, the data storage structure forms an FP field ring that has sixty-four addressable storage elements for storing the FP fields, an FTT field ring that has sixty-four addressable storage elements for storing the FTT fields, and an CEXC field ring that has sixty-four addressable storage elements for storing the CEXC fields. Each of the addressable storage elements of the FP, FTT, and CEXC field rings corresponds to an instruction serial number.

The FP bits are set ("1") or cleared ("0") to indicate whether the corresponding instructions are SPARC-V9 floating point type instructions or not. For the instructions in the FPEXCEP ring 306 which are identified by the FP bit as being floating point instructions, the FTT fields identify the type of SPARC-V9 floating point trap that occurred. As indicated in the SPARC-V9 Architecture Manual, this includes no trap, an IEEE_754_exception, an unimplemented_FPop, an unfinished_FPop, a sequence_error, a hardware_error, and an invalid_fp_register error. As those skilled in the art will appreciate, the CPU 51 could be implemented without specifying, detecting, and handling some of these types of traps, in which case the FTT fields of the FPEXCEP ring 306 could be made smaller so as to require less storage space. Furthermore, for the floating point instructions for which the FTT fields indicate an IEEE_754_exception occurred, the CEXC fields identify the one or more types of IEEE_754_exceptions that did occur in accordance with IEEE Std 754–1985 and the SPARC-V9 Architecture Manual. Thus, the CEXC field includes a bit to indicate if an operand is improper (nvc), a bit to indicate if an overflow occurred (ofc), a bit to indicate if an underflow occurred (ufc), a bit to indicate if a divide by zero occurred (dzc), and a bit to indicate if an inexact result occurred (nxc). But, for floating point instructions that result in other types of floating point trap types or no floating point trap, the CEXC fields indicate that none of the types of IEEE_754_exceptions occurred.

Like the A-ring 312 and M-ring 324 described earlier and shown in FIG. 11, the FPEXCEP ring 306 is implemented as a circular, ring, or wrap-around data structure where pointers are moved in along the data structure using "modulo-FPEXCEP-ring register length" arithmetic (here, modulo-64 arithmetic), as shown in FIG. 37. Those skilled in the art will recognize that, although a circular data structure is advantageous, it is not essential to the invention and other data structures implementing the features of the invention may be used.

Referring back to FIG. 38, during each issue stage, the ISU 200 outputs the ISSUE_VALID signal described earlier which indicates which of the fetched FR_INST_BRP_0–3 instructions was issued. At the same time, it outputs an FP_ISSUE signal that identifies which of the issued instructions is a floating point instruction. These signals are received by the FP write (WR) logic 901 and the FTT write (WR) logic 902. In addition, the FP WR logic 901 and the FTT WR logic 902 receives from the ICRU 301 the NISN pointer discussed earlier.

The FR WR logic 901 and the FTT WR logic 902 use the NISN pointer and the ISSUED_VALID signal to address the locations in the FPEXCEP ring that corresponding to the FP bits and the FTT fields for the instructions that were just issued by the ISU 200. For each of these instructions identified by FP_ISSUE as being a floating point instruction, the FP WR logic 901 sets the corresponding FP bit to indicate that it is a floating point instruction. And, for those of the issued instructions that are identified by FP_ISSUE as not being a floating point instruction, the FP WR logic 901 clears the corresponding FP bit to indicate that it is not a floating point instruction.

Figure 39:
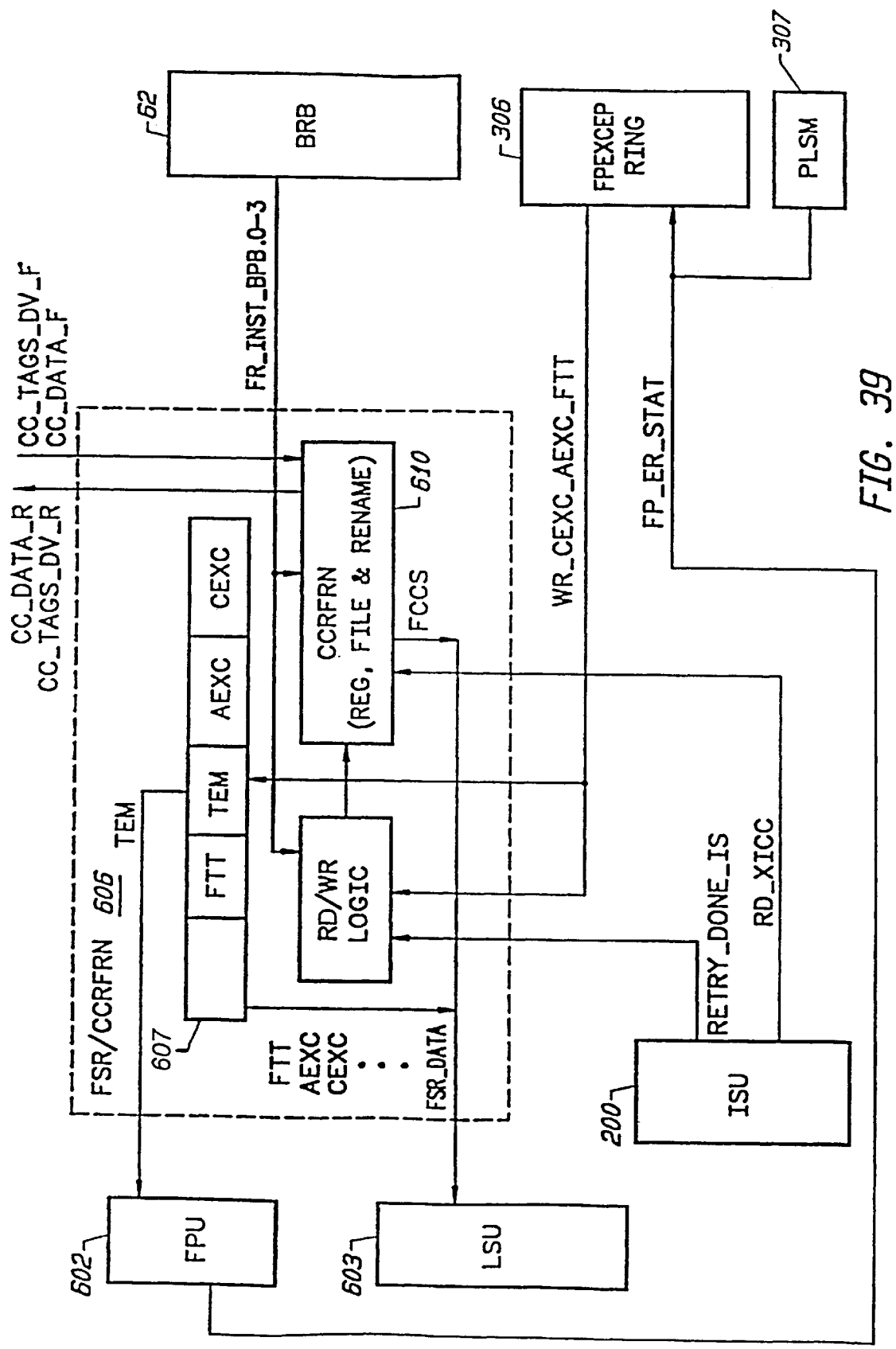
FIG. 39 shows the floating point exception unit including the RD and AEXC logic.

Referring to FIG. 8, as described earlier, the FPU 600, the FXU 601, the FXAGU 602, and the LSU 603 execute issued instructions and the output ERR_STAT signals when execution is completed. As shown in FIG. 39, the ERR_STAT signals include FP_ERR_STAT signals that contain the serial numbers, checkpoint numbers, and error status fields for floating point instructions executed and completed by the FPU 600. The error status fields indicate the floating point trap type that will result from an executed floating point instruction or no floating point trap if one will not result and the current floating point exceptions caused by the floating point instruction or no current floating point exceptions if none were caused. In other words, the error status fields contain data representing the FFT and CEXC fields to be written to the FPEXCEP ring 306 for the floating point instruction.

Moreover, referring to FIG. 39, the FSR/CCRFRN 606 includes the SPARC-V9 floating point status register (FSR) 607. The FSR 607 includes a trap enable mask (TEM) field that includes a masking bit for each of the IEEE_754_ exceptions described earlier so that one or more of these exceptions may be masked. The TEM field is provided to the FPU 602. When an IEEE_754_exception occurs, the FP_ERR_STAT signals will not indicate to the PLSM 307 that an exception occurred if the TEM field indicates that it is of the type that should be masked. But, the FP_ERR_STAT signals will nevertheless indicate to the FPEXCEP unit that such an IEEE_754_exception occurred (i.e., FTT) and also the type of IEEE_754_exception that it is (i.e., CEXC).

For each completed floating point instruction, the FTT WR logic 902 uses the serial number provided in the FP_ERR_STAT signals to write into the corresponding FTT field of the FPEXCEP ring 306 the FTT data identified by the FP_ERR_STAT signals. Furthermore, the CEXC write (WR) logic 903 uses this serial number to write into the corresponding CEXC field of the FPEXCEP ring 306 the CEXC data identified by the FP_ERR_STAT signals.

The read and accrued exception compute (RD and AEXC compute) logic 904 receives the RRP pointer and the COMMIT_VALID signal from the ICRU 301 of the PSU 300. The RRP pointer points to the last instruction retired in the previous machine cycle and the COMMIT_VALID signal indicates how far the RRP pointer will advance (i.e., the number of instructions that were retired) in the previous machine cycle.

During each machine cycle, the RD and AEXC compute logic 904 uses the RRP pointer and the COMMIT_VALID signal to read the FP bit and FTT and CEXC fields in the FPEXCEP ring 306 for each instruction that was retired in the last machine cycle. Then, for those of the retired instructions that are floating point instruction (as identified by the FP bits), the RD and AEXC compute logic 904 logical ORs their CEXC fields to compute an AEXC field. The AEXC field identifies the masked IEEE_754_exceptions accrued by all of the floating point instructions retired in the last machine cycle since, as described shortly, the floating point instructions that cause non-masked IEEE_754_exceptions will not have been retired and will have resulted in execution trap sequencing by the PLSM 307.

In addition, the RD and AEXC compute logic determines from the read FP bits which of the instructions retired in the current machine cycle is the latest floating point instruction to be retired. If one or more floating point instructions were retired in the current machine cycle, the Rd and AEXC compute logic 904 then outputs WR_CEXC_AEXC_FTT signals that include a signal that contains the computed AEXC field and a signal that indicates that it should be written into the fsr.aexc field of the FSR 607 in FIG. 39. Moreover, the WR_CEXC_AEXC_FTT signal also include signals that contain FTT and CEXC data for the most currently retired floating point instruction and signals that indicate that this data should be written into the fsr.ftt and fsr.cexc fields of the FSR in FIG. 39. In this circumstance, the FTT data will indicate no floating point trap type for several reasons. First, floating point instructions that don't cause execution exceptions can be retired and will have corresponding FTT fields in the FPEXCEP ring that indicate no floating point trap type. Second, floating point instructions that have FTT fields that indicate an IEEE_754_exception trap but which caused one or more corresponding IEEE_754_exceptions that were masked by the TEM field of the FSR 607, can be retired since the PLSM 307 is not altered that any of these execution exceptions occurred.

As mentioned previously, the PLSM 307 also receives the FP_ERR_STAT signals. When these signals indicate that an execution trap has occurred, then an execution trap sequencing process is initiated by the PLSM 307 which causes the CPU 51 to by synced (i.e., RRP=CSN=ISN) at the instruction prior to the trap causing instruction.

The PLSM 307 then generates a FPEXCEP_CHK signal when the CPU 51 is synced. In response to the FPEXCEP_CHK signal, the RD and AEXC compute logic 902 uses the RRP pointer to read the FP, FTT and CEXC fields in the FPEXCEP ring 306 for the instruction which is at RRP+1.

If the read FTT field indicates no floating point trap, then the instruction at RRP+1 was not responsible for causing a floating point exception. Since some other kind of exception may have occurred at this instruction, the RD and AEXC logic 904 outputs the WR_CEXC_AEXC_FTT signals so that they include signals that indicate that nothing should be written into the fsr.ftt, fsr.cexc, and fsr.aexc fields of the FSR 607.

But, if the read FTT field indicates that a floating point trap occurred, then the instruction at RRP+1 was responsible for a floating point exception. The RD and AEXC logic 904 then outputs the WR_CEXC_AEXC_FTT signals so that they include a signal that contains the FTT field read from the FPEXCEP ring 306 for the instruction at RRP+1 and a signal that indicates that it should be read into the fsr.ftt field of the FSR 607 in FIG. 39. Thus, the trap type caused by the floating point instruction is contained in the fsr.ftt field of the FSR 607 so that a floating point execution trap handling routine can access the FSR with a store FSR (STRSR) instruction to properly handle the trap.

In addition, if the read FTT field indicates that a IEEE_754_exception occurred, hen the WR_CEXC_AEXC_FTT signals output by the RD and AEXC logic 904 include a signal that contains the CEXC field read from the FPEXCEP ring 306 for the instruction at RRP+1 and a signal that indicates that it should be read into the fsr.cexc field of the FSR 607 in FIG. 39. As a result, the current exception type caused by the floating point instruction is contained in the fsr.cexc field of the FSR 607 so that the trap handling routine can now access this field of the FSR 607 with a store FSR (STFSR) and properly handle the trap.

Referring to FIG. 37, in this case, since floating point instructions are executed by the FPU 600 out of predicated and/or actual PC order, the instruction at RRP+1 may not have been the faulting instruction that caused the PLSM 307 to begin the execution trap sequencing process. In other words, a floating point instruction may have resulted in an execution trap that was detected earlier than an execution trap caused by another floating point instruction that was issued earlier (i.e., has an earlier serial number) but executed later. However, the later issued but earlier executed instruction caused the start of execution trap sequencing by the PLSM 307, while sequencing prior to machine sync, if an earlier instruction results in an exception , then the PLSM 307 will switch to processing it. Thus, the execution trap sequencing nevertheless results in the later detected execution trap actually being handled instead of the earlier detected execution trap as if the execution traps had occurred in actual PC order.

Although the FPEXCEP unit has been described in the context of the SPARC-V9 architecture, those skilled in the art will appreciate that it may be implemented for any architecture that involves speculative execution of floating point instructions.

C. Recovery by Backtracking the Processor to an Earlier State

A CPU "backtrack" is initiated when either Watchpoint 304 detects a mispredicted instruction or when execution exception occurs in DFB 62 and triggers an execution exception (etrap) in PSU 300. Backtracing the processor may include a processor backup and/or processor backstep and described in greater detail below. More than one misprediction and execution exception can occur during a machine cycle. In the exemplary CPU 51, all speculatively executed control transfer instructions (e.g. predicted branch instructions) are checkpointed. Such a mispredicted instruction always lies at a "checkpoint boundary." Recovery from a checkpointed mispredicted instruction can be accomplished by restoring machine state that was stored in the checkpoint corresponding to that mispredicted instruction at the time it was issued. Execution exceptions, unlike mispredictions, may not correspond to a checkpointed instruction since not all instructions are checkpointed. In general, an instruction generating an execution exception may lie at any "instruction boundary". A checkpoint boundary corresponds to an instruction boundary only for speculatively issued control transfer instructions. Recall that not every speculatively issued instruction requires checkpoint formation, but rather only those speculative control; transfer instructions that create a PC discontinuity (unless the control transfer instruction has been selected as a machine "syncing" instruction and is selectively not checkpointed as described herein). The manner in which the CPU 51 is backtracked therefore depends on the condition that initiated the recovery and whether the misprediction or exception corresponds to a checkpointed instruction.

The term "backup" as used herein refers to a structure and method for restoring machine state at a checkpoint boundary by restoring machine state previously stored in a checkpoint and then taking appropriate action to restart CPU 51 instruction issue and execution. As used herein, backup may or may not involve subsequent in-order reissue and re-execution of instructions forward from the checkpointed instruction. The term "backstep" as used herein, refers to a structure and method for restoring machine state at any instruction boundary, possibly in combination with a backup, and then taking appropriate action to restart CPU 51 instruction issue and execution.

When an execution trap (etraps) is encountered, the machine backtracks to the faulting instruction to preserve the precise state of the machine. Unlike mispredicts which lie on a checkpoint boundary, etraps may require backsteps, backups, or a combination of the two to reach the faulting instruction. There are no constraints in ordering or frequency of backstep or backup operations, other than the necessity of performing the operations. When used in combination, machine backup and backstep provide a method for efficiently recovering from mispredictions and execution exceptions and may advantageously do so, in some circumstances, without forcing re-execution of the instruction causing the exception or of the instruction between a checkpointed instructions and the faulting instruction.

Checkpoints are allocated whenever there is a change in processor flow (For example, Bcc, FBcc, jump, and the like instructions). The exemplary CPU 51 has up to sixteen checkpoints available for allocation. backups are performed to restore machine state to a checkpoint boundary. Backsteps are performed to restore machine state to any instruction boundary. The exemplary machine is limited to backstepping up to four instructions per cycle by available hardware. Backups provide a coarse but fast backtracking mechanism for restoring machine state, and Backsteps provide a mechanism for restoring machine state at fine instruction boundaries. The machine can Backtrack to earlier state though any combination of Backups or Backsteps.

Two rules should be observed in order to realize precise state restoration using the inventive backstep procedure in conjunction with the inventive backup procedure. First, when instructions which may modify architectural control registers are encountered in the instruction stream, the CPU 51 should either be synced prior to execution of the instruction, or the machine should checkpoint that instruction. If this first rule is observed, backstepping never requires any architectural control register modification or update. Second, all instructions that may create program counter discontinuities should be checkpointed. If the second rule is observed, backstepping involves decrementing the PC by the number of backsteps and reclaiming and restoring machine resources (including resources maintained in RRF 302) as they are allocated at the earlier corresponding Program Counter.

Figure 40:
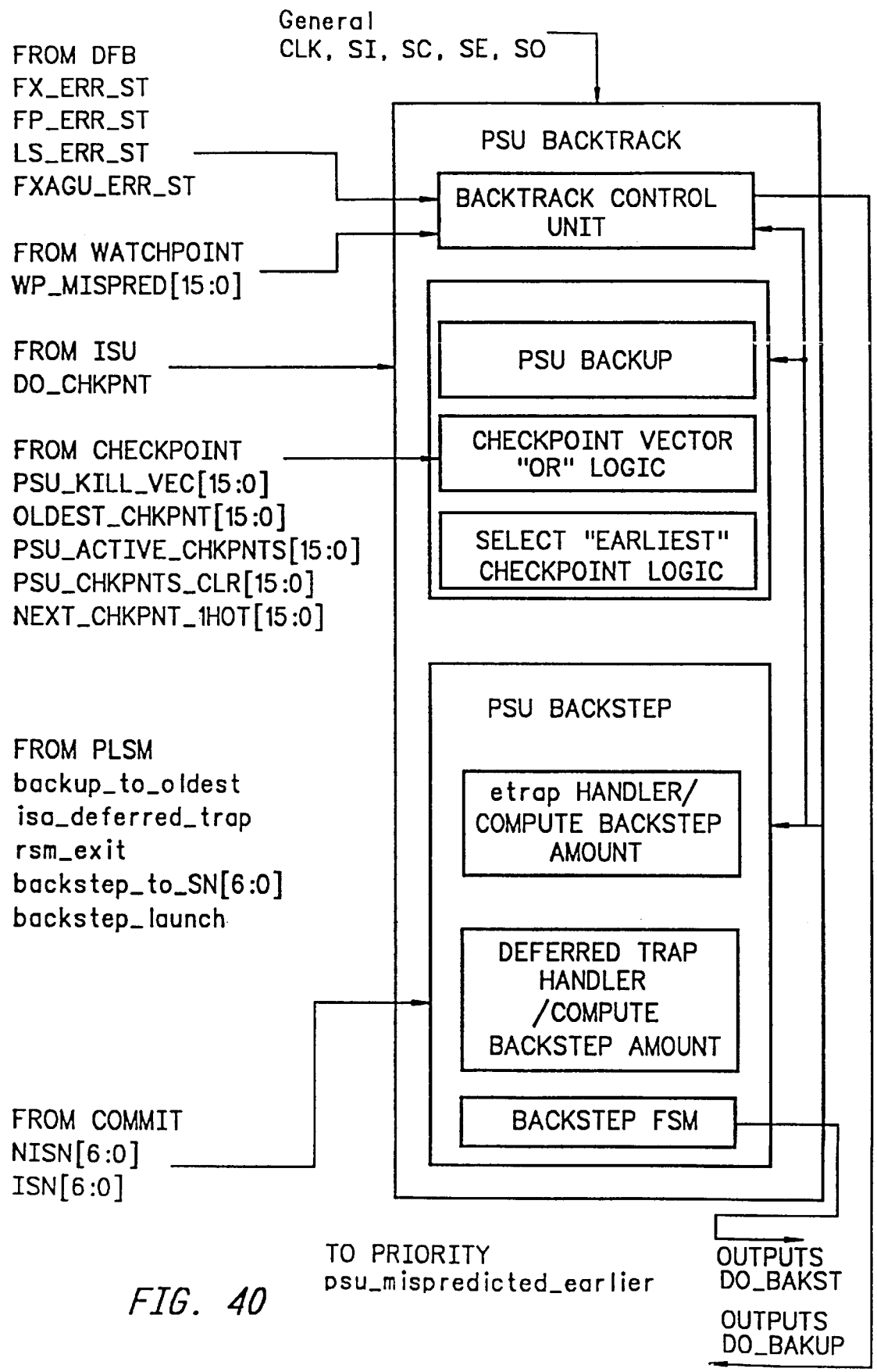
FIG. 40 is a diagrammatic representation of an embodiment of the Backtrack Unit which includes Back-up and Backstep components.

Backtrack Unit (BKTR) 305 functionally located within PSU 300 and is responsible for implementing machine backups and backsteps as required for correct CPU 51 function and recovery. As shown in FIG. 40, BKTR 304 comprises Backtrack Control Unit (BTCN) 401 which is responsible for determining whether a machine backup, one or more machine backsteps, or combinations of backups and backsteps are appropriate to recovery the CPU 51 from mispredictions and exceptions. BTCN 401 receives SN, error, and status information from each execution unit in DFB 62 and from watchpoint 304. Backup Unit (BKUP) 402 is responsible for initiating and sequencing machine backups, and Backstep Unit (BKST) 403 is responsible for initiating and sequencing machine backsteps. The CPU 51 should stop issuing instructions, and backtrack using backup and backstep as appropriate to the instruction causing the exception or misprediction. Structure and method for backing up CPU 51 using backstep, and for backstepping the machine are described in greater detail hereinafter.

1. Processor Backup to a Checkpoint Boundary

A machine backup will be initiated when: (1) PLSM 307 within PSU 300 attempts to enter RED Mode, or when (2) Watchpoint 304 detects a mispredicted instruction. A machine backup <u>may</u> or may not also be initiated when (3) a faulting instruction (execution exception or etrap) is detected from DFB 62. Backup procedures differ, including selection of the checkpointed instruction to backup to, depending on the reason for initiating the backup. A backup may be followed by a backstep if the faulting instruction causing the execution does not coincide with a checkpoint boundary.

Each machine cycle, Backup Unit (BKUP) 402 receives instruction execution status information ERR_STAT from DFB 62 over the Data Forward Busses and mispredicted instruction information (WP_MISPRED) from Watchpoint 304. These signals identify the instruction serial number (SN), instruction checkpoint to which the machine should be backed up to if a backup is needed, an indication that an error has or has not occurred, and an error type indication (deferred, data breakpoint, Floating-Point operation, and the like). If the FXAGU does not handle multiplication or division operations, then the ERR_STAT signals from that execution unit may not generally provide error information but will provide SN and checkpoint number information in the ERR_STAT signals. Although checkpoints are not formed for every instruction that is issued, each instruction is assigned a backup checkpoint at the time it is issued. This checkpoint is allocated by ICRU 301 within PSU 300 prior to instruction issue, associated with the instruction by ISU 200 at issue, sent by ISU 200 to DFB 62 with the instruction operation code (op-code) and instruction serial number, and stored in one of the execution unit'queue. (For example, in FIG. 22, backup checkpoint is stored in checkpoint field 614.) Therefore, when the instruction completes execution, the serial number and checkpoint number are immediately available within the execution unit (i.e. FXU, FPU, FXAGU, or LSU).

2. Mispredicted instruction, RED Mode, and Execution Trap Initiated Backup

A backup cycle is initiated by BKUP 402 whenever a mispredicted instruction is detected by Watchpoint 304 or when entering RED Mode, and may be initiated to recover from an execution exception. Recovery from an execution exception may require only backstepping, only backup, or a combination of a backup and one or more backsteps. BKUP 402 includes Checkpoint Vector Logic Unit 404 that evaluates the instruction execution status information received from DFB 62 and Watchpoint 304 each cycle and determines which instructions, if any, have been mispredicted or caused an execution exception. In the exemplary CPU, Logic Unit 404 performs and "OR" on each checkpoint received from DFB 62 or watchpoint 304. Select Earliest Checkpoint Logic 405 determines which of the checkpoints is the earliest so that etraps corresponding to later faulting instructions will not initiate a backup to checkpoints identified by Logic 404 which have already been killed. BKUP 402 takes into account mispredictions and execution exceptions when determining which checkpoint number to use for a backup.

The machine is backed-up to the mispredicted instruction checkpoint when the mispredicted instruction is the earliest checkpoint. For RED Mode initiated backup, the machine is backed up to checkpoint which is closest to, but greater (in the A-Ring circular sense) than, the Committed Serial Number (CSN). For execution exceptions, the checkpoint selection is more complex and depends on the nature of the exception.

Execution exception (etrap) initiated backups, may require different backup checkpoint number calculations for deferred and non-deferred traps. For a normal non-deferred trap, if instruction I lying in checkpoint n faults at a time when ISN has moved beyond checkpoint n+1, the machine is backed up from ISN to checkpoint n+1, that is to the checkpoint after the faulting instruction. If checkpoint n+1 is not an active or valid checkpoint, either because no instructions requiring checkpoints have been issued or because no time-out checkpoints have been created, then a backup should not be performed. Instead, recovery using backstep(s) only, from ISN backward to the faulting instruction is appropriate, unless the faulting instruction sits in the serial number slot immediately after a checkpoint. For example, if checkpoint m has been allocated and has serial number SN=10, then if the instruction sitting in slot SN=11 faults, a backup to checkpoint m is initiated, instead of a backup to checkpoint m+1. That is, the machine is backed up to the checkpoint before the faulting instruction.

When the checkpointed instruction corresponds to a speculative branch or other control transfer instruction, a program counter discontinuity exists between the checkpointed instruction and the next instruction. The exemplary backstep implementation does not backstep across Program Counter discontinuities and cannot be used in spite of there being only a single program instruction serial number difference. Program Counter and machine state can only be properly restored in this situation through a backup.

Deferred traps require a different backup destination calculation than non-deferred traps. If checkpoint m has been allocated and has serial number SN=10 for example, then if the instruction sitting in SN=11 faults and generates a deferred trap, the machine should be backed up to checkpoint m+1 (if it exists), instead of checkpoint m because ISN should point to the trapping instruction rather than to the instruction preceding the trapping instruction. If checkpoint m+1 does not exist then no backup is initiated. Instead, precise state is restored using only machine backsteps. Table 10 summarizes the backup actions taken for deferred and non-deferred traps under several conditions of checkpoint number and faulting instruction serial number.

Processor state restoration at the checkpointed instruction serial number when Backtrack 305 asserts signals (DO_BAKUP) comprising a control signal that informs CPU 51 units affected by machine backup that a backup is occurring, and four-bit data signals that inform each affected CPU 51 component of the checkpoint number to use in the backup. Since checkpointed state is stored locally in the machine, each CPU 51 unit is responsible for "restoring" state from storage areas within the affected unit in response to the DO_BAKUP signals

TABLE 10

Backup actions taken for deferred and non-deferred traps under several checkpoint and serial number conditions for embodiment of inventive method.

| Is trap Deferred or Non-deferred? | Does Trapping Instruction have SN immediately after checkpoint SN? | Is Checkpoint n+1 valid? (Checkpoint n is assumed valid.) | Backup Action Taken |
|---|---|---|---|
| Not Deferred | NO | NO | NO BACKUP |
| Not Deferred | NO | YES | Backup to n+1 |
| Not Deferred | YES | NO | Backup to n |
| Not Deferred | YES | YES | Backup to n |
| Deferred | NO | NO | NO BACKUP |
| Deferred | NO | YES | Backup to n+1 |
| Deferred | YES | NO | NO BACKUP |
| Deferred | YES | YES | Backup to n+1 |

The CPU 51 units that are responsible for storing, maintaining, and restoring the checkpointed states, as well as the CPU 51 units responsible for sequencing the backup operation (particularly the units within PSU 300) receive and respond to the DO_BACKUP signals. Note that RRF 302 receives DO_BACKSTEP signals but not DO_BAKUP signals because RRF is directly involved only with backstepping the CPU 51 and restoring states in a step-by-step manner rather than with backups.

More specifically, referring to FIG. 6, the checkpoint storage unit 106 outputs, in the form of the CHKPT_PC and CHKPT_NPC signals, the checkpointed APC and NAPC values stored by it in the entry corresponding to the checkpoint number specified by the DO_BACKUP signals. These values are then stored in the APC and NAPC registers 112 and 113. Similarly, the control register checkpoint storage unit 817 outputs, in the form of the CHKPT_CNTRL_REG signals, the control register contents checkpointed for the checkpoint specified by the DO_BACKUP signals and these contents are then stored by the RD/WR update logic in the corresponding control registers in the control register file 800, as shown in FIG. 17. Moreover, referring to FIG. 16, the checkpoint storage unit 616 of each of the FXRFRN 604, the CCRFRN 610, and the FPRFRN 605 output, in the form of the CHKPT_MAP signals, the checkpointed rename maps for the checkpoint specified by the DO_BACKUP signals. The checkpointed rename maps are then stored back in the rename mapping logic 615 by the control logic 613. Furthermore, the checkpoint storage unit 702 of the Freelist Unit 700 outputs, in the form of the CHKPT_FREELIST signal, the checkpointed freelist of the physical registers of each of the FXRFRN 604, the CCRFRN 610, and the FPRFRN 605 which are then stored in the Freelist logic 701.

In the exemplary CPU 51, backups are initiated even as etraps are still being sequenced. Since etrap exception processing may require multiple cycles, it is possible for more than one etrap to be asserted by DFB 62 before the machine is synced (ISN=CSN=RRP) and able to take and process the trap. In one embodiment of the exemplary CPU 51, each of the error and status signals (ERR_STAT) from DFB 62 for each of slots 0 and 1 comprise single bit error indication signals, six-bit serial number signals (FX_SN, FP_SN, LS_SN, and FXAG_SN), and sixteen-bit one-hot checkpoint vectors (FXDF_CHKPNT, FPDF_CHKPNT, FXDF_CHKPNT, and LSDF_CHKPNT) that will be used to compute the proper backup checkpoint for each instruction. Furthermore, mispredicted instruction information signal WP_MISPRED is a sixteen-bit one-hot vector wherein assertion of bit-i indicates that the i-th checkpoint corresponds to a mispredicted instruction and required a backup. Checkpoint Vector Logic Unit 404 cumulatively OR's all of the sixteen-bit one-hot checkpoint vectors from each of the slots 0 and 1 until the machine is able to vector into the trap table. The "ORed" checkpoint vector is fed into Select Earliest Checkpoint Logic 405 which determines the earliest checkpoint. Even if execution exceptions occur that correspond to later instructions, no backup to checkpoints which have already been killed through a prior backup will be initiated. In the exemplary CPU 51, the watchpoint mispredict signal (WP_MISPRED) is a sixteen-bit one-hot vector wherein assertion of bit-i indicates that the i-th checkpoint corresponds to a mispredicted instruction and required a backup.

3. Processor Backstep to Any Instruction Boundary

A machine backstep will be initiated only as a result of execution exceptions (etraps) generated from faulting instructions in DFB 62. Machine backstep frequently occurs in combination with machine backup but may be initiated without also initiating backup.

Backstep Unit (BKST) 403 is responsible for performing backsteps. Machine "backsteps" will only occur as a result of etraps generated from faulting instructions in DFB 62. When backsteps are performed, two events occur in the machine. First, resources are reclaimed (See ICRU 301 and RRF 302 description) and made available as pending instructions are killed. These resources include serial numbers, checkpoints, watchpoints, and allocated physical and logical registers. Secondly, ISN is decremented during backstepping but can never be decremented to go behind CSN and RRP, The faulting instruction still has its active-bit in A-Ring 312 set, thereby preventing CSN and RRP advancement. Only when the faulting instruction has been executed successfully handling deferred traps, the A-Bit (and M-bit) is clear to permit CSN (and NMCSN) advancement and eventual recovery of resources.

Machine backstepping is initiated in BKST 403 by a backstep launch control signals (BACKSTEP_LAUNCH) and a backstep serial number identification signal (BACKSTEP_TO_SN) from PLSM 307 which identify the serial number of the instruction we want to use to backstep to. In response, BKST 403 starts sequencing the backstep procedure by generating a backstep notification signal (DO_BACKSTEP) that informs ICRU 301 and other CPU 51 units that Backtrack 305 is initiating a backstep mode. BKST 403 starts generating a signal that identifies a count of the number of instructions to backstep over and can be viewed as a satellite controller which can be initiated to fulfill a task by PLSM 307. BKST 403 starts the task at PLSM's request, and upon fulfilling the task, indicate the end of the task to PLSM, and await the next request.

BKST 403 handles backsteps for two types of conditions. The first type is a non-deferred etrap. The non-deferred etrap is signaled when a deferred trap signal is not asserted (ISA_DEFERRED_TRAP=0) by PLSM 307 and the backstep launch control signal is asserted (BACKSTEP_LAUNCH=1) to indicate an etrap which is not a deferred trap. In this case, a backstep amount is calculated in BKST 403 by determining the difference between the serial number to be backstepped to (BACKSTEP_TO_SN) and the Next Issued Serial Number (NISN). Using the next issued serial number NISN) rather than the Issued Instruction Serial Number (ISN) results in the machine backing up to the instruction just before the faulting instruction. This backstep amount is saved in a memory storage area within the CPU 51 and decremented until the instruction before the faulting instruction is reached.

The second backstep condition involved deferred etraps. A deferred etrap is signaled by signaled when a deferred trap signal is asserted (ISA_DEFERRED_TRAP=1) by PLSM 307 and the backstep launch control signal is asserted (BACKSTEP_LAUNCH=1) to indicate an etrap which is a deferred trap. In this case, a backstep amount is calculated in BKST 403 by determining the difference between the serial number to be backstepped to (BACKSTEP_TO_SN) and the Issued Serial Number (ISN). Here, the machine is backstepped to the faulting instruction rather then the instruction before the faulting instruction. The calculated backstep amount will be one less than the normal non-deferred case.

In the exemplary CPU 51, a maximum of four instructions may be backstepped over in each machine cycle. Therefore, multiple backstep cycles of up to four instructions each are executed to arrive at the destination (backstep to)s instruction. In general, there is no need to limit the number of instructions backstepped over in a single cycle. A further limitation in the exemplary embodiment is that the backstep method does not support backstepping over instructions that cause program counter discontinuities since decrementing the PC from ISN (or NISN) by the backstep amount may not result in proper state restoration.

A simple state machine consisting of two states, "IDLE" and "BACKSTEP," is used to sequence the backstep. While in IDLE state, assertion of "BACKSTEP_LAUNCH" results in a transition to state BACKSTEP. While in state BACKSTEP, DO_BACKSTEP is asserted, and two termination conditions are evaluated. Either of these two conditions will result in termination of the BACKSTEP and returning to state IDLE.

Restoring CPU 51 state during backstepping only involves updating machine register resources and decrementing the program counter (PC) by the backstep amount. As described, instructions which may modify architectural control registers either sync the machine or are checkpointed, therefore there is no need to restore architected control registers during a backstep. In the exemplary CPU 51, the following machine states are updated during a backstep: Program Counter (PC), Next PC, information stored in RRF, and information stored in the Rename Maps. Other Control Registers including Trap PC, Trap NPC, and Privileged registers in BRB 59 are not modified or updated by backstepping. Machine resources are reclaimed from the Register Files in conjunction with logical-to-old-physical mappings stored in the Register Reclaim Format File (RRF) 302. When the backstep notification signal is asserted (CO_BACKSTEP), it informs ICRU 301, RRF 302, and other CPU 51 units that a backstep mode is being initiated. At backstep, the number of RRF 302 items to be reclaimed and restored during each backstep cycle is equal to the number of instructions to be backstepped over as indicated by the backstep count signal (with DO_BACKSTEP).

Therefore, the CPU 51 units that are responsible for storing, maintaining, and restoring these states, as well as CPU 51 units responsible for sequencing the backstep operation (particularly the units within PSU 300) receive and respond to the backstep control signals including units within BRB 59, ISB 61, and DFB 62. RRF 302 receives DO_BACKSTEP signal but not DO_BACKUP signals because RRF is directly involved only with backstepping the CPU 51 and restoring states in a step-by-step manner rather than with backups.

Figure 41:
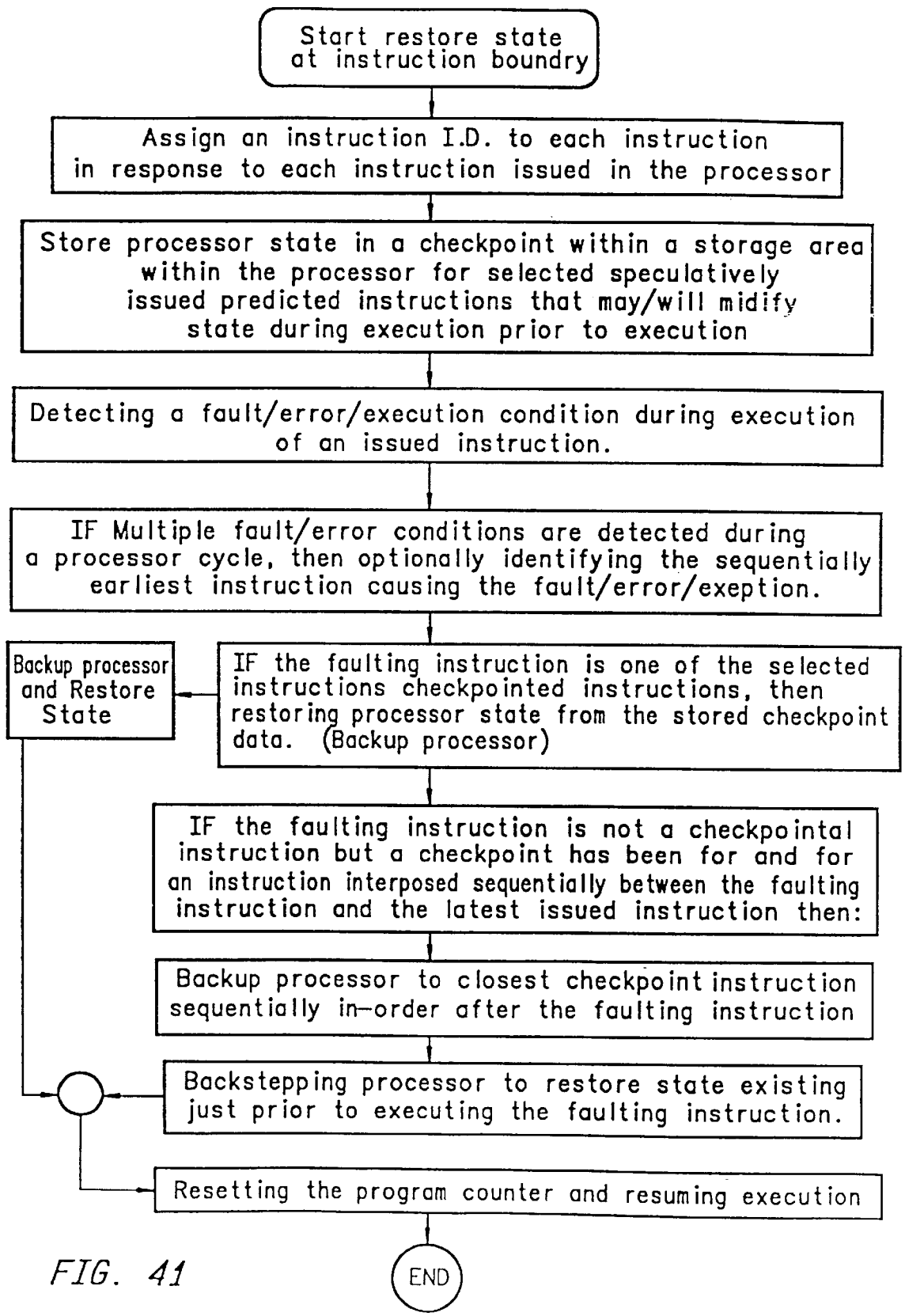
FIG. 41 is a diagrammatic flow-chart of an embodiment of the inventive method for maintaining and restoring precise state at any instruction boundary including the backup and backstep procedures.

Register Reclaim Format Unit 302 responds to the backstep asserted signal (DO_BACKSTEP) and the number of RRF items to be reclaimed and restored is equal to the backstep count within the DO_BACKSTEP signal. RRF contains the logical-to-old physical register map, that is, the assignment of logical to physical registers that hold source or destination data values. Since none of the register resources allocated to instructions in RRF 302, or the register maps, have been freed back to Freelist 700 by advancement of CSN or RRP, the actual data in registers has not been disturbed. RRF permits the physical registers (old physical register) to be reassociated with the logical register in the same relationship as when each backstepped instruction was originally executed. By restoring the register mappings on a step-by-step basis, the register state at each instruction is restored. From the standpoint of register resources, in effect, the machine is run backwards during backstepping. FIG. 18 shows a block diagram of RRF. FIG. 41 shows the manner in which the logical to physical mappings are restored in the register rename files FXFRN, CCFRN, FCCFN, and FPFRN.

In the exemplary embodiment of the RRF, the logical to old physical register information comprising several signals (LOG_OPHYS_TAGS) are bundled together in Read/Write Control unit 365 for storage in either the data storage structure or unit 366. When the RRF is read out for restoration in the Register Rename Maps, the RRF data is unbundled to restore it to its original format. Those workers having ordinary skill in the art, in light of the teachings herein will realize that various storage formats and bundling/unbundling routines may be applied to the RRF data to minimize storage area.

Specifically, when backstepping occurs, the read/write logic 365 controls the storage unit 366 to output, in the form of the LOG_OPHYS_TAGS_BKST signals, the logical to old physical register tag mappings corresponding to the instruction identified by the DO_BACKST signals. Then, referring to FIGS. 8, 16, 18 and 39, the logical to old physical register tag mappings are restored to the FXRFRN604, FPRFRN 606, and the CCRFRN 610. As shown in FIG. 16, the control logic 613 in response to the DO_BACKST signals restores these mappings to the rename mapping logic 615.

A more elaborate backstepping scheme may be implemented by maintaining additional information; however, the inventive backstepping method is simplified since program counter values correspond to instructions within a basic block, that is, there are no program counter discontinuities among the instructions that may be backstepped over. Backstep unit 403 merely signals a number of backsteps from the checkpointed instruction serial number, or from the current ISN when backsteps are used without backup, to arrive at the faulting instruction. If program discontinuities were present, merely decrementing the program counter would not necessarily result in proper restoration. However, those having ordinary skill in the art, in light of the teachings contained herein, would realize that by using more sophisticated backstepping techniques that program counter discontinuities could be tolerated.

Figure 42A:
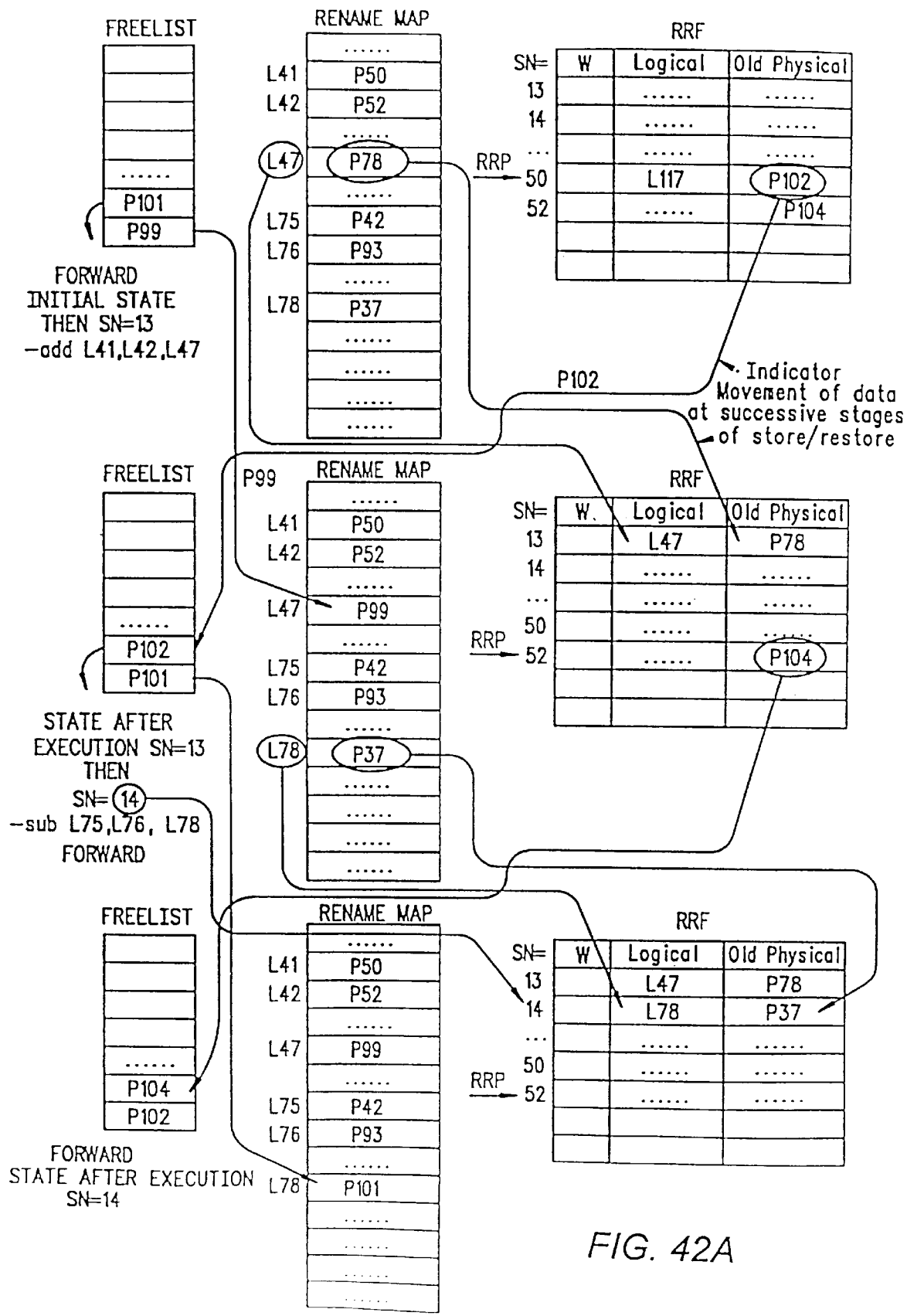
FIGS. 42A and 42B shows the manner in which the logical to physical mappings are restored in a register rename file.
Figure 42B:
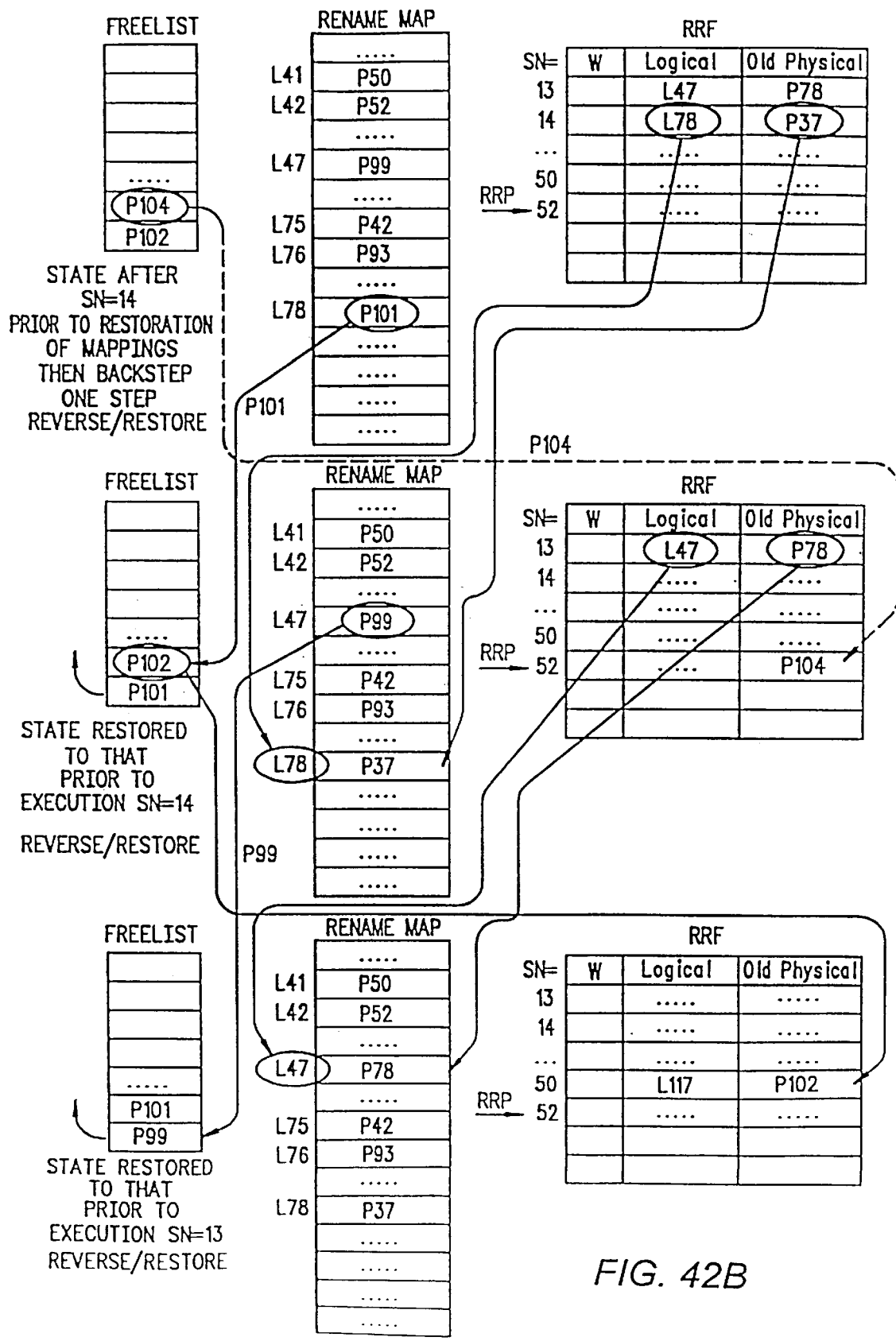

The two backtrack mechanisms, machine backup and machine backstep, provide the Precise State Unit an efficient method and structure for undoing speculative instructions sequences. Machine backups allow the Precise State Unit to bring the CPU 51 to a state corresponding to an active checkpoint boundary. Machine backsteps allow the Precise Sate Unit to backtrack the CPU 51 to a specific instruction boundary between checkpoint boundaries. Backups provides a coarse but fast method and structure for restoring machine state. FIG. 41 is a diagrammatic flow-chart of an embodiment of the inventive method for maintaining and restoring precise state at any instruction boundary. FIG. 42 shows the manner in which the logical to physical mappings are restored in a register rename file.

Figure 43:
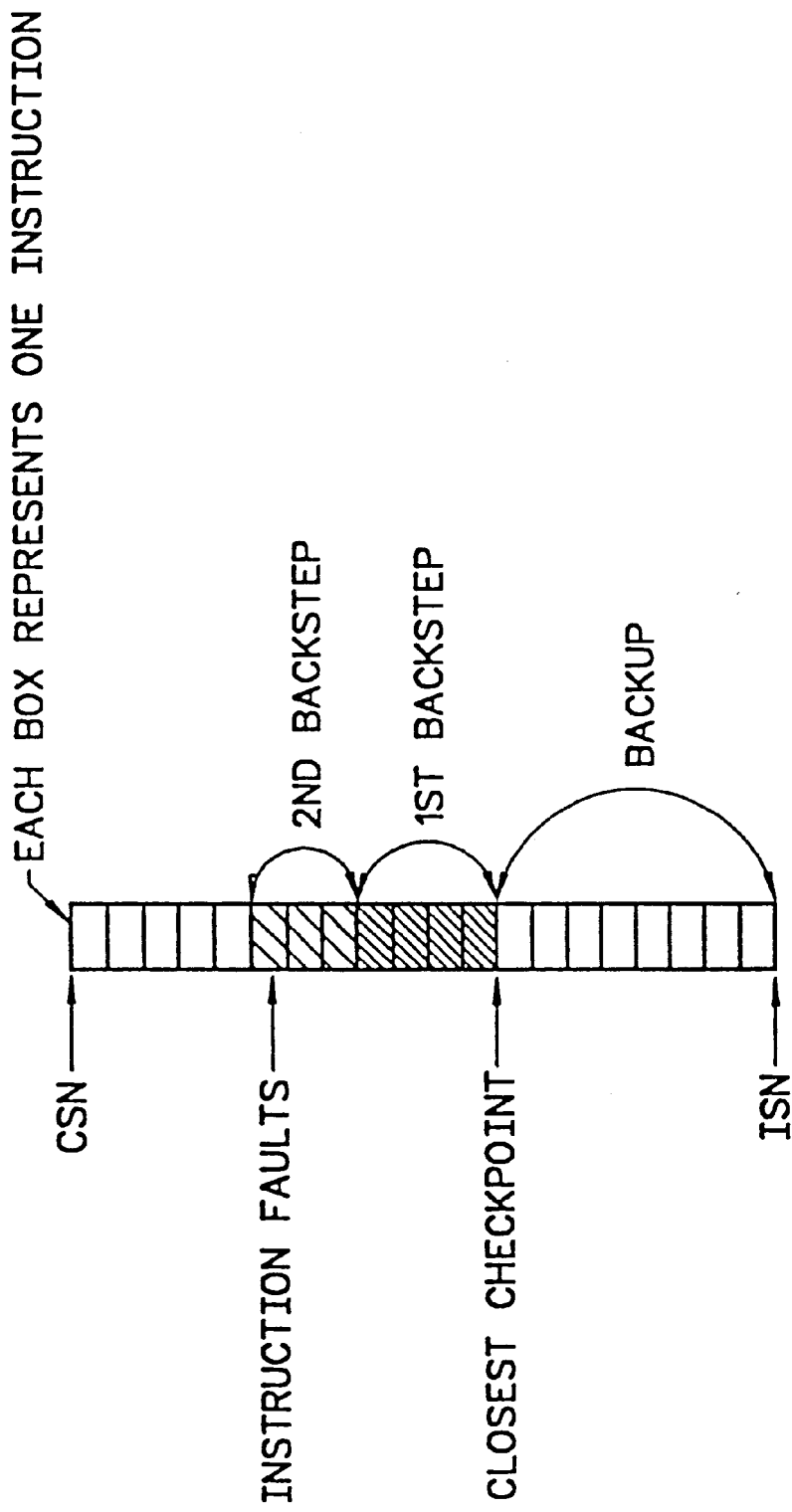
FIG. 43 provides an illustrative example of a machine backtrack including a single machine backup to a checkpoint boundary followed by two machine backsteps to an instruction boundary.

FIG. 43 provides an illustrative example of a machine backup followed by two machine backsteps. Backsteps can be executed as single steps or as multiple steps backing over several instructions at a time. In this example the CPU 51 has already issued an instruction corresponding to pointer ISN when the instruction fault is detected. The machine responds by backing up the machine to the closest checkpoint after the faulting instruction. Instructions between the closest checkpoint and ISN are killed. Then the first backstep by an amount of four instructions brings the machine closer to the faulting instruction by reclaiming all resources dedicated to the four instructions (see First backstep) during issue of those instructions. Then, the second (and last) backstep by the amount of three instructions takes the machine right before the faulting instruction by reclaiming all resources dedicated the those remaining instructions (see second backstep region).

Backing up to a checkpoint is fast but it requires a lot of machine resources to store the checkpointed state. Since all predicted instructions cause a checkpoint to be made, state can be restored to a mispredicted instruction in one step. Backstepping is slower than backing up, but the backstep procedure of this invention allows machine state to be restored to the state which existed at the point of execution of a specific instruction, rather than at a checkpoint prior to the faulting instruction. And, because of th inventive backstepping structure and method, machine sate can be restored to a checkpoint after the faulting instructions, rather than to a checkpoint before a checkpoint as in conventional methods, and then backstepped to the faulting instruction.

Figure 44:
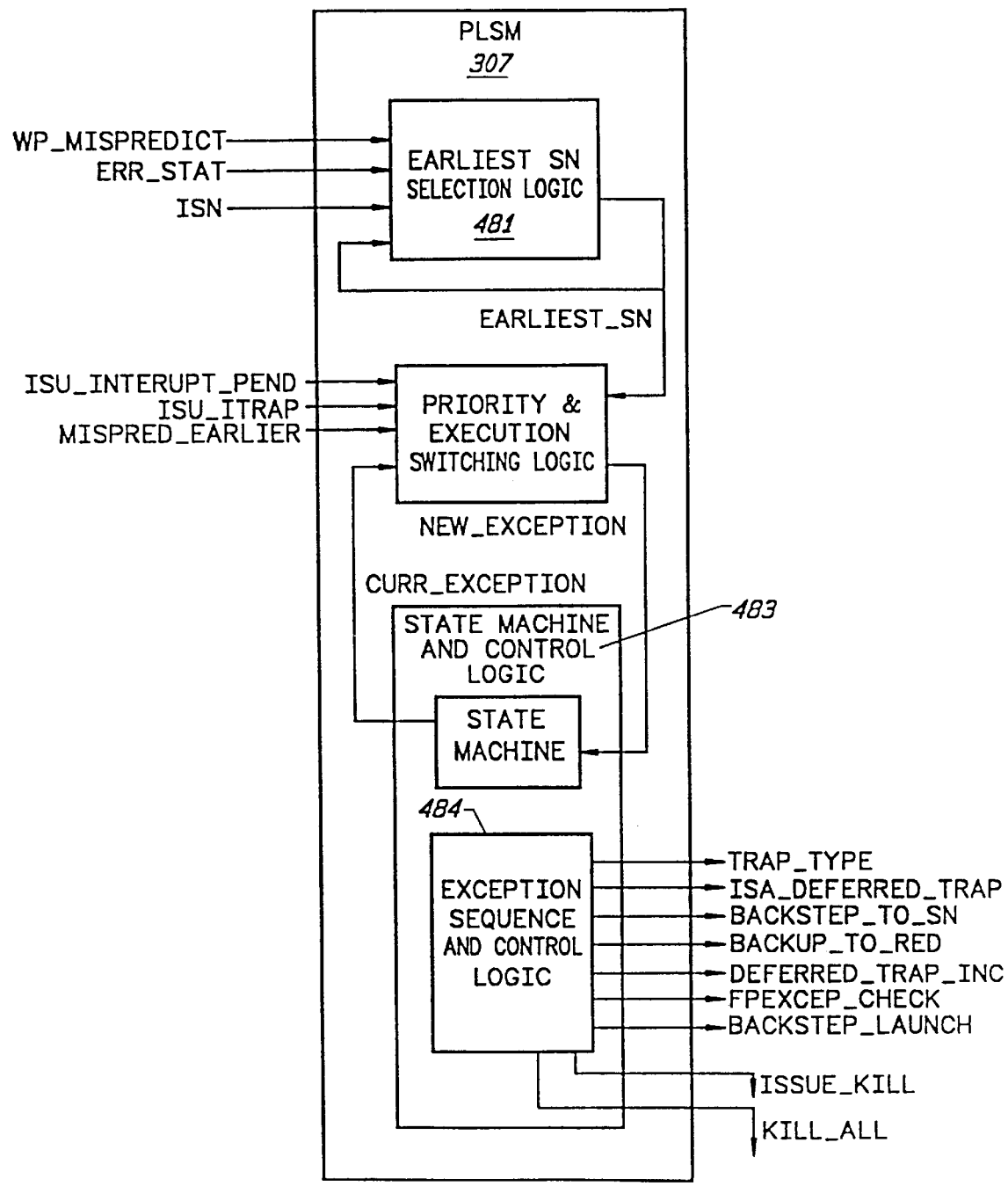
FIG. 44 shows an exemplary Priority Logic and State Machine (PLSM).

D. Priority Logic and State Machine Operation During Exception & Misprediction Recovery FIG. 44 shows an exemplary Priority Logic and State Machine (PLSM) 307 functionally located within CPU 51. PLSM 307 has several responsibilities. First, it identifies the earliest exception within a group of pending or concurrent exceptions. Exception conditions include RED Mode, issue traps (itraps), execution traps (etraps), interrupts, and mispredicts. Second, it priorities the exceptions and mispredictions arriving during a machine cycle among each other and among the currently handled exception and those that may be waiting to be handled. Third, it determines the possible state transitions between different types of exceptions and mispredictions. Fourth, it issues control signals that initiate Backtracking (Backup and/or Backstep), RED mode processing Various exception types that may occur during instruction issue or execution are now described so that the prioritization and handling of the exceptions and mispredictions by PLSM 307 may be better understood. RED traps are asynchronous traps that may occur under various conditions and have the highest priority of all traps. RED Mode is described in the SPARC V-9 Architecture Manual. Itraps are issue traps generated by ISU 200 on instruction issue. These include any of the register spill/fill traps, any of the trap instructions (TA, Tcc), instruction access errors, illegal instructions, privileged opcode, and the like. Generally, issue traps have higher priority only compared to interrupts which have the lower handling priority. All other traps (mispredicts, etraps, or red traps) which are signaled will be to instructions which are temporally earlier than the itrap.

Etraps are execution traps which are signaled from one of the data forward busses. Execution traps must be prioritized against other execution traps on the bases of SN order. This is because etraps may not always occur at a checkpoint boundary and Backsteps may be required to reach the faulting instruction. If the machine performs a Backup to reach the instruction, then any new exceptions will be to an earlier instruction. If an etrap is currently being sequenced, then any new mispredicts will be of higher priority. This is because mispredicted instructions always have a chekpoint available to them. If PSU 300 is not already sequencing any exceptions, then etraps and mispredicts should be prioritized against each other. Interrupts are another type of asynchronous trap. Interrupts have priorities lower than all other exceptions.

Mispredicts are signaled by the Watchpoint Unit 304 when Watchpoint detects that a speculatively issued control transfer instruction was mispredicted. If any non-RED exceptions are being sequenced, mispredicts do not need to be prioritized since they always lie on a checkpoint boundary and will occur to a temporarily earlier instruction. If no exception is being sequenced then mispredict will have higher priorities than interrupts and itraps, but must be prioritized against etraps.

Earliest Serial Number Selection Logic Unit (ESNSL) 481 receives instruction serial numbers for instructions that have completed execution and status information, including information that an exception occurred or not during execution and exception type information, from each execution unit DFB 62, a signal (WP_MISPREDICT) from Watchpoint Unit 304 indicating any mispredictions that have occurred that cycle, the current ISN, and a feedback signal from ESNASL 481 indicating the SN of the exception being handled in the current machine cycle prior to receipt of the new exception information. From the last machine cycle (CURR_EARLIEST_SN). Signals from each of the execution units include ERR_STAT. For example, if exceptions occur for instruction SN=10 and SN=56 in a 64 location A-ring 312, the earliest exception cannot be determined without also knowing the value of ISN. If ISN=40, then SN=56 is the earliest exception; however, if ISN=6, then SN=10 s the earliest exception.

ESNSLU 481 informs Priority & Execution Switching Logic (PESL) Unit 482 of the earliest exception or misprediction so that PESL can prioritize exception and misprediction handling based on both the earliest SN criteria and on the exception type. PESL also receives issue trap signals (ISU_ITRAP) and interrupt signals (ISU_INTERRUPT_PEND) from ISU 200, and a MISPREDICTED_EARLIER signal from Backtrack Unit 305 if Backtrack was able to determine that the misprediction occurred earlier than an execution trap based on a comparison of checkpoint information. PESL also receives a state signal from State Machine and Control Logic (SMCL) 483, which includes State Machine 484 and Exception Control Signal Generation Logic 484, identifying the current exception type (CURR_EXCEPTION_TYPE), if any, being handled (e.g. etrap, itrap, RED, or the like). Exception State is stored in State Machine 484. PESL 482 uses these inputs to prioritize the current and pending exceptions and generates a signal that identifies the new exception type for the present machine cycle (NEW_EXCEPTION_TYPE).

Exception Control Signal Generation Logic (ECSIG) 484 is responsible for generating several signals that inform other units within CPU 51 the state of the CPU and in some instances directs other CPU units to take further action in response to the state. More Specifically, ECSIG generates and sends a TAKE_TRAP signal to the Trapstack Unit that includes a control portion that a trap should be taken, and the kind of trap. It sends a DEFERRED_TRAP_INC to ICRU 301 indicating if a deferred trap has occurred so that CSN and NMCSN should be advanced by one to advance past the exception. ECSIG also sends several signals to Backtrack Unit 305 including a signal that tells Backtrack 305 which instruction SN to backstep to (BACKSTEP_TO_SN); which the existence of a RED mode exception and the instruction to Backup to (BACKUP_RED) in the event of a RED Mode exception. ECSIG 484 also generates instruction kill signals to DFB 62 (KILL_ALL) and to ISU 200 (ISSUE_KILL) that instruct DFB to kill execution of instructions in the execution queues and to stop issuing instructions in the ISU respectively as appropriate to the exception or misprediction being handled during that machine cycle.

PLSM 307 tracks and differentiates traps into five different types: interrupts, red traps, itraps, etraps, and mispredicts. Depending on which exception is currently being sequenced, other exceptions that are detected may or may not have higher priority. If new exceptions have higher priority, PESL 482 tells SMCL 483 to switch from sequencing the current exception to the new higher priority exception or misprediction. These potential state transitions in State machine 484 are based on the current exception type, whether a new error has been reported from the Watchpoint, ISU, or any of the six data forward buses, and whether the new exception is temporally earlier than the current exception.

Possible state transitions may occur as follows: RED—No other trap types will force a transition from state RED.

ITRAP—Three trap types (mispredicts, etraps, red alerts) can force transitions and always have higher priorities,, other etraps require prioritization, and interrupts have lower priorities, while itraps are impossible since the machine is either backing-up or waiting for machine sync so that no instructions that could cause itraps are being issued. INTERRUPT—All trap types have higher priorities and can force transitions. MISPREDICT—Three trap types (mispredicts, etraps, red alerts) have higher priorities and do not require prioritization, interrupts have lower prioritizes, while itraps should not occur since instruction issue is being killed during mispredict handling. IDLE—Red traps have highest priority, followed by any one of the four trap types where simultaneous mispredicts and etraps will result in transition to BACKUP where a determination is made as to whether the mispredict or etrap occurred earlier based on a comparison of checkpoints. (Deferring to checkpoint based prioritization is preferred since Backtrack is able to make the determination more rapidly than priority; however, the prioritization may be performed in PSLM. Finally, itraps and then interrupts will be sequenced.

E. Handling of Traps with Trap Stack

As indicated previously, traps often occur in the instruction pipeline of FIG. 5 and must be handled (i.e., taken) by a trap handling routine. Referring to FIG. 17, when the PSU 300 detects an exception in the manner described earlier for which a trap is to be taken, the PLSM 307 generates TAKE_TRAP signals instructing the control register file 800 to take a trap and identifying the type of trap to be taken. In response, the rd/wr/update logic 816 reads the corresponding trap vector (TRAP_VEC) signal from the TBA register 812 and sends it to the BRB 59. Referring to FIG. 6, the PC logic 106 uses the TRAP_VEC signal to compute a new FPC, APC, and NAPC to fetch and issue the instructions of the corresponding trap handling routine.

So that traps that occur within a trap handling routine may be handled in a nested fashion (i.e., traps taken within taken steps), as specified by the SPARC-V9 architecture, the control register file 800 includes the trap stack unit 815, as shown in FIG. 17. The trap stack unit 815 is shown in greater detail in FIG. 45. It includes a trap stack 820 that is a data storage structure with storage elements or entries.

Each storage entry has four fields which are designated by the SPARC-V9 Architecture Manual as the trap program counter (TPC), trap next program counter (TNPC), trap state (TSTATE), and trap type (TT) fields. The TPC and TNPC fields contain at the time a trap is taken the APC and NAPC values in the APC and NAPC registers 113 and 114 of the BRB 59. As described in the SPARC-V9 Architecture Manual, the TSTATE field contains at the time the trap was taken the contents of the XICC register in the CCRFRN 610 shown in FIG. 39 and the contents of the ASI, CWP, and PSTATE registers 808, 809, and 805 shown in FIG. 17. The TT field identifies the type of trap taken.

Turning again to FIG. 45, in general, when a trap is taken, the current PC, NPC, TSTATE, and TT values are stored in the corresponding fields of one of the storage entries of the trap stack 820. The trap level (TL), which indicates the number of nested traps taken, is then incremented and a trap handling routine begins handling the taken trap. If however a trap occurs during the trap handling routine, then the PC, NPC, TSTATE, and TT values at the time of these second trap are stored in the corresponding fields of another one of the storage entries of the trap stack 820. Then, a second trap handling routine is called upon to handle the second trap. At the end of the second trap handling routine, a DONE or RETRY instruction is executed which causes the PC, NPC, and TSTATE values stored in the storage entry for the second trap to be written to the corresponding registers and the trap level to be decremented. As a result, the CPU 51 is returned to the state at which it was when the second trap was taken and the first trap handling routine resumes handling the first trap. Then, when a DONE or RETRY instruction of the first rap handling routine is executed, the CPU 51 is returned to its original state when the first trap was taken.

From the foregoing, it is evident that, as required by the SPARC-V9 architecture, the trap stack unit 815 includes multiple trap levels to support the handling of multiple nested traps. However, while the SPARC-V9 architecture only specifies a strap stack with four storage entries to support four trap levels, the trap stack 820 includes eight storage entries 0–7 to support the four required trap levels. The additional four storage entries are used so that the concept of register or storage element renaming can be extended to the trap stack unit 815 as described next so that traps may be taken and returned from speculatively. Moreover, as expressed earlier, the present invention will work with any number of trap levels so long as the number of storage entries are larger than the number of trap levels.

Figure 46:
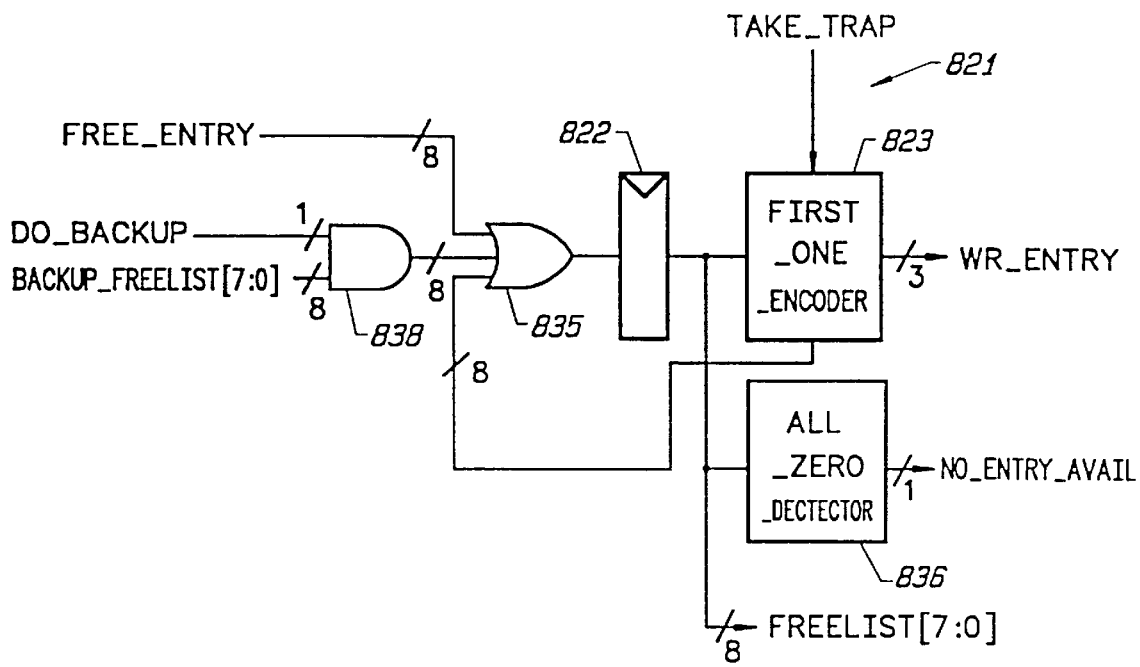
FIG. 46 shows an embodiment of Freelist Logic for storing a list of the storage elements of the Trap Stack.

The trap stack unit 815 includes freelist logic 821 that stores a list of all of the storage entries of the trap stack 820 which are currently available for storing the TPC, TNPC, TSTATE, and TT values associated with traps. Referring to FIG. 46, the freelist register 822 stores during each machine cycle a list of the currently available storage entries in the form of an eight bit FREELIST vector signal. Each bit of the FREELIST signal corresponds to one of the storage entries of the trap stack 820 and identifies if that storage entry is currently available. For the first storage entry identified by the FREELIST vector as being available, the first-one-encoder 823 then encodes the vector into the WR_ENTRY signal which identifies this storage entry and serves as pointer for writing the TPC, TNPC, TSTATE, and TT values for the next trap to be taken.

The FREELIST logic 821 also includes an all-zero-detector 836. It determines when the FREELIST signal contains all zero bits and therefore indicates that no storage entries in the trap stack 820 are available. If this occurs, then it asserts the NO_ENTRY_AVAIL signal.

Figure 45:
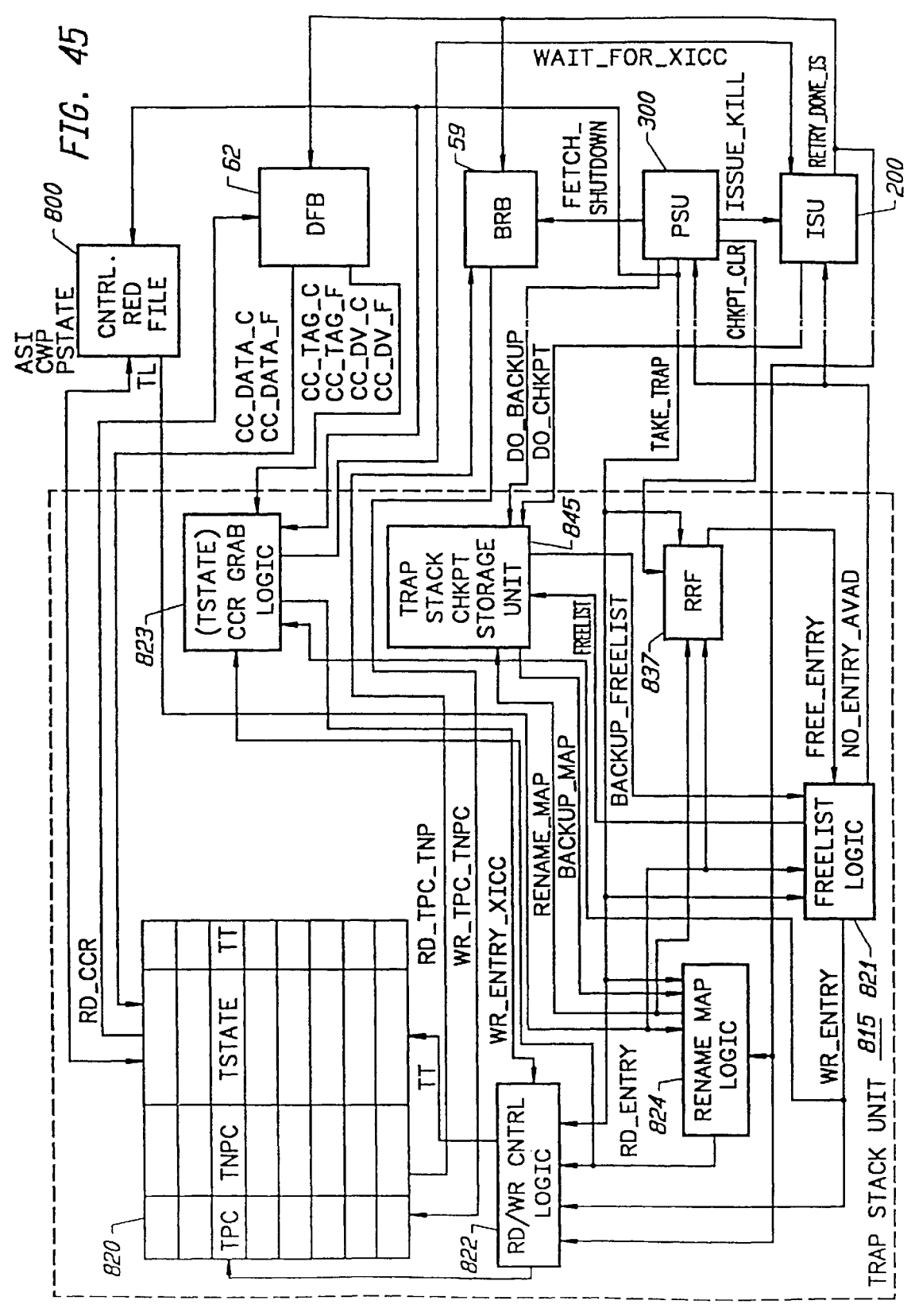

Referring now to FIG. 45, when the PSU 300 determines that a trap is to be taken, but the NO_ENTRY_AVAIL signal indicates that no storage elements are available, the TAKE_TRAP signals it issues will not indicate to take a trap until the NO_ENTRY_AVAIL signal indicates that a storage element is available. Moreover, the PSU 300 will assert the ISSUE_KILL and the FETCH_SHUTDOWN signals to stop issuing of any instructions by the ISU 200 and fetching of instructions by the BRB 59 until the NO_ENTRY_AVAIL signal indicates that a storage entry is available. This has the effect of syncing the CPU 51 so that, as will become clearer shortly, checkpoints are retired and storage entries in the trap stack 820 may be reclaimed and become available.

But, when the NO_ENTRY_AVAIL signal is not asserted, the PSU 300 outputs to the control register file 800 the TAKE_TRAP signals which, as indicated earlier, include a signal that indicates that a trap is to be taken and a signal that identifies the type of trap it is. In response, the control register read/write and update (RD/WR/UPDATE) logic 816 reads the contents of the ASI, CWP, and PSTATE registers 808, 809, and 805 and provides them to the trap stack 820 of the trap stack unit 815.

At the same time, the trap stack 820 receives the WR_TPC_TNPC signals that contain the current APC and NAPC values to be written to the TPC and TNPC fields of the trap stack 820. And, as will be discussed later, the trap stack 820 receives the XICC data of the XICC register in the FSR/CCRFRN 610 of FIG. 8 when they become available.

In response to the TAKE_TRAP signals, the trap stack read/write control (RD/WR) logic 822 extracts the trap type (TT) field contained by the TAKE_TRAP signals and provides it to the trap stack 820. Then, the RD/WR logic 822 writes the received APC, NAPC, ASI, CWP, PSTATE, and TT values immediately into the appropriate field of the storage element pointed to by the WR_ENTRY signal. Moreover, as described later, the XICC data are written into the TSTATE field of this same storage element in response to the WR_ENTRY_XICC signal when the contents of the logical XICC register become available.

Referring to FIG. 17, the control register RD/WR/UPDATE logic 816 then receives the old TL value from the TL register 811 and increments it. It then writes the new TL value back into the TL register 811.

Figure 47:
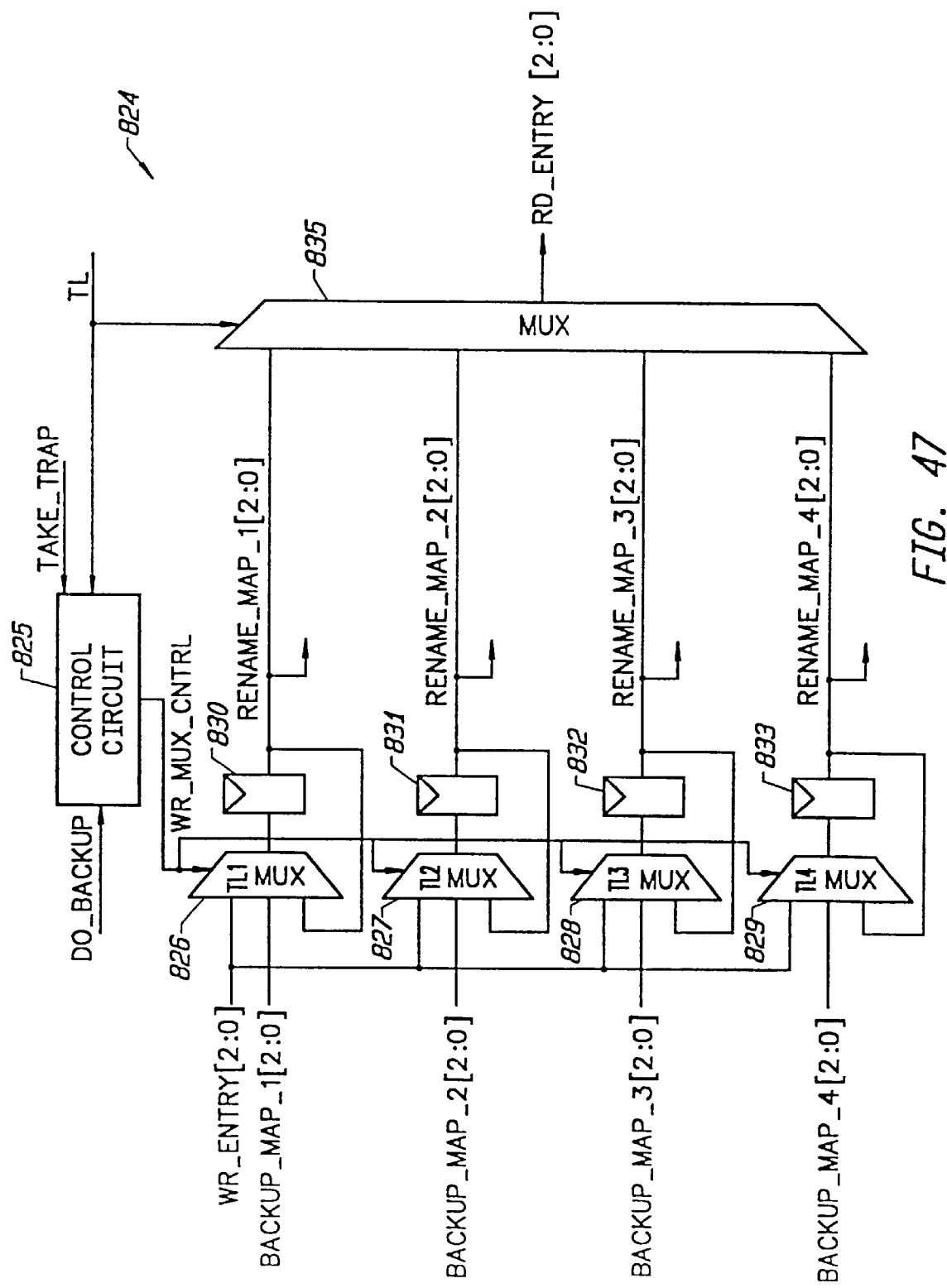
FIG. 47 shows exemplary Rename Map Logic.

As shown in FIG. 45, the trap stack rename mapping (RENAME MAP) logic 824 receives the new TL value and the TAKE_TRAP and WR_ENTRY signals. Referring to FIG. 47, the RENAME MAP logic 824 includes TL1–4 (traps level 1–4) write multiplexers 826–829 and TL1–4 registers 830–833 which each correspond to one of the four trap levels. In response to the new TL value and the TAPE_TRAP signal, the control circuit 825 of the RENAME MAP logic 824 controls the TL1–4 write multiplexers 826–829 with the WR_MUX_CNTRL signals so that the WR_ENTRY signal is stored in the register that corresponds to the trap level identified by the new TL value and also so that the other registers re-store the same value they stored in the previous machine cycle.

Thus, the storage entry identified by the WR_ENTRY signal stored in one of the registers is mapped to the current trap level identified by the new TL value in the RENAME MAP logic 824. Furthermore, the storage entries identified by the signals stored in the other registers remain mapped in the same way as they were in the previous machine cycle.

Referring again to FIG. 46, the first-one-encoder 823 of the FREELIST 821 also receives the TAKE_TRAP signals. When the TAKE_TRAP signals indicate to a trap, first-one-encoder 823 sends back to the OR circuit 835 an eight bit signal with the bit that corresponds to the WR_ENTRY signal set to "0". The OR circuit 835 also receives the eight bit FREE_ENTRY signal from the RRF logic 837 (shown in FIG. 45) whose bits identify those of the storage entries of the trap stack 820 that have been reclaimed in the last machine cycle and are now available. During a backup, the OR circuit 835 receives from the AND circuit 838 the eight bit BACKUP_FREELIST signal whose bits identify the storage entries that were available at the time the checkpoint that was backed up to was made. The bits of the signal received from the first-one-encoder 823 are logically ORed with the corresponding bits of the FREE_ENTRY and BACKUP_FREELIST signals and the resulting FREELIST signal is provided to the register 822. Thus, barring a backup, the FREELIST signal in the next machine cycle will indicate that the storage element corresponding to the bit in the WR_ENTRY signal that was set to "0" is no longer available.

Referring again to FIG. 7, at the same time that the PSU 300 generates the TAKE_TRAP signals, it also requests with the CHKPT_REQ signal that the ISU 200 allocate a checkpoint for the first issued instruction of the trap handling routine. In response, the ISU 200 outputs the DO_CHKPT signals to various blocks and units within the CPU 51, including the control register file 800.

Turning to FIG. 47, the RENAME_MAP_1–4 signals are output by the TL1–4 registers 830–833 and therefore respectively correspond to the trap levels 1–4. Moreover, since these signals are output by the TL1–4 registers 830–833, they provide the current mapping of the storage entries to the trap levels 1–4.

Figure 48:
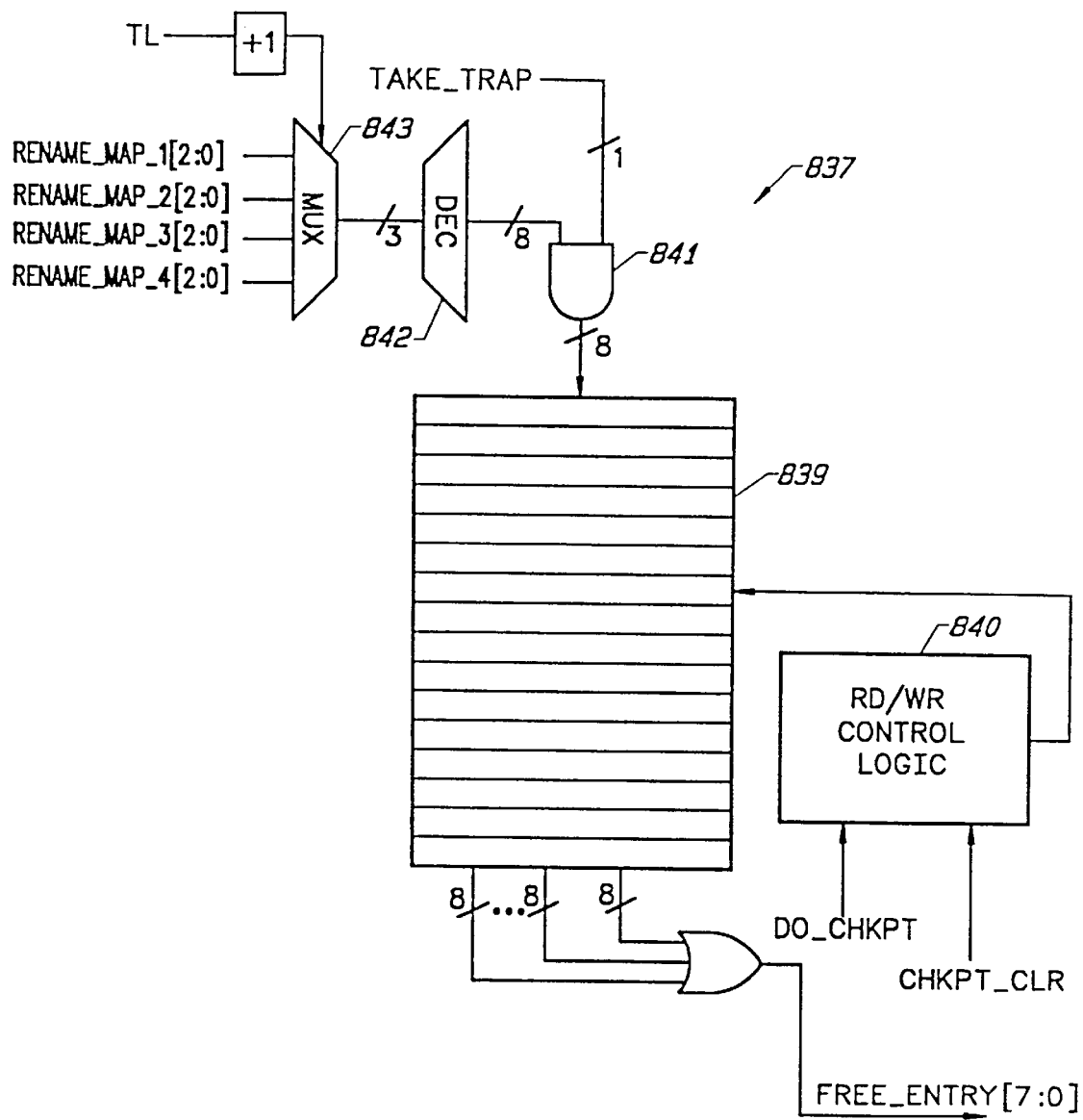
FIG. 48 shows an exemplary Trap-Stack RRF.
Figure 49:
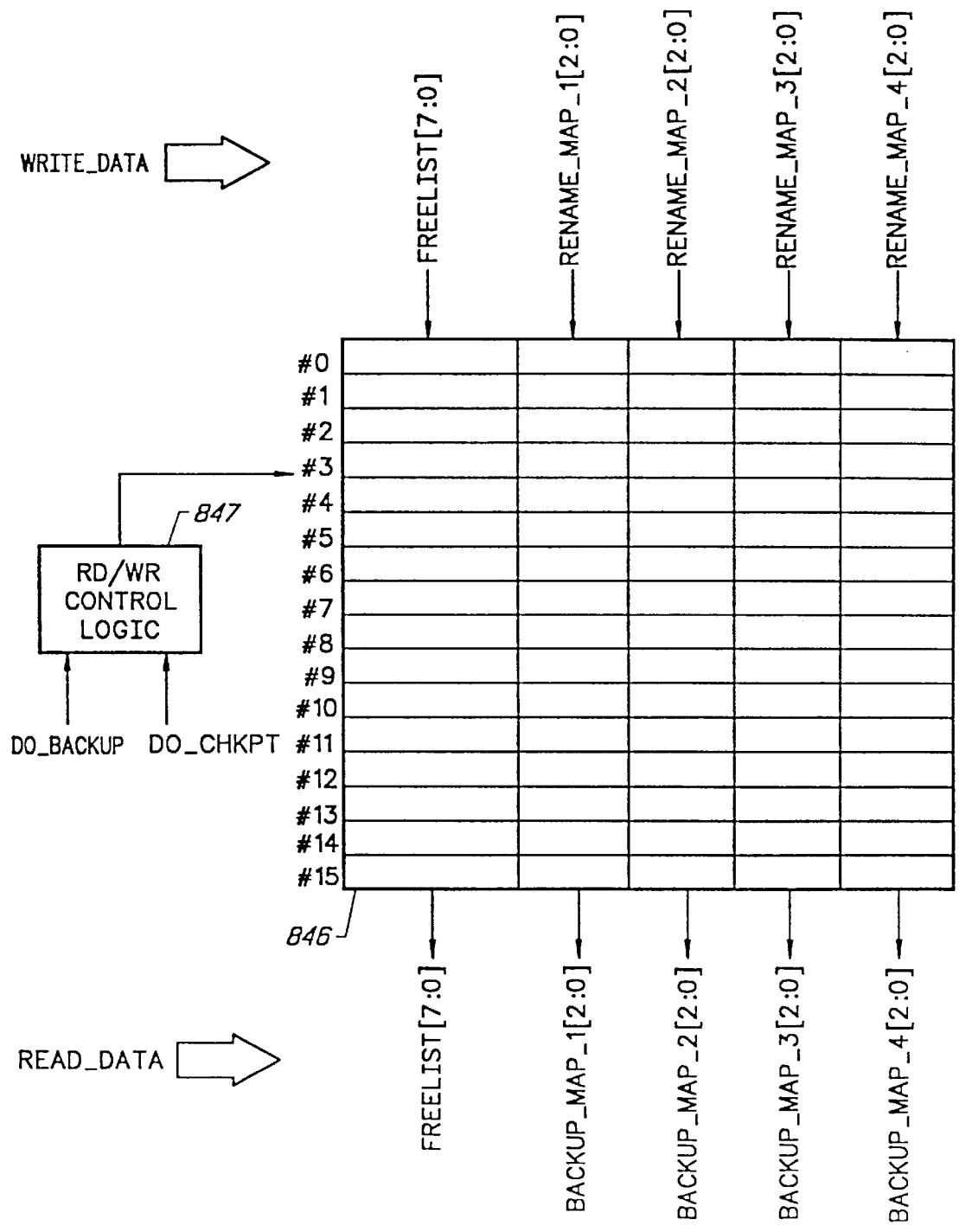
FIG. 49 shows the Trap Stack Checkpoint storage unit.

But, as described earlier, when a trap is taken, the RENAME MAP logic 824 maps a new available storage entry to the new trap level (TL). But, the old mapping of another storage entry to these trap level must be kept track of in case backing up occurs as described earlier. Thus, referring to FIG. 48, the RRF logic 837 preserves these old mappings from the RENAME_MAP_1–4 signals it receives from the RENAME MAP logic 824 until they are no longer needed.

When a trap is taken, the multiplexer 843 outputs the RENAME_MAP signal that corresponds to the TL (i.e., the old TL incremented by one) for the new trap. In other words, the multiplexer selects only the RENAME_MAP signal which will reflect a new mapping in the next machine cycle. This signal is the encoded by the decoder 842 into an eight bit signal indicating which of the storage entries is being replaced by the new mapping to the new trap level. Since the TAKE_TRAP signal will indicate that a trap is being taken, the decoded signal is provided via the AND circuit 841 to the RRF storage unit 839 of the RRF logic 837. But, when no trap is being taken, the AND circuit 842 provides the RRF storage unit 839 an eight bit signal with all bits set to "0".

The RRF storage unit 839 includes 16 storage elements or entries. Each storage entry corresponds to one of the 16 checkpoint number described earlier. Thus, when the DO_CHKPT signals indicate that a checkpoint is to be formed, the RRF read/write (RD/WR) control logic 840, writes the data received from the AND circuit 851 into the storage entry corresponding to the checkpoint number identified by the DO_CHKPT signals.

Thus, the RRF 837 maintains an unavailability list of each storage entry of the trap stack unit 820 which is not currently mapped to one of the trap levels by the current mappings of the RENAME MAP logic 824 but still unavailable for mapping to one of the trap levels because its old mapping to a trap level may need to be restored in case of a backup to a checkpoint. In this case, the storage entry is kept in the unavailability list until the retirement of the checkpoint formed at the time that the storage entry was mapped to the trap level of the trap that caused the checkpoint to be formed.

The RRF RD/WR control logic 840 also receives the sixteen bit CHKPT_CLR signal from the PSU 300. Each bit corresponds to one of the checkpoint numbers and indicates if the corresponding checkpoint has been retired (or cleared) in the manner discussed earlier. In response to this signal, the RRF RD/WR logic reads out the data from the corresponding storage entry of the RRF storage unit 839. Since the CHKPT_CLR signal may identify multiple checkpoints that have been cleared, the bits of the data read from the corresponding storage entries are ORed and combined to form the FREE_ENTRY signal which is sent as the eight bit FREE_ENTRY signal to the FREELIST logic 821 shown in FIG. 46.

In the case where a checkpoint identified by the CHKPT_CLR signal was formed when taking a trap, the storage entry identified by the FREE_ENTRY signal has been reclaimed and is now available again since the corresponding checkpoint has been retired. As a result, this trap can no longer be undone. Thus, assuming that a backup has not occurred, the bits of the FREE_ENTRY signal are then ORed with the corresponding bits of the signal provided by the first-oneencoder 823 to provide the FREELIST signal for the next machine cycle.

In the case where the checkpoint identified by the CHKPT_CLR signal was not formed when taking a trap, the data read from the corresponding storage element will be all "0" bits and thus have no impact in the generation of the FREELIST signal.

As shown in FIG. 45, the trap stack unit 815 also includes a trap stack checkpoint storage unit 845. The storage unit 845 is shown in greater detail in FIG. 48. It includes a data storage structure 846 that has 16 addressable storage elements or entries with each storage entry having five fields.

The storage unit receives the FREELIST signal from the FREELIST logic 821 and the RENAME_MAP signals from the RENAME MAP logic 824. Then, when the DO_CHKPT signals indicate that a checkpoint is to be formed, the trap stack storage read/write control logic 847 writes the FREELIST and RENAME_MAP signals into the appropriate fields of the storage entry corresponding to the checkpoint number identified by the DO_CHKPT signals. Since the current FREELIST and RENAME_MAP signals have been stored when the checkpoint was formed, the current mapping of track stack storage entries to trap levels and the current list of available trap stack storage entries have been checkpointed.

When the DO_BACKUP signals indicate that a backup to a checkpoint is being performed, the RD/WR control logic 847 reads out the checkpointed FREELIST and RENAME_MAP signals form the storage element corresponding to the checkpoint number is identified by the DO_BACKUP signals. The FREELIST signal is read out as the BACKUP_FREELIST signal while the RENAME_MAP signals are read out as the BACKUP_MAP signals.

As shown in FIG. 46, the FREELIST logic 821 receives the BACKUP_FREELIST and DO_BACKUP signals. Since the DO_BACKUP signals indicate that a backup is occurring, the AND circuit 838 provides the BACKUP_FREELIST to the OR circuit 835. As indicated previously, the bits of the signal received from the first-one-encoder 823 are logically ORed with the corresponding bits of the FREE_ENTRY and BACKUP_FREELIST signals to produce the FREELIST signal.

Referring to FIG. 47, the RENAME_MAP logic 824 receives the BACKUP_MAP and DO_BACKUP signals. Since the DO_BACKUP signals indicate that a backup is occurring, the WR_MUX_CNTRL signals the control circuit 825 generates provide the BACKUP_MAP_1–4 signals to the TL1–4 registers 830–833, respectively. As a result, the mapping of trap stack storage elements to trap levels that existed when the checkpoint was made has been reinstated.

As mentioned earlier, the CPU 51 issues and executes instructions speculatively. Since the trap stack unit 815 includes a mechanism to restore a previous trap level in case of a backup, it enables the CPU 51 to speculatively take and return from traps.

Figure 51:
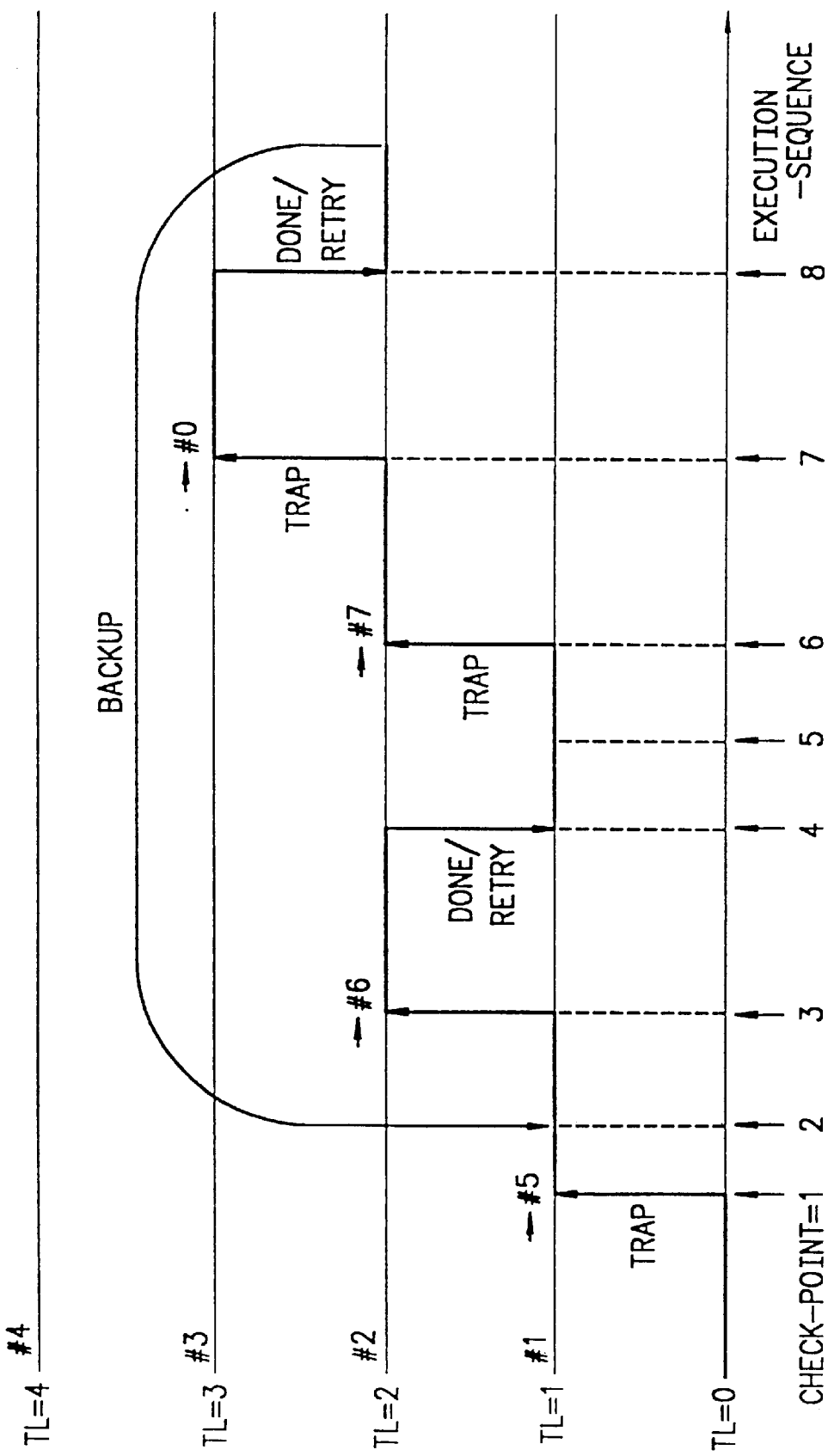
FIG. 51 shows Trap Stack Backup Example.

The ability of the CPU to take and return from traps speculatively is illustrated in FIG. 51. As shown, initially the execution sequence is at trap level 0 and trap levels 1–4 are mapped to trap stack storage entries 1–4, respectively. When the first trap is taken, the trap level is incremented to trap level 1, the checkpoint 1 is formed with the trap level to storage entry mappings at checkpoint 1 being checkpointed, and a new mapping of trap level 1 to storage entry 5 is made. A new checkpoint is made at checkpoint 2 for an instruction such as a predicted program control instruction with the trap level to storage entry mappings at checkpoint 2 being checkpointed. A second trap is then taken and the trap level is incremented to trap level 2, the checkpoint 3 is formed, the trap level to storage entry mappings at checkpoint 3 are checkpointed, and a new mapping of trap level 2 to storage entry 6 is made. When a done or retry instruction in the trap handler for the trap at trap level 2 is executed, the trap level is decremented to trap level 1, the checkpoint 4 is formed, and the trap level to storage entry mappings at checkpoint 4 are checkpointed. After returning to the trap handler for the trap at trap level 1, a checkpoint is made at checkpoint 5 for an instruction of this trap handler with the trap level to storage entry mappings at checkpoint 5 being checkpointed. When another trap is taken, the trap level is incremented to trap level 2, the checkpoint 6 is formed, the trap level to storage entry mappings at checkpoint 6 are checkpointed and a new mapping of trap level 2 to storage entry 7 is made. When yet another trap is taken, the trap level is incremented to trap level 3, the checkpoint 7 is formed, the trap level to storage entry mappings at checkpoint 7 are checkpointed, and a new mapping of trap level 3 to storage entry 0 is made. When a done or retry instruction in the trap handler for the trap at trap level 3 is executed, the trap level is decremented to trap level 2, the checkpoint 8 is formed, and the trap level to storage entry mappings at checkpoint 8 are checkpointed. Then, if it is determined that the program control instruction for which checkpoint 2 was formed was mispredicted, then a backup to checkpoint 2 occurs with the trap level to storage entry mapping at checkpoint 2 being restored. Thus, the traps for which checkpoints 3 and 7 were formed were taken and returned from speculatively while the trap for which checkpoint 6 was formed was taken speculatively.

As mentioned earlier, the TSTATE field of the trap stack includes a XICC field which holds the contents (i.e., XICC data) of the physical register mapped as the logical XICC register in the FSR/CCRFRN 606 in FIG. 8 when the trap was taken. Since fixed point instructions may be executed out of PC order by the FXU 601 and FXAGU 602, these contents may not be available at the time a trap occurs. Thus, without a mechanism for obtaining the correct XICC data at a later time, the PSU 300 would have to wait until the XICC data is available to take a trap.

However, referring to FIG. 45, the trap stack unit 815 includes such mechanism, namely the XICC grabbing logic 823. The XICC grabbing logic 823 receives from the FSR/CCRFRN 606 the CC_TAGS_C, CC_DV_C, CC_TAGS_F, and CC_DV_F signals while the trap stack 820 receives the CC_DATA_C and CC_DATA_F signals.

Figure 52:
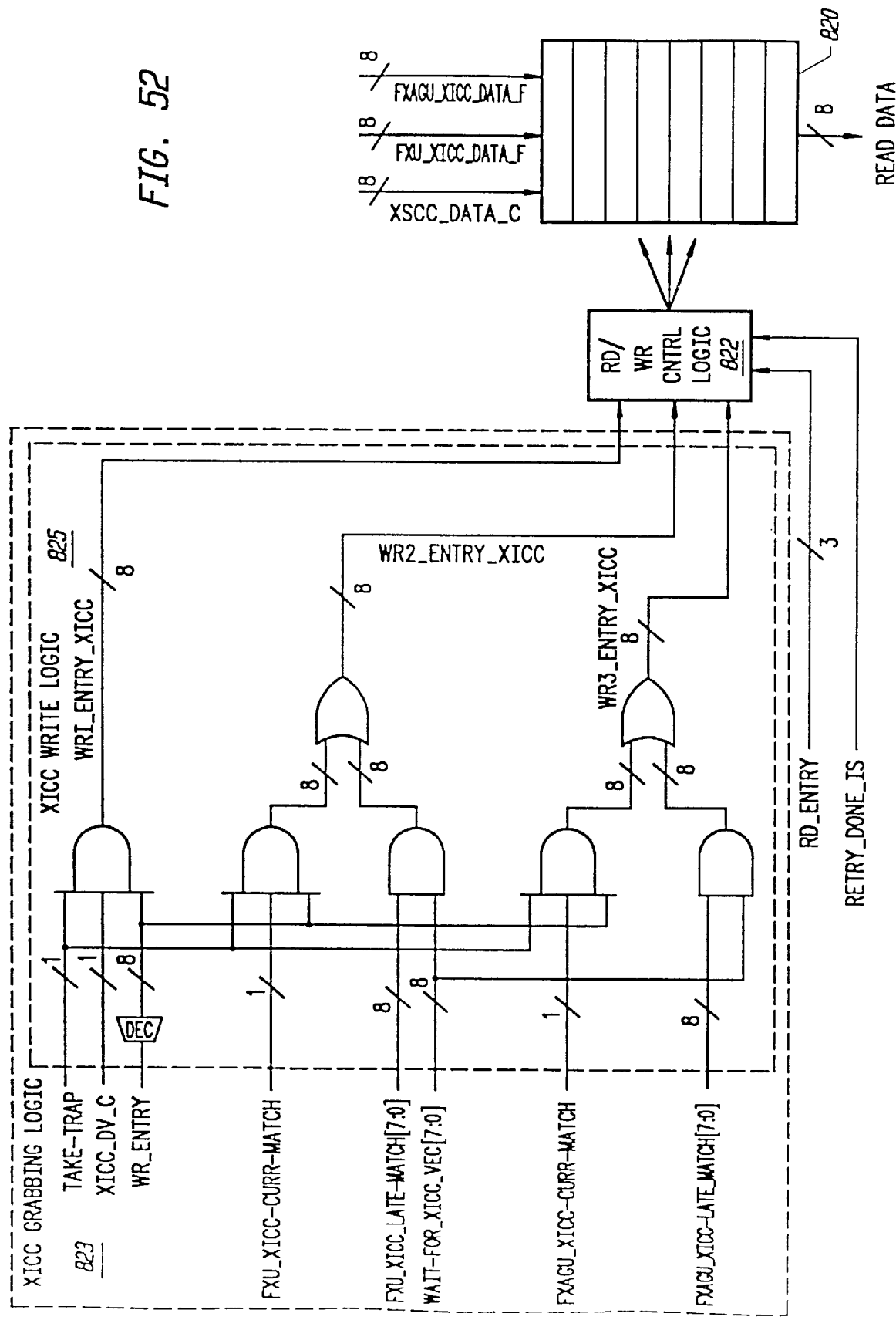
FIG. 52 shows XICC Write Logic.

Referring to FIG. 52, CC_DATA_C signals contain the XICC_DATA_C signal and the CC_DV_C signals contain the XICC_DV_C signal. The XICC_DATA_C signal contains the current contents, if available, of the logical XICC register (i.e., the physical register mapped as the logical XICC register by the CCRFRN 610 shown in FIG. 39) in the machine cycle when a trap is taken. The XICC_DV_C signal indicates if the contents of the XICC_DATA_C signal is valid (i.e., if the contents of the physical register currently mapped as the logical XICC register is available yet).

The contents of the physical register mapped as the logical XICC register at the time the trap is taken may already be available at that time. When this occurs, the XICC_DV_C signal indicates that the contents of the XICC_DATA_C signal is valid and the TAKE_TRAP signals received from the PSU 300 indicate that a trap is being taken. In response, the XICC write logic 825 provides a WR1_ENTRY_XICC signal that corresponds to the entry identified by the WR_ENTRY signal. When this occurs, the RD/WR control logic 822 of the trap stack unit 815 then writes the contents of the XICC_DATA_C signal into the XICC field of the TSTATE field of the entry of the trap stack 820 identified by the WR1_ENTRY_XICC signal.

Figure 53:
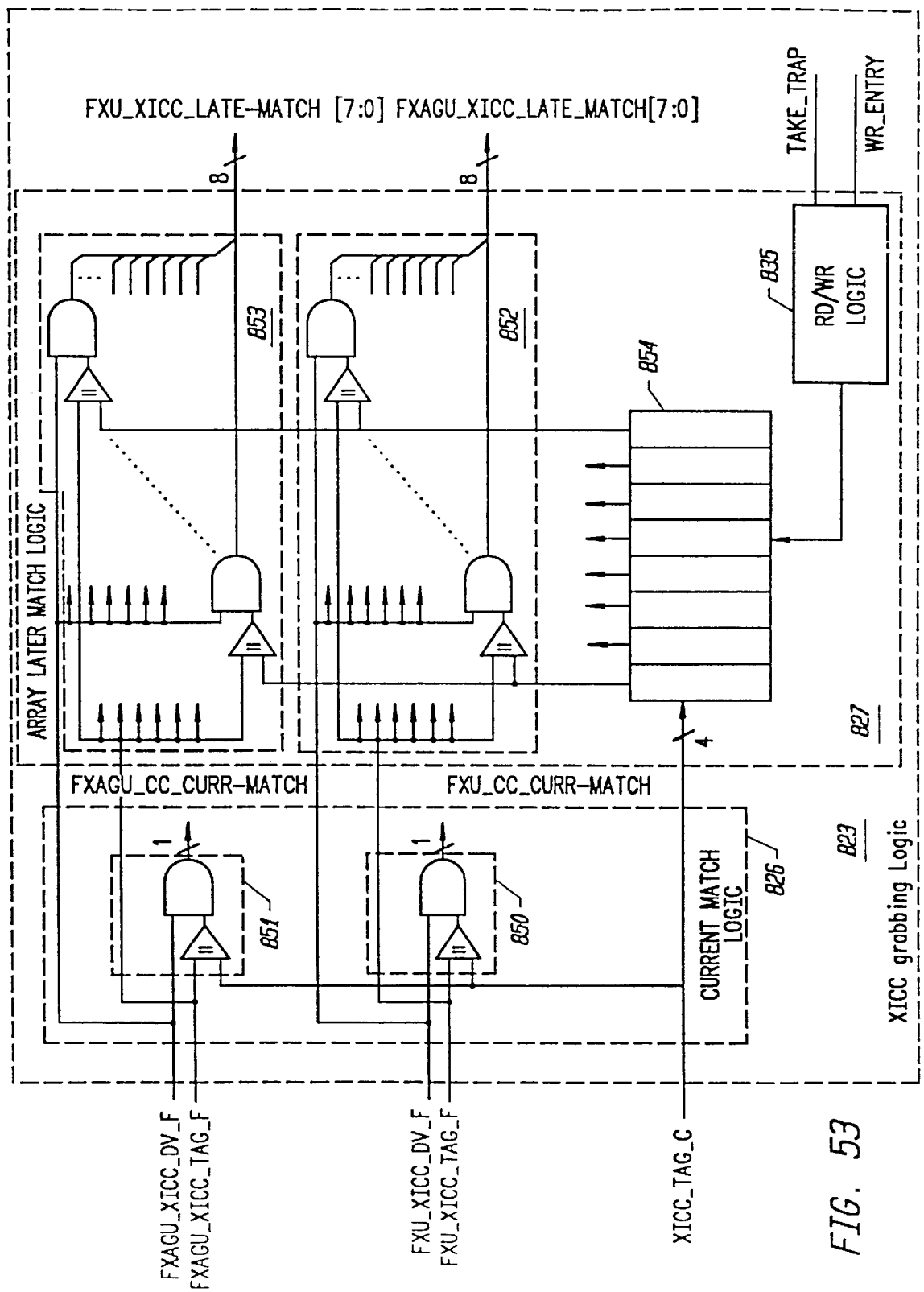
FIG. 53 shows XICC Grabbing Logic and Array Later Match Logic.

However, when the XICC_DV_C signal indicates that the contents of the XICC_DATA_C signal is not valid at the time the trap is taken, then the contents of the XICC_DATA_C signal are not written to the trap stack 820. In this case, the trap stack unit 815 must wait until the contents of the physical register mapped as the logical XICC register at the time the trap was taken becomes available. Referring to FIG. 53, in order to do this, the XICC grabbing logic 823 includes the current match logic 826 and the later match array logic 827.

Still referring to FIG. 53, the CC_TAG_C signals include the XICC_TAG_C signal which contains the physical register tag of the physical register mapped as the logical XICC register when the trap was taken. Moreover, the CC_TAG_F signals include the FXU_XICC_TAG_F and FXAGU_XICC_TAG_F signals respectively forwarded by the FXU 601 and FXAGU 602 when they execute fixed point instructions which modify the logical XICC register. These signals contain the physical register tags of the physical registers mapped as the logical XICC register for these executed fixed point instructions and to which the contents in the FXU_XICC_DATA_F and FXAGU_XICC_DATA_F signals of the CC_DATA_F signals are to be written. The FXU_XICC_DATA_F and FXAGU_XICC_DATA_F signals are respectively forwarded by the FXU 601 and the FXAGU 602.

The CC_DV_F signals include the FXU_XICC_TAG_F and FXAGU_XICC_TAG_F signals respectively forwarded by the FXU 601 and FXAGU 602 when they execute fixed point instructions which modify the logical XICC register. These signals indicate whether the contents in the FXU_XICC_DATA_F and FXAGU_XICC_DATA_F signals to be written to the physical registers mapped as the logical XICC register for the executed fixed point instructions are valid (i.e., available).

As indicated earlier, since instructions may be executed out of actual and/or predicted program order, the forwarded FXU_XICC_DATA_F and FXAGU_XICC_DATA_F signals will eventually contain the contents to be written to the physical register mapped as the logical XICC register when the trap was taken. This may occur in the same machine cycle in which the trap is taken (i.e., the current machine cycle) or in a later machine cycle.

In the case where this occurs in the same machine cycle, the XICC_TAG_C signal currently identifies the tag of the physical register mapped as the logical XICC register when the trap was taken. The tag identified by the XICC_TAG_C signal is compared by the compare logic 850 and the compare logic 850 of the current match logic 826 with the tags respectively identified by the FXU_XICC_TAG_F and FXAGU_XICC_TAG_F signals. If a match occurs, and the corresponding FXU_XICC_DATA_F or FXAGU_XICC_DV_F signal indicates that the contents in the corresponding FXU_XICC_DATA_F or FXAGU_XICC_DATA_F signal is valid, then the current match logic 826 outputs a corresponding FXU_XICC_CURR_MATCH or FXAGU_XICC_CURR_MATCH signal. This signal indicates that the contents of the physical register mapped as the logical XICC register when the trap was taken have become available in the same machine cycle in which the trap is taken.

Referring back to FIG. 52, during this machine cycle, the TAKE_TRAP signals still indicate that a trap is being taken and the WR_ENTRY signal still identifies the entry mapped to the trap level of the trap. Thus, in response to the FXU_XICC_CURR_MATCH or FXAGU_XICC_CURR_MATCH signal, the XICC write logic 825 generates the corresponding WR2_ENTRY_XICC or WR3_ENTRY_XICC signal. This signal corresponds to the entry identified by the WR_ENTRY signal. The RD/WR control logic 822 of the trap stack unit 815 then writes the contents of he FXU_XICC_DATA_F or FXAGU_XICC_DATA_F signal into the XICC field of the TSTATE field of the entry of the trap stack 820 identified by the corresponding WR2_ENTRY_XICC or WR3_ENTRY_XICC signal.

Turning to FIG. 53, as indicated earlier, at a machine cycle after the machine cycle in which the trap was taken, the forwarded FXU_XICC_DATA_F and FXAGU_XICC_DATA_F signals may contain the contents to be written to the physical register mapped as the XICC register when the trap was taken. So as to provide for this situation, the XICC grabbing logic 823 includes the later match array logic 827 which includes the tag array storage unit 854.

The storage unit 854 includes eight storage entries. Each entry corresponds to one of the entries of the trap stack 820. Thus, each time the TAKE_TRAP signal indicates that a trap is being taken, the RD/WR logic 855 writes the tag identified by the XICC_TAGA_C signal at that time to the entry of the storage unit 854 that corresponds to the entry of the trap stack 820 identified by the WR_ENTRY signal.

The compare array logics 852 and 853 respectively compare the tags identified by the FXU_XICC_TAG_F and FXAGU_XICC_TAG_F signals with each of the tags stored in the storage unit 854. As a result, if any matches occur, and the corresponding FXU_XICC_DV_F or FXAGU_XICC_DV_F signal indicates that the contents of the corresponding FXU_XICC_DATA_F or FXAGU_XICC_DATA_F signal is valid, then the corresponding compare array logic 852 or 853 outputs the corresponding FXU_XICC_LATE_MATCH or FXAGU_XICC_LATE_MATCH signal which identifies the entry of the trap stack 820 to which the contents of the corresponding FXU_XICC_DATA_F or FXAGU_XICC_DATA_F signal are to be written.

Figure 54:
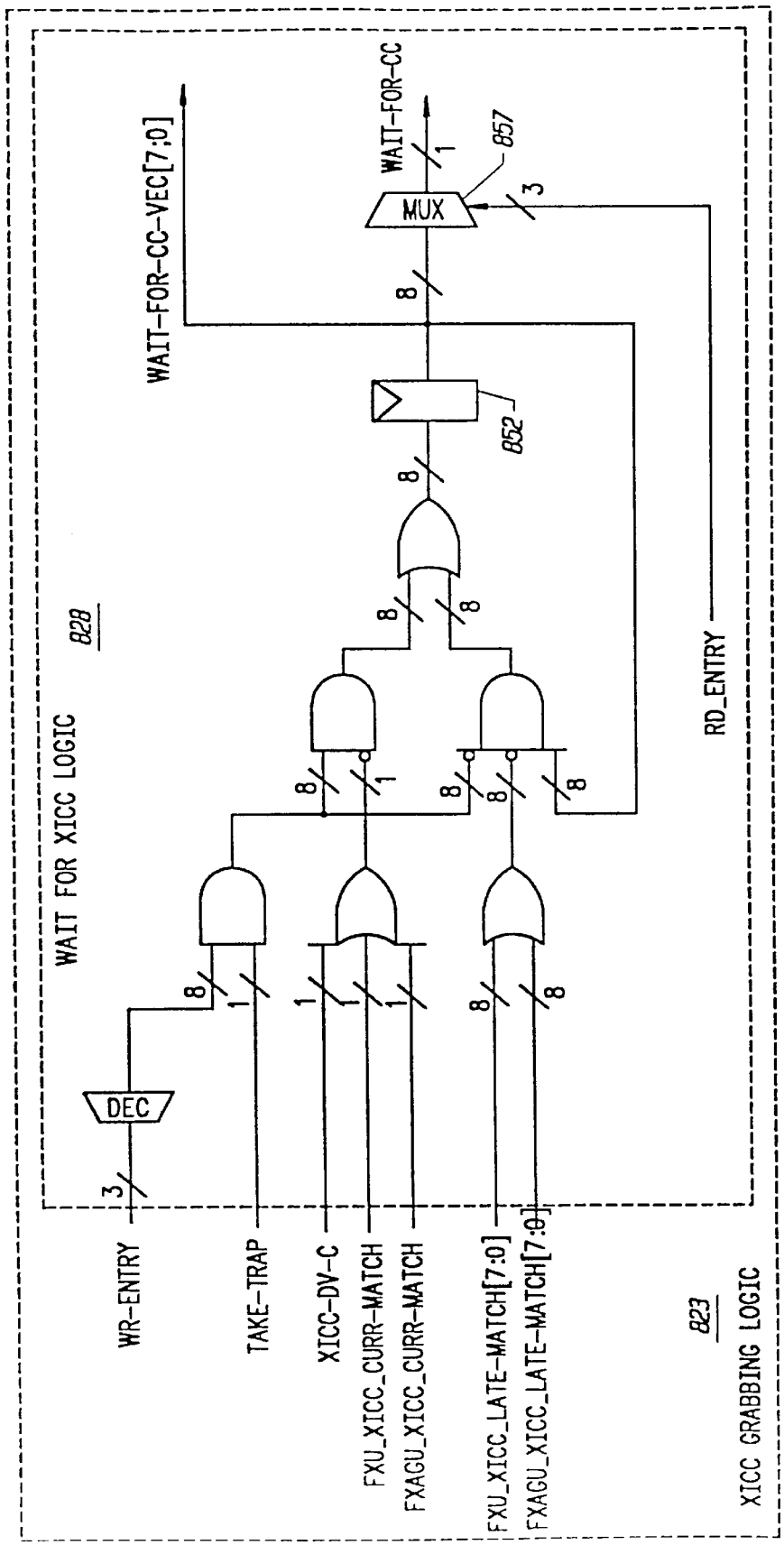
FIG. 54 shows Wait For Condition Code Logic.

Turning to FIG. 54, the XICC grabbing logic includes the wait for XICC logic 828. The register 856 stores the WAIT_FOR_XICC_VEC vector signal. Each bit of the WAIT_FOR_XICC_VEC vector signal corresponds to one of the entries of the trap stack 820 and is asserted when the corresponding entry is waiting for the contents of the physical register mapped as the logical XICC register at the time the corresponding trap was taken to become available. Thus, the WAIT_FOR_XICC_VEC vector signal provides a list of all of the entries of the trap stack 820 which are currently waiting for the contents of various physical registers mapped as the logical XICC register at the time the corresponding traps were taken to become available.

Each time a trap is taken as indicated by the TAKE_TRAP signals, and the XICC_DV_C signal indicates that the contents of the physical register mapped as the logical XICC register are not available at this time, and neither the FXU_XICC_CURR_MATCH signal nor the FXAGU_XICC_CURR_MATCH signal indicate this either, then the WR_ENTRY signal identifies an entry which is waiting for these contents to become available in a later machine cycle. In response, this entry is added by the wait for XICC logic 828 to the list provided by the WAIT_FOR_XICC_VEC vector signal of the entries of the trap stack 820 currently waiting for the contents to become available of the various physical registers mapped as the logical XICC register at the time the corresponding traps were taken.

However, as indicated earlier, when a trap is taken as indicated by the TAKE_TRAP signals, the XICC_DV_C signal may indicate that the contents of the physical register mapped as the logical XICC register are available at this time or the FXU_XICC_CURR_MATCH signal or the FXAGU_XICC_CURR_MATCH signal may indicate this. each time this occurs, the entry identified by the WR_ENTRY signal is not added by the wait for XICC logic 828 to the list provided by the WAIT_FOR_XICC_VEC vector signal.

Moreover, as indicated earlier, whenever the contents of a physical register mapped to the logical XICC register at the time the corresponding trap was taken has become available in a later machine cycle, the FXU_XICC_LATE_MATCH or FXAGU_XICC_LATE_MATCH signal will identify the entry of the trap stack 820 to which these contents are to be written. Turning also to FIG. 52, since at this point the WAIT_FOR_XICC_VEC vector signal still lists this entry, the XICC write logic 825 generates the corresponding WR2_ENTRY_XICC or WR3_ENTRY_XICC signal which identifies this entry. The RD/WR control logic 822 of the trap stack until 815 then writes the contents of the FXU_XICC_DATA_F or FXAGU_XICC_DATA_F signal (i.e., the contents of a physical register mapped to the logical XICC register at the time the corresponding trap was taken) into the XICC field of the TSTATE field of the entry of the trap stack 820 identified by the corresponding WR2_ENTRY_XICC or WR3_ENTRY_XICC signal. Then, referring back to FIG. 54, this entry is removed by the wait for XICC logic 828 from the list provided by the WAIT_FOR_XICC_VEC vector signal.

Thus, for each trap taken and not et returned from, the XICC grabbing logic is able to determine when the contents of the physical register mapped as the logical XICC register when the trap was taken becomes available and to which entry in the trap stack 820 these contents are to be written. As a result, nested traps may be taken even though these contents may not yet be available for any of the traps when they are taken. In other words, the XICC grabbing logic 823 is a mechanism that allows traps to be taken prior to all of the corresponding trap state (TSTATE) data being available.

However, upon return from taking a trap, the contents of the physical register mapped as the logical XICC register when the trap was taken must have been written into the corresponding entry of the trap stack 820. This is due to the fact that a RETRY or DONE instruction requires that these contents be written back into the physical register currently mapped as the logical XICC register.

As shown in FIG. 54, to insure that this occurs, the wait for XICC logic 828 includes a multiplexer 857. In response to the RD_ENTRY signal, which identifies the entry of the trap stack 820 currently mapped to the trap level of the current trap being taken, the multiplexer outputs the bit of the WAIT_FOR_XICC_VEC vector signal that corresponds to this entry as the WAIT_FOR_XICC signal. Thus, this signal indicates whether or not the entry of the trap stack 820 currently mapped to the trap level of the current trap being taken is waiting for the contents of the physical register mapped as the logical XICC register when the trap was taken.

Referring to FIG. 45, the XICC grabbing logic 823 outputs to the ISU 200 the WAIT_FOR_XICC signal. If this signal is asserted, then the ISU 200 sill not issue a RETRY or DONE instruction until the signal is no longer asserted.

When the ISU 200 finally issues a RETRY or DONE instruction, it outputs DONE_RETRY_IS signals that includes a signal that indicates if a DONE instruction was issued and a signal that indicates if a RETRY instruction was issued.

Referring to FIG. 47, the read multiplexer 835 outputs as the RD_ENTRY signal the RENAME_MAP signal that corresponds to the current TL value. And, referring to FIG. 45, the RD/WR control logic 822 of the trap stack unit 815 reads the TPC, TNPC, ASI, CWP, PSTATE and XICC values out from the storage element identified by the RD_ENTRY signal when the DONE_RETRY_IS signals indicate that a DONE or RETRY instruction has been issued.

Referring to FIG. 17, the ASI, CWP, and PSTATE values are written into their corresponding registers by the RD/WR/UPDATE logic 816 of the control register file 800 in response to the DONE_RETRY_IS signals.

Furthermore, as shown in FIG. 45, the TPC and TNPC values are provided to the BRB 59 with the RD_TPC_TNPC signals. As a result, the BRB 59 uses this values to form the PC and NPC values to fetch the next set of instructions.

Finally, the XICC values are provided to the DFB 62 with the RD_XICC signal. Referring to FIG. 8, in response to the DONE_RETRY_IS signal, the CCRFRN 610 maps the logical XICC register to a physical register. Thus, when the CCRFRN 610 receives the XICC data from the trap stack unit 815, it stores it in the newly mapped physical register.

Moreover, those skilled in the art will appreciate that the FXU 601 and the FXAGU 602 may each have more than one execution unit which can execute fixed point instructions that modify the logical XICC register. In this case, the XICC grabbing logic 823 would have duplicate logic to that already described in order to properly update the trap stack 820 with the contents of the physical register mapped as the logical XICC register at the time a trap is taken.

In addition, those skilled in the art will appreciate that the concept of the XICC grabbing logic 823 may be extended to other types of register for which the contents may not be available at the time a trap is taken but need to be written to a trap stack and for which register renaming (i.e., mapping of physical registers to logical registers) has been implemented.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

We claim:

1. In a processor having an instruction execution unit, an instruction issue unit, and a memory for storing data within said processor, a method of restoring a prior processor state at any instruction boundary upon detecting a fault or exception condition; said method comprising:

allocating an instruction serial number for each issued instruction;

storing processor state in a checkpoint within said memory prior to execution only for a first set of executable instructions that will or may alter processor state, said first set of executable instructions being fewer in number than the set of all of the instructions that will or may alter machine state implemented within said processor;

identifying a faulting instruction causing said fault or exception condition, and if multiple such conditions occurred simultaneously, then identifying said faulting instruction as the in order sequentially earliest instruction causing one of said multiple simultaneous conditions;

if said faulting instruction causing said condition is a checkpointed instruction, then restoring a processor state stored prior to execution of said faulting instruction causing said conditions;

if one of said executable instructions for which a processor state information has been stored is sequentially interposed between said faulting instruction causing said condition and the last issued instruction, then:
  (i) first, backing-up said processor to the closest checkpoint near said faulting instruction sequentially after said faulting instruction, and
  (ii) second, backstepping said processor to restore processor state to the state that existed just prior to execution of said faulting instruction by updating register resources, and
  (iii) decrementing a processor program counter associated with said processor to the instruction serial number of said faulting instruction.

2. The method of claim 1, wherein said step of storing processor state in said memory comprises the step of storing a register rename map rather than storing register data values, and storing alternative next program counters for speculatively issued predicted instructions.

3. The method of claim 1, wherein said a first set of instructions are instructions selected from the group consisting of: predicted program control transfer instructions including predicted branch instructions; instructions that may have the side-effect of modifying control register values; instructions of the type that result in program flow changes including jump-and-link type instructions; and combinations thereof; and selected instructions of the type that modify processor state including (i) instructions which may have the side-effect of modifying control register values, but limited to fewer than all instruction of checkpointed state, non-checkpointed instructions of this type resulting in controlled processor synchronizing (ii) instructions which frequently result in an instruction issue trap; and (iii) instructions of the type that initiate speculative trap entry.

4. The method of claim 2, further comprising the step of synchronizing said processor prior to executing any one of a second set of instructions that involve a speculative instruction sequence.

5. The method of claim 4, wherein said synchronizing said processor comprises:

temporarily suspending issue or execution of said instruction requiring processor synchronization prior to execution;

waiting for all pending instructions in the execution stage to be committed and retired; and after said processor arrives at processor synchronization, issuing or executing said instruction.

6. A method of restoring machine state in a processor at any instruction boundary comprising:

for any instruction which may modify control registers, either: (i) synchronizing said machine prior to execution of said instruction, or (ii) storing an instruction checkpoint to preserve machine state prior to execution of said instruction; and for any instruction that creates a program counter discontinuity, storing an instruction checkpoint within said processor to preserve architectural and machine state prior to execution of said instruction; and monitoring instruction execution to detect an execution exception or fault condition;

saving an instruction identifier of each instruction that results in said execution exception or fault condition;

if more than one executed instruction results in an execution exception or fault condition, determining which of said more than one excepting or faulting instructions occurred sequentially earlier;

using an instruction identifier for said earliest excepting or faulting instruction as an endpoint to backup a program counter in said processor;

if said earliest faulting instruction is a checkpointed instruction, then restoring said machine state stored in the checkpoint prior to execution of said faulting instruction; and if one of said instructions for which a machine state has been stored is sequentially interposed between said faulting instruction and the last issued instruction, then (i) backing-up said processor to the closest checkpoint near said faulting instruction after said faulting instruction, (ii) backstepping said processor to restore machine state to the state that existed just prior to execution of said faulting instruction by updating register resources, and (iii) decrementing said processor program counter to the instruction identifier of said faulting instruction.

7. The method of claim 6, wherein said instruction identifier is an instruction serial number assigned at the time said instruction was issued.

8. The method of claim 7, wherein each said checkpoint includes a register rename map and control; architectural control register values; an instruction serial number (ISN); an architectural program counter (APC) and next architectural program counter (NAPC); and an alternate next program counter (ANPC).

9. The method of claim 7, wherein said checkpoints are generated and assigned during instruction issue.

10. The method of claim 7, wherein said synchronizing the machine comprising:

suspending issue or execution of said instruction requiring machine synchronization prior to said issue or execution;

waiting for all pending instructions in the execution stage to be committed; and after said processor arrives at machine synchronization, issuing or executing said instruction requiring machine synchronization.

* * * * *